(12) United States Patent
Hiwatari et al.

(10) Patent No.: US 9,672,007 B2
(45) Date of Patent: Jun. 6, 2017

(54) DEVICE FOR PERFORMING ARITHMETIC OPERATIONS OF MULTIVARIATE POLYNOMIALS, CONTROL METHOD, AND PROGRAM

(71) Applicant: SONY CORPORATION, Tokyo (JP)

(72) Inventors: Harunaga Hiwatari, Kanagawa (JP); Toru Akishita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 336 days.

(21) Appl. No.: 14/366,129

(22) PCT Filed: Feb. 15, 2013

(86) PCT No.: PCT/JP2013/053651
§ 371 (c)(1),
(2) Date: Jun. 17, 2014

(87) PCT Pub. No.: WO2013/129134
PCT Pub. Date: Sep. 6, 2013

(65) Prior Publication Data
US 2014/0365546 A1 Dec. 11, 2014

(30) Foreign Application Priority Data

Mar. 2, 2012 (JP) .................................. 2012-046688
Aug. 31, 2012 (JP) .................................. 2012-191546

(51) Int. Cl.
G06F 5/01 (2006.01)
H04L 9/30 (2006.01)
(Continued)

(52) U.S. Cl.
CPC ................ *G06F 5/01* (2013.01); *G06F 7/544* (2013.01); *G06F 7/552* (2013.01); *H04L 9/3093* (2013.01);
(Continued)

(58) Field of Classification Search
None
See application file for complete search history.

(56) References Cited

U.S. PATENT DOCUMENTS

| 6,111,952 | A | 8/2000 | Patarin | |
|---|---|---|---|---|
| 7,631,190 | B2 * | 12/2009 | Walmsley | ................ H04L 9/12 380/44 |

(Continued)

FOREIGN PATENT DOCUMENTS

| JP | 10-505439 A | 5/1998 |
|---|---|---|
| JP | 2004-158951 A | 6/2004 |

(Continued)

OTHER PUBLICATIONS

Morris Mano, "Registers and Counters", Slides Handout Based on "Digital Design" by Morris Mano, 4th Edition, Jan. 1, 2008, pp. 11, XP055217693.

(Continued)

*Primary Examiner* — Michael D Yaary
(74) *Attorney, Agent, or Firm* — Chip Law Group

(57) ABSTRACT

Provided is an arithmetic operation device including a plurality of shift registers each constituted by first to $(N+1)^{th}$ registers and a control unit configured to cause the shift registers to move stored values. The control unit causes the stored values to be output from a predetermined pair of registers constituting the first shift register while causing the stored values to move so that all combinations of a pair of stored values selectable from the stored values are output, and causes the stored values to be output from a predetermined pair of registers constituting the other shift register while causing the stored values to move.

16 Claims, 81 Drawing Sheets

(51) Int. Cl.
  *H04L 9/32* (2006.01)
  *G06F 7/544* (2006.01)
  *G06F 7/552* (2006.01)

(52) U.S. Cl.
  CPC .......... *H04L 9/3221* (2013.01); *H04L 9/3247* (2013.01); *H04L 2209/125* (2013.01)

(56) References Cited

U.S. PATENT DOCUMENTS

| | | | |
|---|---|---|---|
| 7,757,086 B2 * | 7/2010 | Walmsley | B41J 2/17546 380/259 |
| 2003/0206628 A1 * | 11/2003 | Gura | G06F 7/724 380/28 |
| 2009/0182795 A1 * | 7/2009 | Dobbek | H03M 7/24 708/209 |
| 2012/0233704 A1 | 9/2012 | Sakumoto et al. | |

FOREIGN PATENT DOCUMENTS

| | | |
|---|---|---|
| JP | 2011-107528 A | 6/2011 |
| WO | WO 2012/014669 A1 | 2/2012 |

OTHER PUBLICATIONS

Ray Andraka, "A Survey of Cordic Algorithms for FPGA Based Computers", FGPA '98 Proceedings of the 1998 ACM/SIGDA International Symposium on Field Programmable Gate Arrays, Feb. 22, 1998, pp. 10, vol. 6th, ISBN: 0-89791-978-5, ACM, New York, USA.

Jacques Patarin: "Asymmetric Cryptography With a Hidden Monomial", Advances in Cryptology—CRYPTO '96, 16th Annual International Cryptology Conference Santa Barbara, Aug. 18-22, 1996, p. 16, ISBN: 978-3-540-61512-5, Springer-Verlag Berlin Heidelberg, DE.

"Supplementary European Search Report", Received for European Patent Application No. 13754141.3, Mailed on Oct. 9, 2015, pp. 8.

International Search Report issued Apr. 16, 2013 in PCT/JP2013/053651.

Jacques Patarin, et al., "Quartz, 128-bit long digital signatures", CT-RSA 2001, LNCS 2020, http://www.minrank.org/quartz/, 2001, pp. 282-297.

Jacques Patarin, "Asymmetric cryptography with a hidden monomial and a candidate algorithm for $\cong$ 64 bits asymmetric signatures", CP8 TRANSAC, 1996, pp. 45-60.

\* cited by examiner

FIG. 13

| ADDRESS | STORED VALUE |
|---|---|
| 00...00 | $a_{1,2}$ |
| 00...01 | $a_{1,3}$ |
| ... | ... |
| ... | $a_{1,n}$ |
| ... | $b_1$ |
| ... | $a_{2,3}$ |
| ... | $a_{2,4}$ |
| ... | ... |
| ... | $a_{2,n}$ |
| ... | $b_2$ |
| ... | ... |
| ... | ... |
| ... | ... |
| ... | $a_{n-2,n-1}$ |
| ... | $a_{n-2,n}$ |
| ... | $b_{n-2}$ |
| ... | $a_{n-1,n}$ |
| ... | $b_{n-1}$ |
| ... | $b_n$ |

FIG. 15

| ADDRESS | STORED VALUE |
|---|---|
| 00...00 | $a_{112}, a_{212}, ..., a_{m12}$ |
| 00...01 | $a_{113}, a_{213}, ..., a_{m13}$ |
| ... | ... |
| ... | $a_{11n}, a_{21n}, ..., a_{m1n}$ |
| ... | $b_{11}, b_{21}, ..., b_{m1}$ |
| ... | $a_{123}, a_{223}, ..., a_{m23}$ |
| ... | $a_{124}, a_{224}, ..., a_{m24}$ |
| ... | ... |
| ... | $a_{12n}, a_{22n}, ..., a_{m2n}$ |
| ... | $b_{12}, b_{22}, ..., b_{m2}$ |
| ... | ... |
| ... | ... |
| ... | ... |
| ... | $a_{1(n-2)(n-1)}, a_{2(n-2)(n-1)}, ..., a_{m(n-2)(n-1)}$ |
| ... | $a_{1(n-2)n}, a_{2(n-2)n}, ..., a_{m(n-2)n}$ |
| ... | $b_{1(n-2)}, b_{2(n-2)}, ..., b_{m(n-2)}$ |
| ... | $a_{1(n-1)n}, a_{2(n-1)n}, ..., a_{m(n-1)n}$ |
| ... | $b_{1(n-1)}, b_{2(n-1)}, ..., b_{m(n-1)}$ |
| ... | $b_{1n}, b_{2n}, ..., b_{mn}$ |

FIG. 23
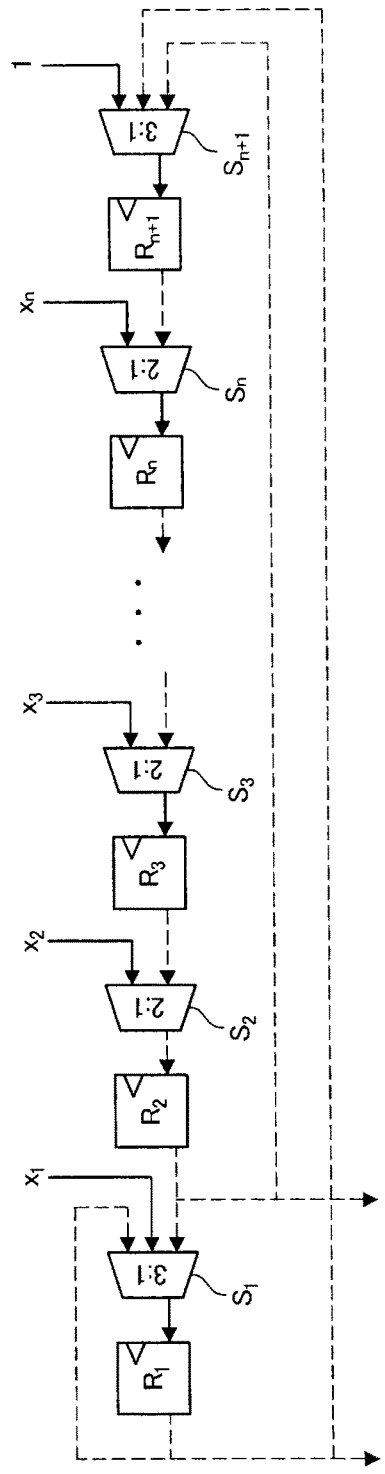
(P1): STORE VALUE
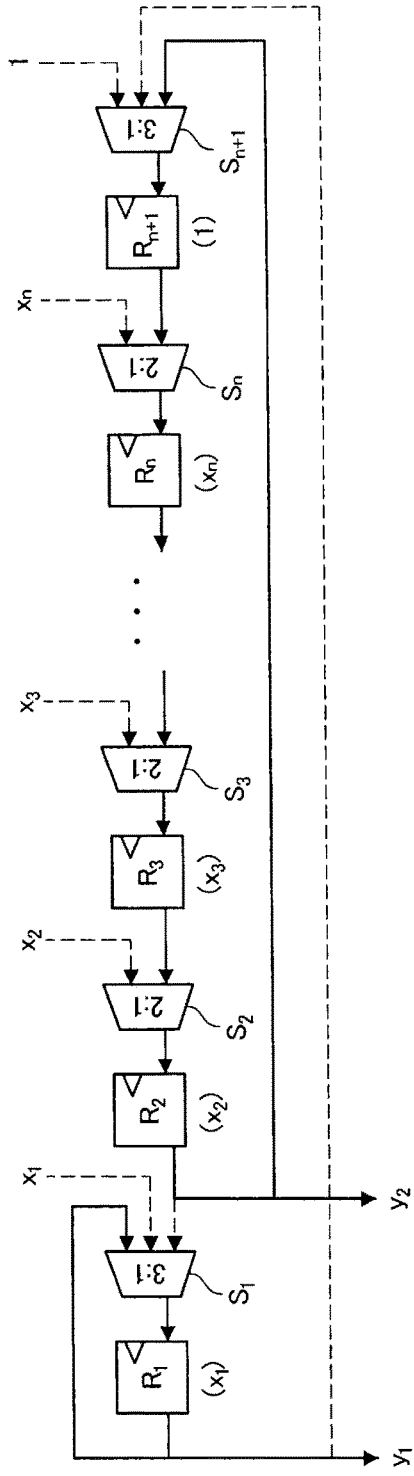
(P2): OUTPUT & UPDATING

FIG. 26

| CYCLE NUMBER | $a_{i,j}$ | y | $y_1$ | $y_2$ | $R_1$ | $R_2$ | $R_3$ | $R_4$ | $R_5$ |
|---|---|---|---|---|---|---|---|---|---|
| 1 | $a_{1,2}$ | $x_1 x_2$ | $x_1$ | $x_2$ | $x_1$ | $x_2$ | $x_3$ | $x_4$ | 1 |
| 2 | $a_{1,3}$ | $x_1 x_3$ | $x_1$ | $x_3$ | $x_1$ | $x_3$ | $x_4$ | 1 | $x_2$ |
| 3 | $a_{1,4}$ | $x_1 x_4$ | $x_1$ | $x_4$ | $x_1$ | $x_4$ | 1 | $x_2$ | $x_3$ |
| 4 | $b_1$ | $x_1$ | $x_1$ | 1 | $x_1$ | 1 | $x_2$ | $x_3$ | $x_4$ |
| 5 | - | $x_1 x_2$ | $x_1$ | $x_2$ | $x_1$ | $x_2$ | $x_3$ | $x_4$ | 1 |
| 5 + 1 | $a_{2,3}$ | $x_2 x_3$ | $x_2$ | $x_3$ | $x_2$ | $x_3$ | $x_4$ | 1 | $x_1$ |
| 5 + 2 | $a_{2,4}$ | $x_2 x_4$ | $x_2$ | $x_4$ | $x_2$ | $x_4$ | 1 | $x_1$ | $x_3$ |
| 5 + 3 | $b_2$ | $x_2$ | $x_2$ | 1 | $x_2$ | 1 | $x_1$ | $x_3$ | $x_4$ |
| 5 + 4 | - | $x_2 x_1$ | $x_2$ | $x_1$ | $x_2$ | $x_1$ | $x_3$ | $x_4$ | 1 |
| 2 x 5 | - | $x_2 x_3$ | $x_2$ | $x_3$ | $x_2$ | $x_3$ | $x_4$ | 1 | $x_1$ |
| 2 x 5 + 1 | $a_{3,4}$ | $x_3 x_4$ | $x_3$ | $x_4$ | $x_3$ | $x_4$ | 1 | $x_1$ | $x_2$ |
| 2 x 5 + 2 | $b_3$ | $x_3$ | $x_3$ | 1 | $x_3$ | 1 | $x_1$ | $x_2$ | $x_4$ |
| 2 x 5 + 3 | - | $x_3 x_1$ | $x_3$ | $x_1$ | $x_3$ | $x_1$ | $x_2$ | $x_4$ | 1 |
| 2 x 5 + 4 | - | $x_3 x_2$ | $x_3$ | $x_2$ | $x_3$ | $x_2$ | $x_4$ | 1 | $x_1$ |
| 3 x 5 | - | $x_3 x_4$ | $x_3$ | $x_4$ | $x_3$ | $x_4$ | 1 | $x_1$ | $x_2$ |
| 3 x 5 + 1 | $b_4$ | $x_4$ | $x_4$ | 1 | $x_4$ | 1 | $x_1$ | $x_2$ | $x_3$ |

FIG. 30
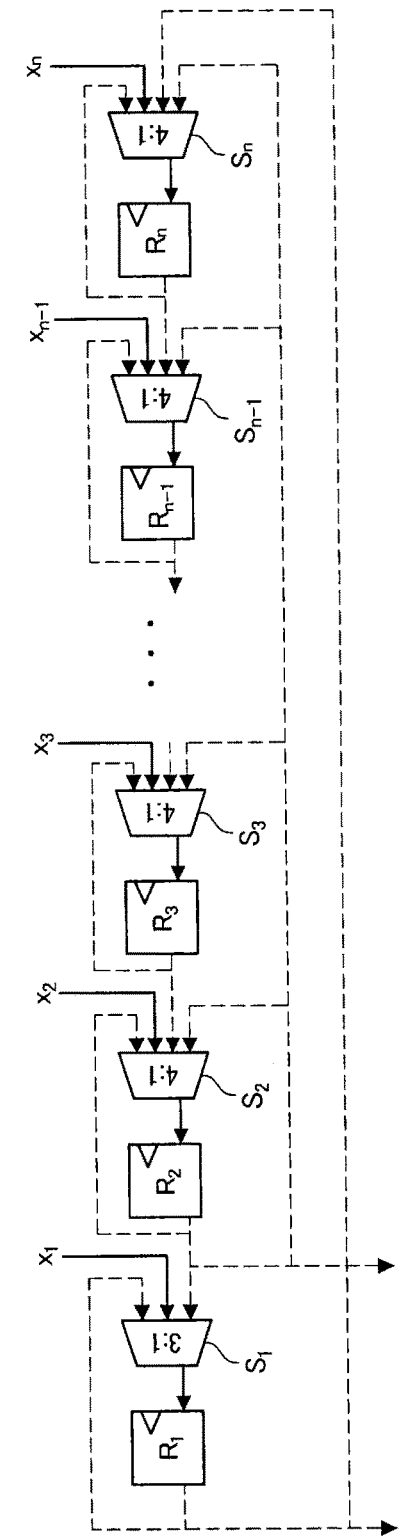
(P1): STORE VALUE
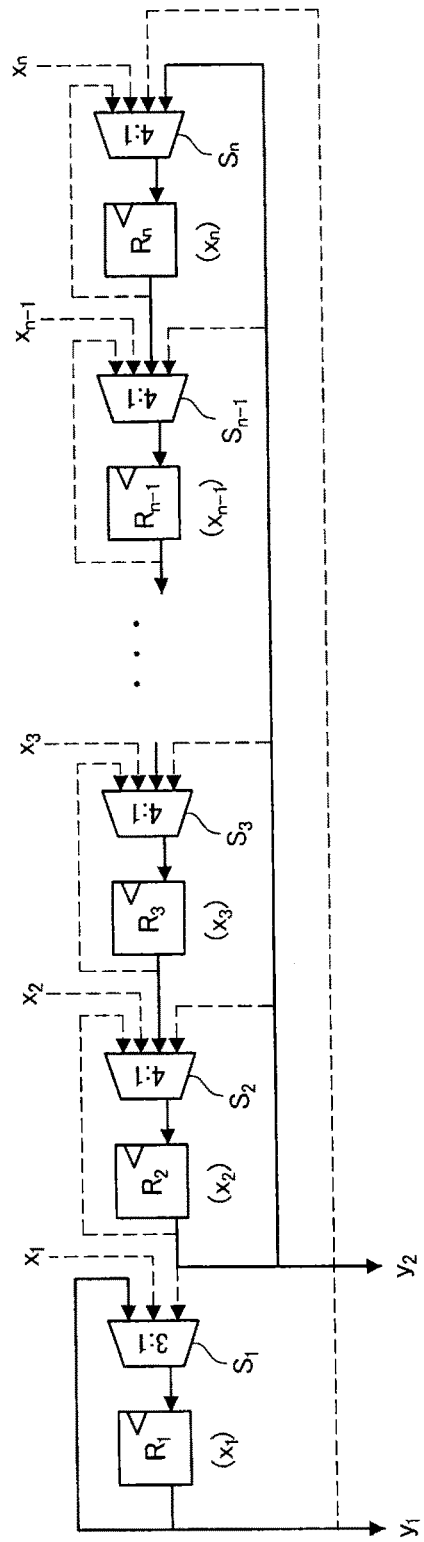
(P2): OUTPUT & UPDATING

FIG. 33

| CYCLE NUMBER | $a_{i,j}$ | y | mask | $y_1$ | $y_2$ | $R_1$ | $R_2$ | $R_3$ | $R_4$ |
|---|---|---|---|---|---|---|---|---|---|
| 1 | $a_{1,2}$ | $x_1 x_2$ | 0 | $x_1$ | $x_2$ | $x_1$ | $x_2$ | $x_3$ | $x_4$ |
| 2 | $a_{1,3}$ | $x_1 x_3$ | 0 | $x_1$ | $x_3$ | $x_1$ | $x_3$ | $x_4$ | $x_2$ |
| 3 | $a_{1,4}$ | $x_1 x_4$ | 0 | $x_1$ | $x_4$ | $x_1$ | $x_4$ | $x_2$ | $x_3$ |
| 4 | $b_1$ | $x_1$ | 1 | $x_1$ | $x_2$ | $x_1$ | $x_2$ | $x_3$ | $x_4$ |
| 4 + 1 | $a_{2,3}$ | $x_2 x_3$ | 0 | $x_2$ | $x_3$ | $x_2$ | $x_3$ | $x_4$ | $x_1$ |
| 4 + 2 | $a_{2,4}$ | $x_2 x_4$ | 0 | $x_2$ | $x_4$ | $x_2$ | $x_4$ | $x_3$ | $x_1$ |
| 4 + 3 | $b_2$ | $x_2$ | 1 | $x_2$ | $x_3$ | $x_2$ | $x_3$ | $x_4$ | $x_1$ |
| 4 + 3 + 1 | $a_{3,4}$ | $x_3 x_4$ | 0 | $x_3$ | $x_4$ | $x_3$ | $x_4$ | $x_1$ | $x_2$ |
| 4 + 3 + 2 | $b_3$ | $x_3$ | 1 | $x_3$ | $x_4$ | $x_3$ | $x_4$ | $x_1$ | $x_2$ |
| 4 + 3 + 2 + 1 | $b_4$ | $x_4$ | 1 | $x_4$ | $x_3$ | $x_4$ | $x_1$ | $x_2$ | $x_3$ |

(P1): STORE VALUE (P3): OUTPUT & UPDATING (SHIFT ALL)

FIG. 42

| CYCLE NUMBER | $a_{i,j}$ | y | $y_{1,1}$ | $y_{1,2}$ | $R_{1,1}$ | $R_{1,2}$ | $R_{1,3}$ | $R_{1,4}$ | $R_{1,5}$ | $y_{2,1}$ | $y_{2,2}$ | $R_{2,1}$ | $R_{2,2}$ | $R_{2,3}$ | $R_{2,4}$ | $R_{2,5}$ |
|---|---|---|---|---|---|---|---|---|---|---|---|---|---|---|---|---|
| 1 | $a_{1,2}$ | $x_{1,1}x_{1,2}$ | $x_{1,1}$ | $x_{1,2}$ | $x_{1,1}$ | $x_{1,2}$ | $x_{1,3}$ | $x_{1,4}$ | 1 | $x_{2,4}$ | 1 | $x_{2,4}$ | $x_{2,3}$ | $x_{2,2}$ | $x_{2,1}$ | 1 |
| 2 | $a_{1,3}$ | $x_{1,1}x_{1,3}$ | $x_{1,1}$ | $x_{1,3}$ | $x_{1,1}$ | $x_{1,3}$ | $x_{1,4}$ | 1 | $x_{1,2}$ | $x_{2,4}$ | $x_{2,3}$ | $x_{2,4}$ | $x_{2,2}$ | $x_{2,1}$ | 1 | $x_{2,3}$ |
| 3 | $a_{1,4}$ | $x_{1,1}x_{1,4}$ | $x_{1,1}$ | $x_{1,4}$ | $x_{1,1}$ | $x_{1,4}$ | 1 | $x_{1,2}$ | $x_{1,3}$ | $x_{2,4}$ | $x_{2,2}$ | $x_{2,4}$ | $x_{2,1}$ | 1 | $x_{2,3}$ | $x_{2,2}$ |
| 4 | $b_1$ | $x_{1,1}$ | $x_{1,1}$ | 1 | $x_{1,1}$ | 1 | $x_{1,2}$ | $x_{1,3}$ | $x_{1,4}$ | $x_{2,4}$ | $x_{2,1}$ | $x_{2,4}$ | 1 | $x_{2,3}$ | $x_{2,2}$ | $x_{2,1}$ |
| 5 | $b'_4$ | $x_{2,4}$ | $x_{1,1}$ | $x_{1,2}$ | $x_{1,1}$ | $x_{1,2}$ | $x_{1,3}$ | $x_{1,4}$ | 1 | $x_{2,3}$ | 1 | $x_{2,3}$ | $x_{2,3}$ | $x_{2,3}$ | 1 | $x_{2,4}$ |
| 5+1 | $a_{2,3}$ | $x_{1,2}x_{1,3}$ | $x_{1,2}$ | $x_{1,3}$ | $x_{1,2}$ | $x_{1,3}$ | $x_{1,4}$ | 1 | $x_{1,1}$ | $x_{2,3}$ | $x_{2,4}$ | $x_{2,3}$ | $x_{2,2}$ | $x_{2,1}$ | 1 | $x_{2,4}$ |
| 5+2 | $a_{2,4}$ | $x_{1,2}x_{1,4}$ | $x_{1,2}$ | $x_{1,4}$ | $x_{1,2}$ | $x_{1,4}$ | 1 | $x_{1,1}$ | $x_{1,3}$ | $x_{2,3}$ | $x_{2,2}$ | $x_{2,3}$ | $x_{2,1}$ | 1 | $x_{2,4}$ | $x_{2,2}$ |
| 5+3 | $b_2$ | $x_{1,2}$ | $x_{1,2}$ | 1 | $x_{1,2}$ | 1 | $x_{1,1}$ | $x_{1,3}$ | $x_{1,4}$ | $x_{2,3}$ | $x_{2,1}$ | $x_{2,3}$ | 1 | $x_{2,4}$ | $x_{2,2}$ | $x_{2,1}$ |
| 5+4 | $b'_3$ | $x_{2,3}$ | $x_{1,2}$ | $x_{1,1}$ | $x_{1,2}$ | $x_{1,1}$ | $x_{1,3}$ | $x_{1,4}$ | 1 | $x_{2,2}$ | 1 | $x_{2,2}$ | $x_{2,4}$ | $x_{2,2}$ | 1 | $x_{2,4}$ |
| 2×5 | $a'_{3,4}$ | $x_{2,3}x_{2,4}$ | $x_{1,2}$ | $x_{1,3}$ | $x_{1,2}$ | $x_{1,3}$ | $x_{1,4}$ | 1 | $x_{1,1}$ | $x_{2,2}$ | $x_{2,4}$ | $x_{2,2}$ | $x_{2,2}$ | $x_{2,1}$ | 1 | $x_{2,4}$ |
| 2×5+1 | $a_{3,4}$ | $x_{1,3}x_{1,4}$ | $x_{1,3}$ | $x_{1,4}$ | $x_{1,3}$ | $x_{1,4}$ | 1 | $x_{1,1}$ | $x_{1,2}$ | $x_{2,2}$ | $x_{2,3}$ | $x_{2,2}$ | $x_{2,2}$ | 1 | $x_{2,4}$ | $x_{2,3}$ |
| 2×5+2 | $b_3$ | $x_{1,3}$ | $x_{1,3}$ | 1 | $x_{1,3}$ | 1 | $x_{1,1}$ | $x_{1,2}$ | $x_{1,4}$ | $x_{2,2}$ | $x_{2,1}$ | $x_{2,2}$ | 1 | $x_{2,4}$ | $x_{2,3}$ | $x_{2,1}$ |
| 2×5+3 | $b'_2$ | $x_{2,2}$ | $x_{1,3}$ | $x_{1,1}$ | $x_{1,3}$ | $x_{1,1}$ | $x_{1,2}$ | $x_{1,4}$ | 1 | $x_{2,2}$ | $x_{2,2}$ | $x_{2,4}$ | $x_{2,2}$ | $x_{2,1}$ | 1 | $x_{2,4}$ |
| 2×5+4 | $a'_{2,4}$ | $x_{2,2}x_{2,4}$ | $x_{1,3}$ | $x_{1,2}$ | $x_{1,3}$ | $x_{1,2}$ | $x_{1,4}$ | 1 | $x_{1,1}$ | $x_{2,2}$ | $x_{2,3}$ | $x_{2,2}$ | $x_{2,4}$ | $x_{2,2}$ | 1 | $x_{2,3}$ |
| 3×5 | $a'_{2,3}$ | $x_{2,2}x_{2,3}$ | $x_{1,3}$ | $x_{1,4}$ | $x_{1,3}$ | $x_{1,4}$ | 1 | $x_{1,1}$ | $x_{1,2}$ | $x_{2,1}$ | $x_{2,2}$ | $x_{2,1}$ | $x_{2,3}$ | $x_{2,1}$ | 1 | $x_{2,2}$ |
| 3×5+1 | $b_4$ | $x_{1,4}$ | $x_{1,4}$ | 1 | $x_{1,4}$ | $x_{1,1}$ | $x_{1,2}$ | $x_{1,3}$ | 1 | $x_{2,1}$ | $x_{2,4}$ | $x_{2,1}$ | $x_{2,4}$ | $x_{2,1}$ | $x_{2,4}$ | 1 |
| 3×5+2 | $b'_1$ | $x_{2,1}$ | $x_{1,4}$ | $x_{1,1}$ | $x_{1,4}$ | $x_{1,1}$ | $x_{1,2}$ | $x_{1,3}$ | 1 | $x_{2,1}$ | $x_{2,4}$ | $x_{2,1}$ | $x_{2,4}$ | $x_{2,3}$ | $x_{2,4}$ | $x_{2,3}$ |
| 3×5+3 | $a'_{1,4}$ | $x_{2,1}x_{2,4}$ | $x_{1,4}$ | $x_{1,2}$ | $x_{1,4}$ | $x_{1,2}$ | $x_{1,3}$ | 1 | $x_{1,1}$ | $x_{2,1}$ | $x_{2,3}$ | $x_{2,1}$ | $x_{2,4}$ | $x_{2,3}$ | $x_{2,4}$ | $x_{2,2}$ |
| 3×5+4 | $a'_{1,3}$ | $x_{2,1}x_{2,3}$ | $x_{1,4}$ | $x_{1,3}$ | $x_{1,4}$ | $x_{1,3}$ | 1 | $x_{1,1}$ | $x_{1,2}$ | $x_{2,1}$ | $x_{2,3}$ | $x_{2,1}$ | $x_{2,4}$ | $x_{2,3}$ | $x_{2,4}$ | $x_{2,3}$ |
| 4×5 | $a'_{1,2}$ | $x_{2,1}x_{2,2}$ | $x_{1,4}$ | 1 | $x_{1,4}$ | 1 | $x_{1,1}$ | $x_{1,2}$ | $x_{1,3}$ | $x_{2,1}$ | $x_{2,2}$ | $x_{2,1}$ | 1 | $x_{2,4}$ | $x_{2,3}$ | $x_{2,2}$ |

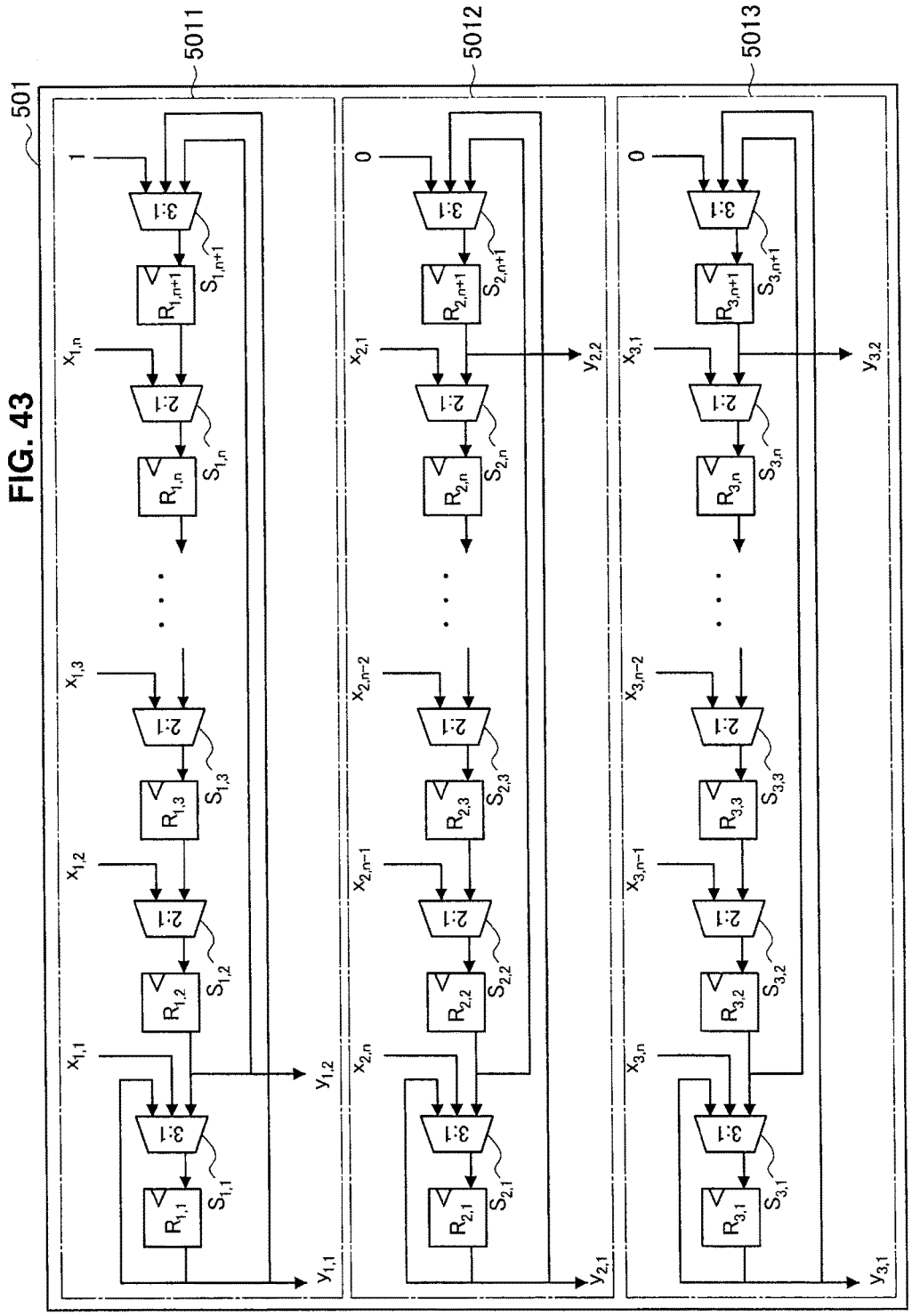

FIG. 50

| CYCLE NUMBER | $a_{i,j}$ | $v_1$ or $v_2$ | $y_{1,1}$ | $y_{1,2}$ | $R_{1,1}$ | $R_{1,2}$ | $R_{1,3}$ | $R_{1,4}$ | $R_{1,5}$ | $y_{k,1}$ $k=2,3$ | $y_{k,2}$ $k=2,3$ | $R_{k,1}$ $k=2,3$ | $R_{k,2}$ $k=2,3$ | $R_{k,3}$ $k=2,3$ | $R_{k,4}$ $k=2,3$ | $R_{k,5}$ $k=2,3$ |
|---|---|---|---|---|---|---|---|---|---|---|---|---|---|---|---|---|
| 1 | $a_{1,2}$ | $x_{1,1}x_{1,2}$ | $x_{1,1}$ | $x_{1,2}$ | $x_{1,1}$ | $x_{1,2}$ | $x_{1,3}$ | $x_{1,4}$ | 1 | $x_{k,4}$ | 0 | $x_{k,4}$ | $x_{k,3}$ | $x_{k,2}$ | $x_{k,1}$ | 0 |
| 2 | $a_{1,3}$ | $x_{1,1}x_{1,3}$ | $x_{1,1}$ | $x_{1,3}$ | $x_{1,1}$ | $x_{1,3}$ | $x_{1,4}$ | 1 | $x_{1,2}$ | $x_{k,4}$ | $x_{k,3}$ | $x_{k,4}$ | $x_{k,2}$ | 0 | 0 | $x_{k,3}$ |
| 3 | $a_{1,4}$ | $x_{1,1}x_{1,4}$ | $x_{1,1}$ | $x_{1,4}$ | $x_{1,1}$ | $x_{1,4}$ | 1 | $x_{1,2}$ | $x_{1,3}$ | $x_{k,4}$ | $x_{k,2}$ | $x_{k,4}$ | $x_{k,1}$ | 0 | $x_{k,3}$ | $x_{k,2}$ |
| 4 | $b_1$ | $x_{1,1}$ | $x_{1,1}$ | 1 | $x_{1,1}$ | 1 | $x_{1,2}$ | $x_{1,3}$ | $x_{1,4}$ | $x_{k,4}$ | $x_{k,1}$ | $x_{k,4}$ | 0 | $x_{k,3}$ | $x_{k,2}$ | $x_{k,1}$ |
| 5 | $b'_4$ | 0 | $x_{1,2}$ | $x_{1,2}$ | $x_{1,1}$ | $x_{1,2}$ | $x_{1,3}$ | $x_{1,4}$ | 1 | $x_{k,3}$ | 0 | $x_{k,3}$ | $x_{k,3}$ | 0 | $x_{k,1}$ | 0 |
| 5+1 | $a_{2,3}$ | $x_{1,2}x_{1,3}$ | $x_{1,2}$ | $x_{1,3}$ | $x_{1,2}$ | $x_{1,3}$ | $x_{1,4}$ | 1 | $x_{1,1}$ | $x_{k,3}$ | $x_{k,4}$ | $x_{k,3}$ | $x_{k,2}$ | $x_{k,1}$ | 0 | $x_{k,4}$ |
| 5+2 | $a_{2,4}$ | $x_{1,2}x_{1,4}$ | $x_{1,2}$ | $x_{1,4}$ | $x_{1,2}$ | $x_{1,4}$ | 1 | $x_{1,1}$ | $x_{1,3}$ | $x_{k,3}$ | $x_{k,2}$ | $x_{k,3}$ | $x_{k,1}$ | 0 | $x_{k,4}$ | $x_{k,2}$ |
| 5+3 | $b_2$ | $x_{1,2}$ | $x_{1,2}$ | 1 | $x_{1,2}$ | 1 | $x_{1,1}$ | $x_{1,3}$ | $x_{1,4}$ | $x_{k,3}$ | $x_{k,1}$ | $x_{k,3}$ | 0 | $x_{k,4}$ | $x_{k,2}$ | $x_{k,1}$ |
| 5+4 | $b'_3$ | 0 | $x_{1,3}$ | $x_{1,3}$ | $x_{1,2}$ | $x_{1,3}$ | $x_{1,4}$ | 1 | $x_{1,1}$ | $x_{k,3}$ | 0 | $x_{k,3}$ | $x_{k,2}$ | $x_{k,1}$ | 0 | $x_{k,4}$ |
| 2×5 | $a'_{3,4}$ | $x_{2,3}x_{3,4}+x_{3,3}x_{2,4}$ | $x_{1,3}$ | $x_{1,4}$ | $x_{1,3}$ | $x_{1,4}$ | 1 | $x_{1,1}$ | $x_{1,2}$ | $x_{k,3}$ | $x_{k,4}$ | $x_{k,2}$ | $x_{k,1}$ | 0 | $x_{k,4}$ | $x_{k,3}$ |
| 2×5+1 | $a_{3,4}$ | $x_{1,3}x_{1,4}$ | $x_{1,3}$ | $x_{1,4}$ | $x_{1,3}$ | $x_{1,4}$ | 1 | $x_{1,1}$ | $x_{1,2}$ | $x_{k,2}$ | $x_{k,3}$ | $x_{k,2}$ | $x_{k,1}$ | 0 | $x_{k,4}$ | $x_{k,3}$ |
| 2×5+2 | $b_3$ | $x_{1,3}$ | $x_{1,3}$ | 1 | $x_{1,3}$ | 1 | $x_{1,1}$ | $x_{1,2}$ | $x_{1,4}$ | $x_{k,2}$ | 0 | $x_{k,2}$ | 0 | $x_{k,4}$ | $x_{k,3}$ | $x_{k,1}$ |
| 2×5+3 | $b'_2$ | 0 | $x_{1,3}$ | $x_{1,3}$ | $x_{1,3}$ | $x_{1,2}$ | $x_{1,4}$ | 1 | $x_{1,1}$ | $x_{k,2}$ | $x_{k,4}$ | $x_{k,2}$ | $x_{k,1}$ | $x_{k,4}$ | 0 | $x_{k,3}$ |
| 2×5+4 | $a'_{2,4}$ | $x_{2,2}x_{3,4}+x_{3,2}x_{2,4}$ | $x_{1,3}$ | $x_{1,4}$ | $x_{1,3}$ | $x_{1,4}$ | 1 | $x_{1,1}$ | $x_{1,2}$ | $x_{k,2}$ | $x_{k,3}$ | $x_{k,2}$ | $x_{k,4}$ | $x_{k,3}$ | $x_{k,1}$ | $x_{k,1}$ |
| 3×5 | $a'_{2,3}$ | $x_{2,2}x_{3,3}+x_{3,2}x_{2,3}$ | $x_{1,3}$ | $x_{1,4}$ | $x_{1,4}$ | 1 | $x_{1,2}$ | $x_{1,3}$ | 1 | $x_{k,2}$ | $x_{k,1}$ | $x_{k,2}$ | $x_{k,4}$ | $x_{k,1}$ | 0 | $x_{k,4}$ |
| 3×5+1 | $b_4$ | $x_{1,4}$ | $x_{1,4}$ | $x_{1,1}$ | $x_{1,4}$ | 1 | $x_{1,1}$ | $x_{1,2}$ | $x_{1,3}$ | $x_{k,1}$ | 0 | $x_{k,1}$ | 0 | $x_{k,4}$ | $x_{k,3}$ | $x_{k,2}$ |
| 3×5+2 | $b'_1$ | 0 | $x_{1,4}$ | $x_{1,1}$ | $x_{1,4}$ | $x_{1,1}$ | $x_{1,2}$ | $x_{1,3}$ | 1 | $x_{k,1}$ | $x_{k,4}$ | $x_{k,1}$ | $x_{k,4}$ | $x_{k,3}$ | $x_{k,2}$ | 0 |
| 3×5+3 | $a'_{1,4}$ | $x_{2,1}x_{3,4}+x_{3,1}x_{2,4}$ | $x_{1,4}$ | $x_{1,2}$ | $x_{1,4}$ | $x_{1,2}$ | $x_{1,3}$ | 1 | $x_{1,1}$ | $x_{k,1}$ | $x_{k,3}$ | $x_{k,1}$ | $x_{k,4}$ | $x_{k,2}$ | 0 | $x_{k,4}$ |
| 3×5+4 | $a'_{1,3}$ | $x_{2,1}x_{3,3}+x_{3,1}x_{2,3}$ | $x_{1,4}$ | $x_{1,3}$ | $x_{1,4}$ | $x_{1,3}$ | 1 | $x_{1,1}$ | $x_{1,2}$ | $x_{k,1}$ | $x_{k,2}$ | $x_{k,1}$ | $x_{k,4}$ | 0 | $x_{k,4}$ | $x_{k,3}$ |
| 4×5 | $a'_{1,2}$ | $x_{2,1}x_{3,2}+x_{3,1}x_{2,2}$ | $x_{1,4}$ | 1 | $x_{1,4}$ | 1 | $x_{1,1}$ | $x_{1,2}$ | $x_{1,3}$ | $x_{k,1}$ | 0 | $x_{k,1}$ | 0 | $x_{k,4}$ | $x_{k,3}$ | $x_{k,2}$ |

FIG. 51

| ADDRESS | STORED VALUE |
|---|---|
| 00...00 | $a_{1,2}$ |
| 00...01 | $a_{1,3}$ |
| 00...02 | $a_{1,4}$ |
| 00...03 | $b_1$ |
| 00...04 | $b_4$ |
| 00...05 | $a_{2,3}$ |
| 00...06 | $a_{2,4}$ |
| 00...07 | $b_2$ |
| 00...08 | $b_3$ |
| 00...09 | $a_{3,4}$ |

FIG. 62

| CYCLE NUMBER | $RA_{1,1}$ | $RA_{1,2}$ | $RA_{1,3}$ | $RA_{1,4}$ | $RA_{1,5}$ | $RA_{2,1}$ | $RA_{2,2}$ | $RA_{2,3}$ | $RA_{2,4}$ | $RA_{2,5}$ | $a_{i,j}, b_i$ | selA |
|---|---|---|---|---|---|---|---|---|---|---|---|---|
| 1 | $x_{1,1}$ | $x_{1,2}$ | $x_{1,3}$ | $x_{1,4}$ | 1 | $x_{2,4}$ | $x_{2,3}$ | $x_{2,2}$ | $x_{2,1}$ | 1 | $a_{1,2}$ | 0 |
| 2 | $x_{1,1}$ | $x_{1,3}$ | $x_{1,4}$ | 1 | $x_{1,2}$ | $x_{2,4}$ | $x_{2,2}$ | $x_{2,1}$ | 1 | $x_{2,3}$ | $a_{1,3}$ | 0 |
| 3 | $x_{1,1}$ | $x_{1,4}$ | 1 | $x_{1,2}$ | $x_{1,3}$ | $x_{2,4}$ | $x_{2,1}$ | 1 | $x_{2,3}$ | $x_{2,2}$ | $a_{1,4}$ | 0 |
| 4 | $x_{1,1}$ | 1 | $x_{1,2}$ | $x_{1,3}$ | $x_{1,4}$ | $x_{2,4}$ | 1 | $x_{2,3}$ | $x_{2,2}$ | $x_{2,1}$ | $b_1$ | 0 |
| 5 | $x_{1,1}$ | $x_{1,2}$ | $x_{1,3}$ | $x_{1,4}$ | 1 | $x_{2,3}$ | $x_{2,3}$ | $x_{2,2}$ | $x_{2,1}$ | 1 | $b_4$ | 1 |
| 6 | $x_{1,2}$ | $x_{1,3}$ | $x_{1,4}$ | 1 | $x_{1,1}$ | 1 | $x_{2,2}$ | $x_{2,1}$ | 1 | $x_{2,4}$ | | |

| CYCLE NUMBER | $RA_{out_1}$ | $RA_{out_2}$ |
|---|---|---|
| 1 | 0 | 0 |
| 2 | $a_{1,2}x_{1,1}x_{1,2}$ | 0 |
| 3 | $a_{1,2}x_{1,1}x_{1,2} + a_{1,3}x_{1,1}x_{1,3}$ | 0 |
| 4 | $a_{1,2}x_{1,1}x_{1,2} + a_{1,3}x_{1,1}x_{1,3} + a_{1,4}x_{1,1}x_{1,4}$ | 0 |
| 5 | $a_{1,2}x_{1,1}x_{1,2} + a_{1,3}x_{1,1}x_{1,3} + a_{1,4}x_{1,1}x_{1,4} + b_1x_{1,1} (= T_{1,1})$ | 0 |
| 6 | $T_{1,1}$ | $b_4x_{2,4} (= T_{2,4})$ |

FIG. 63

| CYCLE NUMBER | $RB_{1,1}$ | $RB_{1,2}$ | $RB_{1,3}$ | $RB_{1,4}$ | $RB_{2,1}$ | $RB_{2,2}$ | $RB_{2,3}$ | $RB_{2,4}$ | $RB_{2,5}$ | $a_{i,j}, b_i$ | selB |
|---|---|---|---|---|---|---|---|---|---|---|---|
| 1 | $x_{1,2}$ | $x_{1,3}$ | $x_{1,4}$ | 1 | $x_{2,3}$ | $x_{2,2}$ | $x_{2,1}$ | 1 | $x_{2,4}$ | $a_{2,3}$ | 0 |
| 2 | $x_{1,2}$ | $x_{1,4}$ | 1 | $x_{1,3}$ | $x_{2,3}$ | $x_{2,1}$ | 1 | $x_{2,4}$ | $x_{2,2}$ | $a_{2,4}$ | 0 |
| 3 | $x_{1,2}$ | 1 | $x_{1,3}$ | $x_{1,4}$ | $x_{2,3}$ | $x_{2,4}$ | $x_{2,2}$ | $x_{2,1}$ | 1 | $b_2$ | 0 |
| 4 | $x_{1,2}$ | $x_{1,3}$ | $x_{1,4}$ | 1 | $x_{2,3}$ | $x_{2,2}$ | $x_{2,1}$ | 1 | $x_{2,4}$ | $b_3$ | 1 |
| 5 | $x_{1,2}$ | $x_{1,3}$ | $x_{1,4}$ | 1 | $x_{2,3}$ | $x_{2,2}$ | 1 | $x_{2,4}$ | $x_{2,3}$ | $a_{3,4}$ | 1 |
| 6 | $x_{1,3}$ | $x_{1,4}$ | 1 | $x_{1,2}$ | $x_{2,2}$ | $x_{2,1}$ | 1 | $x_{2,4}$ | $x_{2,3}$ | | |

| CYCLE NUMBER | $RBout_1$ | $RBout_2$ |
|---|---|---|
| 1 | $T_{1,1}$ | $T_{2,4}$ |
| 2 | $T_{1,1} + a_{2,3}x_{1,2}x_{1,3}$ | $T_{2,4}$ |
| 3 | $T_{1,1} + a_{2,3}x_{1,2}x_{1,3} + a_{2,4}x_{1,2}x_{1,4}$ | $T_{2,4}$ |
| 4 | $T_{1,1} + a_{2,3}x_{1,2}x_{1,3} + a_{2,4}x_{1,2}x_{1,4} + b_2x_{1,2} \ (= T_{1,1} + T_{1,2})$ | $T_{2,4}$ |
| 5 | $T_{1,1} + T_{1,2}$ | $T_{2,4} + b_3x_{2,3}$ |
| 6 | $T_{1,1} + T_{1,2}$ | $T_{2,4} + b_3x_{2,3} + a_{3,4}x_{2,3}x_{2,4} \ (= T_{2,4} + T_{2,3})$ |

FIG. 64

| CYCLE NUMBER | $RC_{1,1}$ | $RC_{1,2}$ | $RC_{1,3}$ | $RC_{2,1}$ | $RC_{2,2}$ | $RC_{2,3}$ | $RC_{2,4}$ | $RC_{2,5}$ | $a_{i,j}, b_i$ | selC |
|---|---|---|---|---|---|---|---|---|---|---|
| 1 | $x_{1,3}$ | $x_{1,4}$ | 1 | $x_{2,2}$ | $x_{2,1}$ | 1 | $x_{2,4}$ | $x_{2,3}$ | $a_{3,4}$ | 0 |
| 2 | $x_{1,3}$ | 1 | $x_{1,4}$ | $x_{2,2}$ | 1 | $x_{2,4}$ | $x_{2,3}$ | $x_{2,1}$ | $b_3$ | 0 |
| 3 | $x_{1,3}$ | $x_{1,4}$ | 1 | $x_{2,2}$ | $x_{2,4}$ | $x_{2,3}$ | $x_{2,1}$ | 1 | $b_2$ | 1 |
| 4 | $x_{1,3}$ | $x_{1,4}$ | 1 | $x_{2,2}$ | $x_{2,3}$ | $x_{2,1}$ | 1 | $x_{2,4}$ | $a_{2,4}$ | 1 |
| 5 | $x_{1,3}$ | $x_{1,4}$ | 1 | $x_{2,2}$ | $x_{2,1}$ | 1 | $x_{2,4}$ | $x_{2,3}$ | $a_{2,3}$ | 1 |
| 6 | $x_{1,4}$ | 1 | $x_{1,3}$ | $x_{2,1}$ | 1 | $x_{2,4}$ | $x_{2,3}$ | $x_{2,2}$ | | |

| CYCLE NUMBER | $RCout_1$ | $RCout_2$ |
|---|---|---|
| 1 | $T_{1,1} + T_{1,2}$ | |
| 2 | $T_{1,1} + T_{1,2} + a_{3,4}x_{1,3}x_{1,4}$ | $T_{2,4} + T_{2,3}$ |
| 3 | $T_{1,1} + T_{1,2} + a_{3,4}x_{1,3}x_{1,4} + b_3x_{1,3}$ $(= T_{1,1} + T_{1,2} + T_{1,3})$ | $T_{2,4} + T_{2,3}$ |
| 4 | $T_{1,1} + T_{1,2} + T_{1,3}$ | $T_{2,4} + T_{2,3}$ |
| 5 | $T_{1,1} + T_{1,2} + T_{1,3}$ | $T_{2,4} + T_{2,3} + b_2x_{2,2}$ |
| 6 | $T_{1,1} + T_{1,2} + T_{1,3}$ | $T_{2,4} + T_{2,3} + b_2x_{2,2} + a_{2,4}x_{2,2}x_{2,4} + a_{2,3}x_{2,2}x_{2,3}$ $(= T_{2,4} + T_{2,3} + T_{2,2})$ |

FIG. 65

| CYCLE NUMBER | $RD_{1,1}$ | $RD_{1,2}$ | $RD_{2,1}$ | $RD_{2,2}$ | $RD_{2,3}$ | $RD_{2,4}$ | $RD_{2,5}$ | $a_{i,j}, b_i$ | selD |
|---|---|---|---|---|---|---|---|---|---|
| 1 | $x_{1,4}$ | 1 | $x_{2,1}$ | 1 | $x_{2,4}$ | $x_{2,3}$ | $x_{2,2}$ | $b_4$ | 0 |
| 2 | $x_{1,4}$ | 1 | $x_{2,1}$ | $x_{2,4}$ | $x_{2,3}$ | $x_{2,2}$ | 1 | $b_1$ | 1 |
| 3 | $x_{1,4}$ | 1 | $x_{2,1}$ | $x_{2,3}$ | $x_{2,2}$ | 1 | $x_{2,4}$ | $a_{1,4}$ | 1 |
| 4 | $x_{1,4}$ | 1 | $x_{2,1}$ | $x_{2,2}$ | 1 | $x_{2,4}$ | $x_{2,3}$ | $a_{1,3}$ | 1 |
| 5 | $x_{1,4}$ | 1 | 1 | $x_{2,4}$ | $x_{2,3}$ | $x_{2,2}$ | $x_{2,1}$ | $a_{1,2}$ | 1 |
| 6 | 1 | $x_{1,4}$ | | | | | | | |

| CYCLE NUMBER | $RDout_1$ | $RDout_2$ |
|---|---|---|
| 1 | $T_{1,1} + T_{1,2} + T_{1,3}$ | $T_{2,4} + T_{2,3} + T_{2,2}$ |
| 2 | $T_{1,1} + T_{1,2} + T_{1,3} + b_4 x_{1,4} \ (= T_{1,1} + T_{1,2} + T_{1,3} + T_{1,4})$ | $T_{2,4} + T_{2,3} + T_{2,2}$ |
| 3 | $T_{1,1} + T_{1,2} + T_{1,3} + T_{1,4}$ | $T_{2,4} + T_{2,3} + T_{2,2} + b_1 x_{2,1}$ |
| 4 | $T_{1,1} + T_{1,2} + T_{1,3} + T_{1,4}$ | $T_{2,4} + T_{2,3} + T_{2,2} + b_1 x_{2,1} + a_{1,4} x_{2,4}$ |
| 5 | $T_{1,1} + T_{1,2} + T_{1,3} + T_{1,4}$ | $T_{2,4} + T_{2,3} + T_{2,2} + b_1 x_{2,1} + a_{1,4} x_{2,4} + a_{1,3} x_{2,3}$ |
| 6 | $T_{1,1} + T_{1,2} + T_{1,3} + T_{1,4}$ | $T_{2,4} + T_{2,3} + T_{2,2} + b_1 x_{2,1} + a_{1,4} x_{2,4} + a_{1,3} x_{2,3} + a_{1,2} x_{2,2}$ $(= T_{2,4} + T_{2,3} + T_{2,2} + T_{2,1})$ |

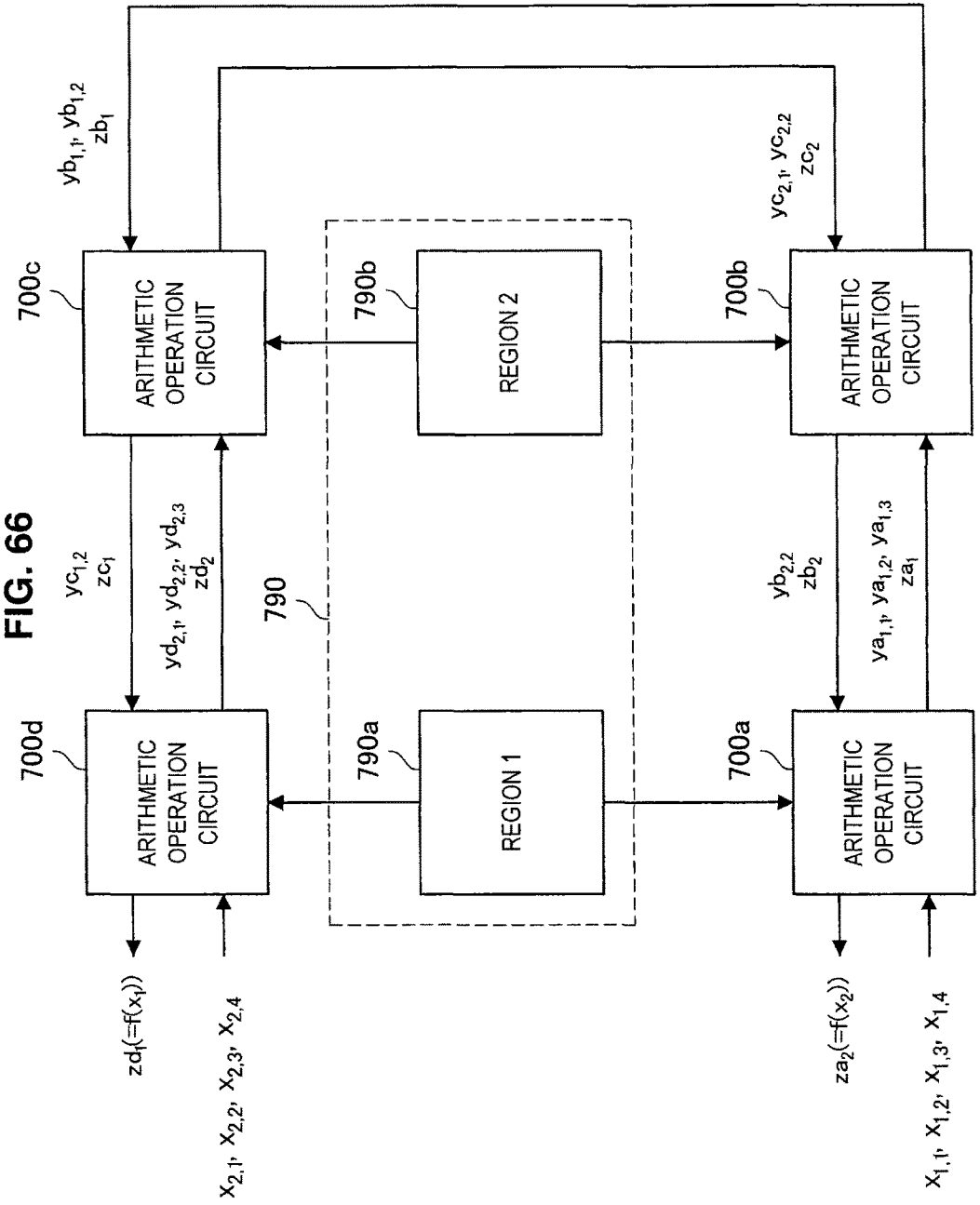

FIG. 75

| CYCLE NUMBER | $RA_{1,1}$ | $RA_{1,2}$ | $RA_{1,3}$ | $RA_{1,4}$ | $RA_{1,5}$ | $RA_{2,1}$ | $RA_{2,2}$ | $a_{i,j}, b_i$ | selA |
|---|---|---|---|---|---|---|---|---|---|
| 1 | $x_{1,1}$ | $x_{1,2}$ | $x_{1,3}$ | $x_{1,4}$ | 1 | | | $a_{1,2}$ | 0 |
| 2 | $x_{1,1}$ | $x_{1,3}$ | $x_{1,4}$ | 1 | $x_{1,2}$ | | | $a_{1,3}$ | 0 |
| 3 | $x_{1,1}$ | $x_{1,4}$ | 1 | $x_{1,2}$ | $x_{1,3}$ | | | $a_{1,4}$ | 0 |
| 4 | $x_{1,1}$ | 1 | $x_{1,2}$ | $x_{1,3}$ | $x_{1,4}$ | | | $b_1$ | 0 |
| 5 | $x_{1,1}$ | $x_{1,2}$ | $x_{1,3}$ | $x_{1,4}$ | 1 | | | $b_4$ | |
| 6 | $x_{1,2}$ | $x_{1,3}$ | $x_{1,4}$ | 1 | $x_{1,1}$ | | | | |
| 6+1 | $x_{1,1}$ | $x_{1,2}$ | $x_{1,3}$ | $x_{1,4}$ | 1 | | | $a_{1,2}$ | 0 |
| 6+2 | $x_{1,1}$ | $x_{1,3}$ | $x_{1,4}$ | 1 | $x_{1,2}$ | | | $a_{1,3}$ | 0 |
| 6+3 | $x_{1,1}$ | $x_{1,4}$ | 1 | $x_{1,2}$ | $x_{1,3}$ | | | $a_{1,4}$ | 0 |
| 6+4 | $x_{1,1}$ | 1 | $x_{1,2}$ | $x_{1,3}$ | $x_{1,4}$ | | | $b_1$ | 0 |
| 6+5 | $x_{1,1}$ | $x_{1,2}$ | $x_{1,3}$ | $x_{1,4}$ | 1 | | | $b_4$ | |
| 6+6 | $x_{1,2}$ | $x_{1,3}$ | $x_{1,4}$ | 1 | $x_{1,1}$ | | | | |
| 2x6+1 | $x_{1,1}$ | $x_{1,2}$ | $x_{1,3}$ | $x_{1,4}$ | 1 | | | $a_{1,2}$ | 0 |
| 2x6+2 | $x_{1,1}$ | $x_{1,3}$ | $x_{1,4}$ | 1 | $x_{1,2}$ | | | $a_{1,3}$ | 0 |
| 2x6+3 | $x_{1,1}$ | $x_{1,4}$ | 1 | $x_{1,2}$ | $x_{1,3}$ | | | $a_{1,4}$ | 0 |
| 2x6+4 | $x_{1,1}$ | 1 | $x_{1,2}$ | $x_{1,3}$ | $x_{1,4}$ | | | $b_1$ | 0 |
| 2x6+5 | $x_{1,1}$ | $x_{1,2}$ | $x_{1,3}$ | $x_{1,4}$ | 1 | | | $b_4$ | |
| 2x6+6 | $x_{1,2}$ | $x_{1,3}$ | $x_{1,4}$ | 1 | $x_{1,1}$ | | | | |
| 3x6+1 | $x_{1,1}$ | $x_{1,2}$ | $x_{1,3}$ | $x_{1,4}$ | 1 | $x_{2,4}$ | 1 | $a_{1,2}$ | 0 |
| 3x6+2 | $x_{1,1}$ | $x_{1,3}$ | $x_{1,4}$ | 1 | $x_{1,2}$ | $x_{2,4}$ | 1 | $a_{1,3}$ | 0 |
| 3x6+3 | $x_{1,1}$ | $x_{1,4}$ | 1 | $x_{1,2}$ | $x_{1,3}$ | $x_{2,4}$ | 1 | $a_{1,4}$ | 0 |
| 3x6+4 | $x_{1,1}$ | 1 | $x_{1,2}$ | $x_{1,3}$ | $x_{1,4}$ | $x_{2,4}$ | 1 | $b_1$ | 0 |
| 3x6+5 | $x_{1,1}$ | $x_{1,2}$ | $x_{1,3}$ | $x_{1,4}$ | 1 | $x_{2,4}$ | 1 | $b_4$ | 1 |
| 3x6+6 | $x_{1,2}$ | $x_{1,3}$ | $x_{1,4}$ | 1 | $x_{1,1}$ | 1 | $x_{2,4}$ | | |
| 4x6+1 | $x_{1,1}$ | $x_{1,2}$ | $x_{1,3}$ | $x_{1,4}$ | 1 | $x_{2,4}$ | 1 | $a_{1,2}$ | 0 |
| 4x6+2 | $x_{1,1}$ | $x_{1,3}$ | $x_{1,4}$ | 1 | $x_{1,2}$ | $x_{2,4}$ | 1 | $a_{1,3}$ | 0 |
| 4x6+3 | $x_{1,1}$ | $x_{1,4}$ | 1 | $x_{1,2}$ | $x_{1,3}$ | $x_{2,4}$ | 1 | $a_{1,4}$ | 0 |
| 4x6+4 | $x_{1,1}$ | 1 | $x_{1,2}$ | $x_{1,3}$ | $x_{1,4}$ | $x_{2,4}$ | 1 | $b_1$ | 0 |
| 4x6+5 | $x_{1,1}$ | $x_{1,2}$ | $x_{1,3}$ | $x_{1,4}$ | 1 | $x_{2,4}$ | 1 | $b_4$ | 1 |
| 4x6+6 | $x_{1,2}$ | $x_{1,3}$ | $x_{1,4}$ | 1 | $x_{1,1}$ | 1 | $x_{2,4}$ | | |

FIG. 76

| CYCLE NUMBER | RAout$_1$ | RAout$_2$ |
|---|---|---|
| 1 | 0 | |
| 2 | $a_{1,2}x_{1,1}x_{1,2}$ | |
| 3 | $a_{1,2}x_{1,1}x_{1,2} + a_{1,3}x_{1,1}x_{1,3}$ | |
| 4 | $a_{1,2}x_{1,1}x_{1,2} + a_{1,3}x_{1,1}x_{1,3} + a_{1,4}x_{1,1}x_{1,4}$ | |
| 5 | $a_{1,2}x_{1,1}x_{1,2} + a_{1,3}x_{1,1}x_{1,3} + a_{1,4}x_{1,1}x_{1,4} + b_1x_{1,1} (= T_{1,1})$ | |
| 6 | $T_{1,1}$ | |
| 6+1 | 0 | |
| 6+2 | $a_{1,2}x_{1,1}x_{1,2}$ | |
| 6+3 | $a_{1,2}x_{1,1}x_{1,2} + a_{1,3}x_{1,1}x_{1,3}$ | |
| 6+4 | $a_{1,2}x_{1,1}x_{1,2} + a_{1,3}x_{1,1}x_{1,3} + a_{1,4}x_{1,1}x_{1,4}$ | |
| 6+5 | $a_{1,2}x_{1,1}x_{1,2} + a_{1,3}x_{1,1}x_{1,3} + a_{1,4}x_{1,1}x_{1,4} + b_1x_{1,1} (= T_{1,1})$ | |
| 6+6 | $T_{1,1}$ | |
| 2×6+1 | 0 | |
| 2×6+2 | $a_{1,2}x_{1,1}x_{1,2}$ | |
| 2×6+3 | $a_{1,2}x_{1,1}x_{1,2} + a_{1,3}x_{1,1}x_{1,3}$ | |
| 2×6+4 | $a_{1,2}x_{1,1}x_{1,2} + a_{1,3}x_{1,1}x_{1,3} + a_{1,4}x_{1,1}x_{1,4}$ | |
| 2×6+5 | $a_{1,2}x_{1,1}x_{1,2} + a_{1,3}x_{1,1}x_{1,3} + a_{1,4}x_{1,1}x_{1,4} + b_1x_{1,1} (= T_{1,1})$ | |
| 2×6+6 | $T_{1,1}$ | |
| 3×6+1 | 0 | $T_{2,1} + T_{2,2} + T_{2,3}$ |
| 3×6+2 | $a_{1,2}x_{1,1}x_{1,2}$ | $T_{2,1} + T_{2,2} + T_{2,3}$ |
| 3×6+3 | $a_{1,2}x_{1,1}x_{1,2} + a_{1,3}x_{1,1}x_{1,3}$ | $T_{2,1} + T_{2,2} + T_{2,3}$ |
| 3×6+4 | $a_{1,2}x_{1,1}x_{1,2} + a_{1,3}x_{1,1}x_{1,3} + a_{1,4}x_{1,1}x_{1,4}$ | $T_{2,1} + T_{2,2} + T_{2,3}$ |
| 3×6+5 | $a_{1,2}x_{1,1}x_{1,2} + a_{1,3}x_{1,1}x_{1,3} + a_{1,4}x_{1,1}x_{1,4} + b_1x_{1,1} (= T_{1,1})$ | $T_{2,1} + T_{2,2} + T_{2,3}$ |
| 3×6+6 | $T_{1,1}$ | $T_{2,1} + T_{2,2} + T_{2,3} + b_4x_{2,4}$ $(= T_{2,1} + T_{2,2} + T_{2,3} + T_{2,4})$ |
| 4×6+1 | 0 | $T_{2,1} + T_{2,2} + T_{2,3}$ |
| 4×6+2 | $a_{1,2}x_{1,1}x_{1,2}$ | $T_{2,1} + T_{2,2} + T_{2,3}$ |
| 4×6+3 | $a_{1,2}x_{1,1}x_{1,2} + a_{1,3}x_{1,1}x_{1,3}$ | $T_{2,1} + T_{2,2} + T_{2,3}$ |
| 4×6+4 | $a_{1,2}x_{1,1}x_{1,2} + a_{1,3}x_{1,1}x_{1,3} + a_{1,4}x_{1,1}x_{1,4}$ | $T_{2,1} + T_{2,2} + T_{2,3}$ |
| 4×6+5 | $a_{1,2}x_{1,1}x_{1,2} + a_{1,3}x_{1,1}x_{1,3} + a_{1,4}x_{1,1}x_{1,4} + b_1x_{1,1} (= T_{1,1})$ | $T_{2,1} + T_{2,2} + T_{2,3}$ |
| 4×6+6 | $T_{1,1}$ | $T_{2,1} + T_{2,2} + T_{2,3} + b_4x_{2,4}$ $(= T_{2,1} + T_{2,2} + T_{2,3} + T_{2,4})$ |

FIG. 77

| CYCLE NUMBER | $RB_{1,1}$ | $RB_{1,2}$ | $RB_{1,3}$ | $RB_{1,4}$ | $RB_{2,1}$ | $RB_{2,2}$ | $RB_{2,3}$ | $a_{i,j}, b_i$ | selB |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 6+1 | $x_{1,2}$ | $x_{1,3}$ | $x_{1,4}$ | 1 | | | | $a_{2,3}$ | 0 |
| 6+2 | $x_{1,2}$ | $x_{1,4}$ | 1 | $x_{1,3}$ | | | | $a_{2,4}$ | 0 |
| 6+3 | $x_{1,2}$ | 1 | $x_{1,3}$ | $x_{1,4}$ | | | | $b_2$ | 0 |
| 6+4 | $x_{1,2}$ | $x_{1,3}$ | $x_{1,4}$ | 1 | | | | $b_3$ | |
| 6+5 | $x_{1,2}$ | $x_{1,3}$ | $x_{1,4}$ | 1 | | | | $a_{3,4}$ | |
| 6+6 | $x_{1,3}$ | $x_{1,4}$ | 1 | $x_{1,2}$ | | | | | |
| 2×6+1 | $x_{1,2}$ | $x_{1,3}$ | $x_{1,4}$ | 1 | $x_{2,3}$ | 1 | $x_{2,4}$ | $a_{2,3}$ | 0 |
| 2×6+2 | $x_{1,2}$ | $x_{1,4}$ | 1 | $x_{1,3}$ | $x_{2,3}$ | 1 | $x_{2,4}$ | $a_{2,4}$ | 0 |
| 2×6+3 | $x_{1,2}$ | 1 | $x_{1,3}$ | $x_{1,4}$ | $x_{2,3}$ | 1 | $x_{2,4}$ | $b_2$ | 0 |
| 2×6+4 | $x_{1,2}$ | $x_{1,3}$ | $x_{1,4}$ | 1 | $x_{2,3}$ | $x_{2,4}$ | 1 | $b_3$ | 1 |
| 2×6+5 | $x_{1,2}$ | $x_{1,3}$ | $x_{1,4}$ | 1 | $x_{2,3}$ | 1 | $x_{2,4}$ | $a_{3,4}$ | 1 |
| 2×6+6 | $x_{1,3}$ | $x_{1,4}$ | 1 | $x_{1,2}$ | 1 | $x_{2,4}$ | $x_{2,3}$ | | |
| 3×6+1 | $x_{1,2}$ | $x_{1,3}$ | $x_{1,4}$ | 1 | $x_{2,3}$ | 1 | $x_{2,4}$ | $a_{2,3}$ | 0 |
| 3×6+2 | $x_{1,2}$ | $x_{1,4}$ | 1 | $x_{1,3}$ | $x_{2,3}$ | 1 | $x_{2,4}$ | $a_{2,4}$ | 0 |
| 3×6+3 | $x_{1,2}$ | 1 | $x_{1,3}$ | $x_{1,4}$ | $x_{2,3}$ | 1 | $x_{2,4}$ | $b_2$ | 0 |
| 3×6+4 | $x_{1,2}$ | $x_{1,3}$ | $x_{1,4}$ | 1 | $x_{2,3}$ | $x_{2,4}$ | 1 | $b_3$ | 1 |
| 3×6+5 | $x_{1,2}$ | $x_{1,3}$ | $x_{1,4}$ | 1 | $x_{2,3}$ | 1 | $x_{2,4}$ | $a_{3,4}$ | 1 |
| 3×6+6 | $x_{1,3}$ | $x_{1,4}$ | 1 | $x_{1,2}$ | 1 | $x_{2,4}$ | $x_{2,3}$ | | |
| 4×6+1 | $x_{1,2}$ | $x_{1,3}$ | $x_{1,4}$ | 1 | $x_{2,3}$ | 1 | $x_{2,4}$ | $a_{2,3}$ | 0 |
| 4×6+2 | $x_{1,2}$ | $x_{1,4}$ | 1 | $x_{1,3}$ | $x_{2,3}$ | 1 | $x_{2,4}$ | $a_{2,4}$ | 0 |
| 4×6+3 | $x_{1,2}$ | 1 | $x_{1,3}$ | $x_{1,4}$ | $x_{2,3}$ | 1 | $x_{2,4}$ | $b_2$ | 0 |
| 4×6+4 | $x_{1,2}$ | $x_{1,3}$ | $x_{1,4}$ | 1 | $x_{2,3}$ | $x_{2,4}$ | 1 | $b_3$ | 1 |
| 4×6+5 | $x_{1,2}$ | $x_{1,3}$ | $x_{1,4}$ | 1 | $x_{2,3}$ | 1 | $x_{2,4}$ | $a_{3,4}$ | 1 |
| 4×6+6 | $x_{1,3}$ | $x_{1,4}$ | 1 | $x_{1,2}$ | 1 | $x_{2,4}$ | $x_{2,3}$ | | |

FIG. 78

| CYCLE NUMBER | RBout$_1$ | RBout$_2$ |
|---|---|---|
| 1 | | |
| 2 | | |
| 3 | | |
| 4 | | |
| 5 | | |
| 6 | | |
| 6+1 | $T_{1,1}$ | |
| 6+2 | $T_{1,1} + a_{2,3}x_{1,2}x_{1,3}$ | |
| 6+3 | $T_{1,1} + a_{2,3}x_{1,2}x_{1,3} + a_{2,4}x_{1,2}x_{1,4}$ | |
| 6+4 | $T_{1,1} + a_{2,3}x_{1,2}x_{1,3} + a_{2,4}x_{1,2}x_{1,4} + b_2x_{1,2}\ (= T_{1,1} + T_{1,2})$ | |
| 6+5 | $T_{1,1} + T_{1,2}$ | |
| 6+6 | $T_{1,1} + T_{1,2}$ | |
| 2×6+1 | $T_{1,1}$ | $T_{2,1} + T_{2,2}$ |
| 2×6+2 | $T_{1,1} + a_{2,3}x_{1,2}x_{1,3}$ | $T_{2,1} + T_{2,2}$ |
| 2×6+3 | $T_{1,1} + a_{2,3}x_{1,2}x_{1,3} + a_{2,4}x_{1,2}x_{1,4}$ | $T_{2,1} + T_{2,2}$ |
| 2×6+4 | $T_{1,1} + a_{2,3}x_{1,2}x_{1,3} + a_{2,4}x_{1,2}x_{1,4} + b_2x_{1,2}\ (= T_{1,1} + T_{1,2})$ | $T_{2,1} + T_{2,2}$ |
| 2×6+5 | $T_{1,1} + T_{1,2}$ | $T_{2,1} + T_{2,2} + b_3x_{2,3}$ |
| 2×6+6 | $T_{1,1} + T_{1,2}$ | $T_{2,1} + T_{2,2} + b_3x_{2,3} + a_{3,4}x_{2,3}x_{2,4}$ $(= T_{2,1} + T_{2,2} + T_{2,3})$ |
| 3×6+1 | $T_{1,1}$ | $T_{2,1} + T_{2,2}$ |
| 3×6+2 | $T_{1,1} + a_{2,3}x_{1,2}x_{1,3}$ | $T_{2,1} + T_{2,2}$ |
| 3×6+3 | $T_{1,1} + a_{2,3}x_{1,2}x_{1,3} + a_{2,4}x_{1,2}x_{1,4}$ | $T_{2,1} + T_{2,2}$ |
| 3×6+4 | $T_{1,1} + a_{2,3}x_{1,2}x_{1,3} + a_{2,4}x_{1,2}x_{1,4} + b_2x_{1,2}\ (= T_{1,1} + T_{1,2})$ | $T_{2,1} + T_{2,2}$ |
| 3×6+5 | $T_{1,1} + T_{1,2}$ | $T_{2,1} + T_{2,2} + b_3x_{2,3}$ |
| 3×6+6 | $T_{1,1} + T_{1,2}$ | $T_{2,1} + T_{2,2} + b_3x_{2,3} + a_{3,4}x_{2,3}x_{2,4}$ $(= T_{2,1} + T_{2,2} + T_{2,3})$ |
| 4×6+1 | $T_{1,1}$ | $T_{2,1} + T_{2,2}$ |
| 4×6+2 | $T_{1,1} + a_{2,3}x_{1,2}x_{1,3}$ | $T_{2,1} + T_{2,2}$ |
| 4×6+3 | $T_{1,1} + a_{2,3}x_{1,2}x_{1,3} + a_{2,4}x_{1,2}x_{1,4}$ | $T_{2,1} + T_{2,2}$ |
| 4×6+4 | $T_{1,1} + a_{2,3}x_{1,2}x_{1,3} + a_{2,4}x_{1,2}x_{1,4} + b_2x_{1,2}\ (= T_{1,1} + T_{1,2})$ | $T_{2,1} + T_{2,2}$ |
| 4×6+5 | $T_{1,1} + T_{1,2}$ | $T_{2,1} + T_{2,2} + b_3x_{2,3}$ |
| 4×6+6 | $T_{1,1} + T_{1,2}$ | $T_{2,1} + T_{2,2} + b_3x_{2,3} + a_{3,4}x_{2,3}x_{2,4}$ $(= T_{2,1} + T_{2,2} + T_{2,3})$ |

FIG. 79

| CYCLE NUMBER | $RC_{1,1}$ | $RC_{1,2}$ | $RC_{1,3}$ | $RC_{2,1}$ | $RC_{2,2}$ | $RC_{2,3}$ | $RC_{2,4}$ | $a_{i,j}, b_i$ | selC |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 6+1 | | | | $x_{2,2}$ | $x_{2,3}$ | $x_{2,4}$ | 1 | $a_{2,3}$ | 1 |
| 6+2 | | | | $x_{2,2}$ | $x_{2,4}$ | 1 | $x_{2,3}$ | $a_{2,4}$ | 1 |
| 6+3 | | | | $x_{2,2}$ | 1 | $x_{2,3}$ | $x_{2,4}$ | $b_2$ | 1 |
| 6+4 | | | | $x_{2,2}$ | $x_{2,3}$ | $x_{2,4}$ | 1 | $b_3$ | |
| 6+5 | | | | $x_{2,2}$ | $x_{2,3}$ | $x_{2,4}$ | 1 | $a_{3,4}$ | |
| 6+6 | | | | $x_{2,3}$ | $x_{2,4}$ | 1 | $x_{2,2}$ | | |
| 2x6+1 | $x_{1,3}$ | 1 | $x_{1,4}$ | $x_{2,2}$ | $x_{2,3}$ | $x_{2,4}$ | 1 | $a_{2,3}$ | 1 |
| 2x6+2 | $x_{1,3}$ | 1 | $x_{1,4}$ | $x_{2,2}$ | $x_{2,4}$ | 1 | $x_{2,3}$ | $a_{2,4}$ | 1 |
| 2x6+3 | $x_{1,3}$ | 1 | $x_{1,4}$ | $x_{2,2}$ | 1 | $x_{2,3}$ | $x_{2,4}$ | $b_2$ | 1 |
| 2x6+4 | $x_{1,3}$ | $x_{1,4}$ | 1 | $x_{2,2}$ | $x_{2,3}$ | $x_{2,4}$ | 1 | $b_3$ | 0 |
| 2x6+5 | $x_{1,3}$ | 1 | $x_{1,4}$ | $x_{2,2}$ | $x_{2,3}$ | $x_{2,4}$ | 1 | $a_{3,4}$ | 0 |
| 2x6+6 | 1 | $x_{1,4}$ | $x_{1,3}$ | $x_{2,3}$ | $x_{2,4}$ | 1 | $x_{2,2}$ | | |
| 3x6+1 | $x_{1,3}$ | 1 | $x_{1,4}$ | $x_{2,2}$ | $x_{2,3}$ | $x_{2,4}$ | 1 | $a_{2,3}$ | 1 |
| 3x6+2 | $x_{1,3}$ | 1 | $x_{1,4}$ | $x_{2,2}$ | $x_{2,4}$ | 1 | $x_{2,3}$ | $a_{2,4}$ | 1 |
| 3x6+3 | $x_{1,3}$ | 1 | $x_{1,4}$ | $x_{2,2}$ | 1 | $x_{2,3}$ | $x_{2,4}$ | $b_2$ | 1 |
| 3x6+4 | $x_{1,3}$ | $x_{1,4}$ | 1 | $x_{2,2}$ | $x_{2,3}$ | $x_{2,4}$ | 1 | $b_3$ | 0 |
| 3x6+5 | $x_{1,3}$ | 1 | $x_{1,4}$ | $x_{2,2}$ | $x_{2,3}$ | $x_{2,4}$ | 1 | $a_{3,4}$ | 0 |
| 3x6+6 | 1 | $x_{1,4}$ | $x_{1,3}$ | $x_{2,3}$ | $x_{2,4}$ | 1 | $x_{2,2}$ | | |
| 4x6+1 | $x_{1,3}$ | 1 | $x_{1,4}$ | $x_{2,2}$ | $x_{2,3}$ | $x_{2,4}$ | 1 | $a_{2,3}$ | 1 |
| 4x6+2 | $x_{1,3}$ | 1 | $x_{1,4}$ | $x_{2,2}$ | $x_{2,4}$ | 1 | $x_{2,3}$ | $a_{2,4}$ | 1 |
| 4x6+3 | $x_{1,3}$ | 1 | $x_{1,4}$ | $x_{2,2}$ | 1 | $x_{2,3}$ | $x_{2,4}$ | $b_2$ | 1 |
| 4x6+4 | $x_{1,3}$ | $x_{1,4}$ | 1 | $x_{2,2}$ | $x_{2,3}$ | $x_{2,4}$ | 1 | $b_3$ | 0 |
| 4x6+5 | $x_{1,3}$ | 1 | $x_{1,4}$ | $x_{2,2}$ | $x_{2,3}$ | $x_{2,4}$ | 1 | $a_{3,4}$ | 0 |
| 4x6+6 | 1 | $x_{1,4}$ | $x_{1,3}$ | $x_{2,3}$ | $x_{2,4}$ | 1 | $x_{2,2}$ | | |

FIG. 80

| CYCLE NUMBER | RCout$_1$ | RCout$_2$ |
|---|---|---|
| 1 | | |
| 2 | | |
| 3 | | |
| 4 | | |
| 5 | | |
| 6 | | |
| 6+1 | | $T_{2,1}$ |
| 6+2 | | $T_{2,1} + a_{2,3}x_{2,2}x_{2,3}$ |
| 6+3 | | $T_{2,1} + a_{2,3}x_{2,2}x_{2,3} + a_{2,4}x_{2,2}x_{2,4}$ |
| 6+4 | | $T_{2,1} + a_{2,3}x_{2,2}x_{2,3} + a_{2,4}x_{2,2}x_{2,4} + b_2 x_{2,2}$ $(= T_{2,1} + T_{2,2})$ |
| 6+5 | | $T_{2,1} + T_{2,2}$ |
| 6+6 | | $T_{2,1} + T_{2,2}$ |
| 2×6+1 | $T_{1,1} + T_{1,2}$ | $T_{2,1}$ |
| 2×6+2 | $T_{1,1} + T_{1,2}$ | $T_{2,1} + a_{2,3}x_{2,2}x_{2,3}$ |
| 2×6+3 | $T_{1,1} + T_{1,2}$ | $T_{2,1} + a_{2,3}x_{2,2}x_{2,3} + a_{2,4}x_{2,2}x_{2,4}$ |
| 2×6+4 | $T_{1,1} + T_{1,2}$ | $T_{2,1} + a_{2,3}x_{2,2}x_{2,3} + a_{2,4}x_{2,2}x_{2,4} + b_2 x_{2,2}$ $(= T_{2,1} + T_{2,2})$ |
| 2×6+5 | $T_{1,1} + T_{1,2} + b_3 x_{1,3}$ | $T_{2,1} + T_{2,2}$ |
| 2×6+6 | $T_{1,1} + T_{1,2} + b_3 x_{1,3} + a_{3,4}x_{1,3}x_{1,4}$ $(= T_{1,1} + T_{1,2} + T_{1,3})$ | $T_{2,1} + T_{2,2}$ |
| 3×6+1 | $T_{1,1} + T_{1,2}$ | $T_{2,1}$ |
| 3×6+2 | $T_{1,1} + T_{1,2}$ | $T_{2,1} + a_{2,3}x_{2,2}x_{2,3}$ |
| 3×6+3 | $T_{1,1} + T_{1,2}$ | $T_{2,1} + a_{2,3}x_{2,2}x_{2,3} + a_{2,4}x_{2,2}x_{2,4}$ |
| 3×6+4 | $T_{1,1} + T_{1,2}$ | $T_{2,1} + a_{2,3}x_{2,2}x_{2,3} + a_{2,4}x_{2,2}x_{2,4} + b_2 x_{2,2}$ $(= T_{2,1} + T_{2,2})$ |
| 3×6+5 | $T_{1,1} + T_{1,2} + b_3 x_{1,3}$ | $T_{2,1} + T_{2,2}$ |
| 3×6+6 | $T_{1,1} + T_{1,2} + b_3 x_{1,3} + a_{3,4}x_{1,3}x_{1,4}$ $(= T_{1,1} + T_{1,2} + T_{1,3})$ | $T_{2,1} + T_{2,2}$ |
| 4×6+1 | $T_{1,1} + T_{1,2}$ | $T_{2,1}$ |
| 4×6+2 | $T_{1,1} + T_{1,2}$ | $T_{2,1} + a_{2,3}x_{2,2}x_{2,3}$ |
| 4×6+3 | $T_{1,1} + T_{1,2}$ | $T_{2,1} + a_{2,3}x_{2,2}x_{2,3} + a_{2,4}x_{2,2}x_{2,4}$ |
| 4×6+4 | $T_{1,1} + T_{1,2}$ | $T_{2,1} + a_{2,3}x_{2,2}x_{2,3} + a_{2,4}x_{2,2}x_{2,4} + b_2 x_{2,2}$ $(= T_{2,1} + T_{2,2})$ |
| 4×6+5 | $T_{1,1} + T_{1,2} + b_3 x_{1,3}$ | $T_{2,1} + T_{2,2}$ |
| 4×6+6 | $T_{1,1} + T_{1,2} + b_3 x_{1,3} + a_{3,4}x_{1,3}x_{1,4}$ $(= T_{1,1} + T_{1,2} + T_{1,3})$ | $T_{2,1} + T_{2,2}$ |

FIG. 81

| CYCLE NUMBER | $RD_{1,1}$ | $RD_{1,2}$ | $RD_{2,1}$ | $RD_{2,2}$ | $RD_{2,3}$ | $RD_{2,4}$ | $RD_{2,5}$ | $a_{i,j}, b_i$ | selD |
|---|---|---|---|---|---|---|---|---|---|
| 1 | | | $x_{2,1}$ | $x_{2,2}$ | $x_{2,3}$ | $x_{2,4}$ | 1 | $a_{1,2}$ | 1 |
| 2 | | | $x_{2,1}$ | $x_{2,3}$ | $x_{2,4}$ | 1 | $x_{2,2}$ | $a_{1,3}$ | 1 |
| 3 | | | $x_{2,1}$ | $x_{2,4}$ | 1 | $x_{2,2}$ | $x_{2,3}$ | $a_{1,4}$ | 1 |
| 4 | | | $x_{2,1}$ | 1 | $x_{2,2}$ | $x_{2,3}$ | $x_{2,4}$ | $b_1$ | 1 |
| 5 | | | $x_{2,1}$ | $x_{2,2}$ | $x_{2,3}$ | $x_{2,4}$ | 1 | $b_4$ | |
| 6 | | | $x_{2,2}$ | $x_{2,3}$ | $x_{2,4}$ | 1 | $x_{2,1}$ | | |
| 6+1 | | | $x_{2,1}$ | $x_{2,2}$ | $x_{2,3}$ | $x_{2,4}$ | 1 | $a_{1,2}$ | 1 |
| 6+2 | | | $x_{2,1}$ | $x_{2,3}$ | $x_{2,4}$ | 1 | $x_{2,2}$ | $a_{1,3}$ | 1 |
| 6+3 | | | $x_{2,1}$ | $x_{2,4}$ | 1 | $x_{2,2}$ | $x_{2,3}$ | $a_{1,4}$ | 1 |
| 6+4 | | | $x_{2,1}$ | 1 | $x_{2,2}$ | $x_{2,3}$ | $x_{2,4}$ | $b_1$ | 1 |
| 6+5 | | | $x_{2,1}$ | $x_{2,2}$ | $x_{2,3}$ | $x_{2,4}$ | 1 | $b_4$ | |
| 6+6 | | | $x_{2,2}$ | $x_{2,3}$ | $x_{2,4}$ | 1 | $x_{2,1}$ | | |
| 2×6+1 | | | $x_{2,1}$ | $x_{2,2}$ | $x_{2,3}$ | $x_{2,4}$ | 1 | $a_{1,2}$ | 1 |
| 2×6+2 | | | $x_{2,1}$ | $x_{2,3}$ | $x_{2,4}$ | 1 | $x_{2,2}$ | $a_{1,3}$ | 1 |
| 2×6+3 | | | $x_{2,1}$ | $x_{2,4}$ | 1 | $x_{2,2}$ | $x_{2,3}$ | $a_{1,4}$ | 1 |
| 2×6+4 | | | $x_{2,1}$ | 1 | $x_{2,2}$ | $x_{2,3}$ | $x_{2,4}$ | $b_1$ | 1 |
| 2×6+5 | | | $x_{2,1}$ | $x_{2,2}$ | $x_{2,3}$ | $x_{2,4}$ | 1 | $b_4$ | |
| 2×6+6 | | | $x_{2,2}$ | $x_{2,3}$ | $x_{2,4}$ | 1 | $x_{2,1}$ | | |
| 3×6+1 | $x_{1,4}$ | 1 | $x_{2,1}$ | $x_{2,2}$ | $x_{2,3}$ | $x_{2,4}$ | 1 | $a_{1,2}$ | 1 |
| 3×6+2 | $x_{1,4}$ | 1 | $x_{2,1}$ | $x_{2,3}$ | $x_{2,4}$ | 1 | $x_{2,2}$ | $a_{1,3}$ | 1 |
| 3×6+3 | $x_{1,4}$ | 1 | $x_{2,1}$ | $x_{2,4}$ | 1 | $x_{2,2}$ | $x_{2,3}$ | $a_{1,4}$ | 1 |
| 3×6+4 | $x_{1,4}$ | 1 | $x_{2,1}$ | 1 | $x_{2,2}$ | $x_{2,3}$ | $x_{2,4}$ | $b_1$ | 1 |
| 3×6+5 | $x_{1,4}$ | 1 | $x_{2,1}$ | $x_{2,2}$ | $x_{2,3}$ | $x_{2,4}$ | 1 | $b_4$ | 0 |
| 3×6+6 | 1 | $x_{1,4}$ | $x_{2,2}$ | $x_{2,3}$ | $x_{2,4}$ | 1 | $x_{2,1}$ | | |
| 4×6+1 | $x_{1,4}$ | 1 | $x_{2,1}$ | $x_{2,2}$ | $x_{2,3}$ | $x_{2,4}$ | 1 | $a_{1,2}$ | 1 |
| 4×6+2 | $x_{1,4}$ | 1 | $x_{2,1}$ | $x_{2,3}$ | $x_{2,4}$ | 1 | $x_{2,2}$ | $a_{1,3}$ | 1 |
| 4×6+3 | $x_{1,4}$ | 1 | $x_{2,1}$ | $x_{2,4}$ | 1 | $x_{2,2}$ | $x_{2,3}$ | $a_{1,4}$ | 1 |
| 4×6+4 | $x_{1,4}$ | 1 | $x_{2,1}$ | 1 | $x_{2,2}$ | $x_{2,3}$ | $x_{2,4}$ | $b_1$ | 1 |
| 4×6+5 | $x_{1,4}$ | 1 | $x_{2,1}$ | $x_{2,2}$ | $x_{2,3}$ | $x_{2,4}$ | 1 | $b_4$ | 0 |
| 4×6+6 | 1 | $x_{1,4}$ | $x_{2,2}$ | $x_{2,3}$ | $x_{2,4}$ | 1 | $x_{2,1}$ | | |

FIG. 82

| CYCLE NUMBER | RDout$_1$ | RDout$_2$ |
|---|---|---|
| 1 | | 0 |
| 2 | | $a_{1,2}x_{2,1}x_{2,2}$ |
| 3 | | $a_{1,2}x_{2,1}x_{2,2} + a_{1,3}x_{2,1}x_{2,3}$ |
| 4 | | $a_{1,2}x_{2,1}x_{2,2} + a_{1,3}x_{2,1}x_{2,3} + a_{1,4}x_{2,1}x_{2,4}$ |
| 5 | | $a_{1,2}x_{2,1}x_{2,2} + a_{1,3}x_{2,1}x_{2,3} + a_{1,4}x_{2,1}x_{2,4} + b_1x_{2,1} (= T_{2,1})$ |
| 6 | | $T_{2,1}$ |
| 6+1 | | 0 |
| 6+2 | | $a_{1,2}x_{2,1}x_{2,2}$ |
| 6+3 | | $a_{1,2}x_{2,1}x_{2,2} + a_{1,3}x_{2,1}x_{2,3}$ |
| 6+4 | | $a_{1,2}x_{2,1}x_{2,2} + a_{1,3}x_{2,1}x_{2,3} + a_{1,4}x_{2,1}x_{2,4}$ |
| 6+5 | | $a_{1,2}x_{2,1}x_{2,2} + a_{1,3}x_{2,1}x_{2,3} + a_{1,4}x_{2,1}x_{2,4} + b_1x_{2,1} (= T_{2,1})$ |
| 6+6 | | $T_{2,1}$ |
| 2×6+1 | | 0 |
| 2×6+2 | | $a_{1,2}x_{2,1}x_{2,2}$ |
| 2×6+3 | | $a_{1,2}x_{2,1}x_{2,2} + a_{1,3}x_{2,1}x_{2,3}$ |
| 2×6+4 | | $a_{1,2}x_{2,1}x_{2,2} + a_{1,3}x_{2,1}x_{2,3} + a_{1,4}x_{2,1}x_{2,4}$ |
| 2×6+5 | | $a_{1,2}x_{2,1}x_{2,2} + a_{1,3}x_{2,1}x_{2,3} + a_{1,4}x_{2,1}x_{2,4} + b_1x_{2,1} (= T_{2,1})$ |
| 2×6+6 | | $T_{2,1}$ |
| 3×6+1 | $T_{1,1} + T_{1,2} + T_{1,3}$ | 0 |
| 3×6+2 | $T_{1,1} + T_{1,2} + T_{1,3}$ | $a_{1,2}x_{2,1}x_{2,2}$ |
| 3×6+3 | $T_{1,1} + T_{1,2} + T_{1,3}$ | $a_{1,2}x_{2,1}x_{2,2} + a_{1,3}x_{2,1}x_{2,3}$ |
| 3×6+4 | $T_{1,1} + T_{1,2} + T_{1,3}$ | $a_{1,2}x_{2,1}x_{2,2} + a_{1,3}x_{2,1}x_{2,3} + a_{1,4}x_{2,1}x_{2,4}$ |
| 3×6+5 | $T_{1,1} + T_{1,2} + T_{1,3}$ | $a_{1,2}x_{2,1}x_{2,2} + a_{1,3}x_{2,1}x_{2,3} + a_{1,4}x_{2,1}x_{2,4} + b_1x_{2,1} (= T_{2,1})$ |
| 3×6+6 | $T_{1,1} + T_{1,2} + T_{1,3} + b_4x_{1,4} (= T_{1,1} + T_{1,2} + T_{1,3} + T_{1,4})$ | $T_{2,1}$ |
| 4×6+1 | $T_{1,1} + T_{1,2} + T_{1,3}$ | 0 |
| 4×6+2 | $T_{1,1} + T_{1,2} + T_{1,3}$ | $a_{1,2}x_{2,1}x_{2,2}$ |
| 4×6+3 | $T_{1,1} + T_{1,2} + T_{1,3}$ | $a_{1,2}x_{2,1}x_{2,2} + a_{1,3}x_{2,1}x_{2,3}$ |
| 4×6+4 | $T_{1,1} + T_{1,2} + T_{1,3}$ | $a_{1,2}x_{2,1}x_{2,2} + a_{1,3}x_{2,1}x_{2,3} + a_{1,4}x_{2,1}x_{2,4}$ |
| 4×6+5 | $T_{1,1} + T_{1,2} + T_{1,3}$ | $a_{1,2}x_{2,1}x_{2,2} + a_{1,3}x_{2,1}x_{2,3} + a_{1,4}x_{2,1}x_{2,4} + b_1x_{2,1} (= T_{2,1})$ |
| 4×6+6 | $T_{1,1} + T_{1,2} + T_{1,3} + b_4x_{1,4} (= T_{1,1} + T_{1,2} + T_{1,3} + T_{1,4})$ | $T_{2,1}$ |

DEVICE FOR PERFORMING ARITHMETIC OPERATIONS OF MULTIVARIATE POLYNOMIALS, CONTROL METHOD, AND PROGRAM

TECHNICAL FIELD

The present technology relates to an arithmetic operation device, a control method, and a program.

BACKGROUND ART

With the rapid development of information processing technologies and communication technologies, documents have been digitized rapidly regardless of whether the documents are public or private. With the digitization of such documents, many individuals and companies have a considerable interest in security management of electronic documents. Countermeasures against tampering acts such as wiretapping or forgery of electronic documents have been actively studied in various fields in response to an increase in this interest. Regarding the wiretapping of electronic documents, security is ensured, for example, by encrypting the electronic documents. Further, regarding the forgery of electronic documents, security is ensured, for example, by using digital signatures. However, when the encryption or the digital signature to be used does not have high tampering resistance, sufficient security is not ensured.

The digital signature is used for specifying the author of an electronic document. Accordingly, the digital signature should be able to be generated only by the author of the electronic document. If a malicious third party is able to generate the same digital signature, the third party can impersonate the author of the electronic document. That is, an electronic document is forged by the malicious third party. Various opinions have been expressed regarding the security of the digital signature to prevent such forgery. As digital signature schemes that are currently widely used, a RSA signature scheme and a DSA signature scheme are known, for example.

The RSA signature scheme takes "difficulty of prime factorisation of a large composite number (hereinafter, prime factorisation problem)" as a basis for security. Also, the DSA signature scheme takes "difficulty of solving discrete logarithm problem" as a basis for security. These bases are based on that algorithms that efficiently solve the prime factorisation problem and the discrete logarithm problem by using a classical computer do not exist. That is, the difficulties mentioned above suggest the computational difficulty of a classical computer. However, it is said that solutions to the prime factorisation problem and the discrete logarithm problem can be efficiently calculated when a quantum computer is used.

Similarly to the RSA signature scheme and the DSA signature scheme, many of the digital signature schemes and public-key authentication schemes that are currently used also take difficulty of the prime factorisation problem or the discrete logarithm problem as a basis for security. Thus, if the quantum computer is put to practical use, security of such digital signature schemes and public-key authentication schemes will not be ensured. Accordingly, realizing new digital signature schemes and public-key authentication schemes is desired that take as a basis for security a problem different from problems such as the prime factorisation problem and the discrete logarithm problem that can be easily solved by the quantum computer. As a problem which is not easily solved by the quantum computer, there is a problem related to a multivariate polynomial, for example.

For example, as digital signature schemes that take the multivariate polynomial problem as a basis for security, those based on MI (Matsumoto-Imai cryptography), HFE (Hidden Field Equation cryptography), OV (Oil-Vinegar signature scheme), and TTM (Tamed Transformation Method cryptography) are known. For example, a digital signature scheme based on the HFE is disclosed in the following Non-Patent Literatures 1 and 2.

CITATION LIST

Non-Patent Literature

Non-Patent Literature 1: Jacques Patarin, Asymmetric Cryptography with a Hidden Monomial, CRYPTO 1996, pp. 45-60.

Non-Patent Literature 2: Patarin, J., Courtois, N., and Goubin, L., QUARTZ, 128-Bit Long Digital Signatures. In Naccache, D., Ed. Topics in Cryptology—CT-RSA 2001 (San Francisco, Calif., USA, April 2001), vol. 2020 of Lecture Notes in Computer Science, Springer-Verlag, pp. 282-297.

SUMMARY OF INVENTION

Technical Problem

As described above, the multivariate polynomial problem is an example of a problem called NP-hard problem which is difficult to solve even when using the quantum computer. Normally, a public-key authentication scheme that uses the multivariate polynomial problem typified by the HFE or the like uses a multi-order multivariate simultaneous equation with a special trapdoor. For example, a multi-order multivariate simultaneous equation $F(x_1, \ldots, x_n)=y$ related to $x_1, \ldots, x_n$, and linear transformations A and B are provided, and the linear transformations A and B are secretly managed. In this case, the multi-order multivariate simultaneous equation F and the linear transformations A and B are the trapdoors.

An entity that knows the trapdoors F, A, and B can solve an equation $B(F(A(x_1, \ldots, x_n)))=y'$ related to $x_1, \ldots, x_n$. On the other hand, the equation $B(F(A(x_1, \ldots, x_n)))=y'$ related to $x_1, \ldots, x_n$ is not solved by an entity that does not know the trapdoors F, A, and B. By using this mechanism, a public-key authentication scheme and a digital signature scheme that take the difficulty of solving a multi-order multivariate simultaneous equation as a basis for security can be realized.

As mentioned above, in order to realize the public-key authentication scheme or the digital signature scheme, it is necessary to prepare a special multi-order multivariate simultaneous equation satisfying $B(F(A(x_1, \ldots, x_n)))=y$. Further, at the time of the signature generation, it is necessary to solve the multi-order multivariate simultaneous equation F. For this reason, the available multi-order multivariate simultaneous equation F has been limited to relatively easily soluble equations. That is, in the past schemes, only a multi-order multivariate simultaneous equation $B(F(A(x_1, \ldots, x_n)))=y$ of a combined form of three functions (trapdoors) B, F, and A that can be relatively easily solved has been used, and thus it is difficult to ensure sufficient security.

Thus, the inventors of the present case took the above circumstances into consideration, and have invented an efficient public-key authentication scheme and a digital signature scheme with high security using a multi-order multivariate simultaneous equation to which an efficient solution (trapdoor) has not been known (Koichi Sakumoto, Taizo Shirai and Harunaga Hiwatari, 'Public-Key Identification Schemes Based on Multivariate Quadratic Polynomials', CRYPTO 2011, LNCS 6841, pp. 706-723, 2011).

In such a public-key authentication scheme and a digital signature scheme, an arithmetic operation of a multivariate polynomial is used. For this reason, a technique of efficiently performing an arithmetic operation of a multivariate is required. For example, in the public-key authentication scheme and the digital signature scheme, an operation of computing an arithmetic operation result of a multivariate polynomial with respect to a plurality of inputs is included. However, when arithmetic operations of multivariate polynomials are individually performed for each input, miniaturization and speed-up should be improved because scales of circuits to be installed increase and a critical path is lengthened. The present technology has been invented with intention of providing a novel and improved arithmetic operation apparatus, control method, and program that can realize arithmetic operations of multivariate polynomials in a small scale at a high speed.

Solution to Problem

According to an aspect of the present technology, there is provided an arithmetic operation device including a plurality of shift registers each constituted by first to $(N+1)^{th}$ registers and capable of moving a stored value from an $(n+1)^{th}$ register (n=1 to N) to an $n^{th}$ register, and a control unit configured to cause a first shift register in which the first to $(N+1)^{th}$ registers respectively store stored values $x_1, \ldots, x_N$, and c (c is a predetermined number) to move the stored values, and to cause another shift register in which the first to $(N+1)^{th}$ registers respectively store stored values $x_N', \ldots, x_1'$, and c' (c' is a predetermined number) to move the stored values in the same cycle as the first shift register. The control unit causes the stored values to be output from a predetermined pair of registers constituting the first shift register while causing the stored values to move so that all combinations of a pair of stored values selectable from the stored values $x_1, \ldots, x_N$, and c are output, and causes the stored values to be output from a predetermined pair of registers constituting the other shift register while causing the stored values to move so that all combinations of a pair of stored values selectable from the stored values $x_N', \ldots, x_1'$, and c' are output.

According to another aspect of the present technology, there is provided an arithmetic operation device including a plurality of shift registers each constituted by first to $(N+1)^{th}$ registers and capable of moving a stored value from an $(n+1)^{th}$ register (n=1 to N) to an $n^{th}$ register, and a control unit configured to cause a first shift register in which the first to $(N+1)^{th}$ registers respectively store stored values $x_1, \ldots, x_N$, and c (c is a predetermined number) to move the stored values, to cause a second shift register in which the first to $(N+1)^{th}$ registers respectively store stored values $x_N', \ldots, x_1'$, and c' (c' is a predetermined number) to move the stored values in the same cycle as the first shift register, and to cause a third shift register in which the first to $(N+1)^{th}$ registers respectively store stored values $x_N'', \ldots, x_1''$, and c'' (c'' is a predetermined number) to move the stored values in the same cycle as the second shift register. The control unit causes the stored values to be output from a predetermined pair of registers constituting the first shift register while causing the stored values to move so that all combinations of a pair of stored values selectable from the stored values $x_1, \ldots, x_N$, and c are output, and causes the stored values to be output from predetermined pairs of registers constituting the second and third shift registers while causing the stored values to move so that all combinations of a pair of stored values selectable from the stored values $x_N', \ldots, x_1'$, and c' and all combinations of a pair of stored values selectable from the stored values $x_N'', \ldots, x_1''$, and c'' are output.

According to another aspect of the present technology, there is provided a control method including a step of causing, among a plurality of shift registers each constituted by first to $(N+1)^{th}$ registers and capable of moving a stored value from an $(n+1)^{th}$ register (n=1 to N) to an $n^{th}$ register, a first shift register in which the first to $(N+1)^{th}$ registers respectively store stored values $x_1, \ldots, x_N$, and c (c is a predetermined number) to move the stored values and causing another shift register in which the first to $(N+1)^{th}$ registers respectively store stored values $x_N', \ldots, x_1'$, and c' (c' is a predetermined number) to move the stored values in the same cycle as the first shift register. In the step of causing the movement, a process of outputting the stored values from a predetermined pair of registers constituting the first shift register while the stored values are moved so that all combinations of a pair of stored values selectable from the stored values $x_1, \ldots, x_N$, and c are output, and of outputting the stored values from a predetermined pair of registers constituting the other shift register while the stored values are moved so that all combinations of a pair of stored values selectable from the stored values $x_N', \ldots, x_1'$, and c' are output is performed.

According to another aspect of the present technology, there is provided a control method including a step of causing, among a plurality of shift registers each constituted by first to $(N+1)^{th}$ registers and capable of moving a stored value from an $(n+1)^{th}$ register (n=1 to N) to an $n^{th}$ register, a first shift register in which the first to $(N+1)^{th}$ registers respectively store stored values $x_1, \ldots, x_N$, and c (c is a predetermined number) to move the stored values, a second shift register in which the first to $(N+1)^{th}$ registers respectively store stored values $x_N', \ldots, x_1'$, and c' (c' is a predetermined number) to move the stored values in the same cycle as the first shift register, and a third shift register in which the first to $(N+1)^{th}$ registers respectively store stored values $x_N'', \ldots, x_1''$, and c'' (c'' is a predetermined number) to move the stored values in the same cycle as the second shift register. In the step of causing the movement, a process of outputting the stored values from a predetermined pair of registers constituting the first shift register while the stored values are moved so that all combinations of a pair of stored values selectable from the stored values $x_1, \ldots, x_N$, and c are output, and of outputting the stored values from predetermined pairs of registers constituting the second and third shift registers while the stored values are moved so that all combinations of a pair of stored values selectable from the stored values $x_N', \ldots, x_1'$, and c' and all combinations of a pair of stored values selectable from the stored values $x_N'', \ldots, x_1''$, and c'' are output is performed.

According to another aspect of the present technology, there is provided a program causing a computer to realize a control function of causing, among a plurality of shift registers each constituted by first to $(N+1)^{th}$ registers and capable of moving a stored value from an $(n+1)^{th}$ register (n=1 to N) to an $n^{th}$ register, a first shift register in which the first to $(N+1)^{th}$ registers respectively store stored values $x_1, \ldots, x_N$, and c (c is a predetermined number) to move the stored values and causing another shift register in which the first to $(N+1)^{th}$ registers respectively store stored values $x_N{}', \ldots, x_1{}'$, and $c'$ ($c'$ is a predetermined number) to move the stored values in the same cycle as the first shift register. The control function causes the stored values to be output from a predetermined pair of registers constituting the first shift register while causing the stored values to move so that all combinations of a pair of stored values selectable from the stored values $x_1, \ldots, x_N$, and $c$ are output, and causes the stored values to be output from a predetermined pair of registers constituting the other shift register while causing the stored values to move so that all combinations of a pair of stored values selectable from the stored values $x_N{}', \ldots, x_1{}'$, and $c'$ are output.

According to another aspect of the present technology, there is provided a program causing a computer to realize a control function of causing, among a plurality of shift registers each constituted by first to $(N+1)^{th}$ registers and capable of moving a stored value from an $(n+1)^{th}$ register ($n=1$ to $N$) to an $n^{th}$ register, a first shift register in which the first to $(N+1)^{th}$ registers respectively store stored values $x_1, \ldots, x_N$, and $c$ ($c$ is a predetermined number) to move the stored values, a second shift register in which the first to $(N+1)^{th}$ registers respectively store stored values $x_N{}', \ldots, x_1{}'$, and $c'$ ($c'$ is a predetermined number) to move the stored values in the same cycle as the first shift register, and a third shift register in which the first to $(N+1)^{th}$ registers respectively store stored values $x_N{}'', \ldots, x_1{}''$, and $c''$ ($c''$ is a predetermined number) to move the stored values in the same cycle as the second shift register. The control function causes the stored values to be output from a predetermined pair of registers constituting the first shift register while causing the stored values to move so that all combinations of a pair of stored values selectable from the stored values $x_1, \ldots, x_N$, and $c$ are output, and causes the stored values to be output from predetermined pairs of registers constituting the second and third shift registers while causing the stored values to move so that all combinations of a pair of stored values selectable from the stored values $x_N{}', \ldots, x_1{}'$, and $c'$ and all combinations of a pair of stored values selectable from the stored values $x_N{}'', \ldots, x_1{}''$, and $c''$ are output.

According to another aspect of the present technology, there is provided an arithmetic operation device including a plurality of arithmetic operation circuits each including a first shift register constituted by first to $(N+1)^{th}$ registers and capable of moving a stored value from an $(n+1)^{th}$ register ($n=1$ to $N$) to an $n^{th}$ register and a second shift register constituted by first to $(M+1)^{th}$ registers and capable of moving a stored value from an $(m+1)^{th}$ register ($m=1$ to $M$) to an $m^{th}$ register, and a control unit configured to cause the first shift register of each of the arithmetic operation circuits in which the first to $(N+1)^{th}$ registers respectively store stored values $x_1, \ldots, x_N$, and $c$ ($c$ is a predetermined number) to move the stored values, and to cause the second shift register thereof in which the first to $(M+1)^{th}$ registers respectively store stored values $x_M{}', \ldots, x_1{}'$, and $c'$ ($c'$ is a predetermined number) to move the stored values in the same cycle as the first shift register. The plurality of arithmetic operation circuits are configured to cause the first shift register and the second shift register to execute a pipeline process in the same order. The control unit causes the stored values to be output from a predetermined pair of registers constituting the first shift register while causing the stored values to move so that all combinations of a pair of stored values selectable from the stored values $x_1, \ldots, x_N$, and $c$ are output, and causes the stored values to be output from a predetermined pair of registers constituting the second shift register while causing the stored values to move so that all combinations of a pair of stored values selectable from the stored values $x_M{}', \ldots, x_1{}'$, and $c'$ are output. A number of registers $N+1$ of the first shift register is configured to gradually decrease in later arithmetic operation circuits in the pipeline process.

According to another aspect of the present technology, there is provided an arithmetic operation device including a plurality of arithmetic operation circuits each including a first shift register constituted by first to $(N+1)^{th}$ registers and capable of moving a stored value from an $(n+1)^{th}$ register ($n=1$ to $N$) to an $n^{th}$ register and a second shift register constituted by first to $(M+1)^{th}$ registers and capable of moving a stored value from an $(m+1)^{th}$ register ($m=1$ to $M$) to an $m^{th}$ register, and a control unit configured to cause the first shift register of each of the arithmetic operation circuits in which the first to $(N+1)^{th}$ registers respectively store stored values $x_1, \ldots, x_N$, and $c$ ($c$ is a predetermined number) to move the stored values, and to cause the second shift register thereof in which the first to $(M+1)^{th}$ registers respectively store stored values $x_M{}', \ldots, x_1{}'$, and $c'$ ($c'$ is a predetermined number) to move the stored values in the same cycle as the first shift register. The plurality of arithmetic operation circuits are configured to cause the first shift register and the second shift register to execute a pipeline process in reverse orders to each other. The control unit causes the stored values to be output from a predetermined pair of registers constituting the first shift register while causing the stored values to move so that all combinations of a pair of stored values selectable from the stored values $x_1, \ldots, x_N$, and $c$ are output, and causes the stored values to be output from a predetermined pair of registers constituting the second shift register while causing the stored values to move so that all combinations of a pair of stored values selectable from the stored values $x_M{}', \ldots, x_1{}'$, and $c'$ are output. A number of the first shift registers $N+1$ and a number of registers $M+1$ of the second shift register are configured to gradually decrease in later arithmetic operation circuits in the pipeline process.

According to another aspect of the present technology, there is provided a control method, with respect to each of a plurality of arithmetic operation circuits each including a first shift register constituted by first to $(N+1)^{th}$ registers and capable of moving a stored value from an $(n+1)^{th}$ register ($n=1$ to $N$) to an $n^{th}$ register and a second shift register constituted by first to $(M+1)^{th}$ registers and capable of moving a stored value from an $(m+1)^{th}$ register ($m=1$ to $M$) to an $m^{th}$ register, the method including a step of causing the first shift register in which the first to $(N+1)^{th}$ registers respectively store stored values $x_1, \ldots, x_N$, and $c$ ($c$ is a predetermined number) to move the stored values, and causing the second shift register in which the first to $(M+1)^{th}$ registers respectively store stored values $x_M{}', \ldots, x_1{}'$, and $c'$ ($c'$ is a predetermined number) to move the stored values in the same cycle as the first shift register. The plurality of arithmetic operation circuits are configured to cause the first shift register and the second shift register to execute a pipeline process in the same order, and a number of registers $N+1$ of the first shift register is configured to gradually decrease in later arithmetic operation circuits in the pipeline process. In the step of causing the movement, a process of outputting the stored values from a predetermined pair of registers constituting the first shift register while the stored values are moved so that all combinations of a pair of stored values selectable from the stored values $x_1, \ldots, x_N$, and $c$ are output, and of outputting the stored values from a predetermined pair of registers constituting the second shift register while the stored values are moved so that all combinations of a pair of stored values selectable from the stored values $x_M', \ldots, x_1'$, and $c'$ are output is performed.

According to another aspect of the present technology, there is provided a control method, with respect to each of a plurality of arithmetic operation circuits each including a first shift register constituted by first to $(N+1)^{th}$ registers and capable of moving a stored value from an $(n+1)^{th}$ register ($n=1$ to $N$) to an $n^{th}$ register and a second shift register constituted by first to $(M+1)^{th}$ registers and capable of moving a stored value from an $(m+1)^{th}$ register ($m=1$ to $M$) to an $m^{th}$ register, the method including a step of causing the first shift register in which the first to $(N+1)^{th}$ registers respectively store stored values $x_1, \ldots, x_N$, and $c$ ($c$ is a predetermined number) to move the stored values, and causing the second shift register in which the first to $(M+1)^{th}$ registers respectively store stored values $x_M', \ldots, x_1'$, and $c'$ ($c'$ is a predetermined number) to move the stored values in the same cycle as the first shift register. The plurality of arithmetic operation circuits are connected to one another in series, and cause the first shift register and the second shift register to execute a pipeline process in reverse orders to each other, and a number of registers $N+1$ of the first shift register and a number of registers $M+1$ of the second shift register are configured to gradually decrease in later arithmetic operation circuits in the pipeline process. In the step of causing the movement, a process of outputting the stored values from a predetermined pair of registers constituting the first shift register while the stored values are moved so that all combinations of a pair of stored values selectable from the stored values $x_1, \ldots, x_N$, and $c$ are output, and of outputting the stored values from a predetermined pair of registers constituting the second shift register while the stored values are moved so that all combinations of a pair of stored values selectable from the stored values $x_M', \ldots, x_1'$, and $c'$ are output is performed.

In addition, according to another point of view of the present technology, a computer-readable recording medium on which the program is recorded is provided.

Advantageous Effects of Invention

According to the present technology described above, a device that can realize arithmetic operations of multivariate polynomials in a smaller scale at a high speed can be provided.

BRIEF DESCRIPTION OF DRAWINGS

[FIG. 13]

FIG. 15 is an illustrative diagram for describing a configuration of a circuit that calculates a plurality of multivariate polynomials in a parallel manner.

FIG. 23 is an illustrative diagram for describing a configuration of a circuit that executes calculation of a multivariate polynomial (a configuration example of using a shift register).

FIG. 26 is an illustrative diagram for describing a configuration of a circuit that executes calculation of a multivariate polynomial (a configuration example of using a shift register).

FIG. 30 is an illustrative diagram for describing a configuration of a circuit that executes calculation of a multivariate polynomial (a configuration example of using a shift register of a plurality of feedback loops).

FIG. 33 is an illustrative diagram for describing a configuration of a circuit that executes calculation of a multivariate polynomial (a configuration example of using a shift register of a plurality of feedback loops).

FIG. 42 is an illustrative diagram for describing an operation of the circuit that executes calculation of a multivariate polynomial (Embodiment #1).

FIG. 43 is an illustrative diagram for describing an operation of the circuit that executes calculation of a multivariate polynomial (Embodiment #2).

FIG. 50 is an illustrative diagram for describing an operation of the circuit that executes calculation of a multivariate polynomial (Embodiment #2).

FIG. 51 is a table showing a data structure example of a recording memory.

FIG. 62 is an illustrative diagram for describing an operation of the circuit that executes calculation of a multivariate polynomial (Embodiment #3).

FIG. 63 is an illustrative diagram for describing an operation of the circuit that executes calculation of a multivariate polynomial (Embodiment #3).

FIG. 64 is an illustrative diagram for describing an operation of the circuit that executes calculation of a multivariate polynomial (Embodiment #3).

FIG. 65 is an illustrative diagram for describing an operation of the circuit that executes calculation of a multivariate polynomial (Embodiment #3).

FIG. 66 is an illustrative diagram for describing an operation of the circuit that executes calculation of a multivariate polynomial (Embodiment #4).

FIG. 75 is an illustrative diagram for describing an operation of the circuit that executes calculation of a multivariate polynomial (Embodiment #4).

FIG. 76 is an illustrative diagram for describing an operation of the circuit that executes calculation of a multivariate polynomial (Embodiment #4).

FIG. 77 is an illustrative diagram for describing an operation of the circuit that executes calculation of a multivariate polynomial (Embodiment #4).

FIG. 78 is an illustrative diagram for describing an operation of the circuit that executes calculation of a multivariate polynomial (Embodiment #4).

FIG. 79 is an illustrative diagram for describing an operation of the circuit that executes calculation of a multivariate polynomial (Embodiment #4).

FIG. 80 is an illustrative diagram for describing an operation of the circuit that executes calculation of a multivariate polynomial (Embodiment #4).

FIG. 81 is an illustrative diagram for describing an operation of the circuit that executes calculation of a multivariate polynomial (Embodiment #4).

FIG. 82 is an illustrative diagram for describing an operation of the circuit that executes calculation of a multivariate polynomial (Embodiment #4).

DESCRIPTION OF EMBODIMENTS

Figure 1:
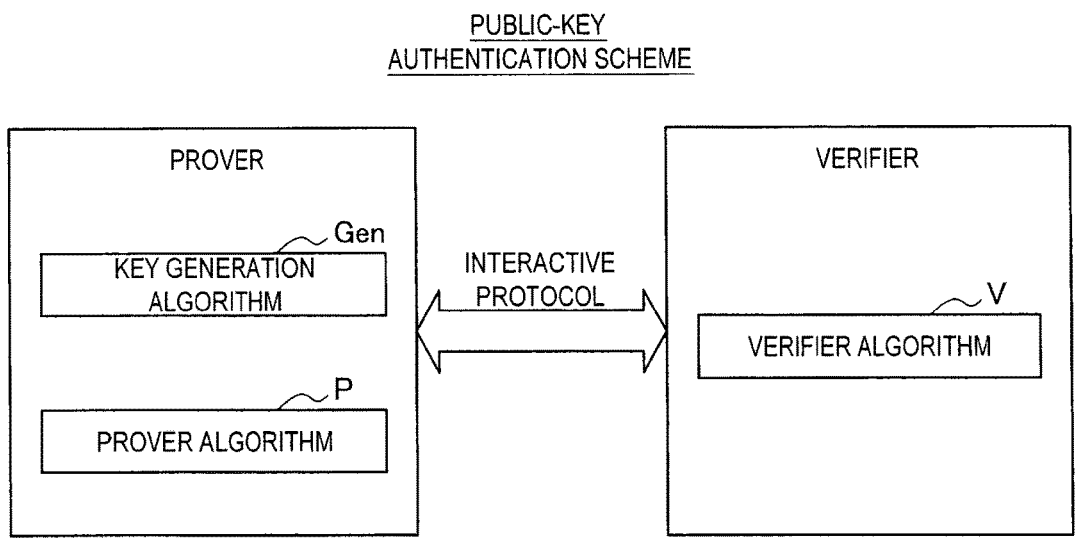
FIG. 1 is an illustrative diagram for describing a configuration of algorithms of a public-key authentication scheme.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[Flow of Description]

Here, a flow of the description of embodiments of the present technology to be made below will be briefly described. First, an algorithm structure of a public-key authentication scheme will be described with reference to FIG. 1. Next, an algorithm structure of a digital signature scheme will be described with reference to FIG. 2. Next, an n-pass public-key authentication scheme will be described with reference to FIG. 3.

Then, a configuration example of an algorithm of a 3-pass public-key authentication scheme will be described with reference to FIGS. 4 and 5. Then, a configuration example of an algorithm of a 5-pass public-key authentication scheme will be described with reference to FIGS. 6 and 7. Then, a method of modifying an efficient algorithm of the 3-pass and 5-pass public-key authentication schemes to an algorithm of a digital signature scheme will be described with reference to FIGS. 8 and 9. Then, a hardware configuration example of an information processing apparatus that can realize each algorithm according to an embodiment of the present technology will be described with reference to FIG. 10.

Then, a configuration of a circuit that executes calculation of a multivariate polynomial will be described with reference to FIGS. 11 to 13. Then, a configuration of a circuit that executes calculation of a plurality of multivariate polynomials in a parallel manner will be described with reference to FIGS. 14 and 15. Then, a configuration and an operation of a circuit that executes calculation of a multivariate polynomial (configuration example of using selectors with multi-bit inputs) will be described with reference to FIGS. 16 to 19. Then, a configuration and an operation of a circuit that executes calculation of a multivariate polynomial (configuration example of using a shift register) will be described with reference to FIGS. 20 to 26.

Then, a configuration and an operation of a circuit that executes calculation of a multivariate polynomial (configuration example of using a shift register of a plurality of feedback loops) will be described with reference to FIGS. 27 to 34. Then, a configuration and an operation of a circuit that executes calculation of a multivariate polynomial (Embodiment #1) will be described with reference to FIGS. 35 to 42. Then, a configuration and an operation of a circuit that executes calculation of a multivariate polynomial (Embodiment #2) will be described with reference to FIGS. 43 to 50. Then, a configuration and an operation of a circuit that executes calculation of a multivariate polynomial (Embodiment #3) will be described with reference to FIGS. 51 to 65. Then, a configuration and an operation of a circuit that executes calculation of a multivariate polynomial (Embodiment #4) will be described with reference to FIGS. 66 to 82. Finally, an effect obtained from a technical gist will be briefly described by summarizing the technical gist of the present embodiment.

(Subjects to be Described)
1: Introduction
  1-1: Algorithms of a public-key authentication scheme
  1-2: Algorithms of a digital signature scheme
  1-3: Public-key authentication scheme of n-pass
2: Configuration of an algorithm based on a 3-pass public-key authentication scheme
  2-1: Detailed configuration example of the algorithm
  2-2: Configuration example of a parallelized algorithm
3: Configuration of an algorithm based on a 5-pass public-key authentication scheme
  3-1: Detailed configuration example of the algorithm
  3-2: Configuration example of a parallelized algorithm
4: Modification to a digital signature scheme
  4-1: Modification from the 3-pass public-key authentication scheme to the digital signature scheme
  4-2: Modification from the 5-pass public-key authentication scheme to the digital signature scheme
5: Hardware configuration example 6: Configuration of a circuit that calculates a multivariate polynomial
  6-1: Overview
  6-2: Configuration that uses selectors with multi-bit inputs
    6-2-1: Circuit configuration
    6-2-2: Operation
  6-3: Configuration that uses a shift register #1
    6-3-1: Circuit configuration
    6-3-2: Operation
  6-4: Configuration that uses a shift register #2 (feedback loop)
    6-4-1: Circuit configuration
    6-4-2: Operation
  6-5: Embodiment #1 (Calculation of a multivariate polynomial F)
    6-5-1: Circuit configuration
    6-5-2: Operation
  6-6: Embodiment #2 (Calculation of multivariate polynomials F and G)
    6-5-1: Circuit configuration
    6-5-2: Operation
  6-7: Embodiment #3 (Pipelining of calculation of a multivariate polynomial F)
    6-5-1: Circuit configuration
    6-5-2: Operation
  6-8: Embodiment #4 (Pipelining of calculation of a multivariate polynomial F)
    6-5-1: Circuit configuration
    6-5-2: Operation
7: Conclusion

1. Introduction

The present embodiment relates to a public-key authentication scheme and a digital signature scheme that take the difficulty of solving a multi-order multivariate simultaneous equation as a basis for security. However, the present embodiment relates to a public-key authentication scheme and a digital signature scheme that uses a multi-order multivariate simultaneous equation that does not have an efficient solution (trapdoor), unlike a past method such as an HFE digital signature scheme. First, overviews of an algorithm of a public-key authentication scheme, an algorithm of a digital signature scheme, and the public-key authentication scheme of n-pass will be briefly described.

[1-1: Algorithms of a Public-Key Authentication Scheme]

First, an overview of algorithms of a public-key authentication scheme will be described with reference to FIG. 1. FIG. 1 is an illustrative diagram for describing the overview of the algorithms of the public-key authentication scheme.

A public-key authentication is used when a person (prover) convinces another person (verifier) of his or her identity by using a public key pk and a secret key sk. For example, a public key $pk_A$ of a prover A is made known to the verifier B. On the other hand, a secret key $sk_A$ of the prover A is secretly managed by the prover A. According to the public-key authentication mechanism, a person who knows the secret key $sk_A$ corresponding to the public key $pk_A$ is regarded as the prover A herself.

When the prover A proves identity as being the prover A to the verifier B using the public-key authentication mechanism, the prover A should present evidence that the prover A knows the secret key $sk_A$ corresponding to the public key $pk_A$ to the verifier B via an interactive protocol. When the evidence that the prover A knows the secret key $sk_A$ is presented to the verifier B and then the verifier B finishes confirmation of the evidence, legitimacy (identity) of the prover A is proven.

However, a public-key authentication mechanism requires the following conditions for ensuring security.

The first condition is "to lower as much as possible the probability of falsification being established, at the time the interactive protocol is performed, by a falsifier not having the secret key sk". That this first condition is satisfied is called "soundness." In other words, the soundness means that "falsification is not established during the execution of an interactive protocol by a falsifier not having the secret key sk with a non-negligible probability". The second condition is that, "even if the interactive protocol is performed, information on the secret key $sk_A$ of the prover A is not at all leaked to the verifier B". That this second condition is satisfied is called "zero knowledge."

It is necessary to use an interactive protocol having soundness and zero knowledge to perform public-key authentication in security. When an authentication process is conducted using the interactive protocol that does not have soundness and zero knowledge, there would be a definite chance of false verification and a definite chance of the divulgence of secret key information, and thus the validity of the prover would not be proven even if the process itself is completed successfully. Consequently, the question of how to ensure the soundness and zero knowledge of an interactive protocol is important.

(Model)

In a model of the public-key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public-key authentication scheme is configured from two entities, namely the prover and the verifier, and three algorithms, namely the key generation algorithm Gen, the prover algorithm P and the verifier algorithm V.

Note that, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus. The hardware configuration of these information processing apparatuses is as shown in FIG. 12, for example. That is, the key generation algorithm Gen, the prover algorithm P, and the verifier algorithm V are performed by a CPU 902 based on a program recorded on a ROM 904, a RAM 906, a storage unit 920, a removable recording medium 928, or the like.

(Key Generation Algorithm Gen)

The key generation algorithm Gen is used by a prover. The key generation algorithm Gen is an algorithm for generating a pair of a public key pk and a secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed by the prover is used to prove to the verifier of possession of the secret key sk corresponding to the public key pk by the prover. Formally, the key generation algorithm Gen is represented as formula (1) below as an algorithm that takes security parameter $1^\lambda$ ($\lambda$ is an integer of 0 or more) as an input and outputs the secret key sk and the public key pk.

[Math 1]

$$(sk, pk) \leftarrow Gen(1^\lambda) \quad (1)$$

(Prover Algorithm P)

The prover algorithm P is used by a prover. The prover algorithm P is an algorithm for proving to the verifier that the prover possesses the secret key sk corresponding to the public key pk. In other words, the prover algorithm P is an algorithm that takes the public key pk and the secret key sk as inputs and performs the interactive protocol.

(Verifier Algorithm V)

The verifier algorithm V is used by the verifier. The verifier algorithm V is an algorithm that verifies whether or not the prover possesses the secret key sk corresponding to the public key pk during the interactive protocol. The verifier algorithm V is an algorithm that takes the public key pk as input, and outputs 0 or 1 (1 bit) according to the execution results of the interactive protocol. Note that, the verifier decides that the prover is illegitimate in the case where the verifier algorithm V outputs 0, and decides that the prover is legitimate in the case where the verifier algorithm V outputs 1. Formally, the verifier algorithm V is expressed as in the following formula (2).

[Math 2]

$$0/1 \leftarrow V(pk) \quad (2)$$

As above, realizing meaningful public-key authentication involves having the interactive protocol satisfy the two conditions of soundness and zero knowledge.

However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be leaked to the verifier. For this reason, the above key generation algorithm Gen, the prover algorithm P, and the verifier algorithm V should be skillfully designed to satisfy these requirements.

The foregoing thus summarizes the algorithms in a public-key authentication scheme.

[1-2: Algorithms for a Digital Signature Scheme]

Figure 2:
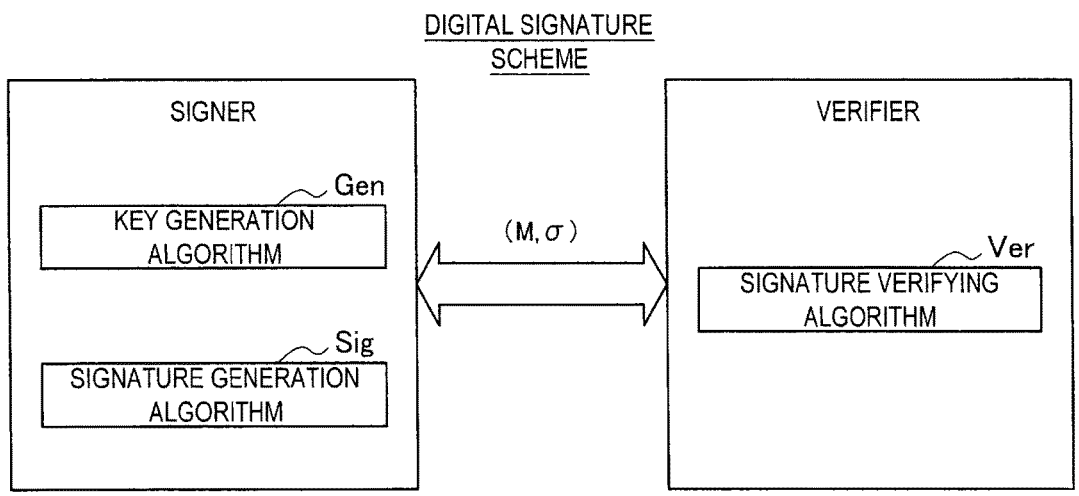
FIG. 2 is an illustrative diagram for describing a configuration of algorithms of a digital signature scheme.

Next, algorithms for a digital signature scheme will be summarized with reference to FIG. 2. FIG. 2 is an illustrative diagram for describing an overview of algorithms of the digital signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is digital signatures. A digital signature refers to a setup that associates given data with signature data known only to the creator of the data, provides the signature data to a recipient, and verifies that signature data on the recipient's end.

(Model)

As illustrated in FIG. 2, the two identities of signer and verifier exist in a model of a digital signature scheme. Further, the model of the digital signature scheme is made up of three algorithms: a key generation algorithm Gen, a signature generation algorithm Sig, and a signature verifying algorithm Ver.

The signer uses the key generation algorithm Gen to generate a paired signature key sk and verification key pk unique to the signer. The signer also uses the signature generation algorithm Sig to generate a digital signature σ to attach to a message M. In other words, the signer is an entity that attaches a digital signature to the message M. Meanwhile, the verifier uses the signature verifying algorithm Ver to verify the digital signature σ attached to the message M. In other words, the verifier is an entity that verifies the digital signature σ in order to confirm whether or not the creator of the message M is the signer.

Note that although the terms "signer" and "verifier" are used in the description hereinafter, these terms ultimately mean entities. Consequently, the agent that executes the key generation algorithm Gen and the signature generation algorithm Sig is an information processing apparatus corresponding to the "signer" entity. Similarly, the agent that executes the signature verifying algorithm Ver is an information processing apparatus. The hardware configuration of these information processing apparatus is as illustrated in FIG. 12, for example. In other words, the key generation algorithm Gen, the signature generation algorithm Sig, and the signature verifying algorithm Ver are executed by a device such as the CPU 902 on the basis of a program recorded onto a device such as the ROM 904, the RAM 906, the storage unit 920, or the removable recording medium 928.

(Key Generation Algorithm Gen)

The key generation algorithm Gen is used by the signer. The key generation algorithm Gen is an algorithm that generates a paired signature key sk and verification key pk unique to the signer. The verification key pk generated by the key generation algorithm Gen is revealed. Meanwhile, the signer keeps the signature key sk generated by the key generation algorithm Gen in secret. The signature key sk is then used to generate a digital signature σ to attach to a message M. For example, the key generation algorithm Gen accepts a security parameter $1^\lambda$ (where $\lambda$ is an integer equal to or greater than 0) as input, and outputs a signature key sk and a verification key pk. In this case, the key generation algorithm Gen may be expressed formally as in the following formula (3).

[Math 3]

$$(sk, pk) \leftarrow Gen(1^\lambda) \quad (3)$$

(Signature Generation Algorithm Sig)

The signature generation algorithm Sig is used by the signer. The signature generation algorithm Sig is an algorithm that generates the digital signature σ to be attached to the message M. The signature generation algorithm Sig is an algorithm that accepts the signature key sk and the message M as input, and outputs the digital signature λ. The signature generation algorithm Sig may be expressed formally as in the following formula (4).

[Math 4]

$$\sigma \leftarrow \text{Sig}(sk, M) \qquad (4)$$

(Signature Verifying Algorithm Ver)

The signature verifying algorithm Ver is used by the verifier. The signature verifying algorithm Ver is an algorithm that verifies whether or not the digital signature σ is a valid digital signature for the message M. The signature verifying algorithm Ver is an algorithm that accepts a signer's verification key pk, a message M, and a digital signature q as input, and outputs 0 or 1 (1 bit). The signature verifying algorithm Ver can be expressed formally as in the following formula (5). At this point, the verifier decides that the digital signature σ is invalid in the case where the signature verifying algorithm Ver outputs 0 (the case where the public key pk rejects the message M and the digital signature q), and decides that the digital signature σ is valid in the case where the signature verifying algorithm Ver outputs 1 (the case where the public key pk accepts the message M and the digital signature σ).

[Math 5]

$$0/1 \leftarrow \text{Ver}(pk, M, \sigma) \qquad (5)$$

The foregoing thus summarizes the algorithms in the digital signature scheme.

[1-3: N-Pass Public-Key Authentication Scheme]

Figure 3:
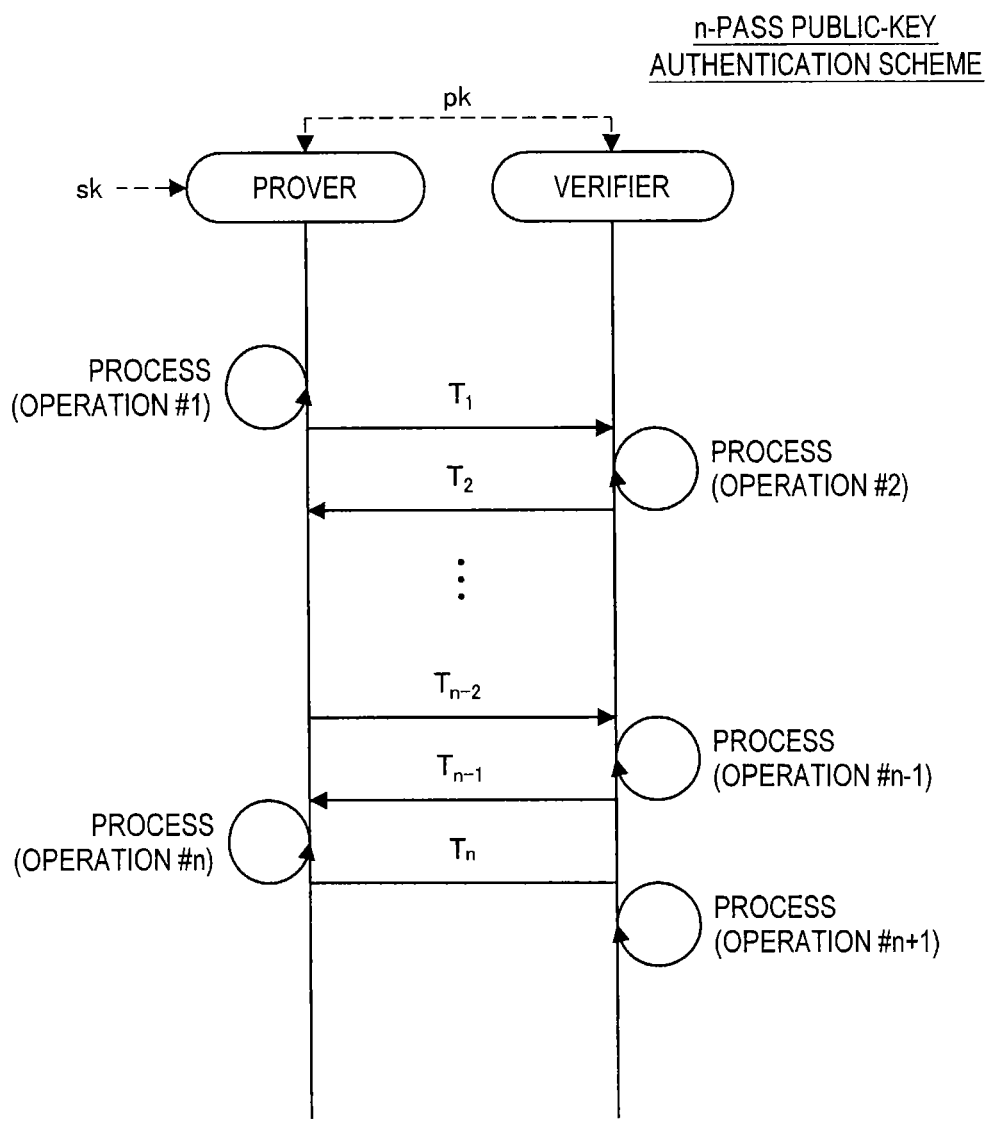
FIG. 3 is an illustrative diagram for describing a configuration of an algorithm according to an n-pass public-key authentication scheme.

Next, an n-pass public-key authentication scheme will be described with reference to FIG. 3. FIG. 3 is an illustrative diagram for describing an n-pass public-key authentication scheme.

As above, a public-key authentication scheme is an authentication scheme that proves to a verifier that a prover possesses a secret key sk corresponding to a public key pk during an interactive protocol. Further, the interactive protocol has to satisfy the two conditions of soundness and zero knowledge. For this reason, in the interactive protocol, both the prover and the verifier exchange information n times while executing respective processes, as illustrated in FIG. 3.

In the case of the n-pass public-key authentication scheme, the prover executes a process using the prover algorithm P (Operation #1), and transmits information $T_1$ to the verifier. Subsequently, the verifier executes a process using the verifier algorithm V (Operation #2), and transmits information $T_2$ to the prover. This execution of processes and transmission of information $T_k$ is successively conducted for k=3 to n and lastly, a process (Operation #n+1) is executed. Transmitting and receiving information n times in this way is thus called an "n-pass" public-key authentication scheme.

The foregoing thus describes the n-pass public-key authentication scheme.

2: Configuration of an Algorithm Based on A3-Pass Public-Key Authentication Scheme Hereinafter, an algorithm based on a 3-pass public-key authentication scheme will be described. Note that, in description provided below, there are cases in which the 3-pass public-key authentication scheme is referred to as a "3-pass scheme."

[2-1: Detailed Configuration Example of the Algorithm (FIG. 4)]

Figure 4:
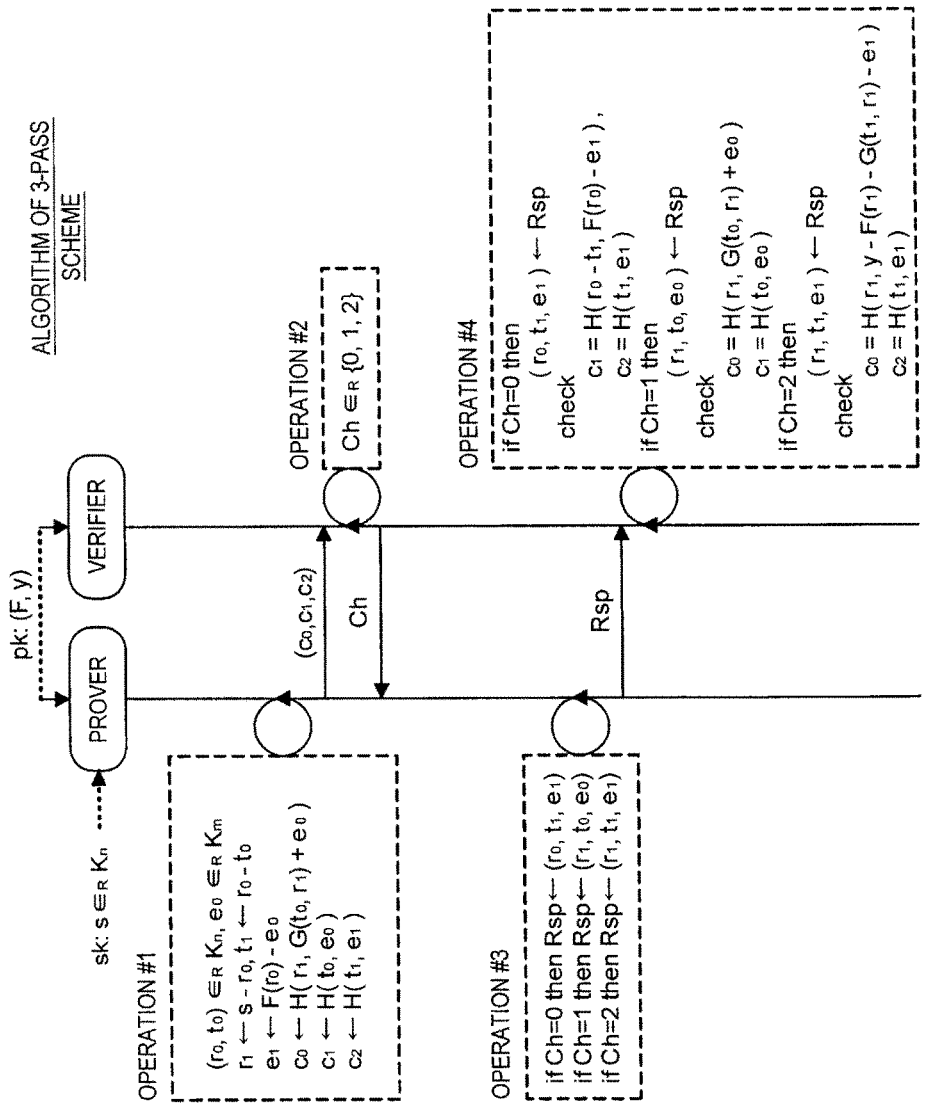
FIG. 4 is an illustrative diagram for describing an efficient algorithm based on a 3-pass public-key authentication scheme.

First, with reference to FIG. 4, a detailed configuration example of the algorithm based on the 3-pass scheme will be introduced. FIG. 4 is an illustrative diagram for describing a detailed configuration of the algorithm based on the 3-pass scheme. Herein, a case in which a tuple of quadratic polynomials $(f_1(x), \ldots, f_m(x))$ is used as a part of a public key pk will be considered. However, a quadratic polynomial $f_i(x)$ is set to be expressed as the following formula (6). In addition, a vector $(x_1, \ldots, x_n)$ is marked by x, and a tuple of quadratic polynomials $(f_1(x), \ldots, f_m(x))$ is marked by a multivariate polynomial F(x).

[Math 6]

$$f_i(x_1, \ldots, x_n) = \sum_{j,k} a_{ijk} x_j x_k + \sum_j b_{ij} x_j \qquad (6)$$

In addition, the tuple of quadratic polynomials $(f_1(x), \ldots, f_m(x))$ can be expressed by formula (7) described below. In addition, $A_1, \ldots, A_m$ are n×n matrixes. Furthermore, $b_1, \ldots, b_m$ each are n×1 vectors.

[Math 7]

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \qquad (7)$$

When these expressions are used, the multivariate polynomial F can be expressed as formula (8) and formula (9) described below. Establishment of the expressions can be easily checked from formula (10) described below.

[Math 8]

$$F(x + y) = F(x) + F(y) + G(x, y) \qquad (8)$$

$$G(x, y) = \begin{pmatrix} y^T (A_1^T + A_1) x \\ \vdots \\ y^T (A_m^T + A_m) x \end{pmatrix} \qquad (9)$$

$$\begin{aligned} f_l(x + y) &= (x + y)^T A_l (x + y) + b_l^T (x + y) \\ &= x^T A_l x + x^T A_l y + y^T A_l x + y^T A_l y + b_l^T x + b_l^T y \\ &= f_l(x) + f_l(y) + x^T A_l y + y^T A_l x \\ &= f_l(x) + f_l(y) + x^T (A_l^T)^T y + y^T A_l x \\ &= f_l(x) + f_l(y) + (A_l^T x)^T y + y^T A_l x \\ &= f_l(x) + f_l(y) + y^T (A_l^T x) + y^T A_l x \\ &= f_l(x) + f_l(y) + y^T (A_l^T + A_l) x \end{aligned} \qquad (10)$$

As above, when F(x+y) is divided into a first portion that relates to x, a second portion that relates to y, and a third portion that relates to both x and y, the term G(x, y) corresponding to the third portion is bilinear with regard to x and y. Hereinbelow, there are cases in which the term G(x, y) is referred to as a bilinear term. When this feature is used, an efficient algorithm can be constructed.

For example, using vectors of $t_0 \in K^n$ and $e_0 \in K^m$, a multivariate polynomial $F_1(x)$ used for masking a multivariate polynomial F(x+r) is expressed as $F_1(x)=G(x, t_0)+e_0$. In this case, the sum of the multivariate polynomial $F(x+r_0)$ and $G(x)$ is expressed as formula (11) described below. Here, if $t_1=r_0+t_0$ and $e_1=F(r_0)+e_0$ are set, a multivariate polynomial $F_2(x)=F(x+r_0)+F_1(x)$ can be expressed by vectors $t_1 \in K^n$ and $e_1 \in K^m$. For this reason, if $F_1(x)=G(x, t_0)+e_0$ is set, $F_1$ and $F_2$ can be expressed using the vector of $K^n$ and the vector of $K^m$, and thereby an efficient algorithm with a small data size necessary for communication can be realized.

[Math 9]

$$F(x+r_0)+F_1(x) \quad (11)$$
$$= F(x)+F(r_0)+G(x, r_0)+G(x, t_0)+e_0$$
$$= F(x)+G(x, r_0+t_0)+F(r_0)+e_0$$

Note that leakage of information relating to $r_0$ from $F_2$ (or $F_1$) does not occur at all. For example, even if $e_1$ and $t_1$ (or $e_0$ and $t_0$) are given, it is not possible to know the information relating to $r_0$ as long as $e_0$ and $t_0$ (or $e_1$ and $t_1$) are unknown. Thus, zero knowledge is ensured. Hereinbelow, an algorithm of the 3-pass scheme constructed based on the logic will be described. The algorithm of the 3-pass scheme that will be described herein is constituted by a key generation algorithm Gen, a prover algorithm P, and a verifier algorithm V as below.

(Key Generation Algorithm Gen)

The key generation algorithm Gen generates m multivariate polynomials $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Also, the key generation algorithm Gen sets if $(f_1(x_1, \ldots, x_n), \ldots, f_m(x_1, \ldots, x_n), y)$ as the public key pk and sets s as a secret key.

(Prover Algorithm P, Verifier Algorithm V)

Hereinafter, a process performed by the prover algorithm P and a process performed by the verifier algorithm V during the interactive protocol will be described with reference to FIG. 4. During the foregoing interactive protocol, a prover does not leak information on the secret key s at all to a verifier and expresses to the verifier that "the prover knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 4.

Operation #1:

As shown in FIG. 4, first, the prover algorithm P randomly generates $r_0, t_0 \in K^n$ and $e_0 \in K^m$. Next, the prover algorithm P calculates $r_1 \leftarrow s-r_0$. This calculation corresponds to manipulation of masking the secret key s with the vector $r_0$. Furthermore, the prover algorithm P calculates $t_1 \leftarrow r_0-t_0$. Next, the prover algorithm P calculates $e_1 \leftarrow F(r_0)-e_0$.

Operation #1 (Continued)

Next, the prover algorithm P calculates $c_0 \leftarrow H(r_1, G(t_0, r_1)+e_0)$. Next, the prover algorithm P calculates $c_1 \leftarrow H(t_0, e_0)$. Next, the prover algorithm P calculates $c_2 \leftarrow H(t_1, e_1)$. A message $(c_0, c_1, c_2)$ generated in Operation #1 is transmitted to the verifier algorithm V.

Operation #2:

The verifier algorithm V that has received the message $(c_0, c_1, c_2)$ selects which verification pattern will be used among three verification patterns. For example, the verifier algorithm V selects one numerical value from three numerical values of {0, 1, 2} indicating types of verification patterns, and sets the selected numerical value to be a challenge Ch. The challenge Ch is transmitted to the prover algorithm P.

Operation #3:

The prover algorithm P that has received the challenge Ch generates responses Rsp to be transmitted to the verifier algorithm V according to the received challenge Ch. In the case of Ch=0, the prover algorithm P generates a response $Rsp=(r_0, t_1, e_1)$. In the case of Ch=1, the prover algorithm P generates a response $Rsp=(r_1, t_0, e_0)$. In the case of Ch=2, the prover algorithm P generates a response $Rsp=(r_1, t_1, e_1)$. The responses Rsp generated in Operation #3 are transmitted to the verifier algorithm V.

Operation #4:

The verifier algorithm V that has received the responses Rsp executes the following verification process using the received responses Rsp.

In the case of Ch=0, the verifier algorithm V verifies whether or not the equation of $c_1=H(r_0-t_1, F(r_0)-e_1)$ is valid. Furthermore, the verifier algorithm V verifies whether or not the equation of $c_2=H(t_1, e_1)$ is valid. When the verification for all of the equations succeeds, the verifier algorithm V outputs a value of 1 indicating success of authentication, and when the verification fails, the verifier algorithm outputs a value of 0 indicating failure of authentication.

In the case of Ch=1, the verifier algorithm V verifies whether or not the equation of $c_0=H(r_1, G(t_0, r_1)+e_0)$ is valid. Furthermore, the verifier algorithm V verifies whether or not the equation of $c_1=H(t_0, e_0)$ is valid. When the verification for all of the equations succeeds, the verifier algorithm V outputs the value of 1 indicating success of authentication, and when the verification fails, the verifier algorithm outputs the value of 0 indicating failure of authentication.

In the case of Ch=2, the verifier algorithm V verifies whether or not the equation of $c_0=H(r_1, y-F(r_1)-G(t_1, r_1)-e_1)$ is valid. Furthermore, the verifier algorithm V verifies whether or not the equation of $c_2=H(t_1, e_1)$ is valid. When the verification for all of the equations succeeds, the verifier algorithm V outputs the value of 1 indicating success of authentication, and when the verification fails, the verifier algorithm outputs the value of 0 indicating failure of authentication.

Hereinabove, the configuration example of the efficient algorithm of 3-pass has been described.

[2-2: Configuration Example of a Parallelized Algorithm (FIG. 5)]

Next, a method of parallelizing the algorithm of the 3-pass scheme shown in FIG. 4 will be described with reference to FIG. 5. Note that description of the configuration of the key generation algorithm Gen will be omitted.

Applying the interactive protocol makes it possible to keep the probability of successful false proof to ⅔ or less. Consequently, executing the interactive protocol twice makes it possible to keep the probability of successful false proof to $(⅔)^2$ or less. Furthermore, if the interactive protocol is executed N times, the probability of successful false proof becomes $(⅔)^N$, and if N is set to a sufficiently large number (N=140, for example), the probability of successful false proof becomes negligibly small.

As methods of executing the interactive protocol a plurality of times, for example, a serial method of sequentially repeating exchange of a message, a challenge, and a response a plurality of times, and a parallel method of exchanging a plurality of messages, challenges, and responses at once are considered. Furthermore, a hybrid-type method obtained by combining the serial method and the parallel method is also considered. Here, an algorithm for executing the interactive protocol based on the 3-pass scheme in a parallel manner (hereinafter referred to as a parallelized algorithm) will be described with reference to FIG. 5.

Figure 5:
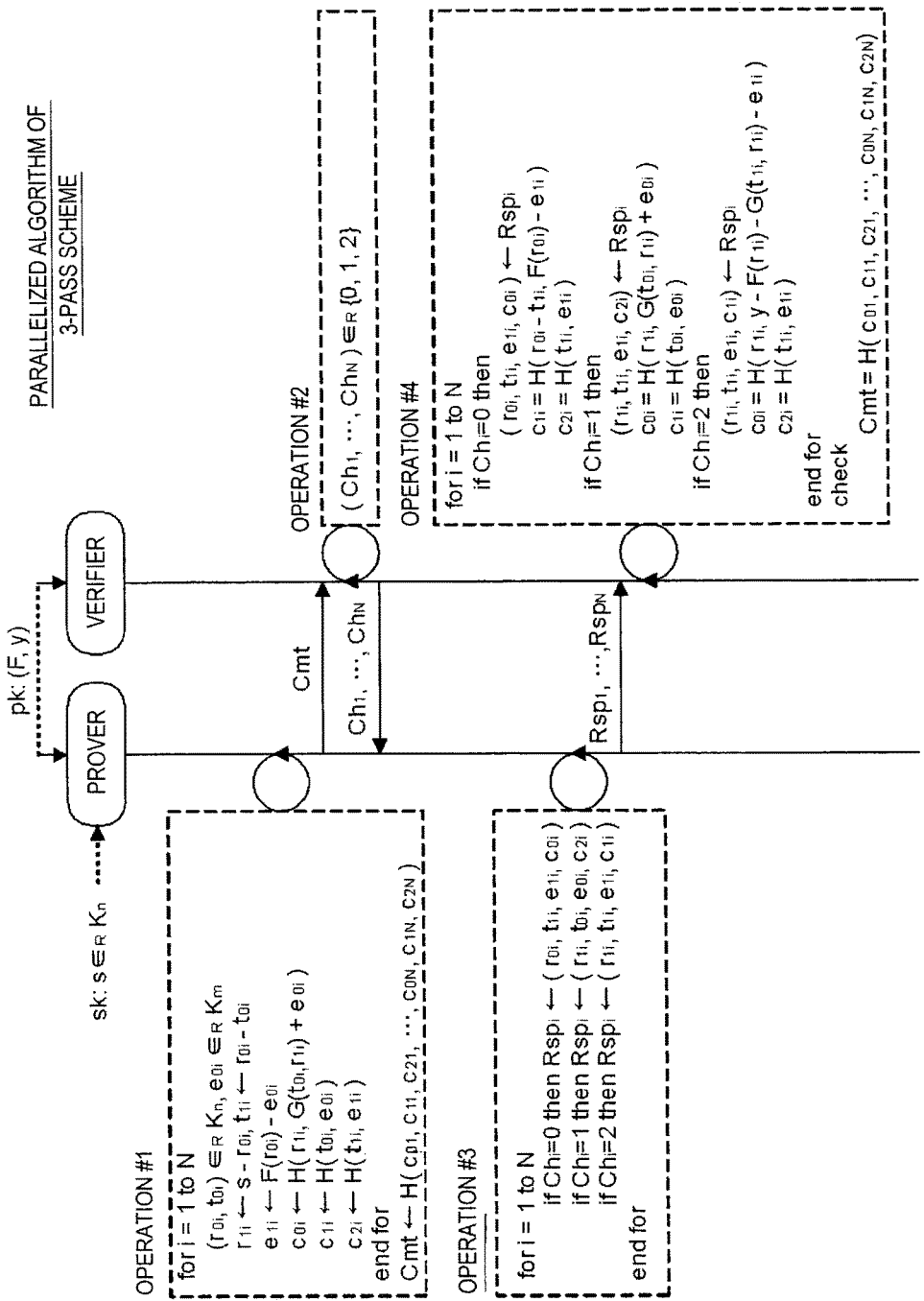
FIG. 5 is an illustrative diagram for describing parallelization of an efficient algorithm based on the 3-pass public-key authentication scheme.

Operation #1:

As shown in FIG. 5, first, the prover algorithm P executes the following processes (1) to (6) for i=1 to N.

Process (1): The prover algorithm P generates vectors of $r_{0i}, t_{0i} \in K^n$ and $e_{0i} \in K^m$ at random.

Process (2): The prover algorithm P calculates $r_{1i} \leftarrow s - r_{0i}$. This calculation corresponds to manipulation of masking the secret key s with the vector $r_{0i}$. Furthermore, the prover algorithm P calculates $t_{1i} \leftarrow r_{0i} + t_{0i}$.

Process (3): The prover algorithm P calculates $e_{1i} \leftarrow F(r_{0i}) - e_{0i}$.

Process (4): The prover algorithm P calculates $c_{0i} \leftarrow H(r_{1i}, G(r_{1i}, t_{0i}) + e_{0i})$.

Process (5): The prover algorithm P calculates $c_{1i} \leftarrow H(t_{0i}, e_{0i})$.

Process (6): The prover algorithm P calculates $c_{2i} \leftarrow H(t_{1i}, e_{1i})$.

Operation #1 (Continued)

After the processes (1) to (6) described above are executed for i=1 to N, the prover algorithm P calculates $Cmt \leftarrow H(c_{01}, c_{11}, c_{21}, \ldots, c_{0N}, c_{1N}, c_{2N})$. The hash value Cmt generated in Operation #1 is transmitted to the verifier algorithm V. In this manner, by converting the message $(c_{01}, c_{11}, c_{21}, \ldots, c_{0N}, c_{1N}, c_{2N})$ into hash values and then transmitting the value to the verifier algorithm V, a communication amount can be reduced.

Operation #2:

The verifier algorithm V that has received the hash value Cmt selects which verification pattern will be used among three verification patterns for each of i=1 to N. For example, the verifier algorithm V selects one numerical value from three numerical values {0, 1, 2} indicating types of the verification patterns for each of i=1 to N, and sets a selected numerical value as a challenge $Ch_i$. Challenges $Ch_1, \ldots, Ch_N$ are transmitted to the prover algorithm P.

Operation #3:

The prover algorithm P that has received the challenges $Ch_1, \ldots, Ch_N$ generates responses $Rsp_1, \ldots, Rsp_N$ to be transmitted to the verifier algorithm V according to each of the received challenges $Ch_1, \ldots, Ch_N$. In the case of $Ch_i=0$, the prover algorithm P generates $Rsp_i=(r_{0i}, t_{1i}, e_{1i}, c_{0i})$. In the case of $Ch_i=1$, the prover algorithm P generates $Rsp_i=(r_{1i}, t_{0i}, e_{0i}, c_{2i})$. In the case of $Ch_i=2$, the prover algorithm P generates $Rsp_i=(r_{1i}, t_{1i}, e_{1i}, c_{1i})$.

The responses $Rsp_1, \ldots, Rsp_N$ generated in Operation #3 are transmitted to the verifier algorithm V.

Operation #4:

The verifier algorithm V that has received the responses $Rsp_1, \ldots, Rsp_N$ executes the processes (1) to (3) described below using the received responses $Rsp_1, \ldots, Rsp_N$ for i=1 to N. However, the verifier algorithm V executes the process (1) when $Ch_i=0$, executes the process (2) when $Ch_i=1$, and executes the process (3) when $Ch_i=2$.

Process (1): When $Ch_i=0$, the verifier algorithm V extracts $(r_{0i}, t_{1i}, e_{1i}, c_{0i})$ from $Rsp_i$. Next, the verifier algorithm V calculates $c_{1i}=H(r_{0i}-t_{1i}, F(r_{0i})-e_{1i})$. Furthermore, the verifier algorithm V calculates $c_{2i}=H(t_{1i}, e_{1i})$. Then, the verifier algorithm V retains $(c_{0i}, c_{1i}, c_{2i})$.

Process (2): When $Ch_i=1$, the verifier algorithm V extracts $(r_{1i}, t_{0i}, e_{0i}, c_{2i})$ from $Rsp_i$. Next, the verifier algorithm V calculates $c_{0i}=H(r_{1i}, G(t_{0i}, r_{1i})+e_{0i})$ Furthermore, the verifier algorithm V calculates $c_{1i}=H(t_{0i}, e_{0i})$. Then, the verifier algorithm V retains $(c_{0i}, c_{1i}, c_{2i})$.

Process (3): When $Ch_i=2$, the verifier algorithm V extracts $(r_{1i}, t_{1i}, e_{1i}, c_{1i})$ from $Rsp_i$. Next, the verifier algorithm V calculates $c_{0i}=H(r_{1i}, y-F(r_{1i})-G(t_{1i}, r_{1i})-e_{1i})$. Furthermore, the verifier algorithm V calculates $c_{2i}=H(t_{1i}, e_{1i})$. Then, the verifier algorithm V retains $(c_{0i}, c_{1i}, c_{2i})$.

After the processes (1) to (3) are executed for i=1 to N, the verifier algorithm V verifies whether or not the equation of $Cmt=H(c_{01}, e_{11}, c_{21}, \ldots, c_{0N}, c_{1N}, c_{2N})$ is valid. When the verification succeeds, the verifier algorithm V outputs the value of 1 indicating success of the verification, and when the verification fails, the verifier algorithm outputs the value of 0 indicating failure of verification.

Hereinabove, the configuration example of the efficient parallelized algorithm based on the 3-pass scheme has been described.

3: Configuration of an Algorithm Based on A 5-Pass Public-Key Authentication Scheme Next, an algorithm based on a 5-pass public-key authentication scheme will be described. Note that, in description below, there are cases in which the 5-pass public-key authentication scheme is referred to as a "5-pass scheme."

While the probability of false proof per execution of the interactive protocol in the case of the 3-pass scheme is 2/3, the probability of false proof per execution of interactive protocol in the case of the 5-pass scheme is 1/2+1/q. However, q is the order of a ring to be used. Thus, when the order of a ring is sufficiently large, the 5-pass scheme can lower the probability of false proof per execution of interactive protocol, and accordingly, the probability of false proof can be sufficiently lowered with a small number of execution times of the interactive protocol.

When it is desired to set the probability of false proof to be $\frac{1}{2^n}$ or lower in the 3-pass scheme, for example, it is necessary to execute the interactive protocol n/(log 3−1)=1.701n times or more. On the other hand, when it is desired to set the probability of false proof to be $\frac{1}{2^n}$ or lower in the 5-pass scheme, it is necessary to execute the interactive protocol n/(1−log(1+1/q)) times or more. Thus, if q=24, a communication amount necessary for realizing a same security level is smaller in the 5-pass scheme than in the 3-pass scheme.

[3-1: Detailed Configuration Example of the Algorithm (FIG. 6)]

Figure 6:
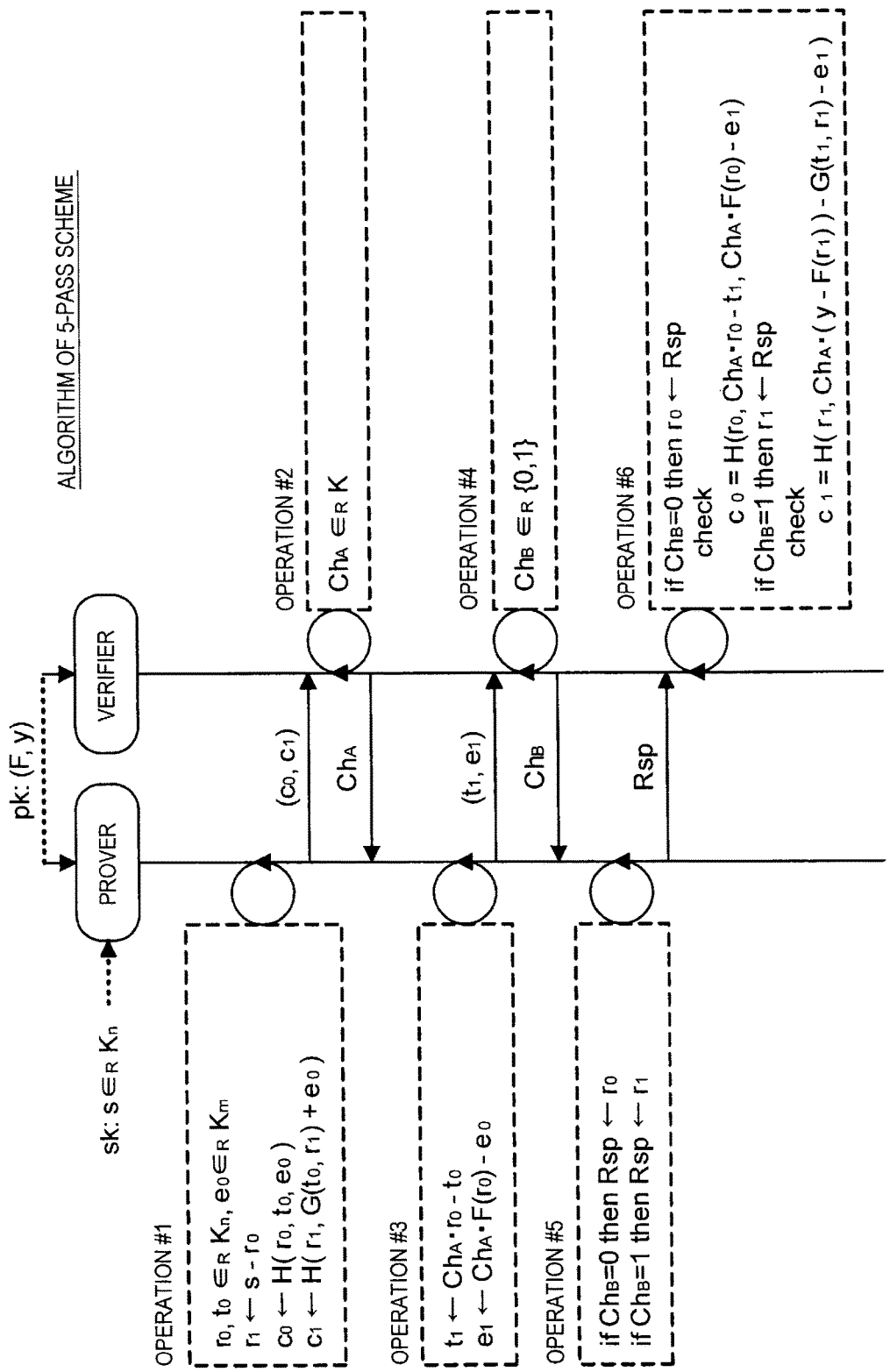
FIG. 6 is an illustrative diagram for describing a configuration example of an efficient algorithm based on a 5-pass public-key authentication scheme.

First, a detailed configuration example of the algorithm based on the 5-pass scheme will be introduced with reference to FIG. 6. FIG. 6 is an illustrative diagram for describing a detailed configuration of an algorithm based on the 5-pass scheme. Here, a case in which the tuple of quadratic polynomials $(f_1(x), \ldots, f_m(x))$ is used as a part of a public key pk will be considered. However, a quadratic polynomial $f_i(x)$ is set to be expressed as formula (6) described above. In addition, a vector $(x_1, \ldots, x_n)$ is marked by x, and a tuple of quadratic polynomials $(f_1(x), \ldots, f_m(x))$ is marked by a multivariate polynomial F(x).

In the same manner as the algorithm based on the 3-pass scheme, using two vectors of $t_0 \in K^n$ and $e_0 \in K^m$, a multivariate polynomial $F_1(x)$ used for masking a multivariate polynomial $F(x+r_0)$ is expressed as $F_1(x)=G(x, t_0)+e_0$. When the expression is used, for the multivariate polynomial $F(x+r_0)$, the relationship expressed by the following formula (12) is obtained.

[Math 10]

$$\begin{aligned}Ch_A \cdot F(x+r_0) + F_1(x) \quad &(12)\\ = Ch_A \cdot F(x) + Ch_A \cdot F(r_0) + Ch_A \cdot G(x, r_0) + G(x, t_0) + e_0\\ = Ch_A \cdot F(x) + G(x, Ch_A \cdot r_0 + t_0) + Ch_A \cdot F(r_0) + e_0\end{aligned}$$

For this reason, if $t_1 = Ch_A \cdot r_0 + t_0$ and $e_1 = Ch_A \cdot F(r_0) + e_0$ are set, a multivariate polynomial $F_2(x) = Ch_A \cdot F(x+r_0) + F_1(x)$ after masking can also be expressed by two vectors of $t_1 \in K^n$ and $e_1 \in K^m$. For this reason, if $F_1(x) = G(x, t_0) + e_0$ is set, $F_1$ and $F_2$ can be expressed using the vector of $K^n$ and the vector of $K^m$, and accordingly, an efficient algorithm having a small data size necessary for communication can be realized.

Note that leakage of information relating to $r_0$ from $F_2$ (or $F_1$) does not occur at all. For example, even if $e_1$ and $t_1$ (or $e_0$ and $t_0$) are given, it is not possible to know the information relating to $r_0$ as long as $e_0$ and $t_0$ (or $e_1$ and $t_1$) are unknown. Thus, zero knowledge is ensured. Hereinbelow, the algorithm of the 5-pass scheme constructed based on the logic will be described. The algorithm of the 5-pass scheme that will be described herein is constituted by a key generation algorithm Gen, a prover algorithm P, and a verifier algorithm V as below.

(Key Generation Algorithm Gen)

The key generation algorithm Gen generates multivariate polynomials $f_1(x_1, \ldots, x_n), \ldots, f_m(x_1, \ldots, x_n)$ defined on a ring K and a vector $s = (s_1, \ldots, s_n) \in K^n$. Next, the key generation algorithm Gen calculates $y = (y_1, \ldots, y_m) \leftarrow (f_1(s), \ldots, f_m(s))$. Also, the key generation algorithm Gen sets $(f_1, \ldots, f_m, y)$ as the public key pk and sets s as a secret key. Hereinafter, a vector $(x_1, \ldots, x_n)$ is represented as x and the tuple of multivariate polynomial $(f_1(x), \ldots, f_m(x))$ is represented as $F(x)$.

(Prover Algorithm P, Verifier Algorithm V)

Hereinbelow, a process executed using the prover algorithm P and the verifier algorithm V in an interactive protocol will be described with reference to FIG. 6. In the interactive protocol, a prover proves to a verifier that "he or she knows s satisfying $y=F(s)$" without leaking information of the secret key s to the verifier at all. On the other hand, the verifier verifies whether or not the prover knows the s satisfying $y=F(s)$. Note that the public key pk is assumed to be disclosed to the verifier. In addition, the secret key s is assumed to be secretly managed by the prover. Hereinbelow, description will proceed according to the flowchart shown in FIG. 6.

Operation #1:

As shown in FIG. 6, first, the prover algorithm P randomly generates vectors $r_0 \in K^n$, $t_0 \in K^n$ and $e_0 \in K^m$. Next, the prover algorithm P calculates $r_1 \leftarrow s - r_0$. This calculation corresponds to manipulation of masking the secret key s with the vector $r_0$. Next, the prover algorithm P generates a hash value $c_0$ of vectors $r_0$, $t_0$ and $e_0$. In other words, the prover algorithm P calculates $c_0 \leftarrow H(r_0, t_0, e_0)$. Next, the prover algorithm P generates a hash value $c_1$ of $G(t_0, r_1) + e_0$ and $r_1$. In other words, the prover algorithm P calculates $c_0 \leftarrow H(r_1, G(t_0, r_1) + e_0)$. A message $(c_0, c_1)$ generated in Operation #1 is transmitted to the verifier algorithm V.

Operation #2:

The verifier algorithm V that has received the message $(c_0, c_1)$ selects one number $Ch_A$ at random from the about q elements of the ring K, and transmits the selected number $Ch_A$ to the prover algorithm P.

Operation #3:

The prover algorithm P that has received the number $Ch_A$ calculates $t_1 \leftarrow Ch_A \cdot r_0 - t_0$. Furthermore, the prover algorithm P calculates $e_1 \leftarrow Ch_A \cdot F(r_0) - e_0$. Then, the prover algorithm P transmits $t_1$ and $e_1$ to the verifier algorithm V.

Operation #4:

The verifier algorithm V that has received $t_1$ and $e_1$ selects a verification pattern that will be used among two verification patterns. For example, the verifier algorithm V selects one numerical value from two numerical values $\{0, 1\}$ indicating types of the verification patterns, and sets the selected numerical value to be a challenge $Ch_B$. The challenge $Ch_B$ is transmitted to the prover algorithm P.

Operation #5:

The prover algorithm P that has received the challenge $Ch_B$ generates a response Rsp to be sent to the verifier algorithm V according to the received challenge $Ch_B$. When $Ch_B = 0$, the prover algorithm P generates a response $Rsp = r_0$. When $Ch_B = 1$, the prover algorithm P generates a response $Rsp = r_1$. The responses Rsp generated in Operation #5 are transmitted to the verifier algorithm V.

Operation #6:

The verifier algorithm V that has received the responses Rsp executes the following verification process using the received responses Rsp.

When $Ch_B = 0$, the verifier algorithm V executes $r_0 \leftarrow Rsp$. Then, the verifier algorithm V verifies whether or not the equation of $c_0 = H(r_0, Ch_A \cdot r_0 - t_1, Ch_A \cdot F(r_0) - e_1)$ is valid. When the verification succeeds, the verifier algorithm V outputs the value of 1 indicating success of authentication, and when the verification fails, the verifier algorithm outputs the value of 0 indicating failure of authentication.

When $Ch_B = 1$, the verifier algorithm V executes $r_1 \leftarrow Rsp$. Then, the verifier algorithm V verifies whether or not the equation of $c_1 = H_1(r_1, Ch_A \cdot (y - F(r_1)) - G(t_1, r_1) - e_1)$ is valid. When the verification succeeds, the verifier algorithm V outputs the value of 1 indicating success of authentication, and when the verification fails, the verifier algorithm outputs the value of 0 indicating failure of authentication.

Hereinabove, the configuration example of the efficient algorithm based on the 5-pass scheme has been described.

[3-2: Configuration Example of a Parallelized Algorithm (FIG. 7)]

Next, a method for parallelizing the algorithm of the 5-pass scheme shown in FIG. 6 will be described with reference to FIG. 7. Note that description of the configuration of the key generation algorithm Gen will be omitted.

As described above, if the interactive protocol based on the 5-pass scheme is applied, the probability of successful false proof can be suppressed to $(1/2 + 1/q)$ or lower. Thus, if the interactive protocol is executed two times, the probability of successful false proof can be suppressed to $(1/2 + 1/q)^2$ or lower. Furthermore, when the interactive protocol is executed N times, the probability of successful false proof is $(1/2 + 1/q)^N$, and if N is set to be a number that is sufficiently large (for example, N=80), the probability of successful false proof becomes low enough to be negligible.

As methods of executing the interactive protocol a plurality of times, for example, a serial method of sequentially repeating exchange of a message, a challenge, and a response a plurality of times, and a parallel method of exchanging a plurality of messages, challenges, and responses at once are considered. Furthermore, a hybrid-type method obtained by combining the serial method and the parallel method is also considered. Here, an algorithm for executing the interactive protocol based on the 5-pass scheme in a parallel manner (hereinafter referred to as a parallelized algorithm) will be described.

Figure 7:
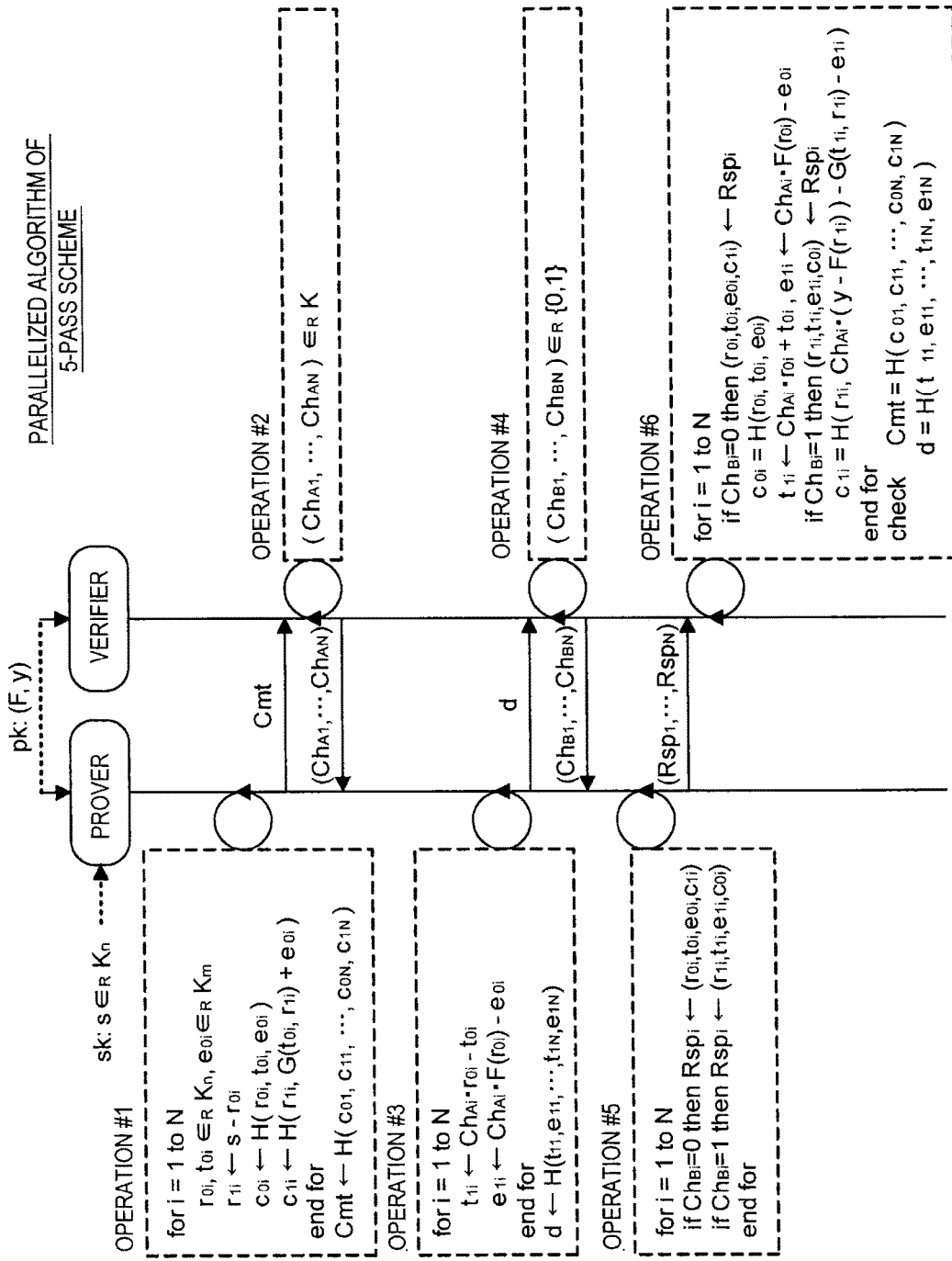
FIG. 7 is an illustrative diagram for describing parallelization of an efficient algorithm based on the 5-pass public-key authentication scheme.

Operation #1:

As shown in FIG. 7, first, the prover algorithm P executes processes (1) to (4) for i=1 to N.

Process (1): The prover algorithm P generates vectors of $r_{0i}, t_{0i} \in K^n$ and $e_{0i} \in K^m$ at random.

Process (2): The prover algorithm P calculates $r_{1i} \leftarrow s - r_{0i}$. This calculation corresponds to manipulation of masking the secret key s with the vector $r_{0i}$.

Process (3): The prover algorithm P calculates $c_{0i} \leftarrow H(r_{0i}, t_{0i}, e_{0i})$ Process (4): The prover algorithm P calculates $c_{1i} \leftarrow H(r_{1i}, G(t_{0i}, r_{1i}) + e_{0i})$.

After the processes (1) to (4) are performed for i=1 to N, the prover algorithm P executes a hash value $Cmt \leftarrow H(c_{01}, c_{11}, \ldots, c_{0N}, c_{1N})$. Then, the hash value Cmt generated in Operation #1 is transmitted to the verifier algorithm V.

Operation #2:

The verifier algorithm V that has received the hash value Cmt selects one number $Ch_{Ai}$ at random from the about q elements of the ring K for each of i=1 to N, and transmits the selected number $Ch_{Ai}$ (i=1 to N) to the prover algorithm P.

Operation #3:

The prover algorithm P that has received the number $Ch_{Ai}$ (i=1 to N) calculates $t_{1i} \leftarrow Ch_{Ai} \cdot r_{0i} - t_{0i}$ for each of i=1 to N. Furthermore, the prover algorithm P calculates $e_{1i} \leftarrow Ch_{Ai} \cdot F(r_{0i}) - e_{0i}$ for each of i=1 to N. Next, the prover algorithm P calculates a hash value $d \leftarrow H(t_{11}, e_{11}, \ldots, t_{1N}, e_{1N})$. Then, the prover algorithm P transmits the hash value d to the verifier algorithm V.

Operation #4:

The verifier algorithm V that has received the hash value d selects a verification pattern that will be used among two verification patterns for each of i=1 to N. For example, the verifier algorithm V selects one numerical value from two numerical values {0, 1} indicating types of the verification patterns, and sets a selected numerical value as a challenge $Ch_{Bi}$. Challenges $Ch_{Bi}$ (i=1 to N) are transmitted to the prover algorithm P.

Operation #5:

The prover algorithm P that has received the challenges $Ch_{Bi}$ (i=1 to N) generates responses $Rsp_i$ to be sent to the verifier algorithm V according to the received challenge $Ch_{Bi}$ with regard to i=1 to N. When $Ch_{Bi}=0$, the prover algorithm P generates the responses $Rsp_i=(r_{0i}, t_{0i}, e_{0i}, c_{1i})$. When $Ch_{Bi}=1$, the prover algorithm P generates the responses $Rsp_i=(r_{1i}, t_{1i}, e_{1i}, c_{0i})$. The responses $Rsp_i$ (i=1 to N) generated in Operation #5 are transmitted to the verifier algorithm V.

Operation #6:

The verifier algorithm V that has received the responses $Rsp_i$ (i=1 to N) executes processes (1) and (2) below using the received responses $Rsp_i$ (i=1 to N)

Process (1): When $Ch_{Bi}=0$, the verifier algorithm V executes $(r_{0i}, t_{0i}, e_{0i}, c_{1i}) \leftarrow Rsp_i$. Then, the verifier algorithm V calculates $c_{0i}=H(r_{0i}, t_{0i}, e_{0i})$. Furthermore, the verifier algorithm V calculates $t_{1i} \leftarrow Ch_{Ai} \cdot r_{0i} + t_{0i}$ and $e_{1i} \leftarrow Ch_{Ai} \cdot F(r_{0i}) - e_{0i}$. Then, the verifier algorithm V retains $(c_{0i}, c_{1i}, t_{1i}, e_{1i})$.

Process (2): When $Ch_{Bi}=1$, the verifier algorithm V executes $(r_{1i}, t_{1i}, e_{1i}, c_{0i}) \leftarrow Rsp_i$. Then, the verifier algorithm V calculates $c_{1i}=H(r_{1i}, Ch_{Ai} \cdot (y - F(r_{1i})) - G(t_{1i}, r_{1i}) - e_{1i}$. Furthermore, the verifier algorithm V retains $(c_{0i}, c_{1i}, t_{1i}, e_{1i})$.

After the processes (1) and (2) are executed for i=1 to N, the verifier algorithm V verifies whether or not the equation of $Cmt = H(c_{01}, e_{11}, \ldots, c_{0N}, c_{1N})$ is valid. Furthermore, the verifier algorithm V verifies whether or not the equation of $d = H(t_{11}, e_{11}, \ldots, t_{1N}, e_{1N})$ is valid. Then, when the verification succeeds, the verifier algorithm V outputs the value of 1 indicating success of authentication, and when the verification fails, the verifier algorithm outputs the value of 0 indicating failure of authentication.

Hereinabove, the configuration example of the efficient parallelized algorithm based on the 5-pass scheme has been described.

4: Modification to a Digital Signature Scheme

Next, a method of modifying the public-key authentication scheme described above to a digital signature scheme will be introduced.

When a prover in the model of the public-key authentication scheme is associated with a signer in the digital signature scheme, it is easily understood that the public-key authentication scheme is similar to the model of the digital signature scheme in that only the prover should convince a verifier. Based on this notion, the method of modifying the public-key authentication scheme described above to the digital signature scheme will be described.

[4-1: Modification from the 3-Pass Public-Key Authentication Scheme to the Digital Signature Scheme (FIG. 8)]

First, modification from the 3-pass public-key authentication scheme to the digital signature scheme will be described.

Figure 8:
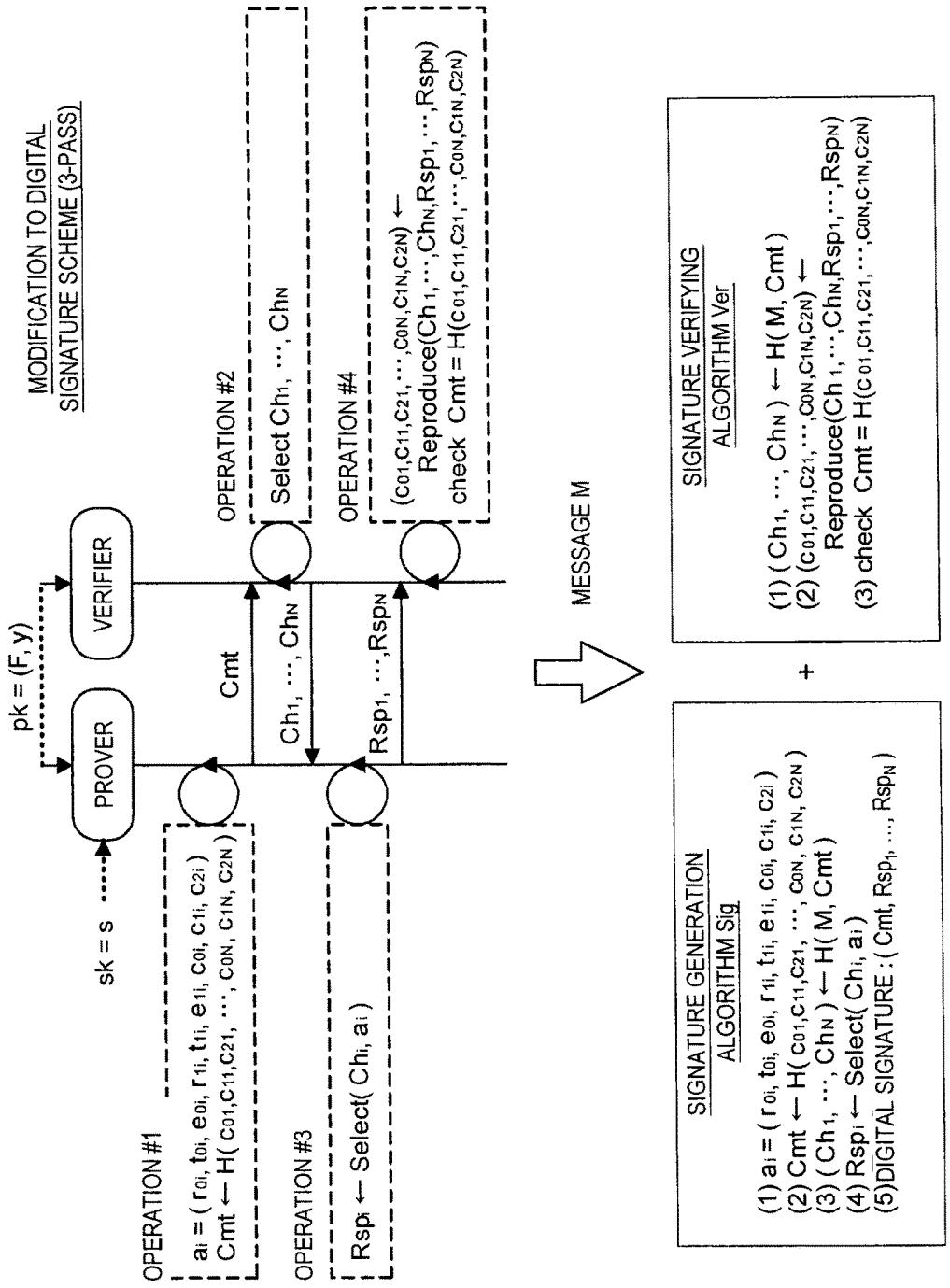
FIG. 8 is an illustrative diagram for describing a method for modifying the efficient algorithm based on the 3-pass public-key authentication scheme to an algorithm of a digital signature scheme.

The efficient algorithm based on the 3-pass scheme (for example, refer to FIG. 5) is expressed by three interactions and four Operations #1 to #4 as shown in FIG. 8.

Operation #1 includes a process (1) of generating $a_i = (r_{0i}, t_{0i}, e_{0i}, r_{1i}, t_{1i}, e_{1i}, c_{0i}, c_{1i}, c_{2i})$ and a process (2) of calculating $Cmt \leftarrow H(c_{01}, c_{11}, c_{21}, \ldots, c_{0N}, c_{1N}, c_{2N})$ for i=1 to N. Cmt generated by the prover algorithm P in Operation #1 is transmitted to the verifier algorithm V.

Operation #2 includes a process of selecting $Ch_1, \ldots, Ch_N$. $Ch_1, \ldots, Ch_N$ selected by the verifier algorithm V in Operation #2 are transmitted to the prover algorithm P.

Operation #3 includes a process of generating $Rsp_1, \ldots, Rsp_N$ using $Ch_1, \ldots, Ch_N$ and $a_1, \ldots, a_N$. This process is expressed by $Rsp_i \leftarrow Select(Ch_i, a_i)$. $Rsp_1, \ldots, Rsp_N$ generated by the prover algorithm P in Operation #3 are transmitted to the verifier algorithm V.

Operation #4 includes a process (1) of reproducing $c_{01}, c_{11}, c_{21}, \ldots, c_{0N}, c_{1N}, c_{2N}$ using $Ch_1, \ldots, Ch_N$ and $Rsp_1, \ldots, Rsp_N$ and a process (2) of verifying $Cmt = H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

The algorithm of the public-key authentication scheme expressed in Operations #1 to #4 described above is modified to a signature generation algorithm Sig and a signature verifying algorithm Ver as shown in FIG. 8.

(Signature Generation Algorithm Sig)

First, a configuration of the signature generation algorithm Sig will be described. The signature generation algorithm Sig is constituted by processes (1) to (5) described below.

Process (1): The signature generation algorithm Sig generates $a_i = (r_{0i}, t_{0i}, e_{0i}, r_{1i}, t_{1i}, e_{1i}, c_{0i}, c_{1i}, c_{2i})$.

Process (2): The signature generation algorithm Sig calculates $Cmt \leftarrow H(c_{01}, c_{11}, c_{21}, \ldots, c_{0N}, c_{1N}, c_{2N})$.

Process (3): The signature generation algorithm Sig calculates $(Ch_1, \ldots, Ch_N) \leftarrow H(M, Cmt)$. The M is a message in which a signature is given.

Process (4): The signature generation algorithm Sig calculates $Rsp_i \leftarrow Select(Ch_i, a_i)$.

Process (5): The signature generation algorithm Sig sets (Cmt, $Rsp_1, \ldots, Rsp_N$) as a signature.

(Signature Verifying Algorithm Ver)

Next, a configuration of the signature verifying algorithm Ver will be described. The signature verifying algorithm Ver is constituted by processes (1) to (3) below.

Process (1): The signature verifying algorithm Ver calculates $(Ch_1, \ldots, Ch_N) \leftarrow H(M, Cmt)$.

Process (2): The signature verifying algorithm Ver generates $c_{01}, c_{11}, c_{21}, \ldots, c_{0N}, c_{1N}, c_{2N}$ using $Ch_1, \ldots, Ch_N$ and $Rsp_1, \ldots, Rsp_N$.

Process (3): The signature verifying algorithm Ver verifies $Cmt = H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

As described above, by associating the prover in the model of the public-key authentication scheme with the signer in the digital signature scheme, the algorithm of the public-key authentication scheme can be modified to the algorithm of the digital signature scheme.

[4-2: Modification from the 5-Pass Public-Key Authentication Scheme to the Digital Signature Scheme (FIG. 9)]

Next, modification from the 5-pass public-key authentication scheme to the digital signature scheme will be described.

Figure 9:
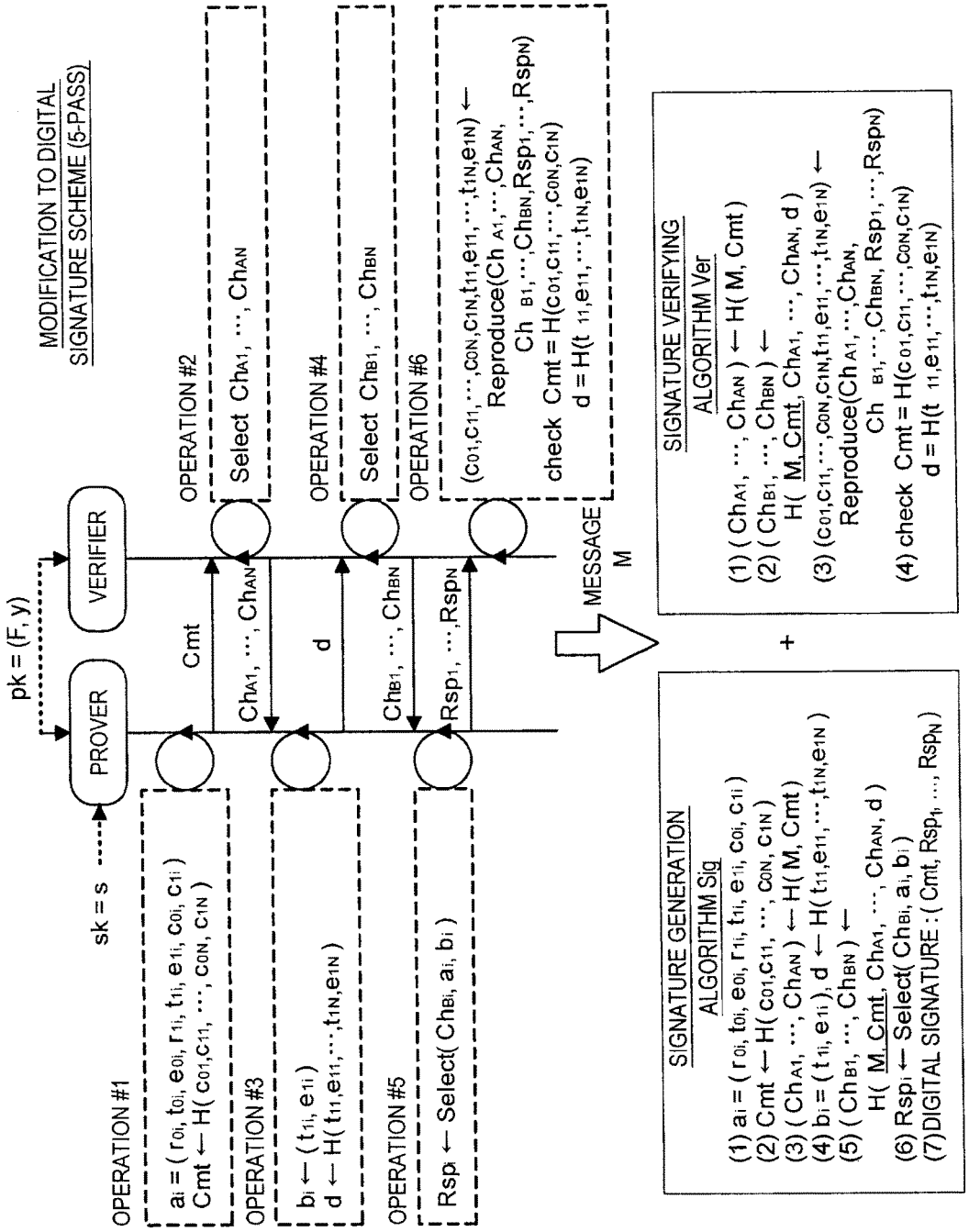
FIG. 9 is an illustrative diagram for describing a method for modifying the efficient algorithm based on the 5-pass public-key authentication scheme to an algorithm of a digital signature scheme.

As shown in FIG. 9, the sufficient algorithm based on the 5-pass scheme (for example, refer to FIG. 7) is expressed by five interactions and six Operations #1 to #6.

Operation #1 includes a process (1) of generating $a_i = (r_{0i}, t_{0i}, e_{0i}, r_{1i}, t_{1i}, e_{1i}, c_{0i}, c_{1i})$ and a process (2) of calculating $Cmt \leftarrow H(c_{01}, c_{11}, \ldots, c_{0N}, c_{1N})$ for i=1 to N. Cmt generated from the prover algorithm P in Operation #1 is transmitted to the verifier algorithm V.

Operation #2 includes a process of selecting $Ch_{A1}, \ldots, Ch_{AN}$. $Ch_{A1}, \ldots, Ch_{AN}$ selected from the verifier algorithm V in Operation #2 are transmitted to the prover algorithm P.

Operation #3 includes a process of generating $bi = (t_{1i}, e_{1i})$ and a process of generating $d = H(t_{11}, e_{11}, \ldots, t_{1N}, e_{1N})$ for i=1 to N. d generated from the prover algorithm P in Operation #3 is transmitted to the verifier algorithm V.

Operation #4 includes a process of selecting $Ch_{B1}, \ldots, Ch_{BN}$. $Ch_{B1}, \ldots, Ch_{BN}$ selected from the verifier algorithm V in Operation #4 are transmitted to the prover algorithm P.

Operation #5 includes a process of generating $Rsp_1, \ldots, Rsp_N$ using $Ch_{B1}, \ldots, Ch_{BN}, a_1, \ldots, a_N$, and $b_1, \ldots, b_N$. This process is expressed as $Rsp_i \leftarrow Select(Ch_{Bi}, a_i, b_i)$. $Rsp_1, \ldots, Rsp_N$ generated from the prover algorithm P in Operation #5 are transmitted to the verifier algorithm V.

Operation #6 includes a process of reproducing $c_{01}, c_{11}, \ldots, c_{0N}, c_{1N}, t_{11}, e_{11}, \ldots, t_{1N}, e_{1N}$ using $Ch_{A1}, \ldots, Ch_{AN}, Ch_{B1}, \ldots, Ch_{BN}$, and $Rsp_1, \ldots, Rsp_N$, a process of verifying $Cmt = H(c_{01}, c_{11}, \ldots, c_{0N}, c_{1N})$ using the reproduced $c_{01}, c_{11}, \ldots, c_{0N}, c_{1N}$, and a process of verifying $d = H(t_{11}, e_{11}, \ldots, t_{1N}, e_{1N})$.

The algorithm of the public-key authentication scheme expressed in Operations #1 to #6 described above is modified to the signature generation algorithm Sig and the signature verifying algorithm Ver shown in FIG. 9.

(Signature Generation Algorithm Sig)

First, a configuration of the signature generation algorithm Sig will be described. The signature generation algorithm Sig is constituted by processes (1) to (7) below.

Process (1): The signature generation algorithm Sig generates $a_i = (r_{0i}, t_{0i}, e_{0i}, r_{1i}, t_{1i}, e_{1i}, c_{0i}, c_{1i})$.

Process (2): The signature generation algorithm Sig calculates $Cmt \leftarrow H(c_{01}, c_{11}, \ldots, c_{0N}, c_{1N})$.

Process (3): The signature generation algorithm Sig calculates $(Ch_{A1}, \ldots, Ch_{AN}) \leftarrow H(M, Cmt)$. The M represents a message to which a signature is given.

Process (4): The signature generation algorithm Sig generates $b_i = (t_{1i}, e_{1i})$ for i=1 to N. Furthermore, the signature generation algorithm Sig computes $d = H(t_{11}, e_{11}, \ldots, t_{1N}, e_{1N})$ Process (5): The signature generation algorithm Sig calculates $(Ch_{B1}, \ldots, Ch_{BN}) \leftarrow H(M, Cmt, Ch_{A1}, \ldots, Ch_{AN}, d)$. Note that it may be modified to $(Ch_{B1}, \ldots, Ch_{BN}) \leftarrow H(Ch_{A1}, \ldots, Ch_{AN}, d)$.

Process (6): The signature generation algorithm Sig calculates $Rsp_i \leftarrow Select(Ch_{Bi}, a_i, b_i)$.

Process (7): The signature generation algorithm Sig sets (Cmt, d, $Rsp_1, \ldots, Rsp_N$) as a digital signature.

(Signature Verifying Algorithm Ver)

Next, a configuration of the signature verifying algorithm Ver will be described. The signature verifying algorithm Ver is constituted by processes (1) to (4) below.

Process (1): The signature verifying algorithm Ver calculates $(Ch_{A1}, \ldots, Ch_{AN}) \leftarrow H(M, Cmt)$.

Process (2): The signature verifying algorithm Ver calculates $(Ch_{B1}, \ldots, Ch_{BN}) \leftarrow H(M, Cmt, Ch_{A1}, \ldots, Ch_{AN}, d)$. Note that, when modification to $(Ch_{B1}, \ldots, Ch_{BN}) \leftarrow H(Ch_{A1}, \ldots, Ch_{AN}, d)$ occurs in the process (5) executed by the signature verifying algorithm Ver, the signature verifying algorithm Ver calculates $(Ch_{B1}, \ldots, Ch_{BN}) \leftarrow H(Ch_{A1}, \ldots, Ch_{AN}, d)$.

Process (3): The signature verifying algorithm Ver generates $t_{11}, e_{11}, \ldots, t_{1N}, e_{1N}, c_{01}, c_{11}, \ldots, c_{0N}, c_{1N}$ using $Ch_{A1}, \ldots, Ch_{AN}, Ch_{B1}, \ldots, Ch_{BN}$, and $Rsp_1, \ldots, Rsp_N$.

Process (4): The signature verifying algorithm Ver verifies $Cmt = H(c_{01}, c_{11}, \ldots, c_{0N}, c_{1N})$ and $d = H(t_{11}, e_{11}, \ldots, t_{1N}, e_{1N})$ using the reproduced $c_{01}, c_{11}, \ldots, c_{0N}, c_{1N}$.

As described above, by associating the prover in the model of the public-key authentication scheme with the signer in the digital signature scheme, the algorithm of the public-key authentication scheme can be modified to the algorithm of the digital signature scheme.

5: Hardware Configuration Example (FIG. 10)

Figure 10:
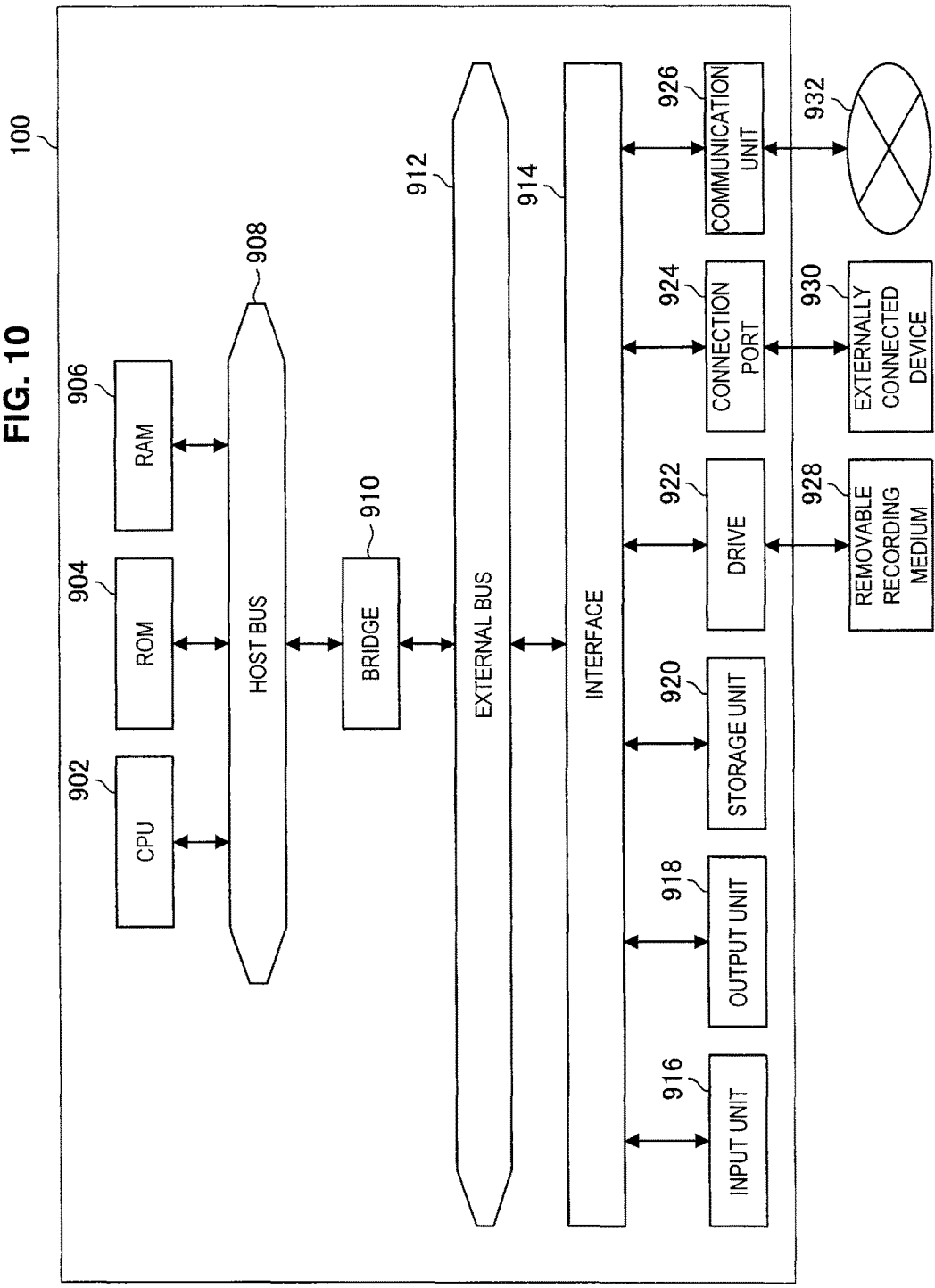
FIG. 10 is an illustrative diagram for describing a hardware configuration example of an information processing apparatus that can execute an algorithm relating to each embodiment of the present technology.

Each algorithm described above can be performed by using, for example, the hardware configuration of the information processing apparatus shown in FIG. 10. That is, processing of each algorithm can be realized by controlling the hardware shown in FIG. 10 using a computer program. Additionally, the mode of this hardware is arbitrary, and may be, for example, a personal computer, a mobile information terminal such as a mobile phone, a PHS or a PDA, a game machine, a contact or contactless IC chip, a contact or contactless IC card, or various types of information appliances. Moreover, the PHS is the abbreviation for Personal Handy-phone System. Also, the PDA is the abbreviation for Personal Digital Assistant.

As shown in FIG. 10, this hardware mainly includes the CPU 902, the ROM 904, the RAM 906, a host bus 908, and a bridge 910. Furthermore, this hardware includes an external bus 912, an interface 914, an input unit 916, an output unit 918, the storage unit 920, a drive 922, a connection port 924, and a communication unit 926. Moreover, the CPU is the abbreviation for Central Processing Unit. Also, the ROM is the abbreviation for Read Only Memory. Furthermore, the RAM is the abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or the movable recording medium 928. The ROM 904 is means for storing a program to be read by the CPU 902 or data or the like used in an arithmetic operation. The RAM 906 temporarily or perpetually stores, for example, a program to be read by the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote controller (hereinafter, a remote controller) that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is the abbreviation for Cathode Ray Tube. The LCD is the abbreviation for Liquid Crystal Display. In addition, the PDP is the abbreviation for Plasma Display Panel. Also, the ELD is the abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is the abbreviation for Hard Disk Drive.

The drive 922 is a device that reads information recorded on the removable recording medium 928, for example, a magnetic disk, an optical disk, a magneto-optical disk, or a semiconductor memory, or writes information in the removable recording medium 928. The removable recording medium 928 is, for example, a DVD medium, a Blu-ray medium, an HD DVD medium, various types of semiconductor storage media, or the like. Of course, the removable recording medium 928 may be, for example, an electronic device or an IC card on which a non-contact IC chip is mounted. The IC is the abbreviation for Integrated Circuit.

The connection port 924 is, for example, a USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. The USB is the abbreviation for Universal Serial Bus. Also, the SCSI is the abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is configured to be a wire-connected or wirelessly connected network, and is the Internet, a home-use LAN, infrared communication, visible light communication, broadcasting, or satellite communication, for example. The LAN is the abbreviation for Local Area Network. Also, the WUSB is the abbreviation for Wireless USB. Furthermore, the ADSL is the abbreviation for Asymmetric Digital Subscriber Line.

6: Configuration of a Circuit that Calculates a Multivariate PolynomialL

Herein, a configuration of a circuit that calculates a multi-order multivariate polynomial will be described.

6-1: Overview (FIGS. 11 to 15)

When a public-key authentication scheme and a digital signature scheme that takes the problem of solving a multi-order multivariate polynomial as the base of its security, including the public-key authentication scheme and the digital signature scheme introduced so far, is applied to a device, it is necessary to design a circuit that calculates a multi-order multivariate polynomial. Particularly, when the scheme shown in FIGS. 4 to 9 is applied, for example, it is necessary to design a circuit that calculates the quadratic multivariate polynomials $F(x_1)=(f_1(x_1), \ldots, f_m(x_1))$ and $F(x_2)=(f_1(x_2), \ldots, f_m(x_2))$ with regard to inputs $x_1, x_2 \in \{0, 1\}^n$.

When the above-described circuit is designed, for example, the circuit is designed focusing on items to be evaluated such as a processing speed, a circuit scale, power consumption, and the like. The processing speed mentioned here is evaluated based on, for example, a maximum operation frequency and the number of processing cycles. In addition, the maximum operation frequency is decided based on a length of a path (critical path) on which propagation of a signal is the latest in the circuit. In addition, a smaller circuit scale is assumed to be better in terms of a degree of freedom in designing and manufacturing costs. In addition, power consumption is regarded as important in terms of a battery continuous time or a degree of freedom in thermal designing of a device to be applied.

It is desirable to design the circuit so as to obtain high evaluation in all of the evaluation items, and herein, a configuration of an arithmetic operation circuit that has favorable features will be introduced focusing on the evaluation items of a processing rate and a circuit scale.

(Regarding a Circuit that Calculates One Quadratic Multivariate Polynomial f)

For example, a quadratic multivariate polynomial f(x) is expressed as in formula (13) described below. Here, $x=(x_1, \ldots, x_N)$. That is, calculation of the quadratic multivariate polynomial f(x) is not different from the arithmetic operation of summing the terms $a_{ij}x_ix_j$ and $b_ix_i$. Thus, if a circuit that sums the calculation values (hereinafter, intermediate values) of each term according to an operation cycle of an arithmetic operation circuit is designed, the circuit that can calculate the quadratic multivariate polynomial f(x) can be constructed.

[Math 11]

$$f(x) = \sum_{i,j} a_{ij}x_ix_j + \sum_i b_ix_i \qquad (13)$$

Figure 11:
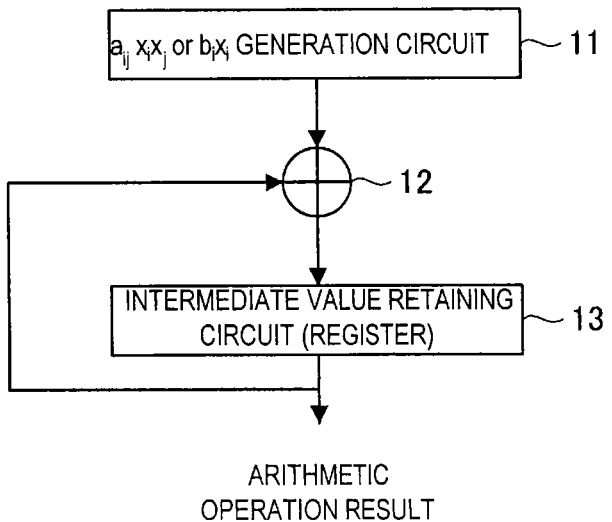
FIG. 11 is an illustrative diagram for describing a configuration of a circuit that executes calculation of a multivariate polynomial.

For example, the circuit that calculates the one quadratic multivariate polynomial f(x) that is expressed by formula (13) described above is constituted by an intermediate value generation circuit 11, an XOR circuit 12, and an intermediate value retaining circuit 13 as shown in FIG. 11. The intermediate value generation circuit 11 is a circuit that generates intermediate values by calculating the terms $a_{ij}x_ix_j$ and $b_ix_i$. In addition, the XOR circuit 12 is a circuit that sums the intermediate values of the terms generated by the intermediate value generation circuit 11. Furthermore, the intermediate value retaining circuit 13 is a circuit that temporarily retains the result summed using the XOR circuit 12.

By configuring the circuit as described above, the intermediate values generated by the intermediate value generation circuit 11 are summed on each occasion, and thereby the arithmetic operation result of the quadratic multivariate polynomial f(x) is finally obtained. In addition, since the summing circuit is shared for arithmetic operations of all terms, the circuit scale is suppressed to be small.

Figure 12:
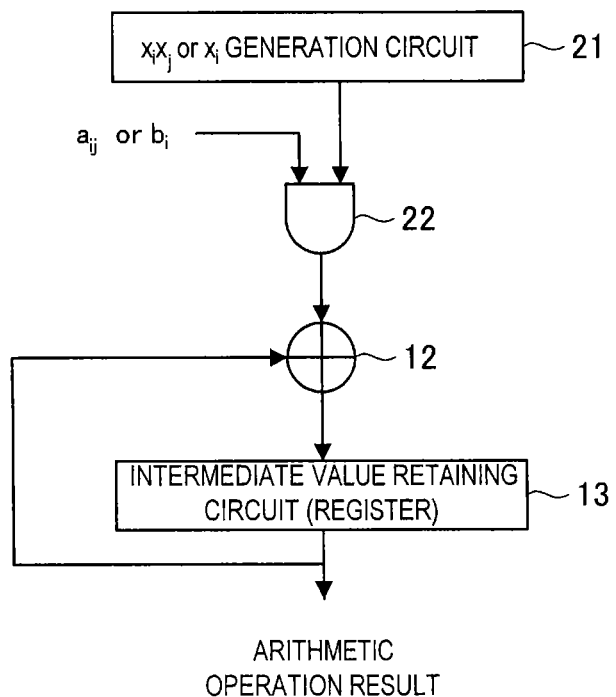
FIG. 12 is an illustrative diagram for describing a configuration of a circuit that executes calculation of a multivariate polynomial.

In addition, the intermediate value generation circuit 11 is constructed using, for example a variable generation circuit 21 and an AND circuit 22 as shown in FIG. 12. The variable generation circuit 12 generates the variable $x_ix_j$ or $x_i$ of each term according to inputs of each cycle. In addition, the AND circuit 22 executes a logical AND operation of one bit between the value of the variable $x_ix_j$ or $x_i$ of each term generated by the variable generation circuit 12 and the value of the coefficient $a_{ij}$ or $b_i$ of each term.

By configuring the circuit as described above, the AND circuit 22 can be shared for arithmetic operations of all of the terms, and accordingly, the circuit scale can be suppressed to be small. Note that the value of a coefficient input to the AND circuit 22 is set to be stored in a recording memory (a ROM, a RAM, or the like) in advance in the form shown in, for example, FIG. 13. For this reason, the value of a desired coefficient can be obtained by accessing a desired address at a desired timing.

(Regarding a Circuit that Calculates a Plurality of Quadratic Multivariate Polynomials $f_i$ (i=1 to m))

However, when an arithmetic operation of a quadratic multivariate polynomial $F(x)=(f_1(x), \ldots, f_m(x))$ is executed, it will be noted that one arithmetic operation of the terms with regard to a certain $x_ix_j$ or $x_j$ is included in each of $f_1(x), \ldots, f_m(x)$. For this reason, it is preferable, in terms of reduction of the number of processing cycles, to generate coefficients $a_{1ij}, \ldots, a_{mij}$ or $b_{1i}, \ldots, b_{mi}$ of m multivariate polynomials $f_1(x), \ldots, f_m(x)$ at once, and to execute an arithmetic operation of the terms with regard to the variable $x_ix_j$ or $x_j$ in a parallel manner.

Figure 14:
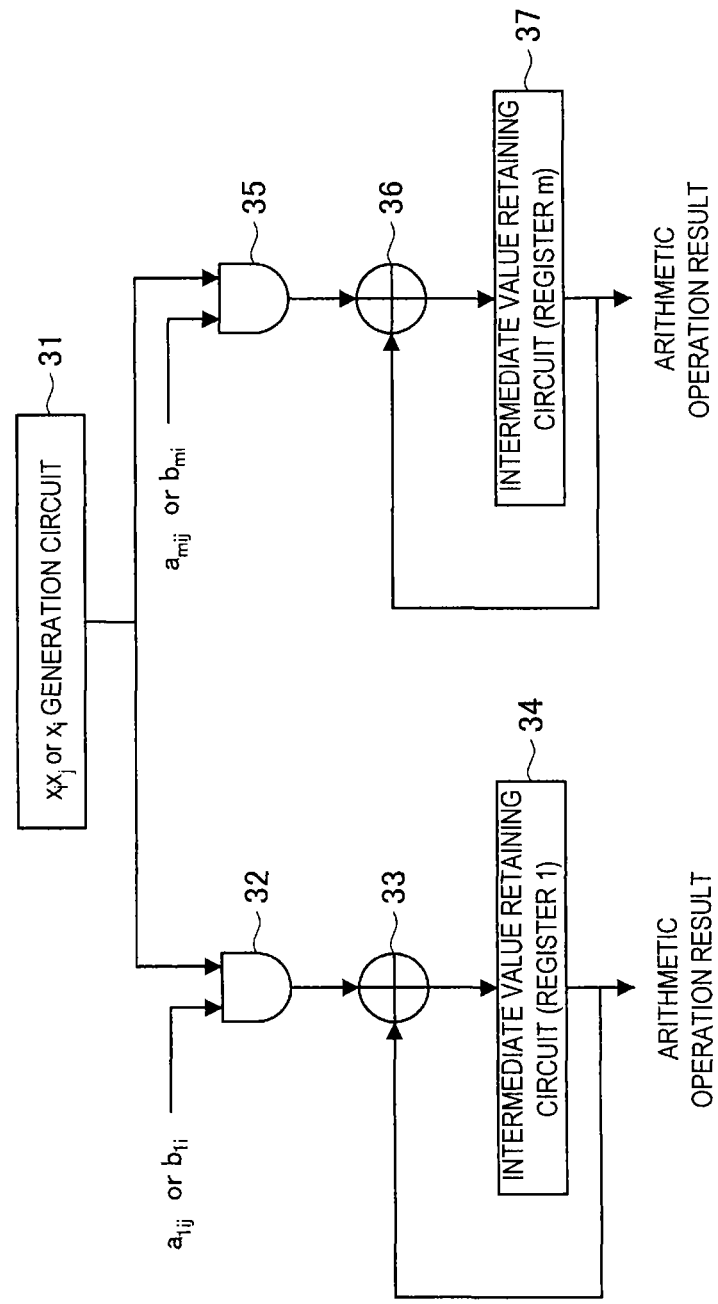
FIG. 14 is an illustrative diagram for describing a configuration of a circuit that calculates a plurality of multivariate polynomials in a parallel manner.

For example, as shown in FIG. 14, an arithmetic operation circuit can be constructed by one variable generation circuit 31, a plurality of AND circuits 32 and 35, a plurality of multipliers 33 and 36, and a plurality of intermediate value retaining circuits 34 and 37. In this case, the variable $x_ix_j$ or $x_j$ generated by the variable generation circuit 31 once is used for an arithmetic operation of the quadratic multivariate polynomials $f_1(x), \ldots, f_m(x)$ in a parallel manner. Note that the coefficients $a_{1ij}, \ldots, a_{mij}$ or $b_{1i}, \ldots, b_{mi}$ are assumed to be stored in the recording memory (the ROM, the RAM, or the like) in advance in the form shown in FIG. 15. For this reason, the value of a desired coefficient with regard to $f_1(x), \ldots, f_m(x)$ can be obtained at once by accessing a desired address at a desired timing.

By configuring the circuit as described above, the m quadratic multivariate polynomials $f_1(x), \ldots, f_m(x)$ can be calculated in parallel, and thereby the number of processing cycles is reduced. Hereinbelow, description will proceed focusing on one quadratic multivariate polynomials $f_i$. By designing the circuit in the form shown in, for example, FIG. 14, the circuit that calculates the m quadratic multivariate polynomials $f_1(x), \ldots, f_m(x)$ in a parallel manner can be constructed.

(Regarding a Configuration Example of an Arithmetic Operation Circuit)

As a configuration of the arithmetic operation circuit described above, a circuit configuration that uses selectors with multi-bit inputs and a circuit configuration that uses a shift register can be applied. With regard to the circuit configuration that uses selectors with multi-bit inputs, for example, Reference Literature 1 (David Arditti, Come Berbain, Olivier Billet, Henri Gilbert, "Compact FPGA Implementations of QUAD", ASIACCS' 07, Mar. 20-22, 2007, Singapore) provides description.

In addition, with regard to the circuit configuration that uses a shift register, for example, Reference Literature 2 (Andrey Bogdanov, Thomas Eisenbarth, Andy Rupp, and Christopher Wolf, "Time-Area Optimized Public-Key Engines: MQ-Cryptosystems as Replacement for Elliptic Curves?", CHES 2008, LNCS 5154, pp. 45-61, 2008.) provides description. However, Reference Literature 2 introduces a circuit configuration that adopts a feedback loop for a shift register.

Note that the circuit configurations described in Reference Literature 1 and Reference Literature 2 are for calculating a quadratic multivariate polynomial f(x) with respect to one input $x \in \{0, 1\}^n$. For this reason, in order to calculate quadratic multivariate polynomials $f(x_1)$ and $f(x_2)$ for two inputs $x_1$ and $x_2 \in \{0, 1\}^n$, it is necessary to operate two arithmetic operation circuits in parallel or one arithmetic operation circuit two times. In addition, as will be described in detail below, the circuit configurations described in Reference Literature 1 and Reference Literature 2 can be improved in terms of a processing speed or a circuit scale. Thus, the inventors of the present case have invented a configuration of an arithmetic operation circuit that calculates quadratic multivariate polynomials with efficiency (refer to Embodiments #1 and #2 that will be described below). Hereinbelow, the circuit configuration will be described in detail.

6-2: Configuration that Uses Selectors with Multi-Bit Inputs

First, a configuration of an arithmetic operation circuit that uses selectors with multi-bit inputs will be described.
(6-2-1: Circuit Configuration (FIGS. 16 to 18))

The arithmetic operation circuit that uses selectors with multi-bit inputs is constituted by a first circuit part (refer to FIGS. 16 and 17) that generates the variable $x_ix_j$ or $x_i$ of each term constituting the quadratic multivariate polynomial f(x) and a second circuit part (refer to FIG. 18) that sums intermediate values obtained by multiplying the variable of each term by the coefficient $a_{ij}$ or $b_j$, and then outputs the arithmetic operation result z.

Figure 16:
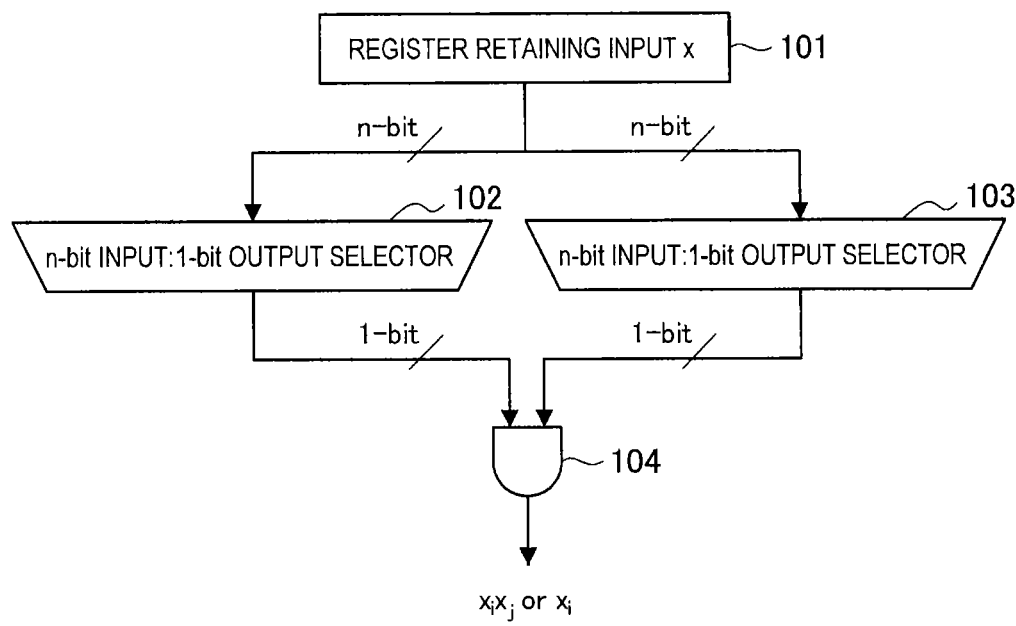
FIG. 16 is an illustrative diagram for describing a configuration of a circuit that executes calculation of a multivariate polynomial (a configuration example of using selectors with multi-bit inputs).
Figure 17:
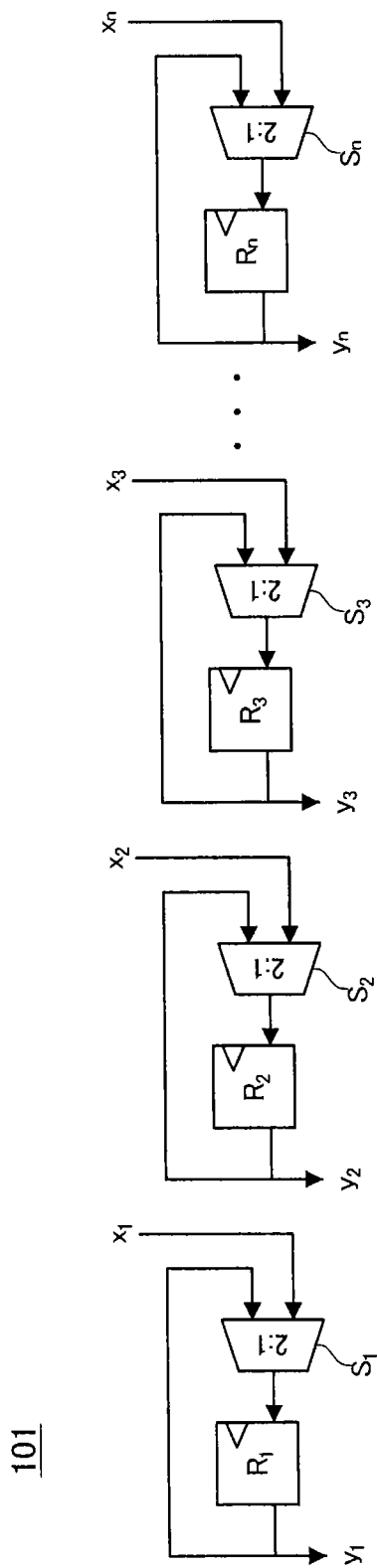
FIG. 17 is an illustrative diagram for describing a configuration of a circuit that executes calculation of a multivariate polynomial (a configuration example of using selectors with multi-bit inputs).

As shown in FIG. 16, the first circuit part includes a register 101 that retains inputs $x=(x_1, \ldots, x_n)$, two selectors 102 and 103 that outputs one bit with respect to an input of n bits, and an AND circuit 104. In addition, the register 101 includes registers $R_1, \ldots, R_n$ and selectors $S_1, \ldots, S_n$ as shown in FIG. 17. The registers $R_1, \ldots, R_n$ store $x_1, \ldots, x_n$ via the selectors $S_1, \ldots, S_n$ respectively at a first cycle. Then, $x_1, \ldots, x_n$ stored in the registers $R_1, \ldots, R_n$ are output as $y_1, \ldots, y_n$ at an arbitrary timing.

Figure 18:
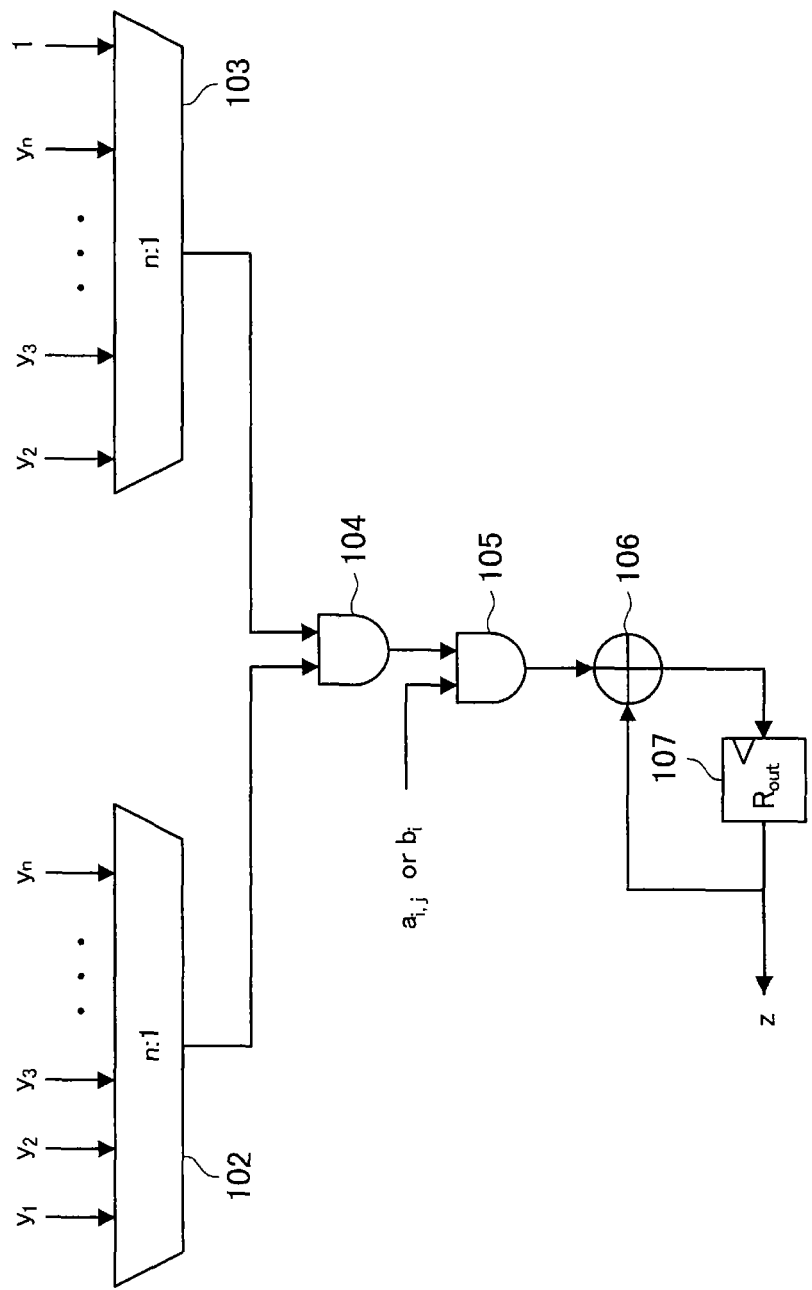
FIG. 18 is an illustrative diagram for describing a configuration of a circuit that executes calculation of a multivariate polynomial (a configuration example of using selectors with multi-bit inputs).

The output values $y_1, \ldots, y_n$ of the register 101 are input to the selectors 102 and 103 as shown in FIG. 16. The selector 102 selects one value from each of the input values $y_1, \ldots, y_n$ and then inputs the values to the AND circuit 104. In addition, the selector 103 selects one value from each of the input values $y_2, \ldots, y_n$ and a constant "1" and then inputs the values to the AND circuit 104. The AND circuit 104 performs a logical AND operation for the two input values and then outputs $x_i x_j$ or $x_i$. The output value of the AND circuit 104 is input to an AND circuit 105 constituting the second circuit part as shown in FIG. 18. Note that the second circuit part includes an XOR circuit 106 and a register 107 in addition to the AND circuit 105 as shown in FIG. 18. In addition, the width of all wirings shown in FIG. 18 is one bit.

The output value of the AND circuit 104 and the coefficient $a_{ij}$ or $b_i$ are input to the AND circuit 105. Then, the output value (intermediate value) of the AND circuit 105 is input to the XOR circuit 106. The intermediate value and a stored value of the register 107 are input to the XOR circuit 106. The XOR circuit 106 performs an exclusive-OR operation for the two input values, and then inputs the arithmetic operation result (intermediate value) to the register 107. When summation of the intermediate values of all terms constituting the quadratic multivariate polynomial f(x) is completed, the value stored in the register 107 is output as an arithmetic operation result z.

Hereinabove, the circuit configuration of the arithmetic operation circuit that uses selectors of multi-bit inputs has been described.

(6-2-2: Operation (FIG. 19))

Next, an operation of the arithmetic operation circuit will be described with reference to FIG. 19. Note that the portions in which wirings are indicated by dashed lines in the drawing represent control over signals not to substantially flow in corresponding cycles. On the other hand, the portions in which wirings are indicated by solid lines in the drawing represent control over signals to flow in corresponding cycles. Such control over signal paths is realized by controlling the selectors S1, . . . , Sn.

Figure 19:
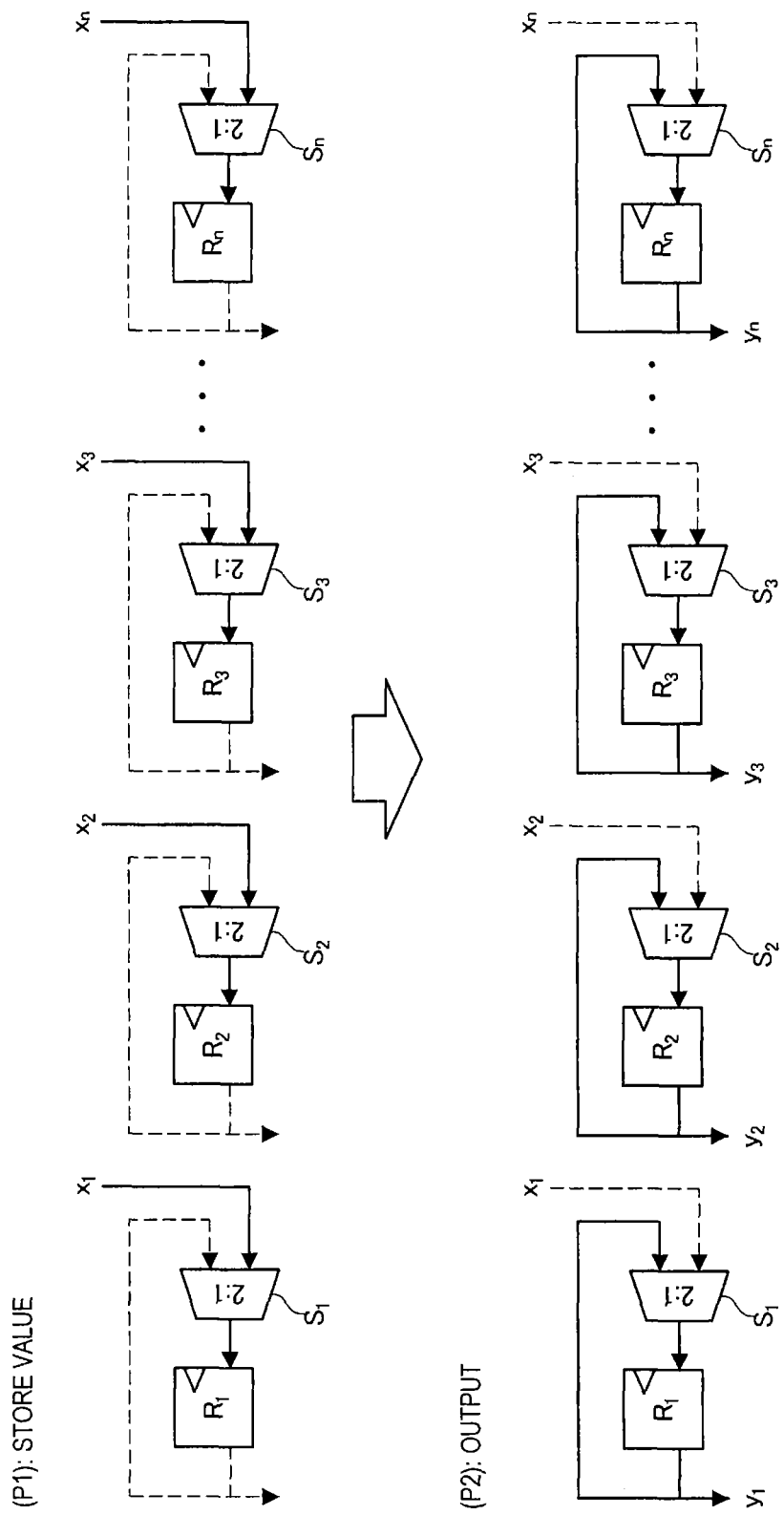
FIG. 19 is an illustrative diagram for describing a configuration of a circuit that executes calculation of a multivariate polynomial (a configuration example of using selectors with multi-bit inputs).

As shown in FIG. 19, in a first cycle (P1), the registers $R_1, \ldots, R_n$ constituting the register 101 store inputs $x \in \{0, 1\}^n$. In the succeeding cycle (P2), in the state in which the stored values of the registers $R_1, \ldots, R_n$ are retained, the stored values $x_1, \ldots, x_n$ of the registers $R_1, \ldots, R_n$ are output as $y_1, \ldots, y_n$. As described above, the process of selecting a value from $y_1, \ldots, y_n$ and the constant "1" is executed by the selectors 102 and 103 with inputs of n bits. In addition, when a first-order term included in the quadratic multivariate polynomial f(x) is calculated, "1" is output from one of the selectors 102 and 103.

Hereinabove, the operation of the arithmetic operation circuit that uses the selectors with multi-bit inputs has been described.

As described above, the arithmetic operation circuit of the quadratic multivariate polynomial f(x) can be constructed by using the selectors with multi-bit inputs. However, since the selectors with multi-bit inputs are used, the critical path is lengthened and the maximum operation frequency is lowered. In addition, if the selectors with multi-bit inputs are installed, the circuit scale increases. Furthermore, when an arithmetic operation circuit that calculates the quadratic multivariate polynomial f(x) with regard to a plurality of inputs is constructed by installing arithmetic operation circuits that use selectors with multi-bit inputs in parallel, it is necessary to prepare a plurality of pairs of AND circuits and XOR circuits. These points can be improved.

6-3: Configuration that Uses a Shift Register #1

Next, a configuration of an arithmetic operation circuit that uses a shift register will be described. The arithmetic operation circuit that uses a shift register does not includes a selector with multi-bit inputs, and can generate intermediate values using an output of a shift register without change, and thus a drop of the maximum operation frequency or an increase of the circuit scale can be suppressed.

(6-3-1: Circuit Configuration (FIGS. 20 to 22))

The arithmetic operation circuit that uses a shift register is constituted by a first circuit part (refer to FIGS. 20 and 21) that generates the variable $x_i x_j$ or $x_i$ of each term constituting the quadratic multivariate polynomial f(x) and a second circuit part (refer to FIG. 22) that sums intermediate values obtained by multiplying the variable of each term by the coefficient $a_{ij}$ or $b_j$ and then outputs the arithmetic operation result z.

Figure 20:
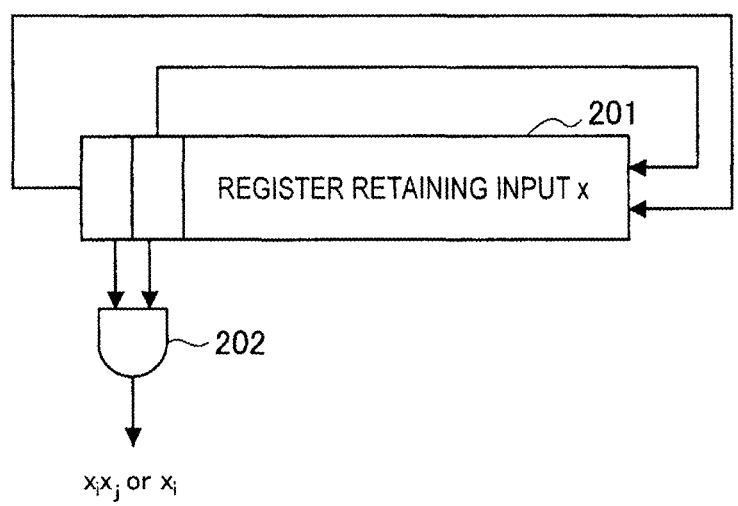
FIG. 20 is an illustrative diagram for describing a configuration of a circuit that executes calculation of a multivariate polynomial (a configuration example of using a shift register).
Figure 21:
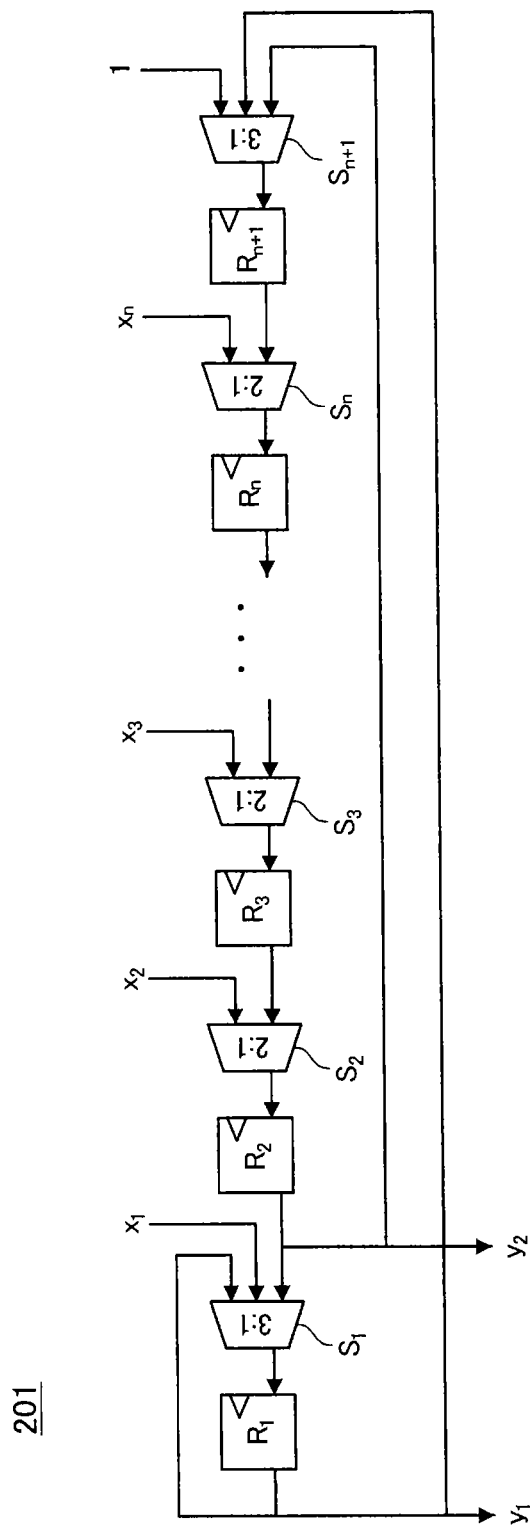
FIG. 21 is an illustrative diagram for describing a configuration of a circuit that executes calculation of a multivariate polynomial (a configuration example of using a shift register).

The first circuit part includes a shift register 201 and an AND circuit 202 as shown in FIG. 20. In addition, the shift register 201 includes selectors $S_1, \ldots, S_{n+1}$ and registers $R_1, \ldots, R_{n+1}$ as shown in FIG. 21. Note that the selectors $S_1, \ldots, S_{n+1}$ are registers of "3-bit input: 1-bit output." In addition, the selectors $S_2, \ldots, S_n$ are registers of "2-bit input: 1-bit output." In addition, the width of all wirings is 1 bit.

Figure 22:
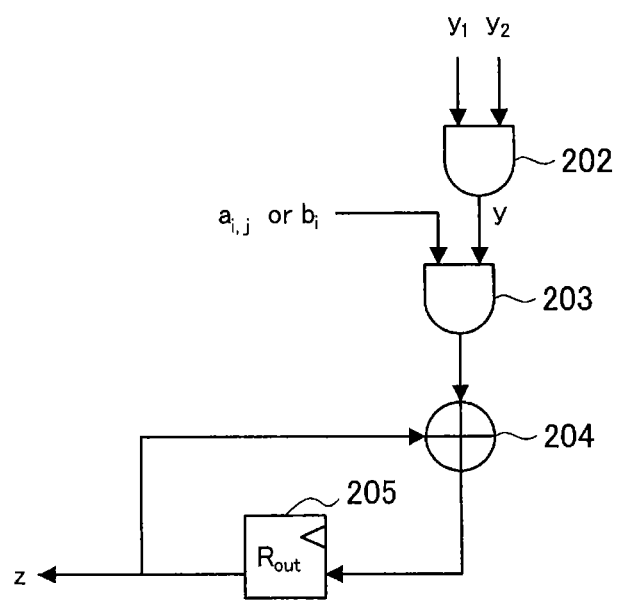
FIG. 22 is an illustrative diagram for describing a configuration of a circuit that executes calculation of a multivariate polynomial (a configuration example of using a shift register).

In addition, the second circuit part includes an AND circuit 203, an XOR circuit 204, a register 205 as shown in FIG. 22. An output value of the AND circuit 202 constituting the first circuit part and coefficient $a_{ij}$ or $b_i$ are input to the AND circuit 203. An output value of the AND circuit 203 is input to the XOR circuit 204. In addition, the output value of the AND circuit 203 and a stored value in the register 205 are input to the XOR circuit 204. In addition, the stored value of the register 205 is updated to an output value of the XOR circuit 204. Then, when a summation process is completed for all combinations of the inputs x, the stored value of the register 205 is output as an arithmetic operation result z.

Hereinabove, the circuit configuration of the arithmetic operation circuit that uses the shift register has been described.

(6-3-2: Operation (FIGS. 23 to 26))

Next, an operation of the arithmetic operation circuit will be described with reference to FIGS. 23 to 26. Note that the portions in which wirings are indicated by dashed lines in the drawing represent control over signals not to substantially flow in corresponding cycles. On the other hand, the portions in which wirings are indicated by solid lines in the drawing represent control over signals to flow in corresponding cycles. Such control over signal paths is realized by controlling the selectors $S_1, \ldots, S_{n+1}$.

As shown in FIG. 23, in a first cycle (P1), the registers $R_1, \ldots, R_n$ constituting the shift register 201 store inputs $x \in \{0, 1\}^n$. At this time, the register $R_{n+1}$ stores the value "1." Here, the stored value "1" is used to calculate a first-order term included in the quadratic multivariate polynomial f(x). In the next cycle (P2), while the stored value of the registers $R_1$ is maintained, the shift register 201 outputs the stored value as an output value $y_1$. In addition, the shift register 201 outputs the stored value of the registers $R_2$ as an output value $y_2$.

Furthermore, the stored values are rotated in the registers $R_2, \ldots, R_{n+1}$. To be specific, the value $x_2$ of one bit stored in the registers $R_2$ is moved to the register $R_{n+1}$, and the values $x_3, \ldots, x_n$, and 1 of one bit stored in the registers $R_3, \ldots, R_{n+1}$ are moved to the registers $R_2, \ldots, R_n$. As a result, the registers $R_1, \ldots, R_{n+1}$ store values $x_1, x_3, \ldots, x_n, 1, x_2$ of one bit respectively. Note that the two values $y_1$ and $y_2$ output from the shift register 201 are input to the AND circuit 202, pass through the AND circuit 203, and the XOR circuit 204, and then are stored in the register 205 (refer to FIG. 22).

Figure 24:
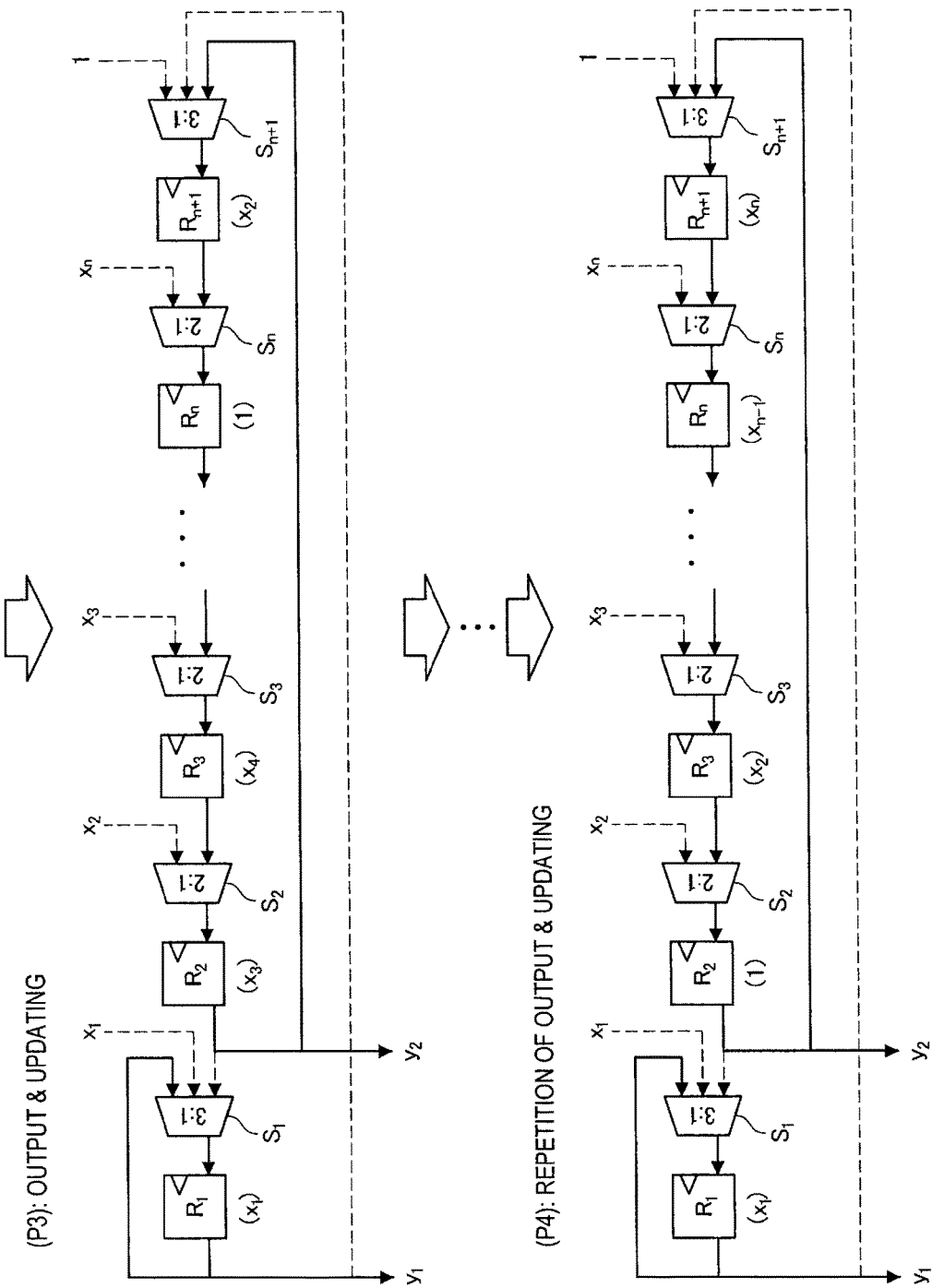
FIG. 24 is an illustrative diagram for describing a configuration of a circuit that executes calculation of a multivariate polynomial (a configuration example of using a shift register).

In the next cycle (P3), while the stored value of the register $R_1$ is maintained, the stored value is output from the shift register 201 as the output value $y_1$ as shown in FIG. 24. In addition, the stored value of the register $R_2$ is output from the shift register 201 as the output value $y_2$. Furthermore, rotation of the stored values is performed in the registers $R_2, \ldots, R_{n+1}$. In the same manner, in the succeeding cycle (P4), outputs of $y_1$ and $y_2$ and rotation of the stored values are repeated.

Figure 25:
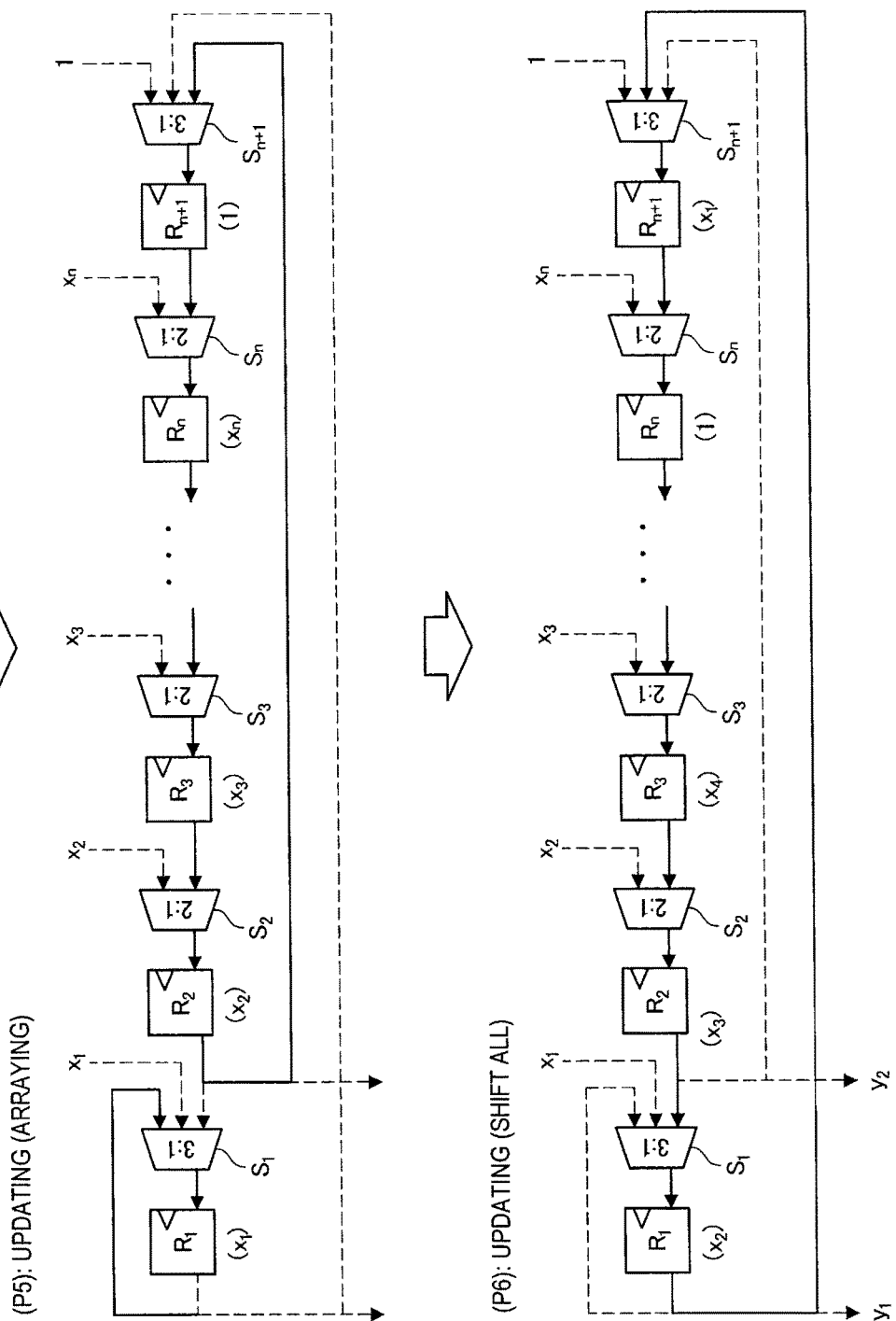
FIG. 25 is an illustrative diagram for describing a configuration of a circuit that executes calculation of a multivariate polynomial (a configuration example of using a shift register).

However, as shown in FIG. 25, in the stage (P5) in which the registers $R_1, \ldots, R_{n+1}$ store the values $x_1, x_2, \ldots, x_n$, and 1 of one bit respectively, the stored values are rotated in the registers $R_1, \ldots, R_{n+1}$ (P6). As a result, the registers $R_1, \ldots, R_{n+1}$ are in the state in which each stores the value $x_2, x_3, \ldots, x_n$, 1, and $x_1$ of one bit respectively.

In the succeeding cycle, while the stored value of the register R1 is maintained again, the stored value is output from the shift register 201 as the output value $y_1$. In addition, the stored value of the register $R_2$ is output from the shift register 201 as the output value $y_2$. Furthermore, the stored values are rotated in the registers $R_2, \ldots, R_{n+1}$. In this manner, the shift register 201 combines rotation of the stored values in the registers $R_2, \ldots, R_{n+1}$ and rotation of the stored values of the registers $R_1, \ldots, R_{n+1}$ and controls the combination of two output values $y_1$ and $y_2$.

FIG. 26 summarizes the output values $y_1$ and $y_2$ and stored values of the registers $R_1, \ldots, R_5$ in each cycle when an input x is 4 bits (when n=4). An operation of the arithmetic operation circuit will be described in detail with reference to FIG. 26.

First, in the first cycle (the cycle number 1), the registers $R_1, \ldots, R_5$ store inputs $x_1, \ldots, x_4$, and 1. Next, the stored values $x_1$ and $x_2$ are output from the registers $R_1$ and $R_2$ as the output values $y_1$ and $y_2$. The output values $y_1$ and $y_2$ are input to the AND circuit 202. Next, the AND circuit 202 computes the logical sum $y=x_1 x_2$. Then, the logical sum y is input to the AND circuit 203. Next, the logical AND with a coefficient $a_{12}$ is calculated by the AND circuit 203, and stored in the register 205.

In the next cycle (cycle number 2), the stored values are rotated in the registers $R_2, \ldots, R_5$, and the stored values are updated to $x_3, x_4$, 1, and $x_2$, respectively. For this reason, the output values $y_1$ and $y_2$ of the shift register 201 become $x_1$ and $x_3$. In the same manner, in the cycles numbers 3 and 4, the stored values are rotated in the registers $R_2, \ldots, R_5$, and the shift register 201 outputs the values $y_1$ and $y_2$ in each cycle.

In the next cycle (cycle number 5), the stored values of the registers $R_1, \ldots, R_5$ become $x_1, \ldots, x_4$, and 1 respectively, and when the stored values are output from the registers $R_1$ and $R_2$ as they are, the values $x_1$ and $x_2$ that have already been output are output. Thus, by adding a function of inputting "0" when the coefficient $a_{ij}$ or $b_i$ would be input to the AND circuit 203 or of not causing the stored value of the register 205 to be updated, the stored value of the register 205 is retained. At this moment, rotation is performed in the registers $R_1, \ldots, R_5$. When rotation is performed, the stored values of the registers $R_1, \ldots, R_5$ are $x_2, x_3, x_4$, 1, and $x_1$ in this order as described in the field of the rotation number 5+1. Thus, the shift register 201 outputs the stored values from the registers $R_1$ and $R_2$.

Next, as described in the cycles numbers 5+1 to 5+4, the shift register 201 outputs the stored values from the registers $R_1$ and $R_2$ while rotating the stored values of the registers $R_2, \ldots, R_5$. However, when the cycle number is 5+4, the stored value of the register 205 is not updated. Then, as in the case of the cycle number 5, the stored values of the registers $R_1, \ldots, R_5$ are rotated to array the stored values of the registers $R_1, \ldots, R_5$, without updating the stored value of the register 205.

Thereafter, the shift register 201 performs rotation of the registers $R_2, \ldots, R_5$ that causes the output from the registers $R_1$ and $R_2$, rotation of the registers $R_2, \ldots, R_5$ that does not cause the output from the registers $R_1$ and $R_2$, and rotation of the registers $R_1, \ldots, R_5$ that does not cause the output from the registers $R_1$ and $R_2$, and then outputs values for all combinations of the stored values. The values $y_1$ and $y_2$ output from the shift register 201 are summed by the AND circuits 202 and 203, the XOR circuit 204, and the register 205 on each occasion. Then, when the summation is completed for all combinations that can be selected from the values $x_1, \ldots, x_4$, and 1, the stored value of the register 205 is output from the arithmetic operation circuit as the arithmetic operation result z.

Hereinabove, the operation of the arithmetic operation circuit that uses the shift register has been described.

As described above, the arithmetic operation circuit for the quadratic multivariate polynomial f(x) can be constructed by using the shift register. However, in order to array the order of the stored values as described above, cycles in which values are rotated without being updated are necessary, and thus the number of processing cycles increases. In addition, when the arithmetic operation circuit for calculating the quadratic multivariate polynomial f(x) with regard to a plurality of inputs is constructed by parallel-installing circuits using the exemplified arithmetic operation circuit herein, it is necessary to prepare a plurality of pairs of AND circuits and XOR circuits. This point can be improved.

6-4: Configuration that Uses a Shift Register #2 (a Plurality of Feedback Loops)

Next, a configuration of an arithmetic operation circuit that uses a shift register into which a plurality of feedback loops are incorporated will be described. This configuration uses a plurality of feedback loops and enables rotation executed only for arraying an order of storage values to be avoided.

(6-4-1: Circuit Configuration (FIGS. 27 to 29))

The arithmetic operation circuit that uses a shift register is constituted by a first circuit part (refer to FIGS. 27 and 28) for generating the variable $x_i x_j$ or $x_i$ of each term constituting the quadratic multivariate polynomial f(x) and a second circuit part (refer to FIG. 29) that sums intermediate values obtained by multiplying the variable of each term by the coefficient $a_{ij}$ or $b_j$ and outputting the arithmetic operation result z.

Figure 27:
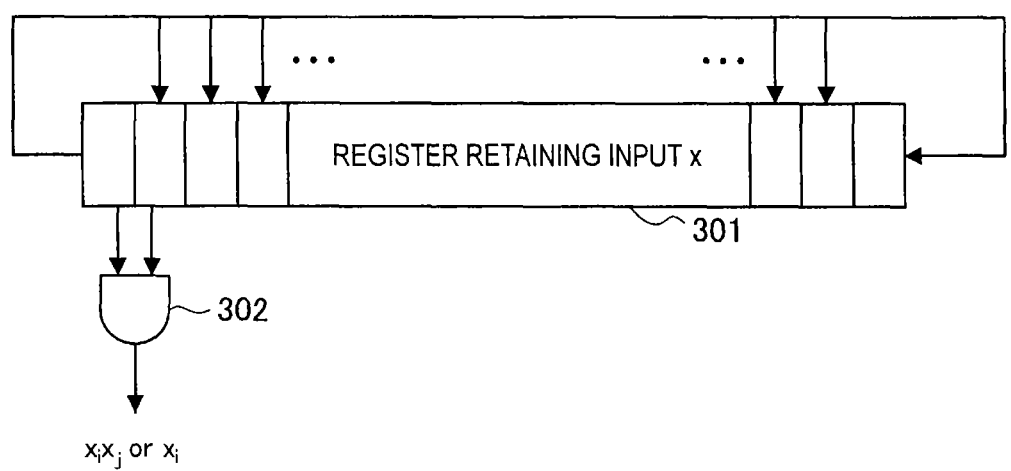
FIG. 27 is an illustrative diagram for describing a configuration of a circuit that executes calculation of a multivariate polynomial (a configuration example of using a shift register of a plurality of feedback loops).
Figure 28:
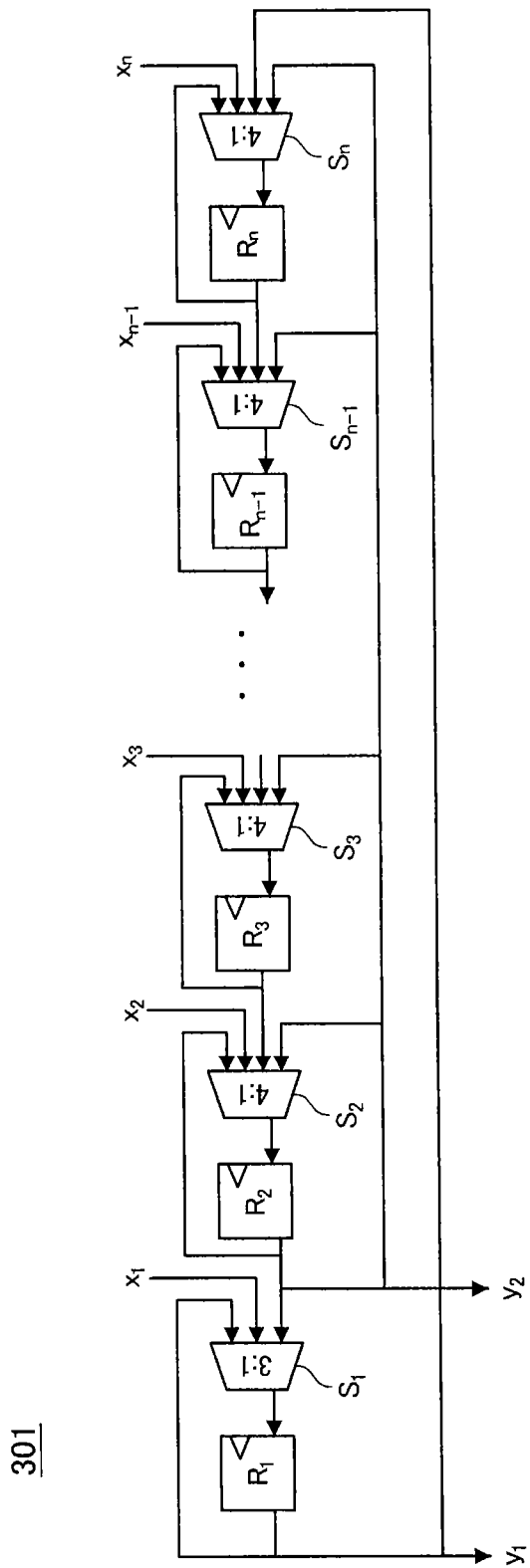
FIG. 28 is an illustrative diagram for describing a configuration of a circuit that executes calculation of a multivariate polynomial (a configuration example of using a shift register of a plurality of feedback loops).

The first circuit part mainly includes a shift register 301 and an AND circuit 302 as shown in FIG. 27. However, in FIG. 27, a mask circuit 303 (refer to FIG. 29) provided in the front stage of the AND circuit 302 is omitted for the sake of convenience in order to facilitate comparison to the shift register 201 shown in FIG. 20. In addition, the shift register 301 includes the selectors $S_1, \ldots, S_n$ and the registers $R_1, \ldots, R_n$ as shown in FIG. 28. Note that the selector $S_1$ is a register of "3-bit input: 1-bit output." In addition, the selectors $S_2, \ldots, S_n$ are registers of "4-bit input: 1-bit output." In addition, the width of all wirings is 1 bit.

Figure 29:
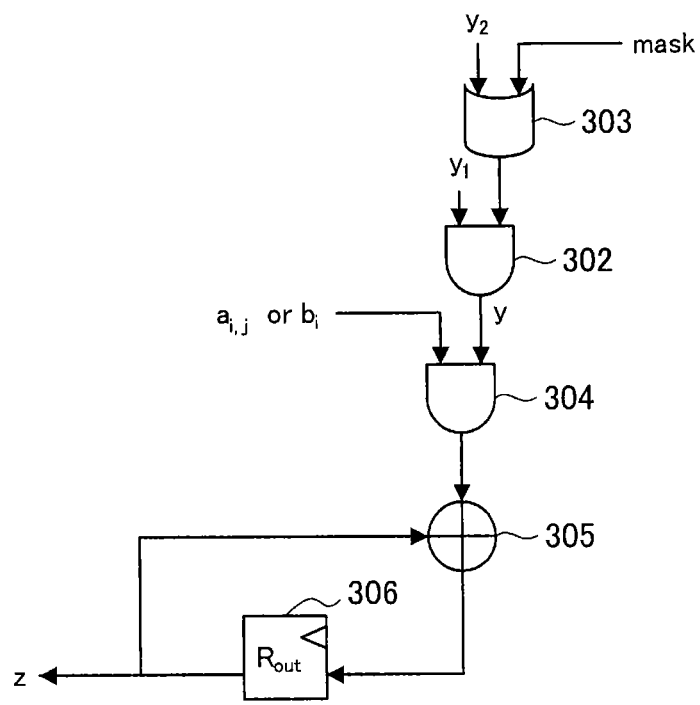
FIG. 29 is an illustrative diagram for describing a configuration of a circuit that executes calculation of a multivariate polynomial (a configuration example of using a shift register of a plurality of feedback loops).

In addition, the second circuit part includes an AND circuit 304, an XOR circuit 305, and a register 306 as shown in FIG. 29. Note that one value $y_2$ output from the shift register 301 and a mask value mask (mask=0/1) are input to the mask circuit 303 that is not illustrated in FIG. 27. When the mask value is 1, the mask circuit 303 outputs 1 regardless of the value of the input $y_2$. On the other hand, when the mask value is 0, the mask circuit 303 outputs the value of the input $y_2$ without change. The output value of the mask circuit 303 is input to the AND circuit 302. In other words, the one value $y_1$ output from the shift register 301 and the output value of the mask circuit 303 are input to the AND circuit 302.

The output value of the AND circuit 302 constituting the first circuit part and the coefficient $a_{ij}$ or $b_i$ are input to the AND circuit 304. In addition, the output value of the AND circuit 304 is input to the XOR circuit 305. In addition, the output value of the AND circuit 304 and the stored value in the register 306 are input to the XOR circuit 305. In addition, the stored value of the register 306 is updated to the output value of the XOR circuit 306. Then, when a summation process for all combinations of inputs x is completed, the stored value of the register 306 is output as an arithmetic operation result z.

Hereinabove, the circuit configuration of the arithmetic operation circuit that uses a shift register has been described.

(6-4-2: Operation (FIGS. 30 to 34))

Next, an operation of the arithmetic operation circuit will be described with reference to FIGS. 30 to 34. Note that the portions in which wirings are indicated by dashed lines in the drawing represent control over signals not to substantially flow in corresponding cycles. On the other hand, the portions in which wirings are indicated by solid lines in the drawing represent control over signals to flow in corresponding cycles.

As shown in FIG. 30, in a first cycle (P1), the registers $R_1, \ldots, R_n$ constituting the shift register 201 store inputs $x \in \{0, 1\}^n$. In the next cycle (P2), while the stored value of the registers $R_1$ is maintained, the shift register 201 outputs the stored value as an output value $y_1$. In addition, the shift register 201 outputs the stored value of the registers $R_2$ as an output value $y_2$. Furthermore, rotation of stored values is performed in the registers $R_2, \ldots, R_n$.

To be specific, the value $x_2$ of one bit stored in the registers $R_2$ is moved to the register $R_n$, and the values $x_3, \ldots, x_x$, of one bit stored in the registers $R_3, \ldots, R_n$ are moved to the registers $R_2, \ldots, R_{n-1}$. As a result, the registers $R_1, \ldots, R_n$ store values $x_1, x_3, \ldots, x_n$, and $x_2$ of one bit respectively. Note that the two values $y_1$ and $y_2$ output from the shift register 301 are input to the AND circuit 302 and the mask circuit 303 respectively, pass through the AND circuit 304 and the XOR circuit 305, and then are stored in the register 305 (refer to FIG. 29).

Figure 31:
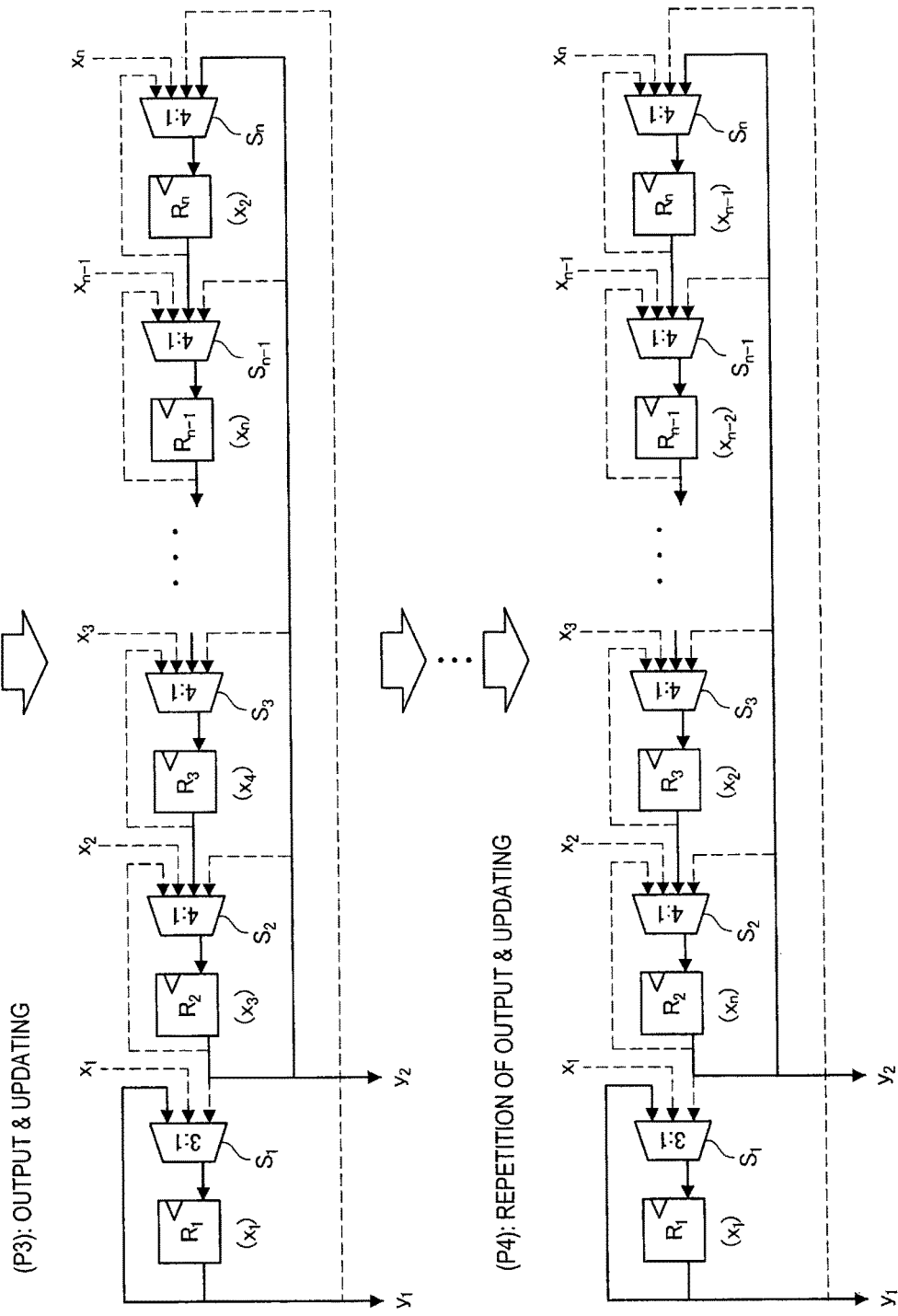
FIG. 31 is an illustrative diagram for describing a configuration of a circuit that executes calculation of a multivariate polynomial (a configuration example of using a shift register of a plurality of feedback loops).

In the next cycle (P3), while the stored value of the register R1 is maintained, the stored value is output from the shift register 301 as the output value $y_1$ as shown in FIG. 31. In addition, the stored value of the register $R_2$ is output from the shift register 301 as the output value $y_2$. Furthermore, rotation of the stored values is performed in the registers $R_2, \ldots, R_n$. In the same manner, in the succeeding cycle (P4), outputs of $y_1$ and $y_2$ and rotation of the stored values are repeated.

Figure 32:
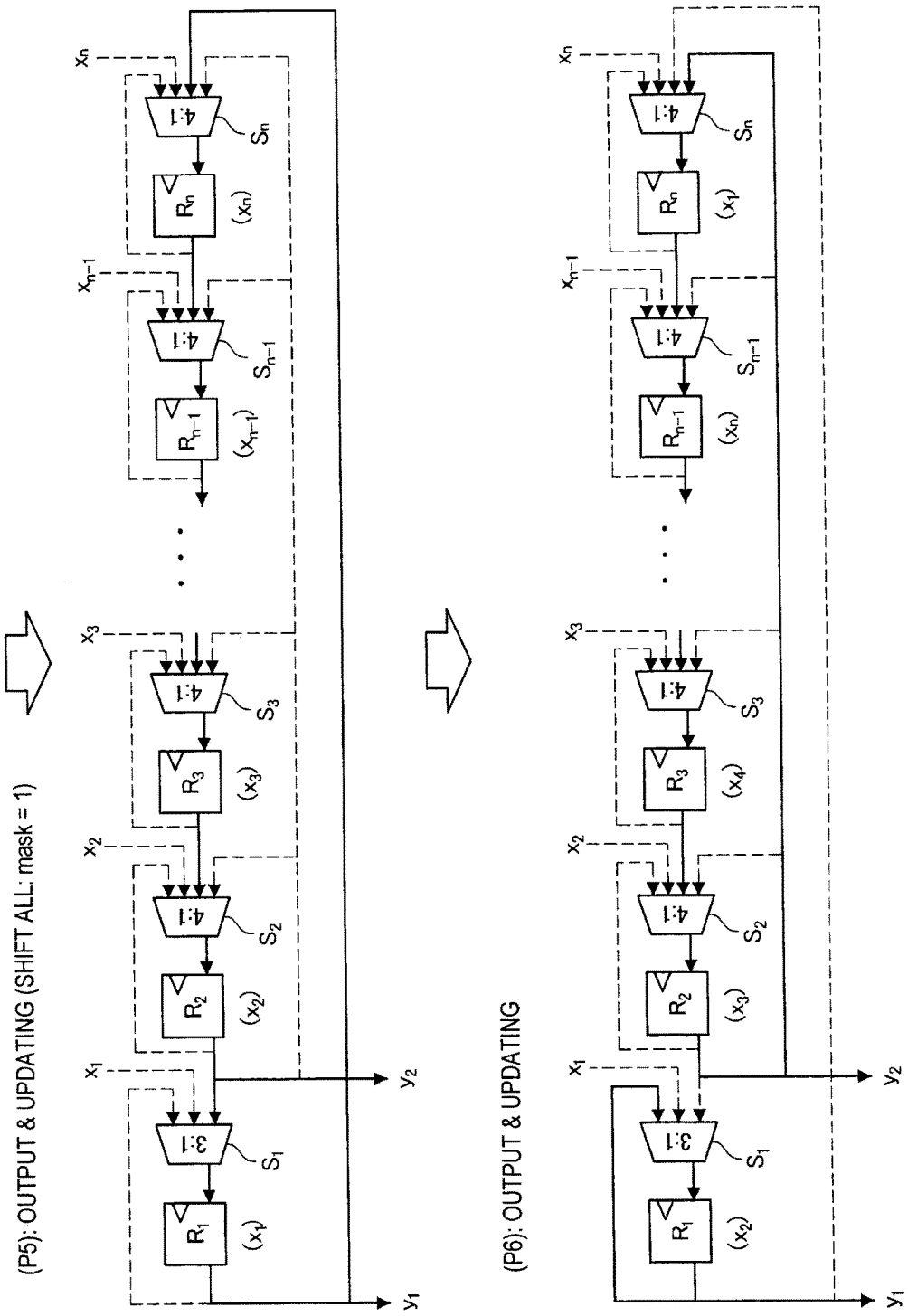
FIG. 32 is an illustrative diagram for describing a configuration of a circuit that executes calculation of a multivariate polynomial (a configuration example of using a shift register of a plurality of feedback loops).

However, as shown in FIG. 32, in the stage in which the registers $R_1, \ldots, R_n$ store the values $x_1, x_2, \ldots, x_n$ of one bit respectively, the stored values are rotated in the registers $R_1, \ldots, R_n$ (P5). At this moment, the shift register 301 outputs the stored values from the registers $R_1$ and $R_2$. The pair of the output stored values $x_1$ and $x_2$ has already been output, but the value $x_2$ ($y_2$) is masked by setting the mask value to be 1, and then the value $x_1$ ($y_1$) and the value "1" are input to the AND circuit 302. As a result, the registers $R_1, \ldots, R_n$ are in the state in which each stores the value $x_2, x_3, \ldots, x_n$, and $x_1$ of one bit respectively (P6).

In the succeeding cycle, while the stored value of the register $R_1$ is maintained again, the stored value is output from the shift register 301 as the output value $y_1$. In addition, the stored value of the register $R_2$ is output from the shift register 301 as the output value $y_2$. However, unlike the operations previously described, since a process of generating a term relating to the variable $x_1$ has been finished, the stored value of $R_n$ in which $x_1$ is stored is also maintained. Based on this, rotation of the stored values is performed in the registers $R_2, \ldots, R_{n-1}$. Then, when the process of generating a term relating to the variable $x_2$ is finished, rotation of the stored values is performed in the registers $R_1, \ldots, R_n$. In this manner, the shift register 301 performs the rotation of the stored values in the registers $R_1, \ldots, R_n$, and rotation relating to the registers $R_2, \ldots, R_i$ for $i=3, \ldots, n$, and thereby controls the combination of the two output values $y_1$ and $y_2$.

A difference between the shift register 201 previously described and the shift register 301 is that there is no period in which cycles are spent only for arraying the stored values of the registers $R_1, \ldots, R_n$. This matter will be reviewed in more detail with reference to a specific example.

As an example, FIG. 33 summarizes the output values $y_1$ and $y_2$, a mask value mask, and the stored values of the registers $R_1, \ldots, R_4$ in each cycle when an input x is 4 bits (when n=4). A specific operation of the arithmetic operation circuit will be described with reference to FIG. 33.

First, in the first cycle (cycle number 1), inputs $x_1, \ldots, x_4$ are input to the registers $R_1, \ldots, R_4$. Next, the stored values $x_1$ and $x_2$ are output from the registers $R_1$ and $R_2$ as the output values $y_1$ and $y_2$. The output values $y_1$ and $y_2$ are respectively input to the AND circuit 302 and the mask circuit 303. In addition, since the mask value mask=0 in this cycle, the AND circuit 302 computes the logical sum $y=x_1 x_2$. Then, the logical sum y is input to the AND circuit 304. Next, the logical AND with a coefficient $a_{12}$ is calculated by the AND circuit 304 and then stored in the register 306.

In the next cycle (cycle number 2), rotation of the stored values is performed in the registers $R_2, \ldots, R_4$, and the stored values are updated to $x_3, x_4$, and $x_2$ respectively. For this reason, the output values $y_1$ and $y_2$ of the shift register 301 turn into $x_1$ and $x_3$ respectively. In the same manner, in the cycle number 3, rotation of the stored values is performed in the registers $R_2, \ldots, R_4$, and values $y_1$ and $y_2$ are output from the shift register 301. At this moment, the output values $y_1$ and $y_2$ of the shift register 301 turn into $x_1$ and $x_4$ respectively.

In the next cycle (cycle number 4), the stored values of the registers $R_1, \ldots, R_4$ respectively turn into $x_1, \ldots, x_4$, and when the stored values are output from the registers $R_1$ and $R_2$ without change, the values $x_1$ and $x_2$ which have already been output are output. Thus, the shift register 301 performs rotation in the registers $R_1, \ldots, R_4$ setting the mask value to mask=1, and causing the value $y_1$ and the value "1" to be input to the AND circuit 302. At this moment, the output y of the AND circuit 302 is $y=x_1$. In addition, the stored values of the registers $R_1, \ldots, R_4$ are respectively $x_2, x_3, x_4$, and $x_1$ in this order as described in the field of the cycle number 4+1.

Next, as described in the cycles numbers 4+1 and 4+2, the shift register 301 returns the mask value to be mask=0, and outputs the stored values from the registers $R_1$ and $R_2$ while performing rotation of the stored values in the registers $R_2, \ldots, R_3$. Next, in the same manner as in the cycle number 4, the shift register 301 sets the mask value to mask=1, and rotates the stored values of the registers $R_1, \ldots, R_4$ to array the stored values of the registers $R_1, \ldots, R_4$ while outputting values from the registers $R_1$ and $R_2$ (cycle number 4+3).

Thereafter, the shift register 301 retains the stored values of the registers $R_1, \ldots, R_4$ and performs rotation of the registers $R_1, \ldots, R_4$ while switching the setting of the mask value mask, and then outputs values with regard to all combinations of the stored values. The values $y_1$ and $y_2$ output from the shift register 301 are summed by the mask circuit 303, the AND circuits 302 and 304, the XOR circuit 305, and the register 306 on each occasion. Then, when the summation of all combinations that can be selected from the values $x_1, \ldots, x_4$ is completed, the stored value of the register 306 is output from the arithmetic operation circuit as the arithmetic operation result z.

Hereinabove, the operation of the arithmetic operation circuit that uses the shift register has been described.

Figure 34:
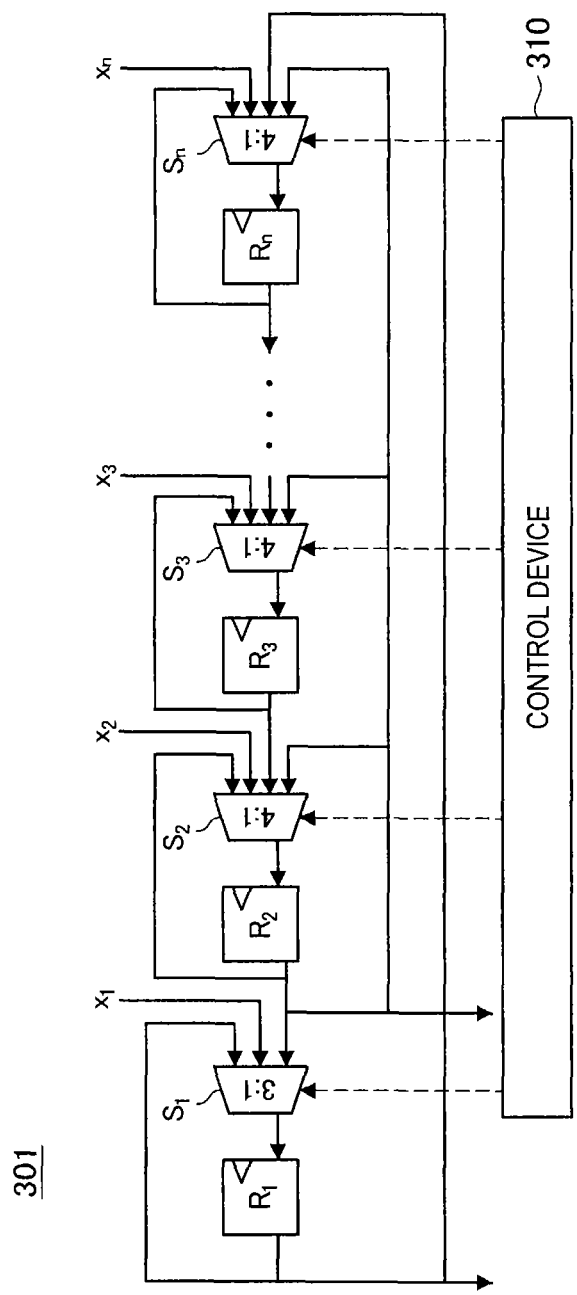
FIG. 34 is an illustrative diagram for describing a configuration of a circuit that executes calculation of a multivariate polynomial (a configuration example of using a shift register of a plurality of feedback loops).

As described above, the arithmetic operation circuit of the quadratic multivariate polynomial f(x) can be constructed by using a shift register. In addition, by adopting a plurality of feedback loops, a useless cycle for performing rotation without outputting a value to array an order of stored values as described above is no longer necessary. However, as shown in FIG. 34, a configuration of a control device 310 that controls the selectors $S_1, \ldots, S_n$ with multi-bit inputs constituting the shift register 301 becomes complicated. As a result, an expansion of a circuit scale and an increase in the critical path occur.

Furthermore, when an arithmetic operation circuit that calculates the quadratic multivariate polynomial f(x) for a plurality of inputs is constructed by parallel-installing circuits using the exemplified arithmetic operation circuit herein, it is necessary to prepare a plurality of groups of AND circuits and XOR circuits. This point can be improved. Thus, the present inventors seriously reviewed various tasks that may be undertaken by the arithmetic operation circuit described above, and has invented a configuration of an arithmetic operation circuit that can shorten a critical path and enables high-speed operations while suppressing an expansion of a circuit scale. Hereinbelow, embodiments according to the configuration (Embodiments #1 and #2) will be described.

6-5: Embodiment #1 (Calculation of a Multivariate Polynomial F)

First, a configuration of an arithmetic operation circuit that can be used in calculation of a quadratic multivariate polynomial F(x) (calculation of f(x) constituting F(x)) (Embodiment #1) will be described. The arithmetic operation circuit according to Embodiment #1 is designed to enable execution of calculation of quadratic multivariate polynomials $F(x_1)$ and $F(x_2)$ (calculation of $f(x_1)$ and $f(x_2)$) in parallel with respect to two inputs $x_1$ and $x_2$.

(6-5-1: Circuit Configuration (FIGS. 35 and 36))

Figure 35:
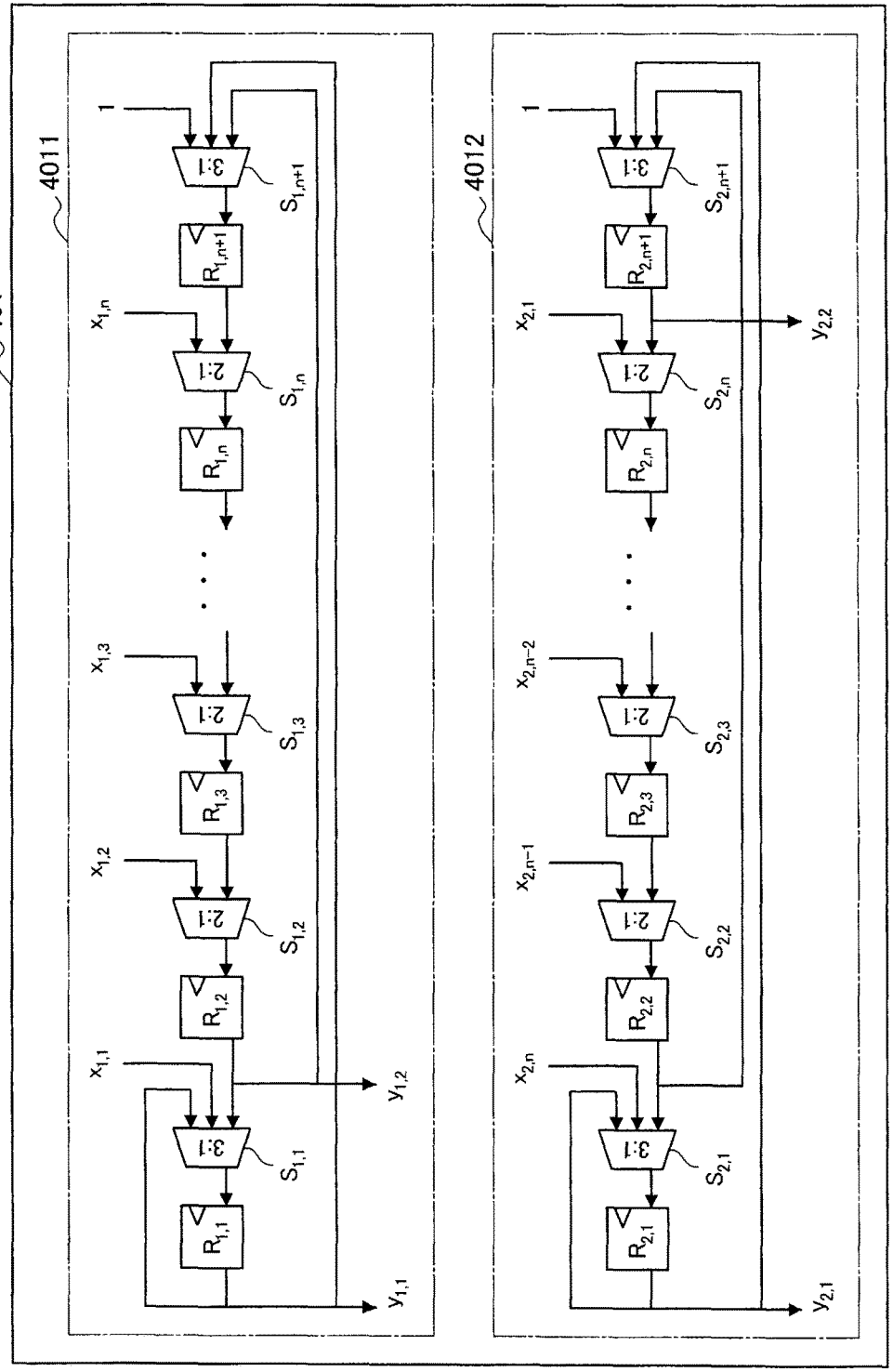
FIG. 35 is an illustrative diagram for describing a configuration of a circuit that executes calculation of a multivariate polynomial (Embodiment #1).
Figure 36:
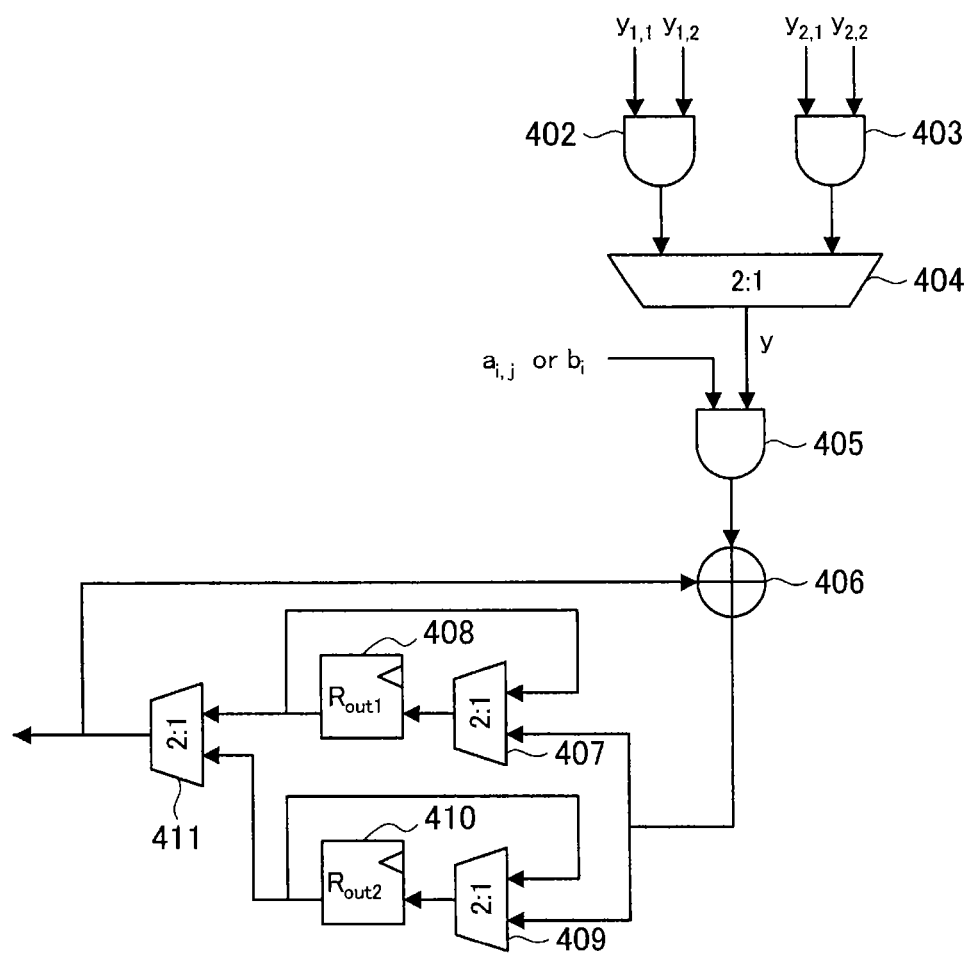
FIG. 36 is an illustrative diagram for describing a configuration of a circuit that executes calculation of a multivariate polynomial (Embodiment #1).

As shown in FIGS. 35 and 36, the arithmetic operation circuit according to Embodiment #1 is constituted by a shift register 401, AND circuits 402 and 403, a selector 404, an AND circuit 405, an XOR circuit 406, selectors 407 and 409, registers 408 and 410, and a selector 411. In addition, the shift register 401 includes a first shift register 4011 and a second shift register 4012.

Note that a configuration of the first shift register 4011 is substantially the same as that of the shift register 201 shown in FIG. 21. In addition, a configuration of the second shift register 4012 is substantially the same as that of the shift register 201 shown in FIG. 21 except that combinations of registers that output values are different. However, the first shift register 4011 and the second shift register 4012 are operated in association with each other in the same cycles.

As shown in FIG. 35, the first shift register 4011 is constituted by registers $R_{1,1}, \ldots, R_{1,n+1}$ and selectors $S_{1,1}, \ldots, S_{1,n+1}$. In addition, the first shift register 4011 is configured to output stored values from the registers $R_{1,1}$ and $R_{1,2}$. Likewise, the second shift register 4012 is constituted by registers $R_{2,1}, \ldots, R_{2,n+1}$ and selectors $S_{2,1}, \ldots, S_{2,n+1}$. However, the second shift register 4012 is configured to output stored values from the registers $R_{2,1}$ and $R_{2,n+1}$.

Values $y_{1,1}$ and $y_{1,2}$ output from the first shift register 4011 are input to the AND circuit 402 as shown in FIG. 36. Likewise, values $y_{2,1}$ and $y_{2,2}$ output from the second shift register 4012 are input to the AND circuit 403. In addition, the AND circuit 402 computes the logical AND of the input values $y_{1,1}$ and $y_{1,2}$ and inputs the computation result to the selector 404. In the same manner, the AND circuit 403 computes the logical AND of the input values $y_{2,1}$ and $y_{2,2}$ and inputs the computation result to the selector 404. The selector 404 selects one value from the two input values, and then inputs the selection result to the AND circuit 405.

The output value of the selector 404 and the coefficients $a_{ij}$ and $b_i$ are input to the AND circuit 405. Then, the AND circuit 405 computes the logical AND of the input output value and the coefficients, and then inputs the computation result to the XOR circuit 406. The output value of the AND circuit 405 and the output value of the selector 411 that will be described later are input to the XOR circuit 406. The XOR circuit 406 executes an exclusive-OR operation for the two input values, and then inputs the arithmetic operation result to the selectors 407 and 409. Note that the arithmetic operation result is stored in the register 408 or the register 410 according to the state of the selectors 407 and 409. In addition, either of the stored values of the registers 408 and 410 is input to the XOR circuit 406 or both are output from the arithmetic operation circuit as the arithmetic operation result z according to the state of the selector 411.

Hereinabove, the configuration of the arithmetic operation circuit according to Embodiment #1 has been described.

(6-5-2: Operation (FIGS. 37 to 42))

Next, an operation of the arithmetic operation circuit according to Embodiment #1 will be described with reference to FIGS. 37 to 42. Note that the portions in which wirings are indicated by dashed lines in the drawing represent control over signals not to substantially flow in corresponding cycles. On the other hand, the portions in which wirings are indicated by solid lines in the drawing represent control over signals to flow in corresponding cycles. The control of the signal paths is realized by controlling the selectors $S_{1,1}, \ldots, S_{1,n}, S_{2,1}, \ldots, S_{2,n+1}$, the selector 404, the selector 407, the selector 409, and the selector 411.

Figure 37:
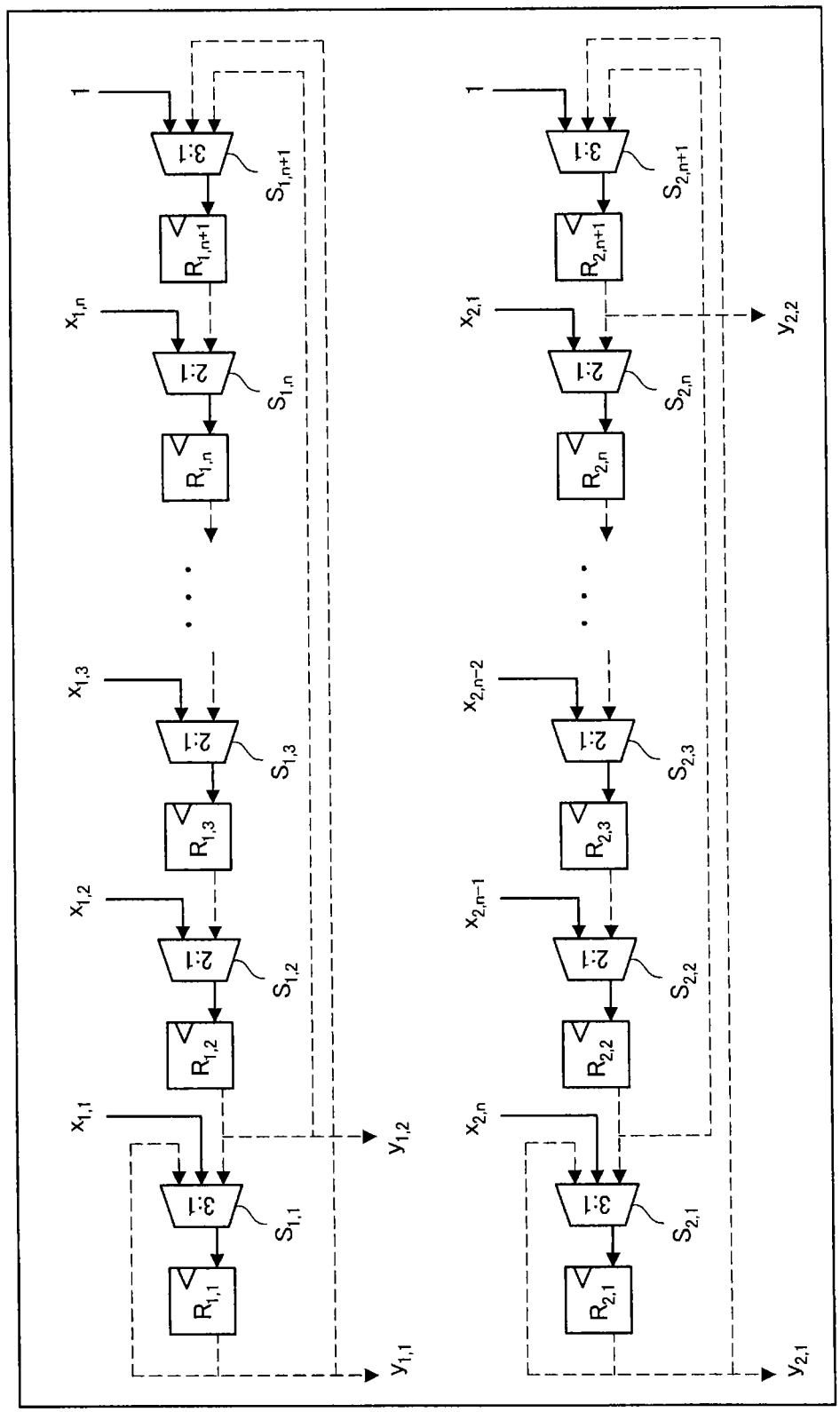
FIG. 37 is an illustrative diagram for describing an operation of the circuit that executes calculation of a multivariate polynomial (Embodiment #1).

In a first cycle (P1), the registers $R_{1,1}, \ldots, R_{1,n}$ store input values $x_{1,1}, \ldots, x_{1,n}$ as shown in FIG. 37. At this moment, the register $R_{1,n+1}$ stores the value "1." The value "1" stored here is used to calculate a first-order term included in the quadratic multivariate polynomials $f(x_1)$. In addition, the registers $R_{2,1}, \ldots, R_{2,n}$ store input values $x_2, \ldots, x_{2,1}$ (the reverse order should be noted). At this moment, the register $R_{2,n+1}$ stores the value "1." The value "1" stored here is used to calculate a first-order term included in the quadratic multivariate polynomials $f(x_2)$.

Figure 38:
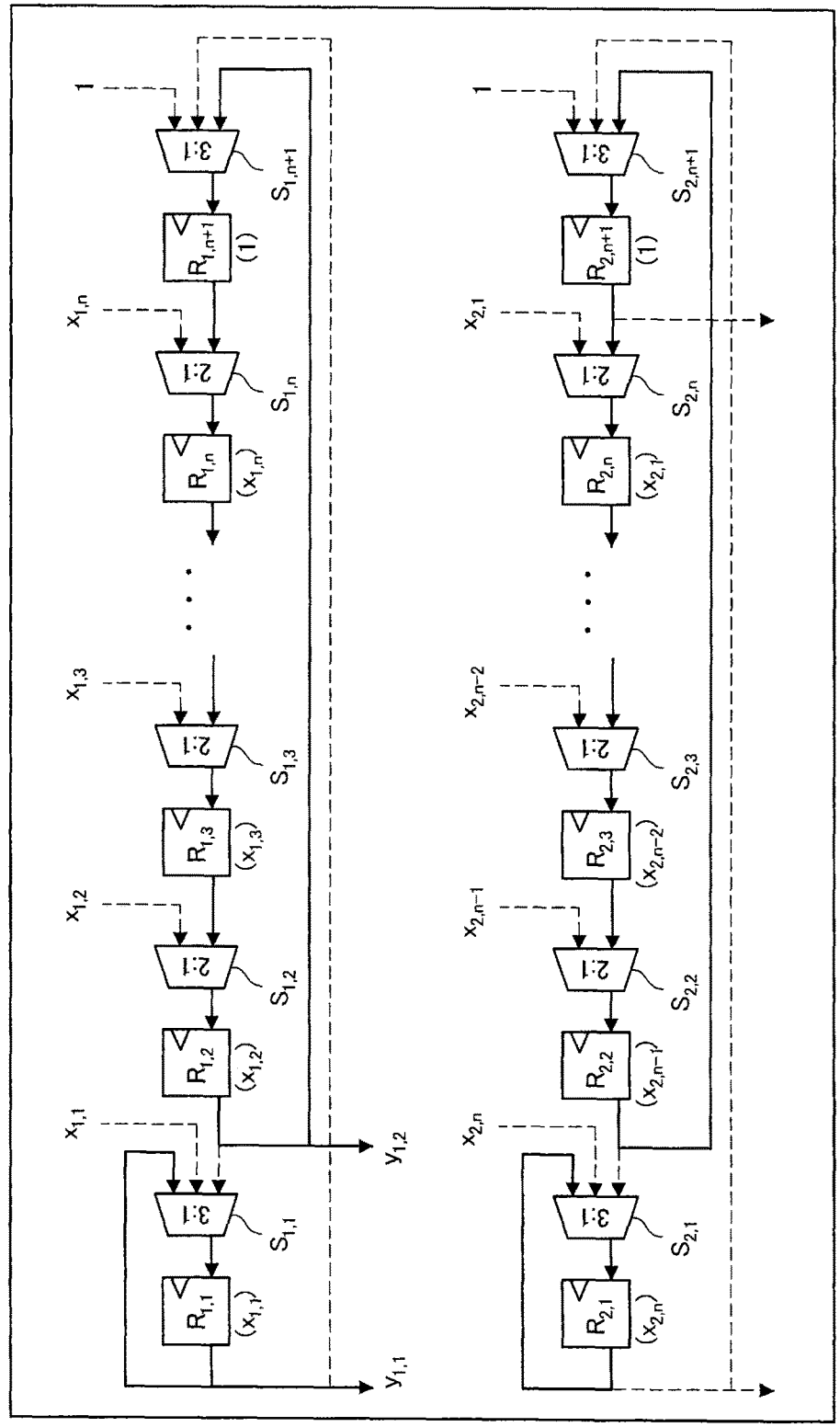
FIG. 38 is an illustrative diagram for describing an operation of the circuit that executes calculation of a multivariate polynomial (Embodiment #1).

In the next cycle (P2), the stored values $x_{1,1}$ and $x_{1,2}$ stored in the registers $R_{1,1}$ and $R_{1,2}$ are output as output values $y_{1,1}$ and $y_{1,2}$ as shown in FIG. 38. In addition, the stored value of the register $R_{1,1}$ is retained, and the stored values of the registers $R_{1,2}, \ldots, R_{1,n+1}$ are rotated. To be specific, the value $x_{1,2}$ of one bit stored in the register $R_{1,2}$ is moved to the register $R_{1,n+1}$ and the values $x_{1,3}, \ldots, x_{1,n}$, and 1 of one bit stored in the registers $R_{1,3}, \ldots, R_{1,n+1}$ are moved to the registers $R_{1,2}, \ldots, R_{1,n}$. As a result, the registers $R_{1,1}, \ldots, R_{1,n+1}$ are in the state in which the values $x_{1,1}, x_{1,3}, \ldots, x_{1,n}$, 1, and $x_{1,2}$ of one bit are respectively stored.

In addition, in the same cycle (P2), the stored value of the register $R_{2,1}$ is retained, and the stored values of the registers $R_{2,2}, \ldots, R_{2,n+1}$ are rotated. To be specific, a value $x_{2,n-1}$ of one bit stored in the register $R_{2,2}$ is moved to the register $R_{2,n+1}$, and values $x_{2,n-2}, \ldots, x_{2,1}$, and 1 of one bit stored in the registers $R_{2,3}, \ldots, R_{2,n+1}$ are moved to the registers $R_{2,2}, \ldots, R_{2,n}$. As a result, the registers $R_{2,1}, \ldots, R_{2,n+1}$ are in the state in which values $x_{2,n}, x_{2,n-2}, \ldots, x_{2,1}$, 1, and $x_{2,n-1}$ of one bit are respectively stored. At this moment, the stored values of the registers $R_{2,1}$ and $R_{2,n+1}$ are not output from the shift register 401 (actually, an output value of the AND circuit 402 is selected by the selector 404).

Figure 39:
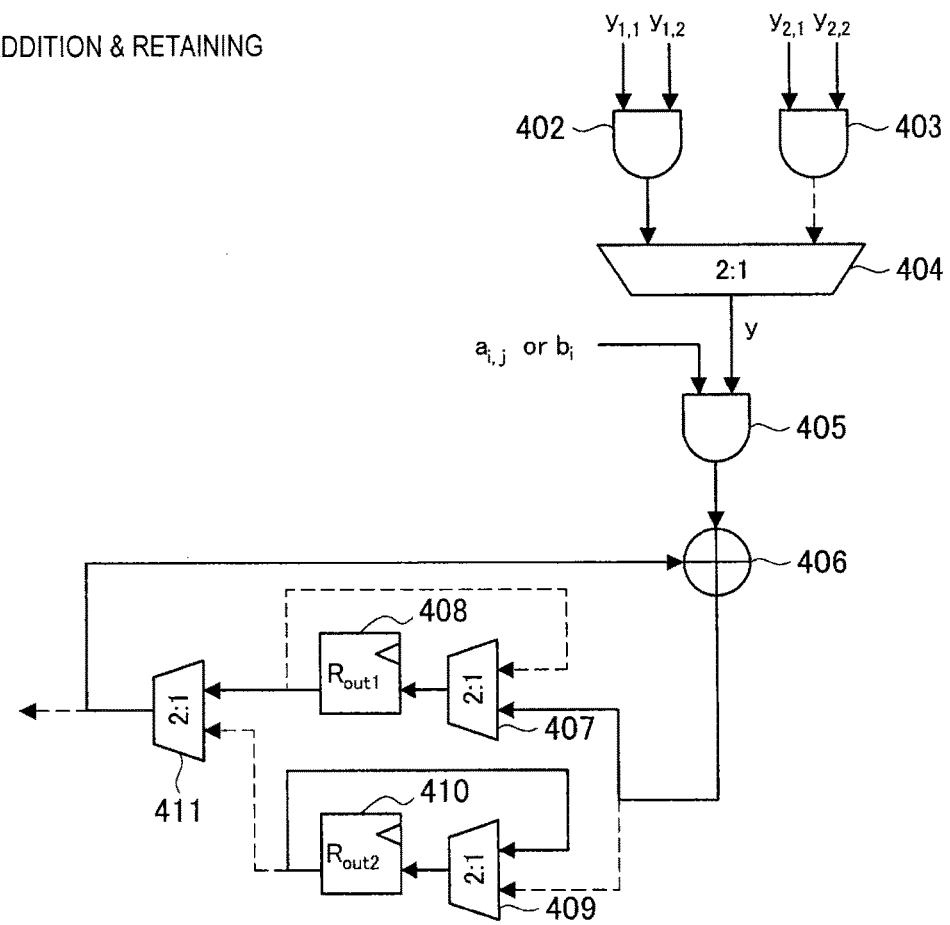
FIG. 39 is an illustrative diagram for describing an operation of the circuit that executes calculation of a multivariate polynomial (Embodiment #1).

The values $y_{1,1}$ and $y_{1,2}$ output from the shift register 401 are input to the AND circuit 402 as shown in FIG. 39. Next, the value of the logical AND output from the AND circuit 402 is input to the selector 404. In this cycle, the selector 404 is controlled such that the output value of the AND circuit 402 is selected. For this reason, the value input to the selector 404 is input to the AND circuit 405 as an output value y of the selector 404, and multiplied by a coefficient. The output of the AND circuit 405 is input to the XOR circuit 406. However, in this cycle, since no value is stored in the registers 408 and 410, the value input to the XOR circuit 406 is input to the selectors 407 and 409.

However, in the cycle, the selector 409 blocks a path connecting the output of the XOR circuit 406 and connects a path connecting the output of the register 410. For this reason, the output value of the XOR circuit 406 is stored in the register 408 via the selector 407 connected to the output of the XOR circuit 406. In this manner, control is performed such that the input of the selector 404 is connected to the output of the AND circuit 402, the output of the XOR circuit 406 is connected to the input of the selector 407 in the cycle in which the first shift register 4011 outputs a stored value, and the input of the selector 409 is connected to the output of the register 410.

In addition, in this state, the selector 411 is maintained in the state in which the output of the register 408 is connected to the input of the XOR circuit 406. While this state is maintained, the shift register 401 outputs the stored values of the registers $R_{1,1}$ and $R_{1,2}$, rotating the stored values of the registers $R_{1,2}, \ldots, R_{1,n+1}$ and the registers $R_{2,2}, \ldots, R_{2,n+1}$. Then, each time a value is output from the shift register 401, intermediate values are summed via the AND circuit 402, the selector 404, the XOR circuit 406, and the selector 407, and thereby the stored value of the register 408 is updated.

Figure 40:
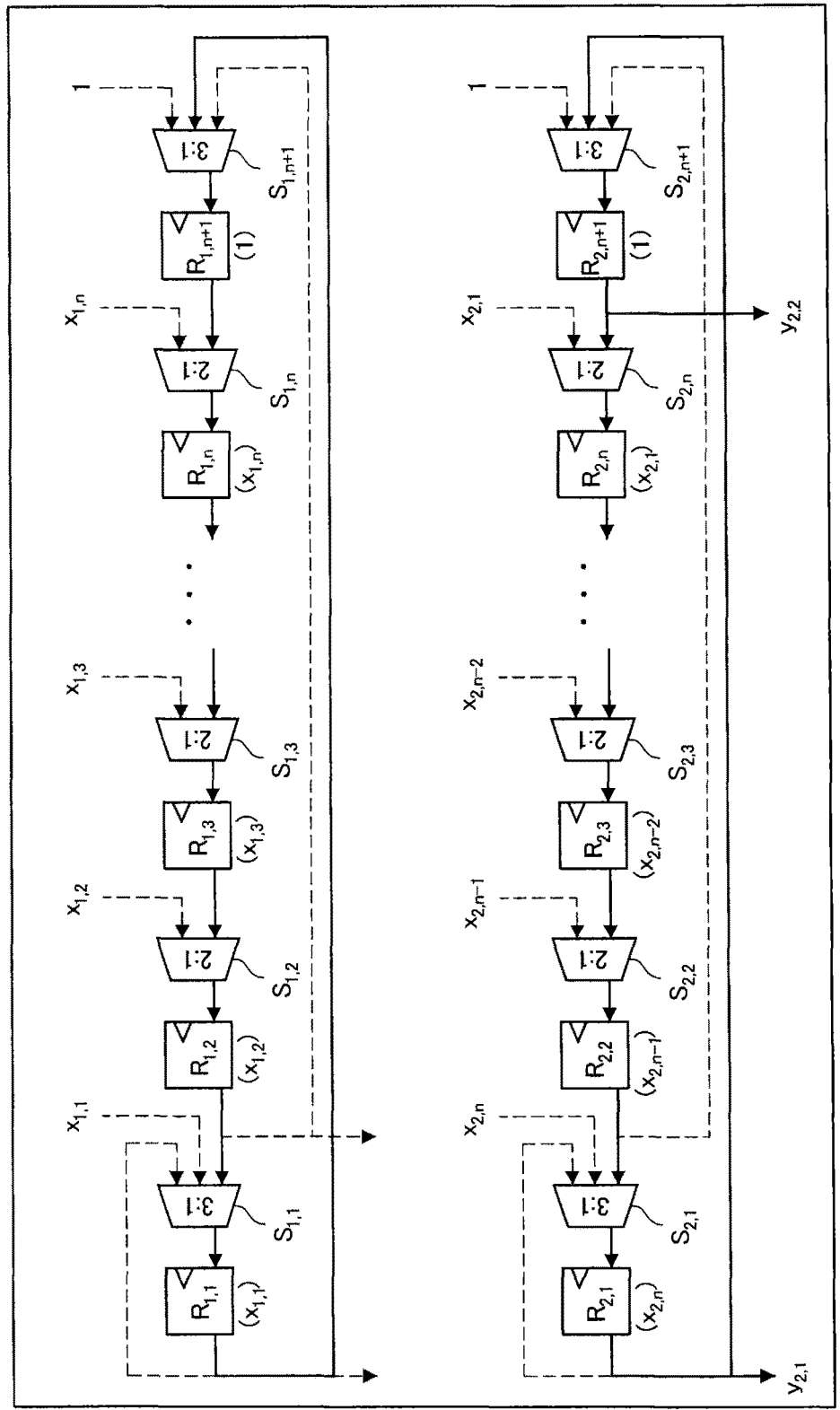
FIG. 40 is an illustrative diagram for describing an operation of the circuit that executes calculation of a multivariate polynomial (Embodiment #1).

However, as shown in FIG. 40, in the stage in which the registers $R_{1,1}, \ldots, R_{1,n+1}$ respectively store the values $x_{1,1}, x_{1,2}, \ldots, x_{1,n}$, and 1 of one bit (P3), the stored values are rotated in the registers $R_{1,1}, \ldots, R_{1,n+1}$ (P3). As a result, in the next cycle, the registers $R_{1,1}, \ldots, R_{1,n+1}$ are in the state in which the values $x_{1,2}, x_{1,3}, \ldots, x_{1,n}$, 1, and $x_{1,1}$ of one bit are respectively stored. In addition, in the state of FIG. 40 (P3), the stored values are rotated in the registers $R_{2,1}, \ldots, R_{2,n+1}$. Furthermore, in this state (P3), the stored values are output from the registers $R_{2,1}$ and $R_{2,n+1}$.

Figure 41:
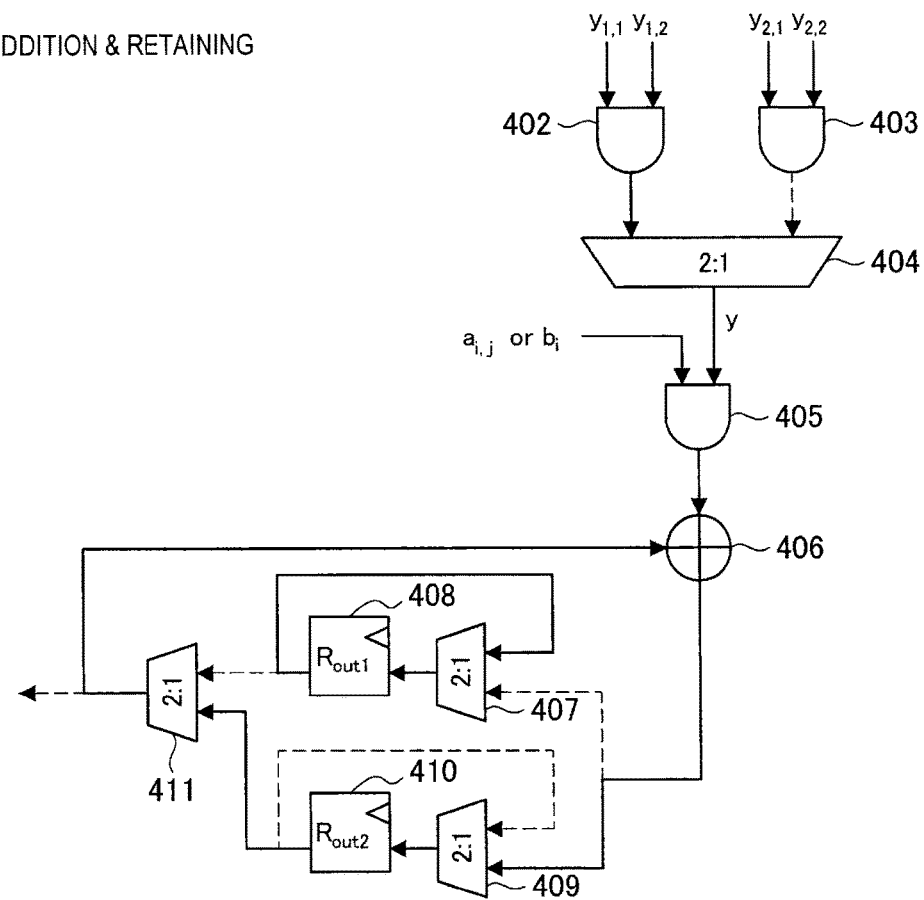
FIG. 41 is an illustrative diagram for describing an operation of the circuit that executes calculation of a multivariate polynomial (Embodiment #1).

At this moment, as shown in FIG. 41, the input of the selector 404 is controlled such that it is connected to the output of the AND circuit 403. In addition, the input of the selector 407 is controlled such that it is connected to the output of the register 408. Furthermore, the input of the selector 409 is controlled such that it is connected to the output of the XOR circuit 406. In addition, the input of the selector 411 is controlled such that it is connected to the output of the register 410. As a result, the output value of the AND circuit 403 is input to the AND circuit 405 via the selector 404. Furthermore, the output value of the AND circuit 405 is stored in the register 410 via the XOR circuit 406 and the selector 409.

In this manner, the arithmetic operation circuit according to Embodiment #1 processes the output value of the second shift register 4012 at the timing at which rotation with regard to the registers $R_{1,2}, \ldots, R_{1,n+1}$ and rotation with regard to the registers $R_{1,1}, \ldots, R_{1,n+1}$ are performed in order for the first shift register 4011 to array the stored values. When the arraying of the stored values is completed in the first shift register 4011, the selectors 404, 407, 409, and 411 are controlled to cause the signal path to return to the original state. In addition, a process of outputting the stored values of the registers $R_{1,1}$ and $R_{1,2}$ is performed while the stored values of the registers $R_{1,2}, \ldots, R_{1,n+1}$ are rotated.

Herein, the description with regard to the operation of the arithmetic operation circuit according to Embodiment #1 will be complemented with reference to a specific example. FIG. 42 summarizes the output values $y_{1,1}, y_{1,2}, y_{2,1}$, and $y_{2,2}$ in each cycle and the stored values of the registers $R_{1,1}, \ldots, R_{1,5}, R_{2,1}, \ldots, R_{2,5}$ when an input x is 4 bits (when n=4). Description with regard to the operation of the arithmetic operation circuit will proceed with reference to FIG. 42.

First, in a first cycle (cycle number 1), the registers $R_{1,1}, \ldots, R_{1,5}$ store inputs $x_{1,1}, \ldots, x_{1,4}$, and 1. In addition, the registers $R_{2,1}, \ldots, R_{2,5}$ store inputs $x_{2,4}, \ldots, x_{2,1}$, and 1. Then, the stored values $x_{1,1}$ and $x_{1,2}$ are output from the registers $R_{1,1}$ and $R_{1,2}$ as the output values $y_{1,1}$ and $y_{1,2}$. In addition, the stored values $x_{2,1}$ and 1 are output from the registers $R_{2,1}$ and $R_{2,5}$ as the output values $y_{2,1}$ and $y_{2,2}$. However, in the cycles numbers 1 to 4, the selector 404 chooses the outputs of the AND circuit 402. Note that detailed processes in the later stage of the selector 404 will not be provided.

In the next cycle (cycle number 2), the stored values are rotated in the registers $R_{1,2}, \ldots, R_{1,5}$, and the stored values are respectively updated to $x_{1,3}, x_{1,4}$, 1, and $x_{1,2}$. For this reason, the output values $y_{1,1}$ and $y_{1,2}$ of the shift register 401 respectively turn into $x_{1,1}$ and $x_{1,3}$. Furthermore, the stored values are rotated in the registers $R_{2,2}, \ldots, R_{2,5}$, and the stored values are respectively updated to $x_{2,2}, x_{2,1}$, 1, and $x_{2,3}$. In the same manner, in the cycles numbers 3 and 4, the stored values are rotated in the registers $R_{1,2}, \ldots, R_{1,5}$, and $R_{2,2}, \ldots, R_{2,5}$, and the values $y_{1,1}$ and $y_{1,2}$ are output from the shift register 401 in each cycle.

In the next cycle (cycle number 5), the stored values of the registers $R_{1,1}, \ldots, R_{1,5}$ respectively turn into $x_{1,1}, \ldots, x_{1,4}$, and 1, and the stored values are output from the registers $R_{1,1}$ and $R_{1,2}$ without change, the values $x_{1,1}$ and $x_{1,2}$ that have already been output are output. Thus, the shift register 401 performs rotation in the registers $R_{1,1}, \ldots, R_{1,5}$ without outputting a value from the registers $R_{1,1}$ and $R_{1,2}$. Furthermore, the shift register 401 outputs the stored values from the registers $R_{2,1}$ and $R_{2,5}$. However, in the cycle number 5, the selector 404 chooses the output of the AND circuit 403.

When rotation is performed, the stored values of the registers $R_{1,1}, \ldots, R_{1,5}$ are arrayed in the order of $x_{1,2}, x_{1,3}, x_{1,4}, 1$, and $x_{1,1}$ as described in the field of the cycle number 5+1. At the same time, the stored values of the registers $R_{2,1}, \ldots, R_{2,5}$ are arrayed in the order of $x_{2,3}, x_{2,2}, x_{2,1}, 1$, and $x_{2,4}$. Note that, in the cycles numbers 5+1 to 5+3, the selector 404 chooses the output of the AND circuit 402 again.

Next, as described in the cycles numbers 5+1 to 5+4, the first shift register 4011 performs rotation of the stored values in the registers $R_{1,2}, \ldots, R_{1,5}$. In addition, in the cycles numbers 5+1 to 5+3, the stored values are output from the registers $R_{1,1}$ and $R_{1,2}$. Next, in the cycle number 2×5, the shift register 401 rotates the stored values of the registers $R_{1,1}, \ldots, R_{1,5}$ to array the stored values of the registers $R_{1,1}, \ldots, R_{1,5}$ without outputting a value from the registers $R_{1,1}$ and $R_{1,2}$ as in the cycle number 5.

On the other hand, the second shift register 4012 performs rotation of the stored vales of the registers $R_{2,2}, \ldots, R_{2,5}$ in the cycles numbers 5+1 to 5+4. In addition, in the cycle number 5+4, the stored values are output from the registers $R_{2,1}$ and $R_{2,5}$. Next, in the cycle number 2×5, the stored values are output from the registers $R_{2,1}$ and $R_{2,5}$ while the stored values of the registers $R_{2,1}, \ldots, R_{2,5}$ are rotated. However, at the timings of the cycle number 5+4 and the cycle number 2×5, the selector 404 chooses the output of the AND circuit 403.

Thereafter, the shift register 401 performs rotation accompanied with an output from the registers $R_{1,1}$ and $R_{1,2}$ and rotation accompanied with an output from the registers $R_{2,1}$ and $R_{2,5}$ and then outputs values with regard to all combinations of the stored values. Then, when the summation is completed for all combinations that can be selected from the values $x_{1,1}, \ldots, x_{1,4}$, and 1, and all combinations that can be selected from the values $x_{2,4}, \ldots, x_{2,1}$, and 1, the stored values are respectively output from the registers 408 and 410 as the arithmetic operation result z.

Here, a control method for the selectors 404, 407, 409, and 411 will be summarized. Note that control over the selectors 404, 407, 409, and 411 is performed by a control unit (not illustrated) provided in the arithmetic operation circuit or a control device (not illustrated) provided in the outside of the arithmetic operation circuit.

In a cycle in which a value is output from the first shift register 4011, the input of the selector 404 is connected to the output of the AND circuit 402. In addition, the input of the selector 407 is connected to the output of the XOR circuit 406. Furthermore, the input of the selector 409 is connected to the output of the register 410. Then, the input of the selector 411 is connected to the output of the register 408.

On the other hand, in a cycle in which a value is output from the second shift register 4012, the input of the selector 404 is connected to the output of the AND circuit 403. In addition, the input of the selector 409 is connected to the output of the XOR circuit 406. Furthermore, the input of the selector 407 is connected to the output of the register 408. Then, the input of the selector 411 is connected to the output of the register 410.

Hereinabove, the operation of the arithmetic operation circuit that uses a shift register has been described. Note that, although an order of reading coefficients has not been mentioned, when an arithmetic operation is performed on an output of the AND circuit 402, coefficients are read in the order of $a_{12}, a_{13}, a_{14}, b_1, \ldots$ . On the other hand, when an arithmetic operation is performed on an output of the AND circuit 403, the coefficients are read in the reverse order (for example, the coefficients are read from the final address of the coefficient list shown in FIG. 15). Note that, in FIG. 42, coefficients that are subject to an arithmetic operation for the output of the AND circuit 403 are denoted by giving primes for the sake of convenience, but the same coefficients as those that are subject to an arithmetic operation for the output of the AND circuit 402 may be used. In addition, there is considered to be no drop of an arithmetic operation speed caused by employing such a reading method.

As described above, since the arithmetic operation circuit according to Embodiment #1 uses the shift registers, it does not include a selector with multi-bit inputs. In addition, the arithmetic operation circuit only includes two kinds of feedback loops of the shift registers. Furthermore, since, at a timing at which one shift register arrays stored values of registers, the other shift register outputs stored values, the arithmetic operation circuit does not spend cycles only for arraying the stored values. In addition, the two shift registers share AND circuits for multiplying coefficients and the XOR circuit for summation. As a result, an increase in the critical path and an expansion of the circuit scale are suppressed and accordingly a small-sized arithmetic operation circuit that performs arithmetic operations at a high speed is realized.

6-6: Embodiment #2 (Calculation of Multivariate Polynomials F and G)

Next, a configuration of an arithmetic operation circuit that can be used in calculation of quadratic multivariate polynomials $F(x_1)$ and $G(x_2, x_3)$ (Embodiment #2) will be described. The arithmetic operation circuit according to Embodiment #2 is designed to execute calculation of the quadratic multivariate polynomials $F(x_1)$ and $G(x_2, x_3)$ (calculation of $f(x_1)$ and $g(x_2, x_3)$) in parallel with regard to three inputs $x_1, x_2$, and $x_3$.

(6-6-1: Circuit Configuration (FIGS. 43 and 44))

Figure 44:
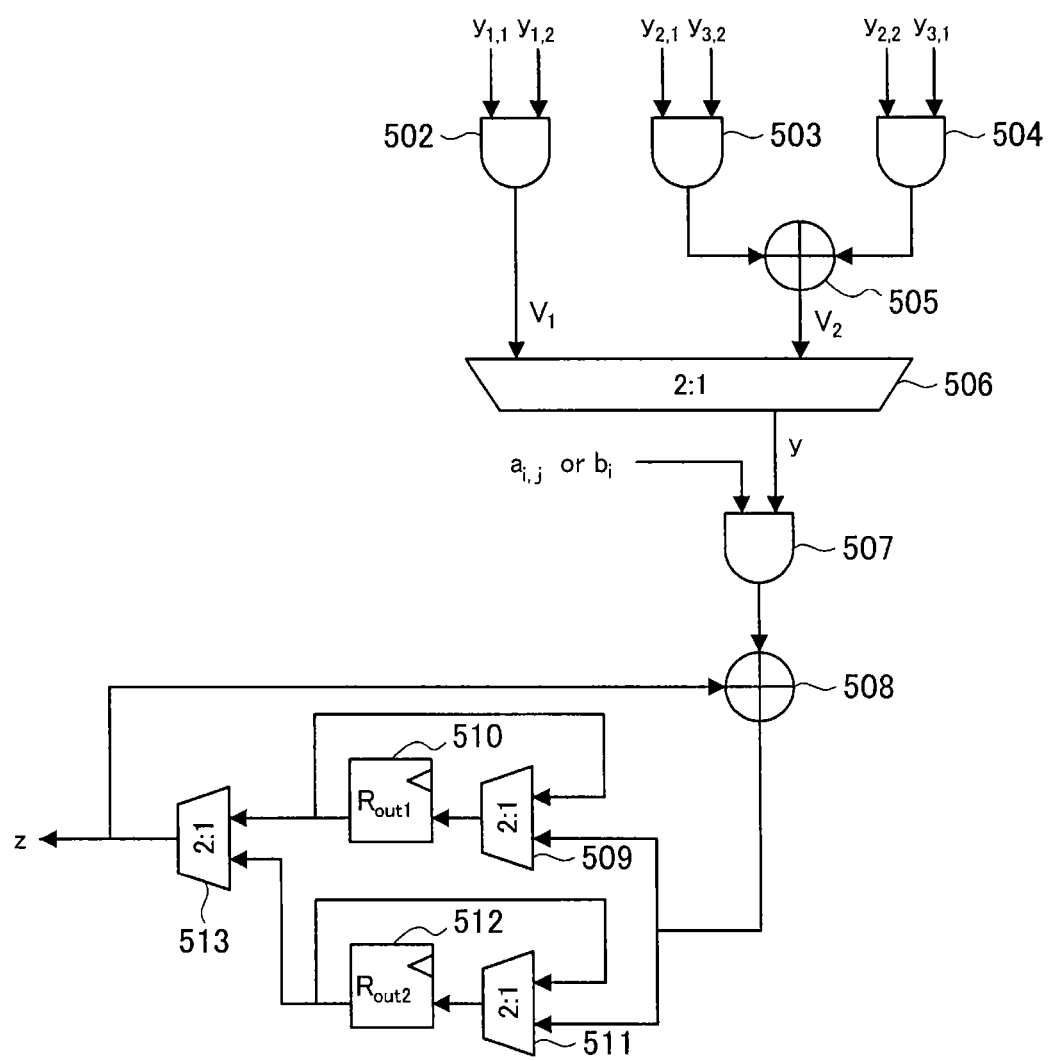
FIG. 44 is an illustrative diagram for describing an operation of the circuit that executes calculation of a multivariate polynomial (Embodiment #2).

As shown in FIGS. 43 and 44, the arithmetic operation circuit according to Embodiment #2 is constituted by a shift register 501, AND circuits 502, 503, and 504, an XOR circuit 505, a selector 506, an AND circuit 507, an XOR circuit 508, selectors 509 and 511, registers 510 and 512, and a selector 513. In addition, the shift register 501 includes a first shift register 5011, a second shift register 5012, and a third shift register 5013.

Note that a configuration of the first shift register 5011 is substantially the same as that of the first shift register 4011 according to Embodiment #1 described above. In addition, configurations of the second shift register 5012 and the third shift register 5013 are substantially the same as that of the second shift register 4012 according to Embodiment #1 described above. Thus, detailed description of the configurations will not be provided. Note that the first shift register 5011, the second shift register 5012, and the third shift register 5013 are operated in association with each other in the same cycles.

The significant difference between the arithmetic operation circuit according to Embodiment #1 and the arithmetic operation circuit according to Embodiment #2 is that the number of shift registers included in the shift register 501 described above and the configuration of the XOR circuit 505. Thus, the configuration of the arithmetic operation circuit according to Embodiment #2 will be described focusing on the difference. The difference is added to calculate the quadratic multivariate polynomial $g(x_2, x_3)$. When the quadratic multivariate polynomials $f(x_1)$ that is subject to an arithmetic operation is also expressed as in formula (14)

provided below, the quadratic multivariate polynomial $g(x_2, x_3)$ is expressed as in formula (15) provided below.

[Math 12]

$$f(x_1) = \sum_{i,j} a_{ij} x_{1i} x_{1j} + \sum_i b_i x_{1i} \quad (14)$$

$$g(x_2, x_3) = \sum_{i,j} a_{ij}(x_{2i} x_{3j} + x_{2j} x_{3i}) \quad (15)$$

Thus, the second shift register 5012, the third shift register 5013, and the AND circuit 503 are provided to compute $x_{2i} x_{3j}$, the second shift register, the third shift register 5013, and the AND circuit 504 are provided to compute $x_{2j} x_{3i}$, and the XOR circuit 505 is provided to add up the computation results. Accordingly, the second shift register 5012 and the third shift register 5013 output stored values of the registers in the same cycle. In addition, the output of the XOR circuit 505 is input to the AND circuit 507 via the selector 506 in the cycle. Note that, since configurations of the circuits provided in the later stage of the AND circuit 507 are substantially the same as that of the arithmetic operation circuit according to Configuration Example #2, description thereof will not be provided.

Hereinabove, the configuration of the arithmetic operation circuit according to Embodiment #2 has been described. The arithmetic operation circuit according to Embodiment #2 is easily understood considering that the second shift register 4012 in the arithmetic operation circuit according to Embodiment #1 is switched to the second shift register 5012 and the third shift register 5013 and the AND circuit 403 is switched to the set of the AND circuit 503 and 504 and XOR circuit 505. However, it should be noted that the values input to the register $R_{2,n+1}$ of the second shift register 5012 and the register $R_{3,n+1}$ of the third shift register 5013 are "0." The difference is attributable to the fact that the quadratic multivariate polynomial $g(x_2, x_3)$ does not include a first-order term.

(6-6-2: Operation (FIGS. 45 to 50))

Next, an operation of the arithmetic operation circuit according to Embodiment #2 will be described with reference to FIGS. 45 to 50. However, since the operation of the arithmetic operation circuit according to Embodiment #2 is the same as that of the arithmetic operation circuit according to Embodiment #1, detailed description thereof will be omitted and description will proceed focusing on differences.

Note that the portions in which wirings are indicated by dashed lines in the drawings represent control over signals not to substantially flow in corresponding cycles. On the other hand, the portions in which wirings are indicated by solid lines in the drawings represent control over signals to flow in corresponding cycles. Such control over signal paths is realized by controlling selectors $S_{1,1}, \ldots, S_{1,n}, S_{2,1}, \ldots, S_{2,n+1}, S_{3,1}, \ldots, S_{3,n+1}$ and the selector 506, the selector 509, the selector 511, and the selector 513.

Figure 45:
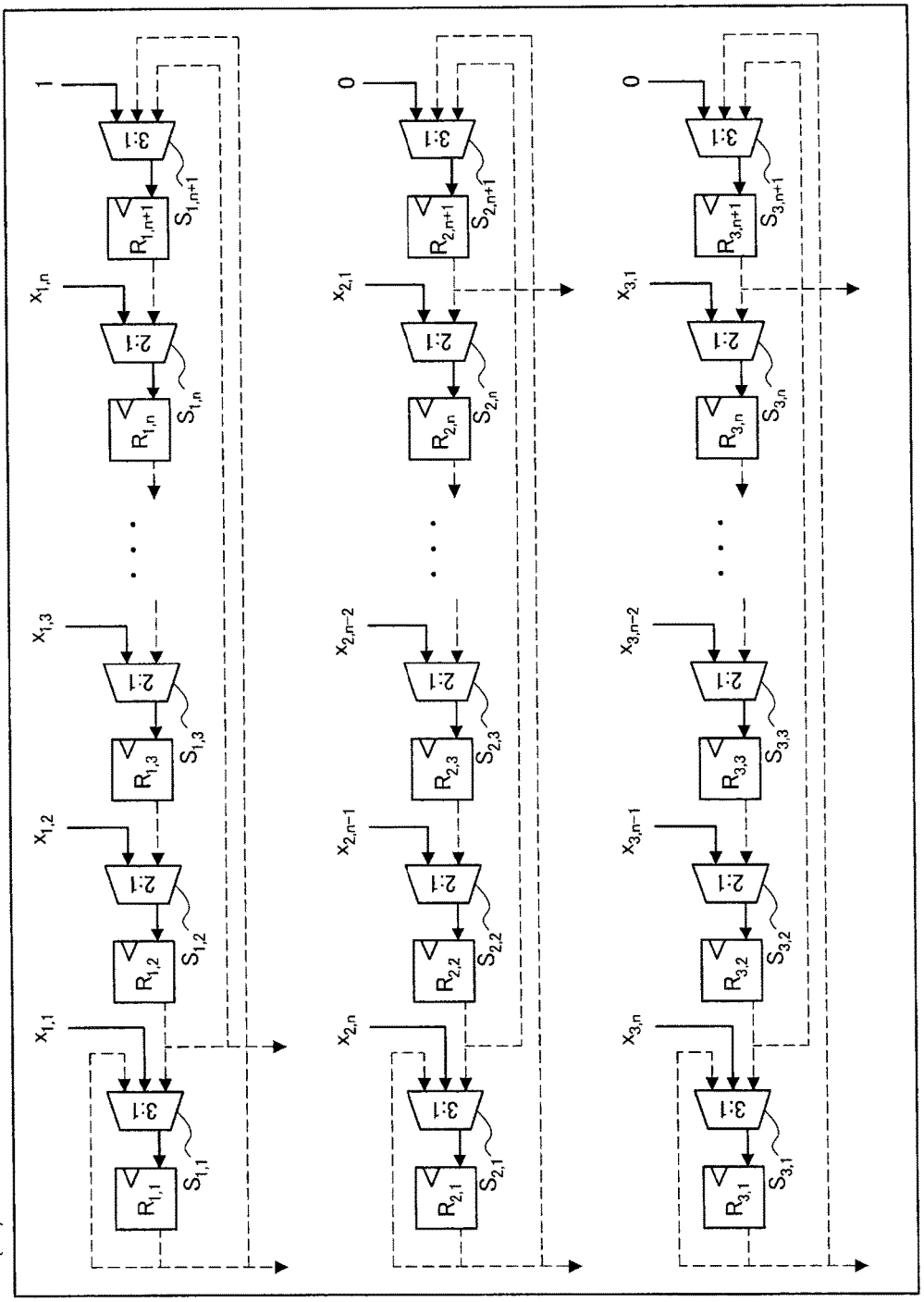
FIG. 45 is an illustrative diagram for describing an operation of the circuit that executes calculation of a multivariate polynomial (Embodiment #2).
Figure 46:
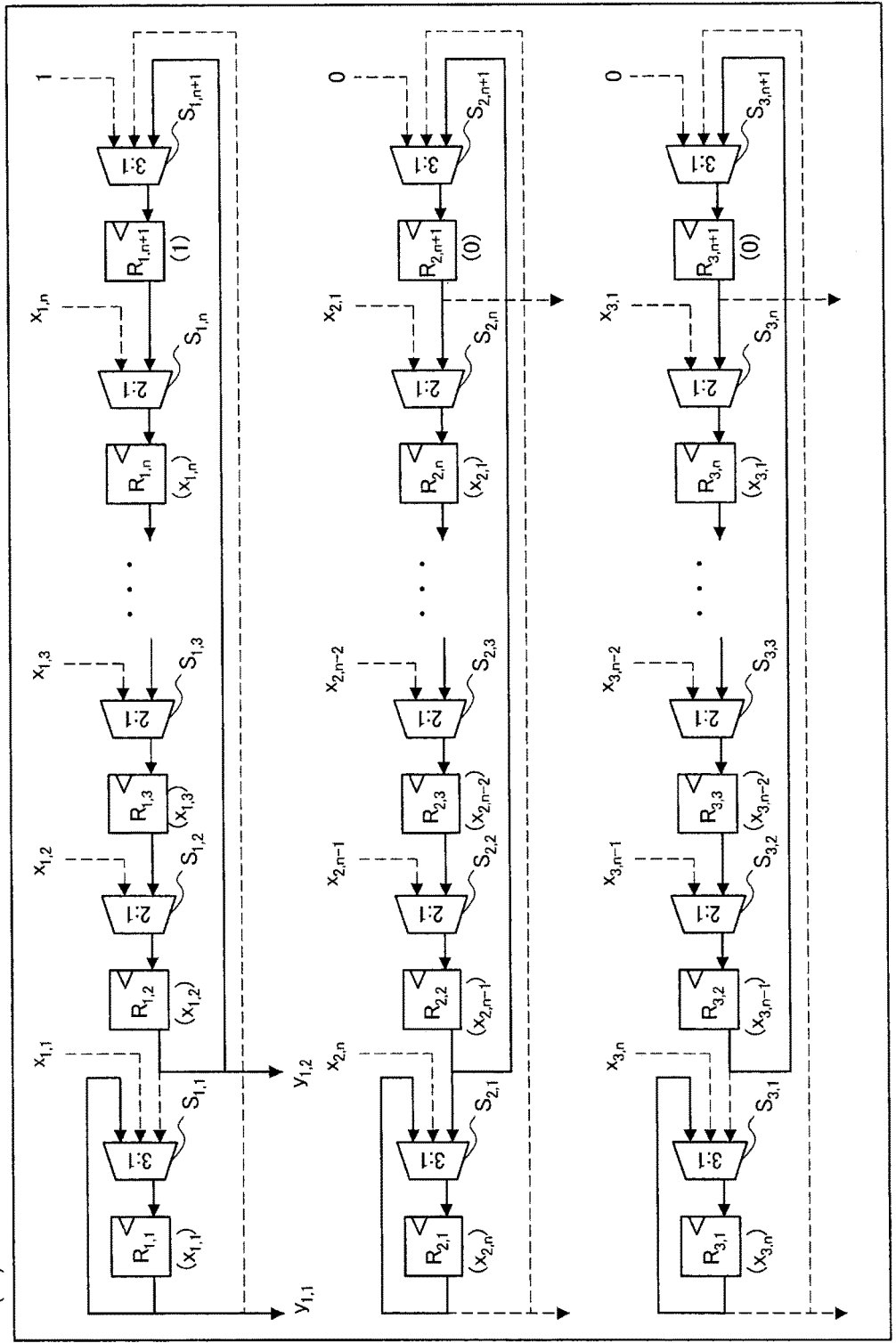
FIG. 46 is an illustrative diagram for describing an operation of the circuit that executes calculation of a multivariate polynomial (Embodiment #2).
Figure 47:
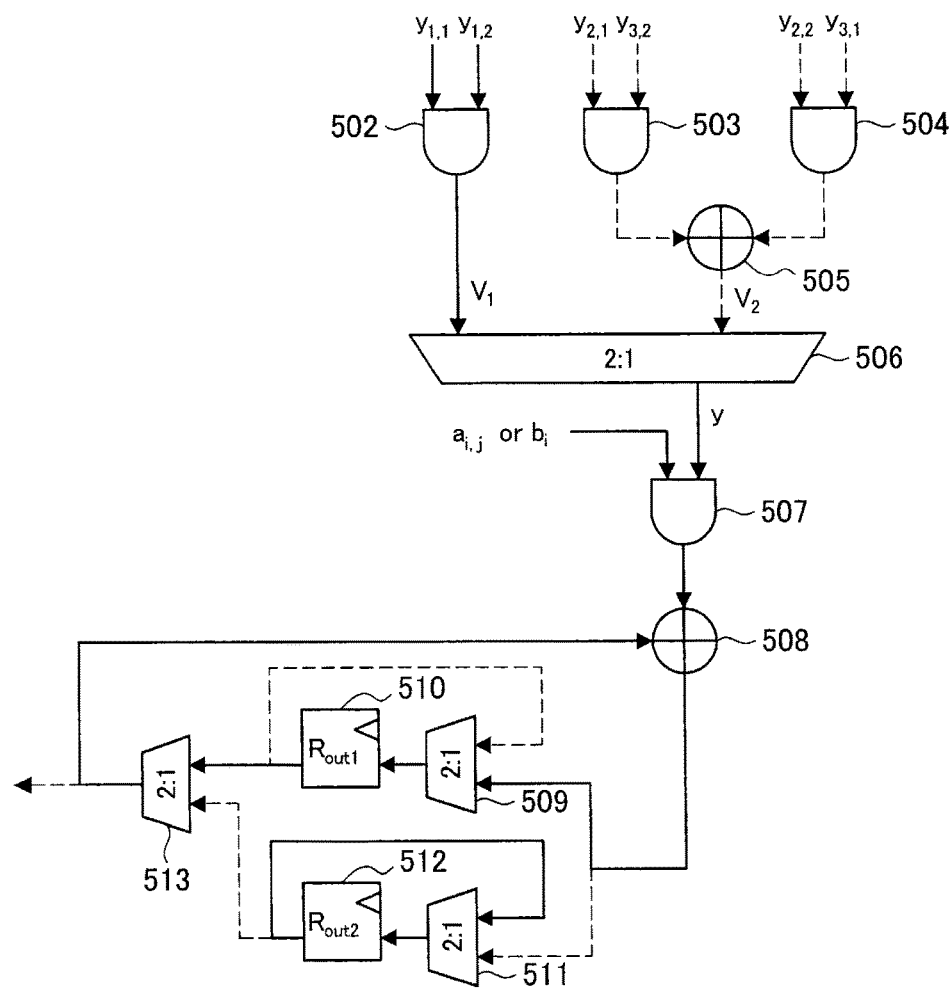
FIG. 47 is an illustrative diagram for describing an operation of the circuit that executes calculation of a multivariate polynomial (Embodiment #2).
Figure 48:
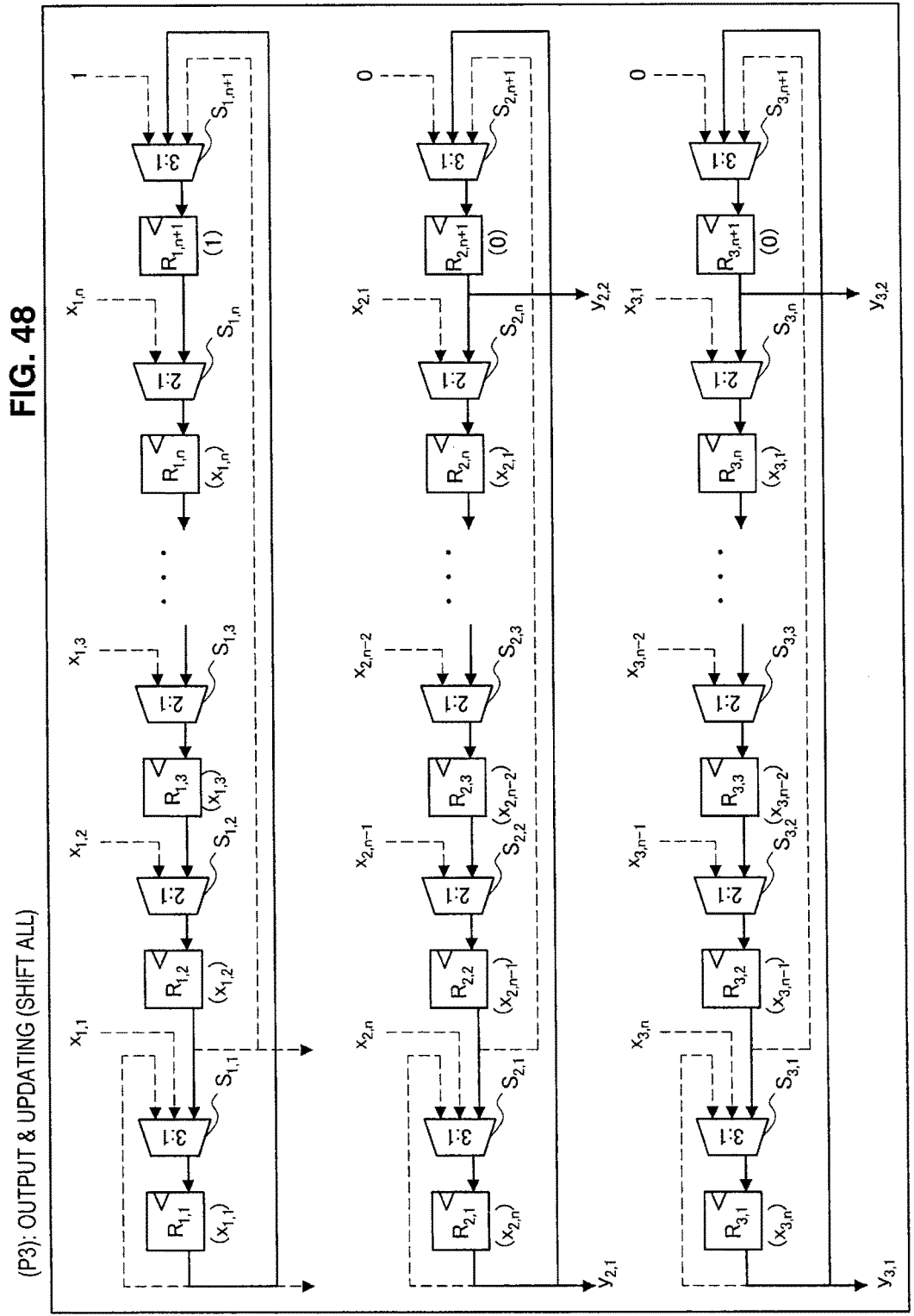
FIG. 48 is an illustrative diagram for describing an operation of the circuit that executes calculation of a multivariate polynomial (Embodiment #2).
Figure 49:
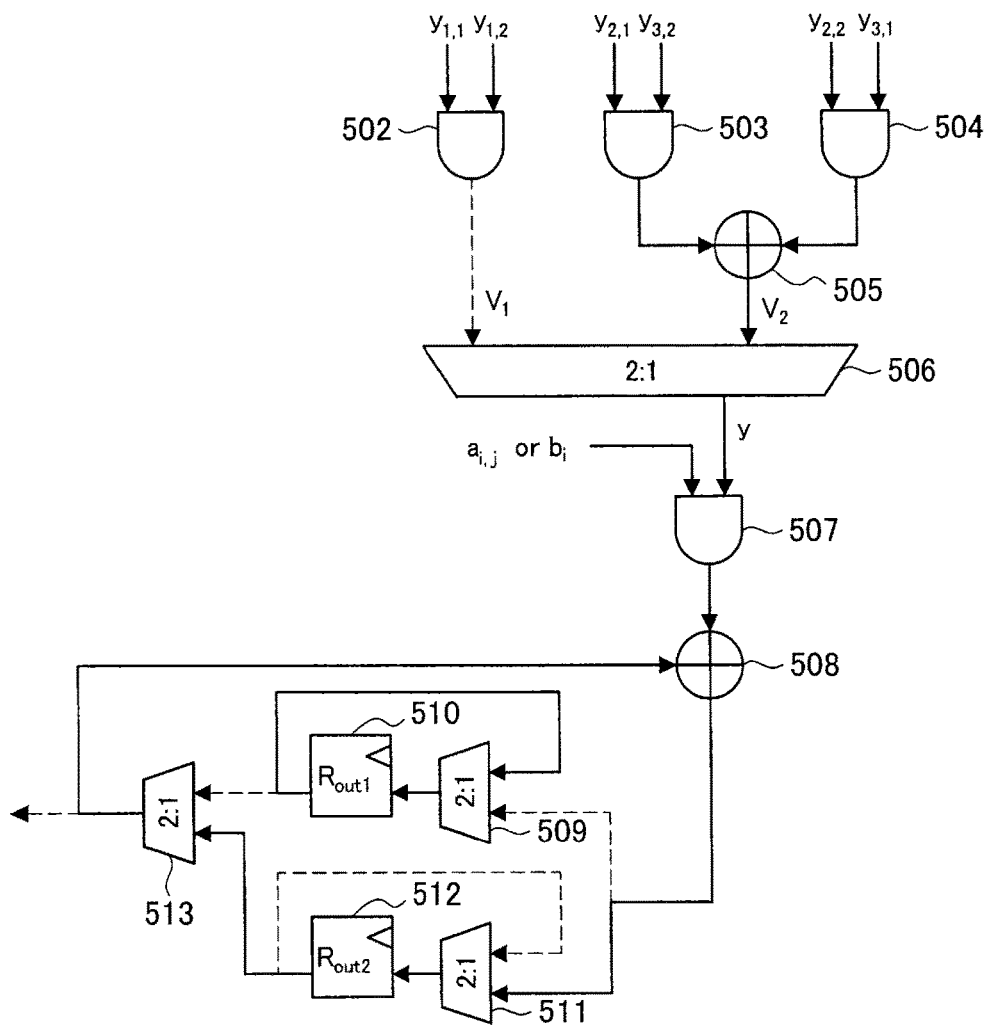
FIG. 49 is an illustrative diagram for describing an operation of the circuit that executes calculation of a multivariate polynomial (Embodiment #2).

When the operations of the first shift register 5011 and the second shift register 5012 are focused, it is ascertained that they are substantially the same as those of the first shift register 4011 and the second shift register 4012 according to Embodiment #1 as shown in FIGS. 45, 46, and 48. In addition, the operation of the third shift register 5013 is the same as that of the second shift register 5012. In addition, since the input of the selector 506 is connected to the output of the AND circuit 502 in the cycle in which the first shift register 5011 outputs a value as shown in FIG. 47, the operations are the same as those of the arithmetic operation circuit according to Embodiment #1.

On the other hand, in the cycle in which the second shift register 5012 and the third shift register 5013 output values, the input of the selector 506 is connected to the output of the XOR circuit 505. For this reason, the output values of the second shift register 5012 and the third shift register 5013 are respectively input to the AND circuits 503 and 504, the output values of the AND circuits 503 and 504 are input to the XOR circuit 505, and the output value of the XOR circuit 505 is input to the AND circuit 507 via the selector 506. Note that operations of the circuits positioned in the later stage of the AND circuit 507 are substantially the same as in the arithmetic operation circuit according to Embodiment #1.

FIG. 50 shows a detailed configuration of stored values of the registers constituting the shift register 501, output values from the shift registers, and intermediate values computed in the AND circuit 507 when n=4. Note that the method of description is the same as in FIG. 42. As is obvious from the specific example shown in FIG. 50, the arithmetic operation circuit according to Embodiment #2 efficiently generates the terms of the quadratic multivariate polynomial $f(x_1)$ expressed in formula (14) above and the terms of the quadratic multivariate polynomial $g(x_2, x_3)$ expressed in formula (15) above. In this manner, when the arithmetic operation circuit according to Embodiment #2 is used, an arithmetic operation of a multivariate polynomial necessary for applying the public-key authentication scheme and the digital signature scheme previously described can be realized.

Hereinabove, the operation of the arithmetic operation circuit according to Embodiment #2 has been described.

Hereinabove, the configurations of the arithmetic operation circuits that can be used in application of the public-key authentication scheme and the digital signature scheme that take the problem of solving a multivariate polynomial as the base of security have been described. Particularly, by applying the arithmetic operation circuits according to Embodiments #1 and #2, a reduction of a circuit scale and improvement of a processing speed can be achieved.

6-7: Embodiment #3 (Pipelining of Calculation of a Multivariate Polynomial F)

Use of the arithmetic operation circuits described above enables a reduction of a circuit scale and improvement of a processing speed that take the problem of solving a multivariate polynomial as the base of security to be achieved. With such public-key authentication scheme and the digital signature scheme, the probability of successful false proof can be reduced enough to be negligible by calculating the arithmetic operation of quadratic polynomials $f(x_1)$ and $f(x_2)$ for each of $x_1$ and $x_2$ a plurality of times (for example, 140 times) and increasing the number of repetitions of the interactive protocol.

Figure 83:
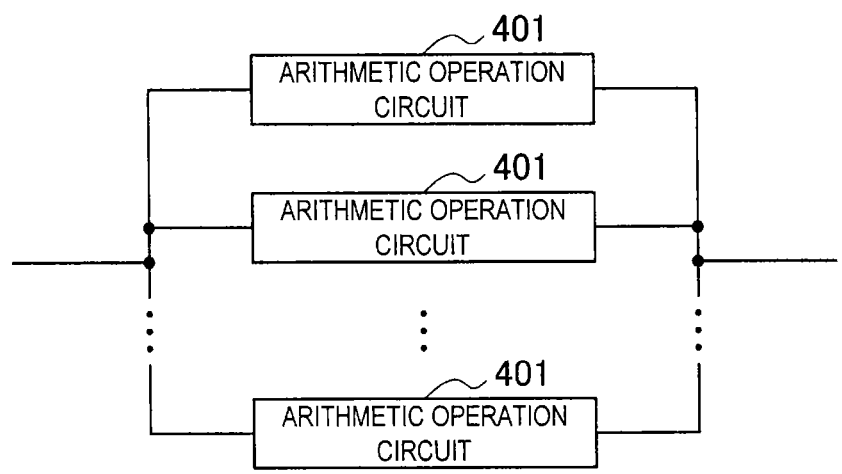
FIG. 83 is an illustrative diagram showing an example in which a plurality of arithmetic operation circuits 401 shown in FIG. 35 are disposed side by side.

When the arithmetic operation of quadratic polynomials $f(x_1)$ and $f(x_2)$ is repeated a plurality of times, the arithmetic operation process can speed up due to a plurality of arithmetic operation circuits shown in FIGS. 35 and 36 disposed in parallel. FIG. 83 is an illustrative diagram showing an example in which a plurality of arithmetic operation circuits 401 shown in FIG. 35 are disposed in parallel. As shown in FIG. 83, when the plurality of arithmetic operation circuits

401 are disposed in parallel, a plurality of times of the arithmetic operation process for the quadratic polynomials $f(x_1)$ and $f(x_2)$ can speed up.

However, when the plurality of arithmetic operation circuits that execute the arithmetic operation process for the quadratic polynomials are disposed in parallel, it is necessary for the arithmetic operation circuits to access a recording memory in which coefficients are stored as shown in FIG. 15 at the same time. In addition, when the plurality of arithmetic operation circuits are disposed in parallel, a restriction on the disposition of the arithmetic operation circuits that there be an arithmetic operation circuit close to the recording memory and an arithmetic operation circuit distant from the recording memory causes a drop of the maximum operation frequency and the simultaneous access to the recording memory. In addition, when the plurality (M) of arithmetic operation circuits that execute the arithmetic operation process for the quadratic polynomials are disposed in parallel, the circuit scale is simply M times the scale of one arithmetic operation circuit.

Thus, a technology of alleviating the restriction on the disposition of the arithmetic operation circuits by making a data structure that makes easy division of the recording memory in which the coefficients are stored as shown in FIG. 15 and by pipelining the arithmetic operation process for the quadratic polynomials, and thereby preventing a drop of the maximum operation frequency, will be described. In addition, a reduction of the number of registers provided in each arithmetic operation circuit by pipelining the arithmetic operation process for the quadratic polynomials will also be described.

(6-7-1: Circuit Configuration (FIGS. 51 to 61))

First, a method for turning a data structure of the recording memory into a data structure that enables easy division thereof will be described. FIG. 51 is an illustrative diagram showing an example of a data structure of the recording memory. FIG. 51 is an illustrative diagram showing the example of the data structure of the recording memory to which an arithmetic operation circuit with a 4-bit and 4-stage pipeline that will be described later refers. When the plurality of arithmetic operation circuits that execute the arithmetic operation process for the quadratic polynomials are disposed in parallel, it is not necessary to have addresses double due to having the data structure shown in FIG. 51. This is because the addresses gradually increase when the arithmetic operation process is performed and when the process reaches the final address, the addresses may decrease.

Next, a method for pipelining the arithmetic operation process for quadratic polynomials for achieving speed-up will be described.

Figure 52:
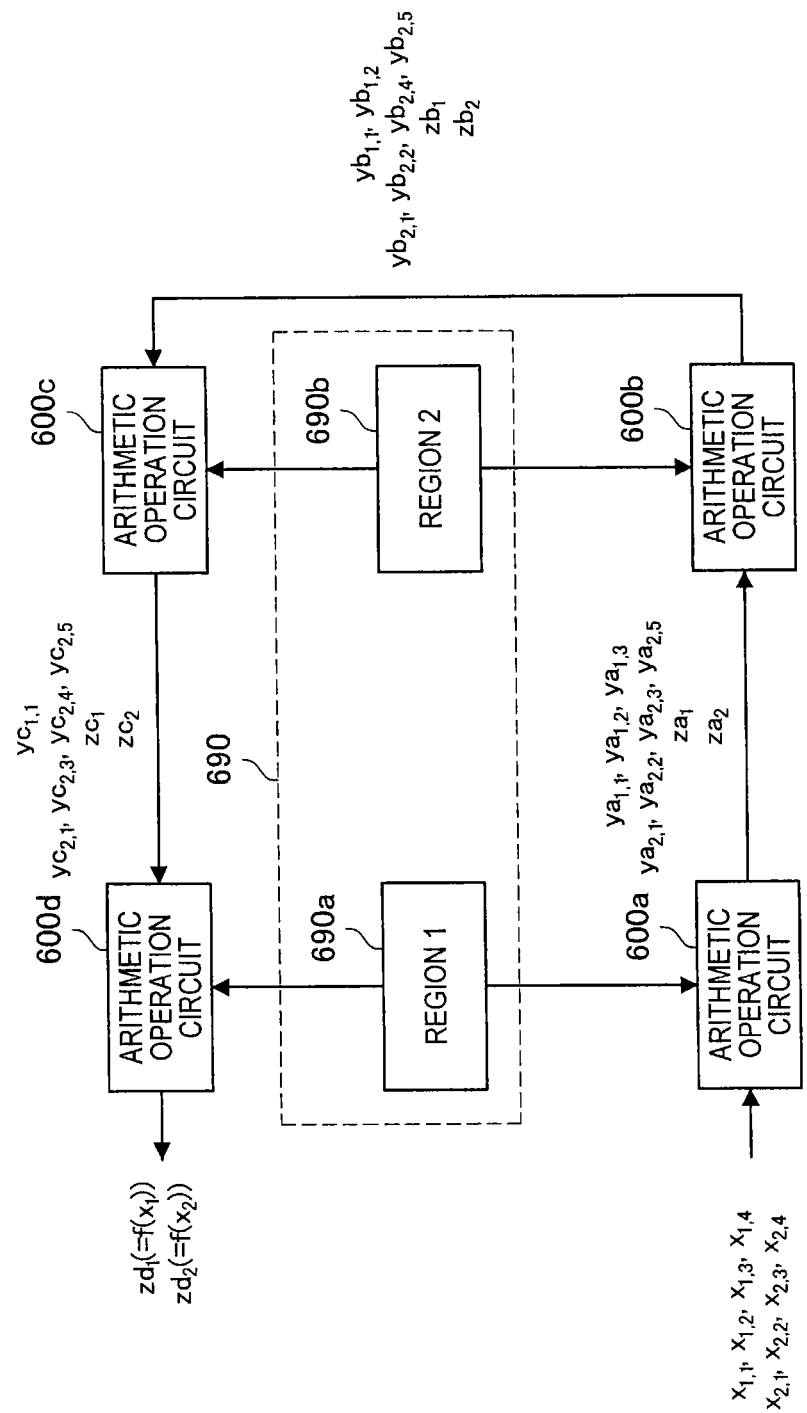
FIG. 52 is an illustrative diagram for describing an operation of the circuit that executes calculation of a multivariate polynomial (Embodiment #3).

FIG. 52 is an illustrative diagram showing a configuration of an arithmetic operation circuit according to Embodiment #3. The arithmetic operation circuit shown in FIG. 52 performs an arithmetic operation on a quadratic polynomial and outputs values when an input x is 4-bit. As shown in FIG. 52, the arithmetic operation circuit according to Embodiment #3 is configured to include arithmetic operation circuits 600a, 600b, 600c, and 600d and a ROM 690 that stores coefficients. In addition, the ROM 690 is divided into two regions 690a and 690b.

The arithmetic operation circuits 600a, 600b, 600c, and 600d are circuits that generate the quadratic multivariate polynomials $f(x_1)$ and $f(x_2)$ in parallel from the two inputs $x_1$ and $x_2$. The arithmetic operation circuits according to Embodiments #1 and #2 are designed to execute calculation of the quadratic multivariate polynomials $f(x_1)$ and $f(x_2)$ in parallel for the two inputs $x_1$ and $x_2$ with one circuit. The arithmetic operation circuit according to Embodiment #3 shown in FIG. 52 is designed to generate the quadratic multivariate polynomials $f(x_1)$ and $f(x_2)$ in parallel from the two inputs $x_1$ and $x_2$ in a pipeline process performed by the four arithmetic operation circuits 600a, 600b, 600c, and 600d.

The pipeline process is a process of connecting processing elements in series so that the output of a processing element is connected to the input of the next processing element, and the pipelined processing elements are parallelized to perform a process.

Figure 53:
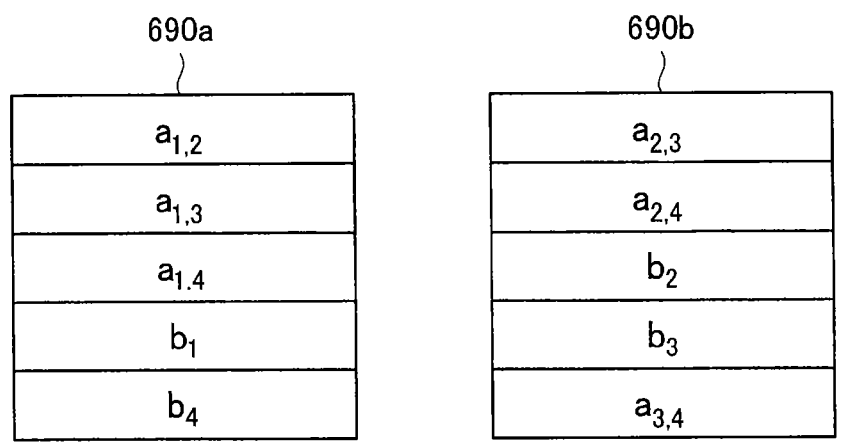
FIG. 53 is a table showing a data structure example of a recording memory.

In order to efficiently generate the quadratic multivariate polynomials $f(x_1)$ and $f(x_2)$ through a pipeline process performed by the four arithmetic operation circuits 600a, 600b, 600c, and 600d, the ROM 690 that stores coefficients is divided into two regions 690a and 690b. FIG. 53 is an illustrative diagram showing an example of a data structure of the ROM 690 and showing examples of coefficients stored in the regions 690a and 690b.

In addition, the arithmetic operation circuits 600a and 600d refer to the coefficients stored in the region 690a and arithmetic operation circuits 600b and 600c refer to the coefficients stored in the region 690b. In this manner, by localizing access of each arithmetic operation circuit to the ROM 690, a drop of the maximum operation frequency can be prevented and higher speed-up of the arithmetic operation process for quadratic polynomials can be achieved.

Figure 54:
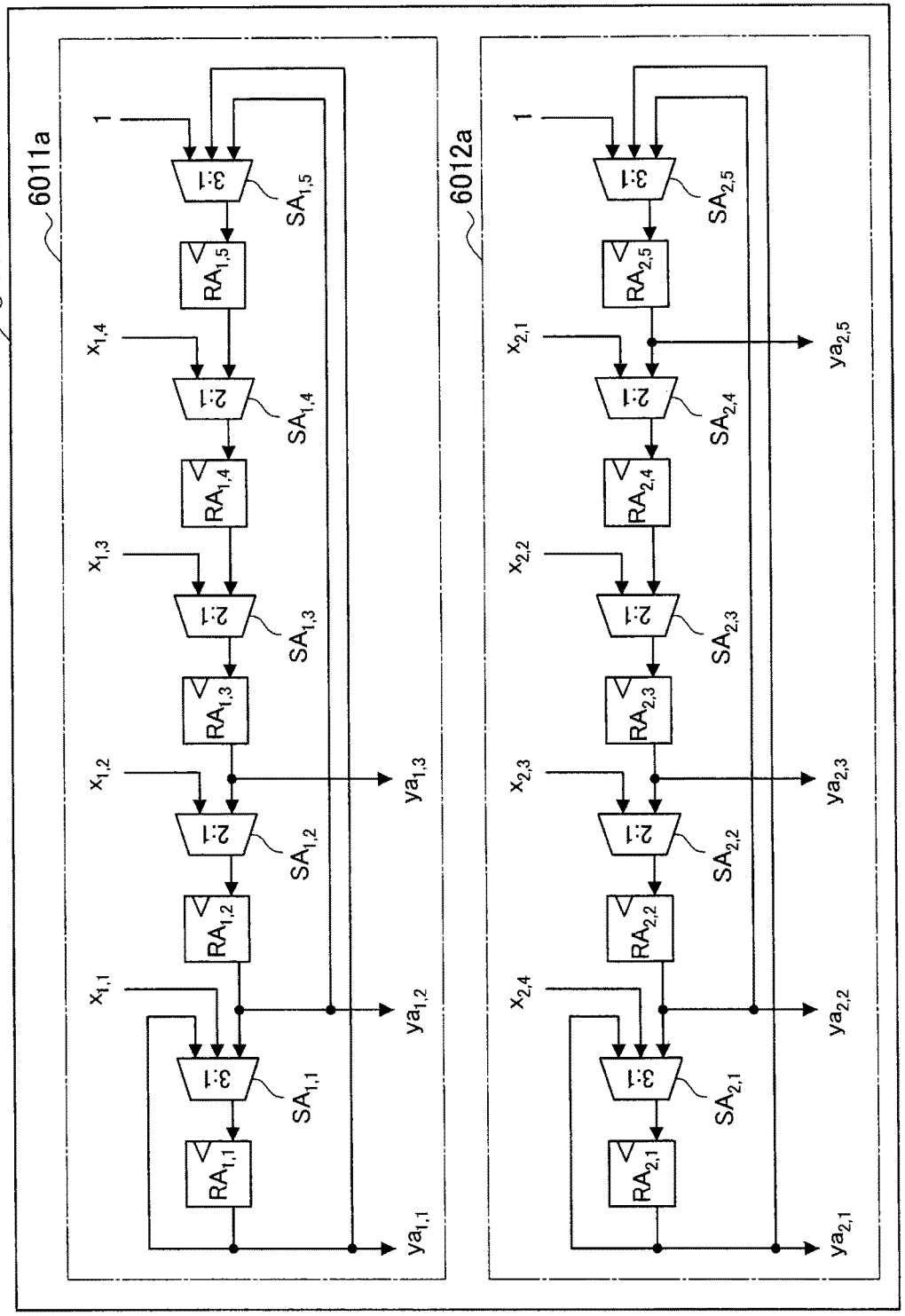
FIG. 54 is an illustrative diagram for describing an operation of the circuit that executes calculation of a multivariate polynomial (Embodiment #3).
Figure 55:
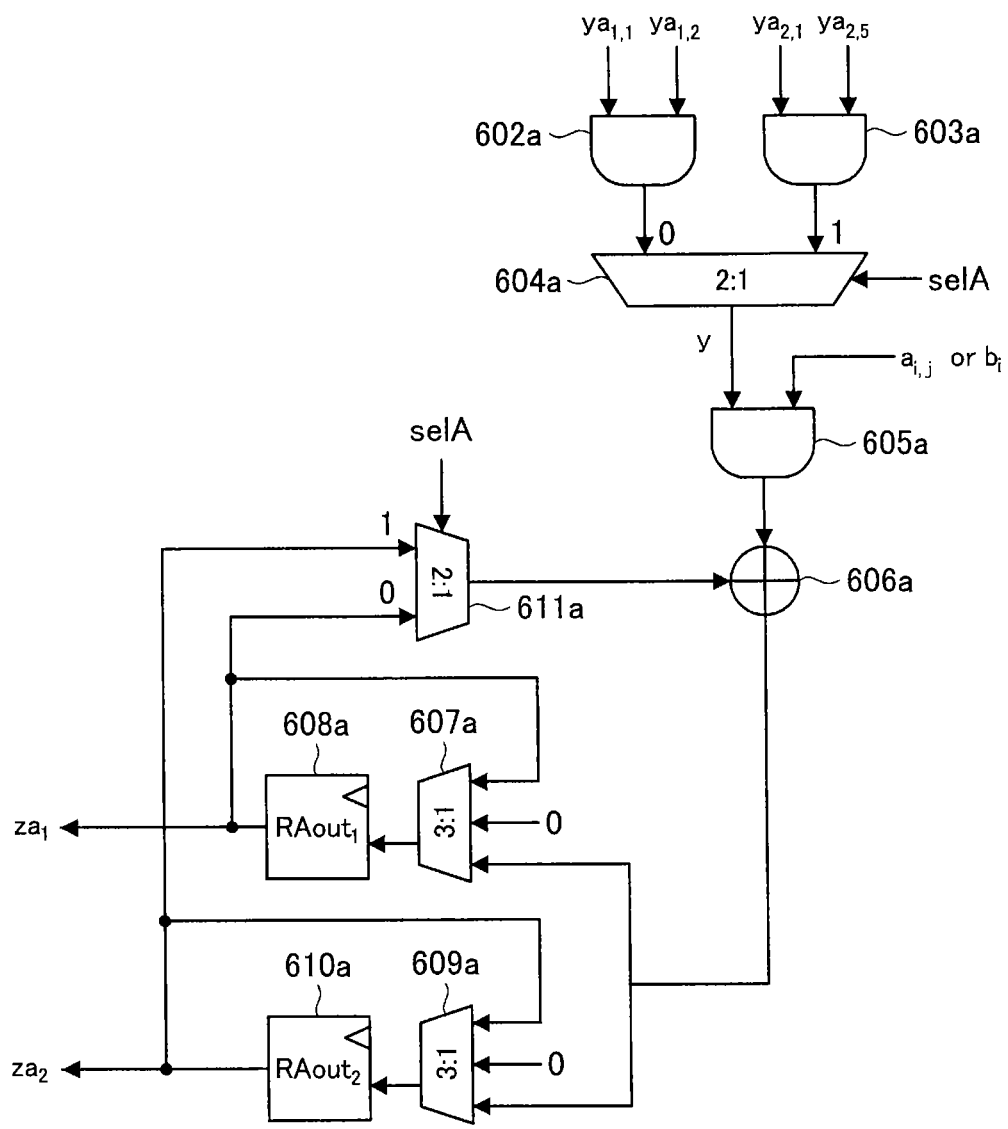
FIG. 55 is an illustrative diagram for describing an operation of the circuit that executes calculation of a multivariate polynomial (Embodiment #3).

FIGS. 54 and 55 are illustrative diagrams showing a circuit configuration of the arithmetic operation circuit 600a. As shown in FIGS. 54 and 55, the arithmetic operation circuit 600a is constituted by a shift register 601a, AND circuits 602a and 603a, a selector 604a, an AND circuit 605a, an XOR circuit 606a, selectors 607a and 609a, registers 608a and 610a, and a selector 611a. In addition, the shift register 601a includes a first shift register 6011a and a second shift register 6012a.

Configurations of the first shift register 6011a and the second shift register 6012a are substantially the same as those of the first shift register 4011 and the second shift register 4012 shown in FIG. 35 except for the difference in combinations of registers that output values. However, the first shift register 6011a and the second shift register 6012a are operated in association with each other in the same cycles.

As shown in FIG. 54, the first shift register 6011a is constituted by registers $RA_{1,1}$, $RA_{1,2}$, $RA_{1,3}$, $RA_{1,4}$, and $RA_{1,5}$, and selectors $SA_{1,1}$, $SA_{1,2}$, $SA_{1,3}$, $SA_{1,4}$, and $SA_{1,5}$. In addition, the first shift register 6011a is configured to output stored values from the registers $RA_{1,1}$, $RA_{1,2}$, and $RA_{1,3}$. Likewise, the second shift register 6012a is constituted by registers $RA_{2,1}$, $RA_{2,2}$, $RA_{2,3}$, $RA_{2,4}$, and $RA_{2,5}$, and selectors $SA_{2,1}$, $SA_{2,2}$, $SA_{2,3}$, $SA_{2,4}$, and $SA_{2,5}$. However, the second shift register 6012a is configured to output stored values from the registers $RA_{2,1}$, $RA_{2,2}$, $RA_{2,3}$, and $RA_{2,5}$.

Values $ya_{1,1}$, $ya_{1,2}$, and $ya_{1,3}$ output from the first shift register 6011a are input to the arithmetic operation circuit 600b provided in the later stage. In addition, the values $ya_{1,1}$ and $ya_{1,2}$ output from the first shift register 6011a are input to the AND circuit 602a as shown in FIG. 55. In the same manner, values $ya_{2,1}$, $ya_{2,2}$, $ya_{2,3}$, and $ya_{2,5}$ output from the second shift register 6012a are input to the arithmetic operation circuit 600b provided in the later stage. In addition, the values $ya_{2,1}$ and $ya_{2,5}$ output from the second shift register 6012a are input to the AND circuit 603a. In addition, the AND circuit 602a computes the logical AND of the input values $ya_{1,1}$ and $ya_{1,2}$ and inputs the computation result to the selector 604a. In the same manner, the AND circuit 603a computes the logical AND of the input values $ya_{2,1}$ and $ya_{2,5}$ and inputs the computation result to the selector 604a. The selector 604a selects one value from the two input values and inputs the selection result to the AND circuit 605a.

Coefficients $a_{ij}$ and $b_i$ and the output value of the selector 604a are input to the AND circuit 605a. Then, the AND circuit 605a computes the logical AND of the input output value and the coefficients, and then inputs the computation result to the XOR circuit 606a. The output value of the AND circuit 605a and the output value of the selector 611a that will be described later are input to the XOR circuit 606a. The XOR circuit 606a performs an exclusive-OR operation for the two input values, and then inputs the arithmetic operation result to the selectors 607a and 609a. Note that the arithmetic operation result is stored in the register 608a or the register 610a according to states of the selectors 607a and 609a. In addition, either stored value of the register 608a or 610a is input to the XOR circuit 606a or output from the arithmetic operation circuit 600a as arithmetic operation results $za_1$ and $za_2$ according to a state of the selector 611a. The values $za_1$ and $za_2$ from the registers 608a and 610a are input to the arithmetic operation circuit 600b provided in the later stage.

Note that the selectors 604a and 611a select and output one of the input values according to the value of selA that will be described later.

Figure 56:
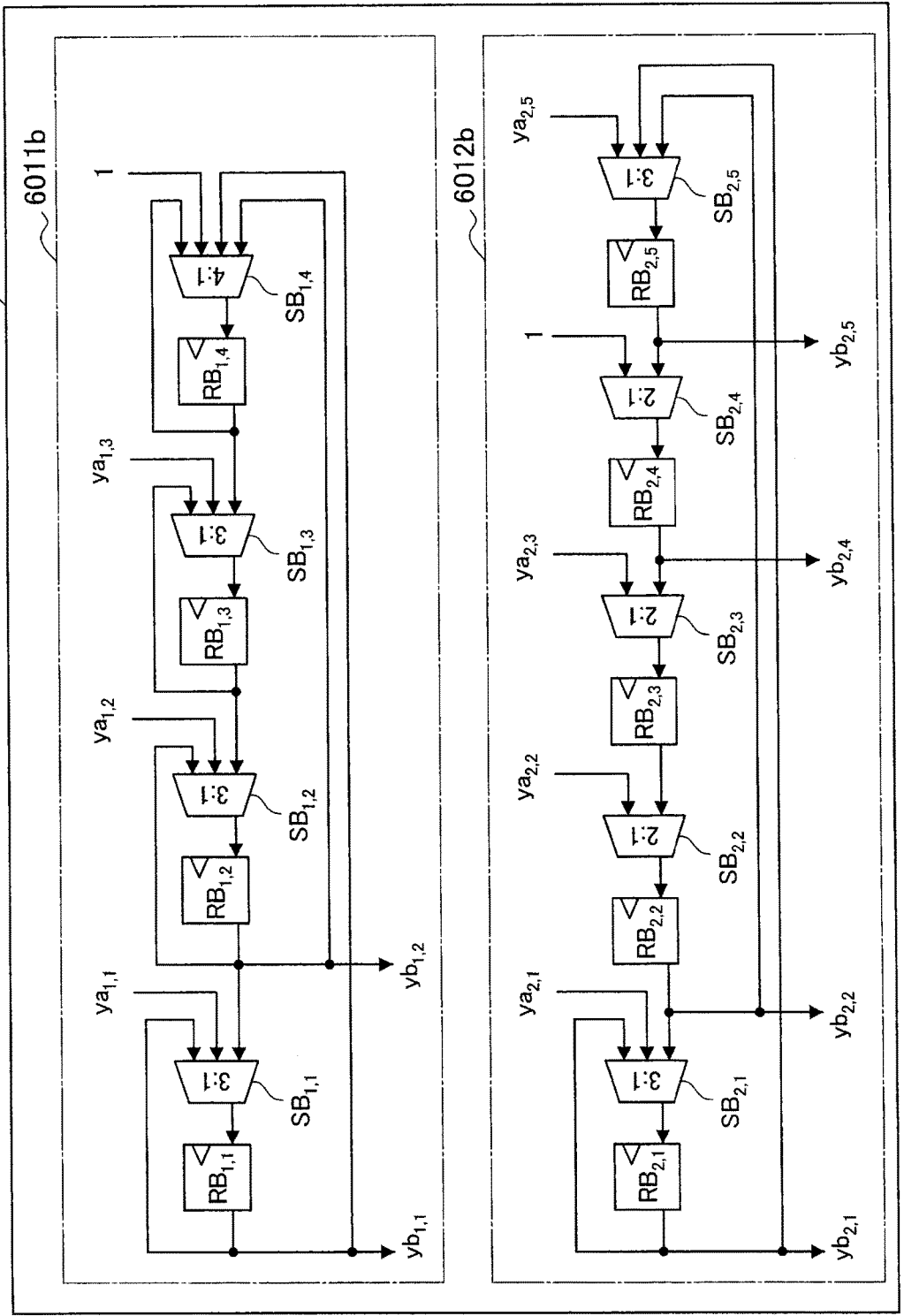
FIG. 56 is an illustrative diagram for describing an operation of the circuit that executes calculation of a multivariate polynomial (Embodiment #3).
Figure 57:
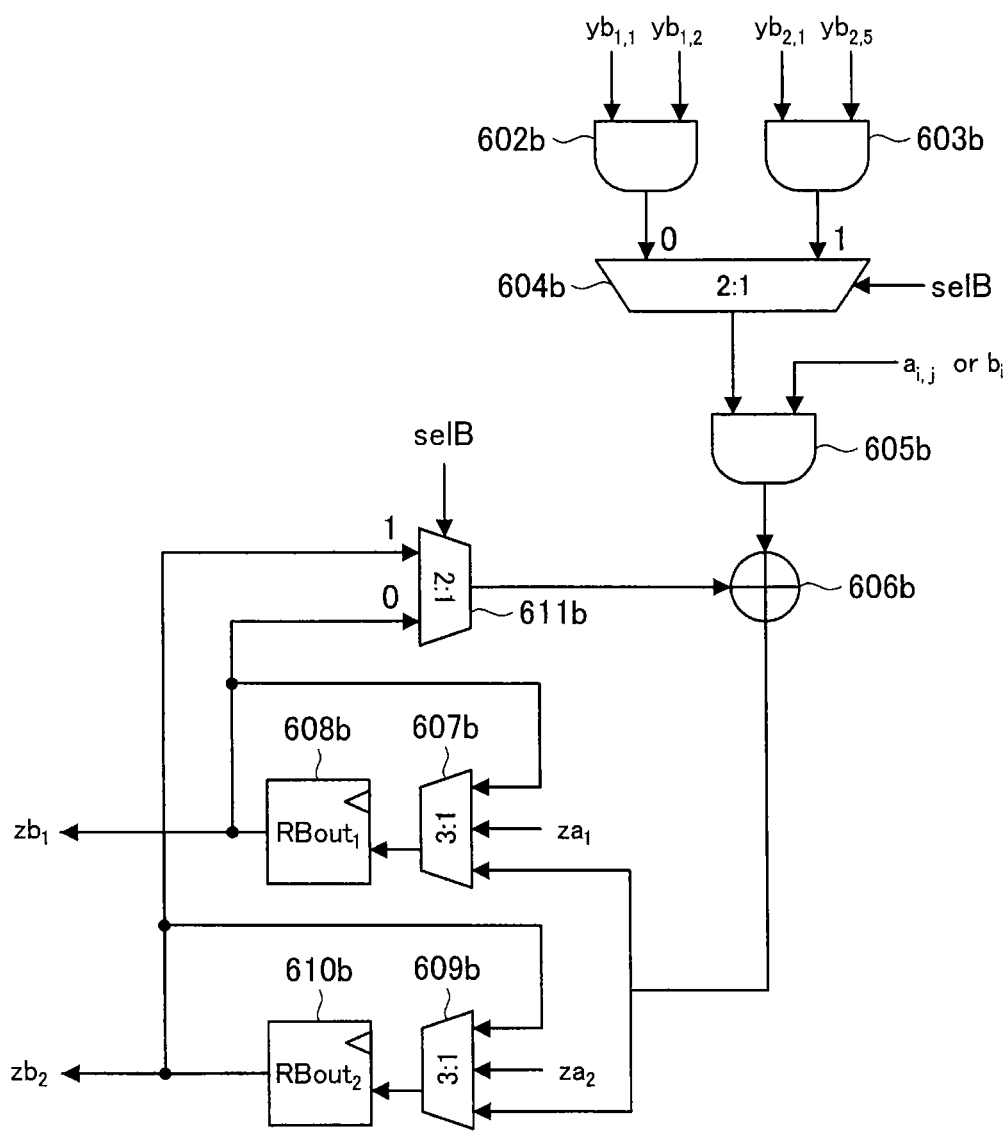
FIG. 57 is an illustrative diagram for describing an operation of the circuit that executes calculation of a multivariate polynomial (Embodiment #3).

FIGS. 56 and 57 are illustrative diagrams showing a circuit configuration of the arithmetic operation circuit 600b. As shown in FIGS. 56 and 57, the arithmetic operation circuit 600b is constituted by a shift register 601b, AND circuits 602b and 603b, a selector 604b, an AND circuit 605b, an XOR circuit 606b, selectors 607b and 609b, registers 608b and 610b, and a selector 611b. In addition, the shift register 601b includes a first shift register 6011b and a second shift register 6012b.

A configuration of the first shift register 6011b has one less register than the configuration of the first shift register 6011a shown in FIG. 54. A configuration of the second shift register 6012b is substantially the same as that of the second shift register 6012a shown in FIG. 54 except that combinations of the registers that output values are different. However, the first shift register 6011b and the second shift register 6012b are operated in association with each other in the same cycles.

As shown in FIG. 56, the first shift register 6011b is constituted by registers $RB_{1,1}$, $RB_{1,2}$, $RB_{1,3}$, and $RB_{1,4}$, and selectors $SB_{1,1}$, $SB_{1,2}$, $SB_{1,3}$, and $SB_{1,4}$. In addition, the first shift register 6011b is configured to output stored values from the registers $RB_{1,1}$, and $RB_{1,2}$. Likewise, the second shift register 6012b is constituted by registers $RB_{2,1}$, $RB_{2,2}$, $RB_{2,3}$, $RB_{2,4}$, and $RB_{2,5}$, and selectors $SB_{2,1}$, $SB_{2,2}$, $SB_{2,3}$, $SB_{2,4}$, and $SB_{2,5}$. However, the second shift register 6012b is configured to output stored values from the registers $RB_{2,1}$, $RB_{2,2}$, $RB_{2,4}$, and $RB_{2,5}$.

Values $yb_{1,1}$, and $yb_{1,2}$ output from the first shift register 6011b are input to the arithmetic operation circuit 600c provided in the later stage. In addition, the values $yb_{1,1}$, and $yb_{1,2}$ output from the first shift register 6011b are input to the AND circuit 602b as shown in FIG. 57. In the same manner, values $yb_{2,1}$, $yb_{2,2}$, $yb_{2,4}$, and $yb_{2,5}$ output from the second shift register 6012b are input to the arithmetic operation circuit 600c provided in the later stage. In addition, the values $yb_{2,1}$ and $yb_{2,5}$ output from the second shift register 6012b are input to the AND circuit 603b. In addition, the AND circuit 602b computes the logical AND of the input values $yb_{1,1}$ and $yb_{1,2}$ and inputs the computation result to the selector 604b. In the same manner, the AND circuit 603b computes the logical AND of the input values $yb_{2,1}$ and $yb_{2,5}$ and inputs the computation result to the selector 604b. The selector 604b selects one value from the two input values and inputs the selection result to the AND circuit 605b.

The coefficients $a_{ij}$ and $b_i$ and the output value of the selector 604b are input to the AND circuit 605b. Then, the AND circuit 605b computes the logical AND of the input output value and the coefficients, and then inputs the computation result to the XOR circuit 606b. The output value of the AND circuit 605b and the output value of the selector 611b that will be described later are input to the XOR circuit 606b. The XOR circuit 606b performs an exclusive-OR operation for the two input values, and then inputs the arithmetic operation result to the selectors 607b and 609a. Note that the arithmetic operation result is stored in the register 608b or the register 610b according to states of the selectors 607b and 609b. In addition, either stored value of the register 608b or 610b is input to the XOR circuit 606b or output from the arithmetic operation circuit as arithmetic operation results $zb_1$ and $zb_2$ according to a state of the selector 611b. The values $zb_1$ and $zb_2$ from the registers 608b and 610b are input to the arithmetic operation circuit 600c provided in the later stage.

Note that the selectors 604b and 611b select and output one of the input values according to the value of selB that will be described later. In addition, the selector 607b selects and outputs one of the output of the XOR circuit 606b, the value $za_1$ supplied from the arithmetic operation circuit 600a, and the output of the register 608b. Likewise, the selector 609b selects and outputs one of the output of the XOR circuit 606b, the value $za_2$ supplied from the arithmetic operation circuit 600a, and the output of the register 610b.

Figure 58:
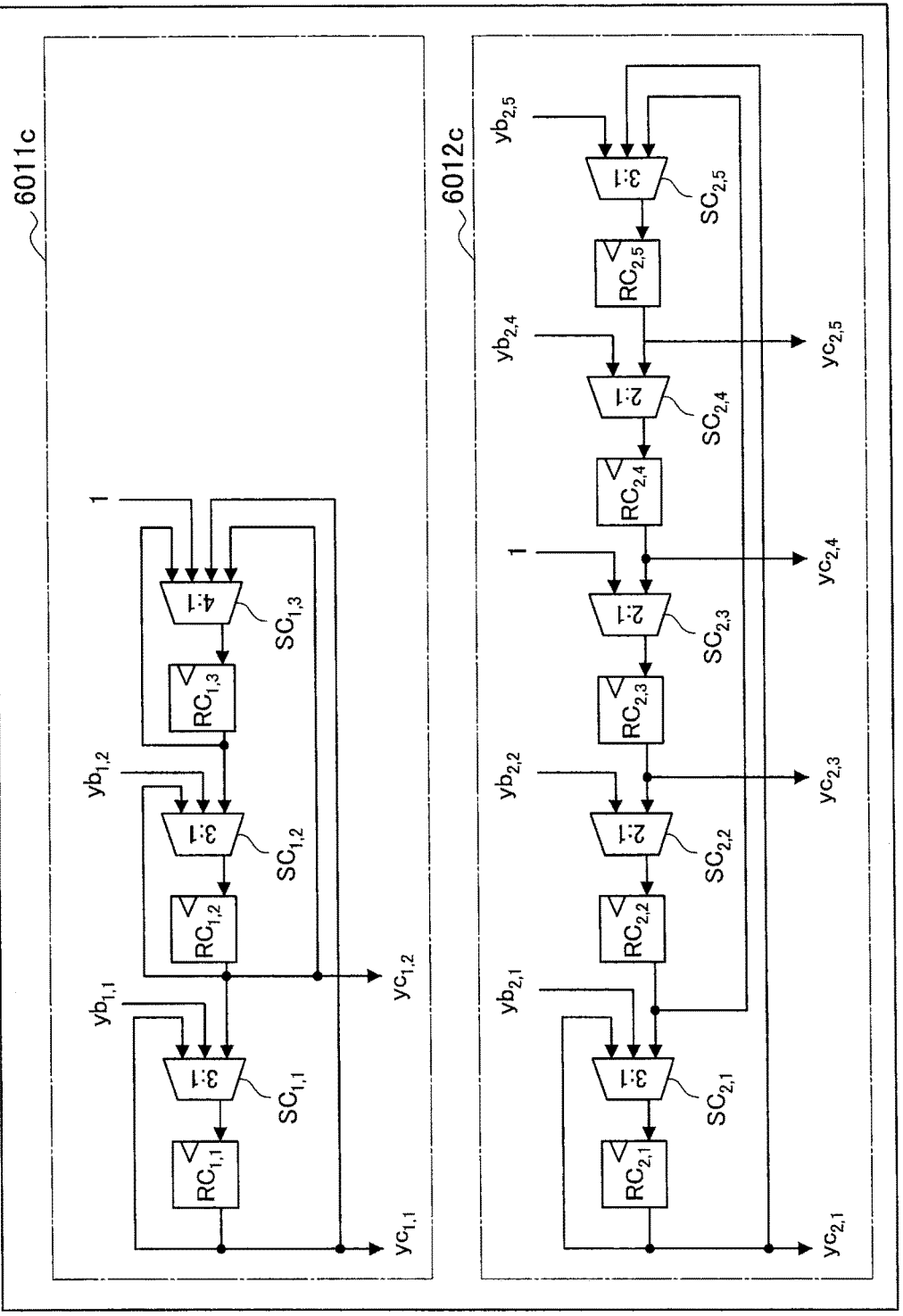
FIG. 58 is an illustrative diagram for describing an operation of the circuit that executes calculation of a multivariate polynomial (Embodiment #3).
Figure 59:
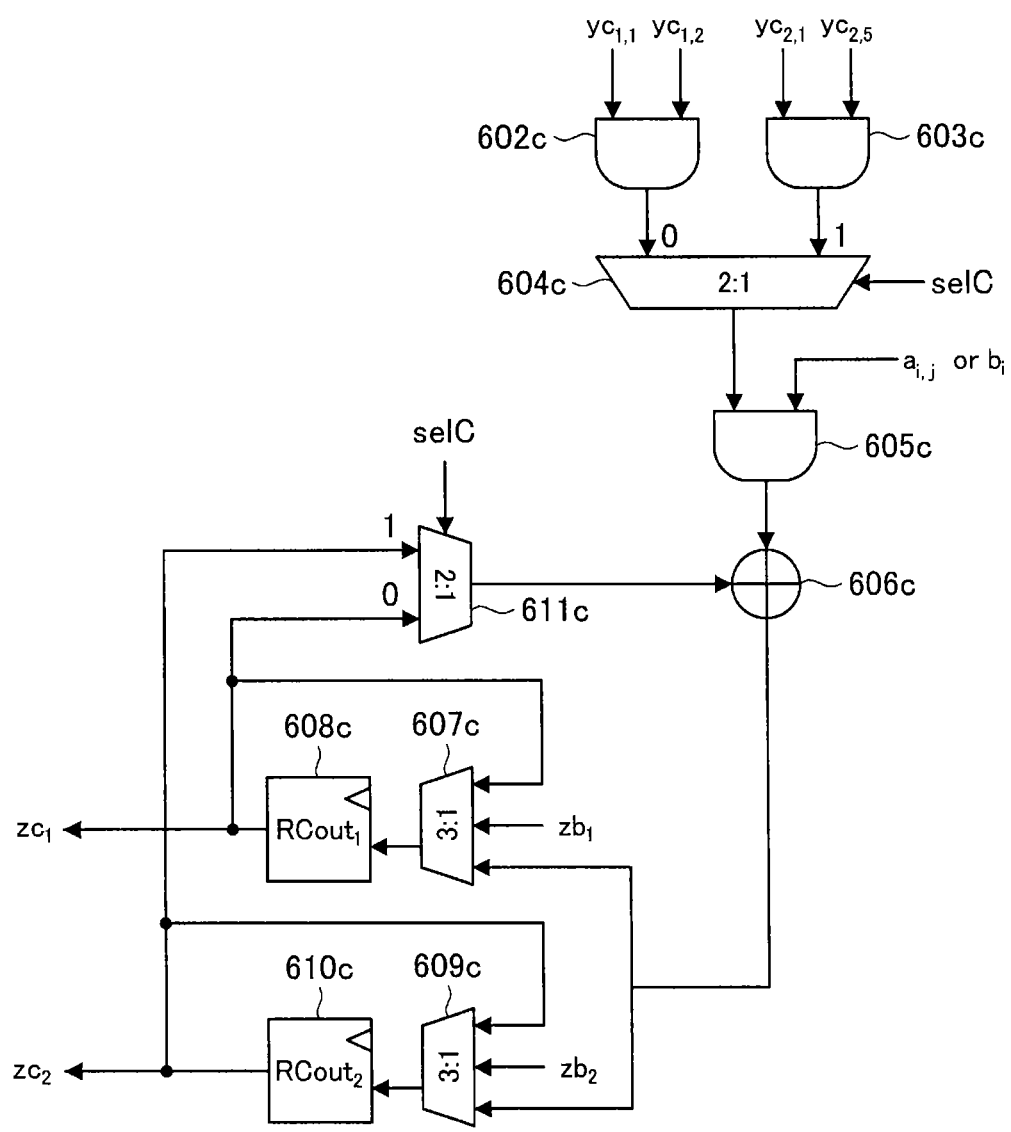
FIG. 59 is an illustrative diagram for describing an operation of the circuit that executes calculation of a multivariate polynomial (Embodiment #3).

FIGS. 58 and 59 are illustrative diagrams showing a circuit configuration of the arithmetic operation circuit 600c. As shown in FIGS. 58 and 59, the arithmetic operation circuit 600c is constituted by a shift register 601c, AND circuits 602c and 603c, a selector 604c, an AND circuit 605c, an XOR circuit 606c, selectors 607c and 609c, registers 608c and 610c, and a selector 611c. In addition, the shift register 601c includes a first shift register 6011c and a second shift register 6012c.

A configuration of the first shift register 6011c has one less register than the configuration of the first shift register 6011b shown in FIG. 56. A configuration of the second shift register 6012c is substantially the same as that of the second shift register 6012a shown in FIG. 54 except that combinations of the registers that output values are different. However, the first shift register 6011c and the second shift register 6012c are operated in association with each other in the same cycles.

As shown in FIG. 58, the first shift register 6011c is constituted by registers $RC_{1,1}$, $RC_{1,2}$, and $RC_{1,3}$, and selectors $SC_{1,1}$, $SC_{1,2}$, and $SC_{1,3}$. In addition, the first shift register 6011c is configured to output stored values from the registers $RC_{1,1}$, and $RC_{1,2}$. Likewise, the second shift register 6012c is constituted by registers $RC_{2,1}$, $RC_{2,2}$, $RC_{2,3}$, $RC_{2,4}$, and $RC_{2,5}$, and selectors $SC_{2,1}$, $SC_{2,2}$, $SC_{2,3}$, $SC_{2,4}$, and $SC_{2,5}$. However, the second shift register 6012c is configured to output stored values from the registers $RC_{2,1}$, $RC_{2,3}$, $RC_{2,4}$, and $RC_{2,5}$.

A value $yc_{1,1}$ output from the first shift register 6011c is input to the arithmetic operation circuit 600d provided in the later stage. In addition, the values $yc_{1,1}$, and $yc_{1,2}$ output from the first shift register 6011c are input to the AND circuit 602c as shown in FIG. 59. In the same manner, values yc$_{2,1}$, yc$_{2,3}$, yc$_{2,4}$, and yc$_{2,5}$ output from the second shift register 6012c are input to the arithmetic operation circuit 600d provided in the later stage. In addition, the values yc$_{2,1}$ and yc$_{2,5}$ output from the second shift register 6012c are input to the AND circuit 603c. In addition, the AND circuit 602c computes the logical AND of the input values yc$_{2,1}$ and yc$_{1,2}$ and inputs the computation result to the selector 604c. In the same manner, the AND circuit 603c computes the logical AND of the input values yc$_{2,1}$ and yc$_{2,5}$ and inputs the computation result to the selector 604c. The selector 604c selects one value from the two input values and inputs the selection result to the AND circuit 605c.

The coefficients a$_{ij}$ and b$_i$ and the output value of the selector 604c are input to the AND circuit 605c. Then, the AND circuit 605c computes the logical AND of the input output value and the coefficients, and then inputs the computation result to the XOR circuit 606c. The output value of the AND circuit 605c and the output value of the selector 611c that will be described later are input to the XOR circuit 606c. The XOR circuit 606c performs an exclusive-OR operation for the two input values, and then inputs the arithmetic operation result to the selectors 607c and 609c. Note that the arithmetic operation result is stored in the register 608c or the register 610c according to states of the selectors 607c and 609c. In addition, either stored value of the register 608c or 610c is input to the XOR circuit 606c or output from the arithmetic operation circuit as arithmetic operation results zc$_1$ and zc$_2$ according to a state of the selector 611c. The values zc$_1$ and zc$_2$ from the registers 608c and 610c are input to the arithmetic operation circuit 600d provided in the later stage.

Note that the selectors 604c and 611c select and output one of the input values according to the value of selC that will be described later. In addition, the selector 607c selects and outputs one of the output of the XOR circuit 606c, the value zb$_1$ supplied from the arithmetic operation circuit 600b, and the output of the register 608c. Likewise, the selector 609c selects and outputs one of the output of the XOR circuit 606c, the value zb$_2$ supplied from the arithmetic operation circuit 600b, and the output of the register 610c.

Figure 60:
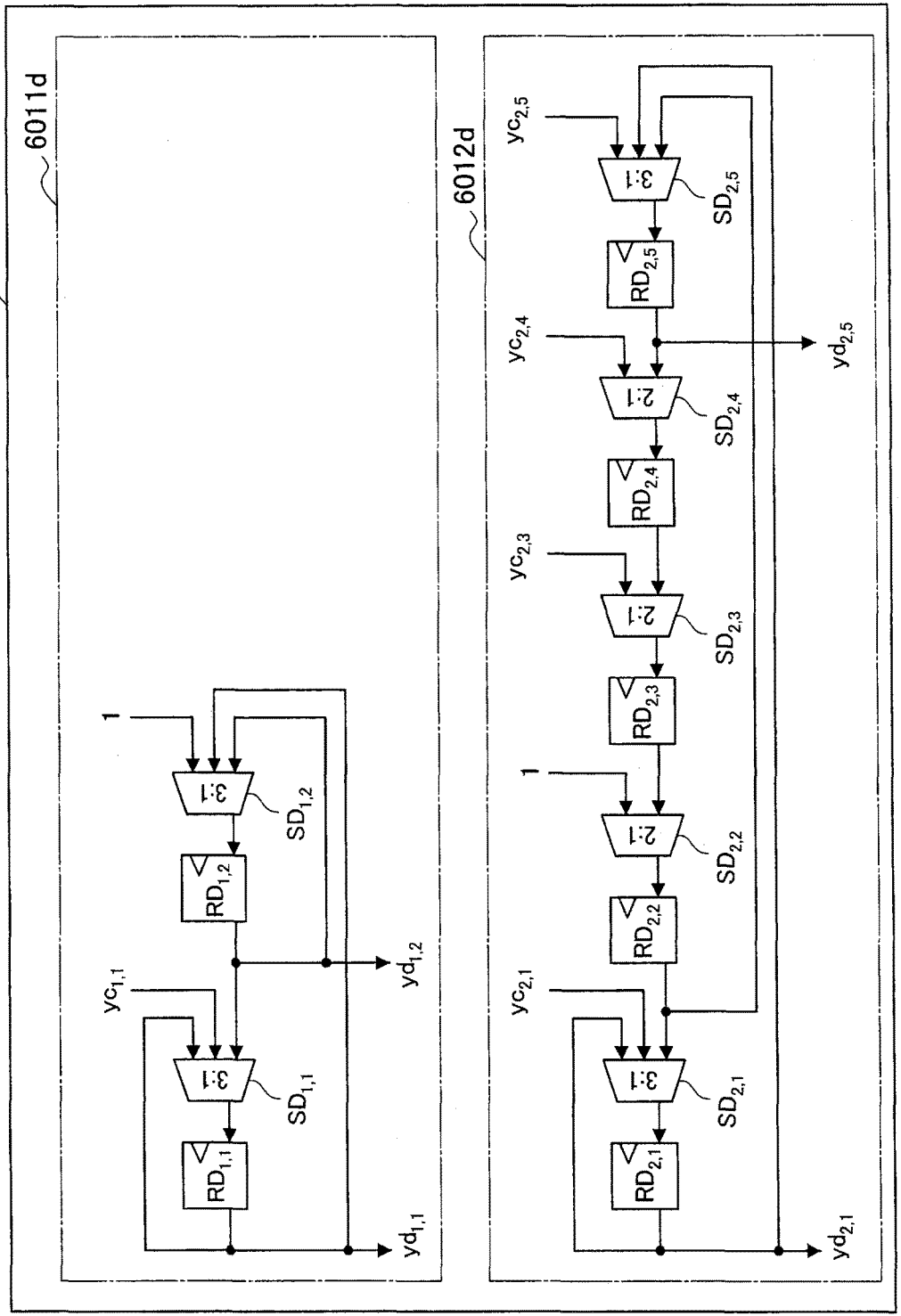
FIG. 60 is an illustrative diagram for describing an operation of the circuit that executes calculation of a multivariate polynomial (Embodiment #3).
Figure 61:
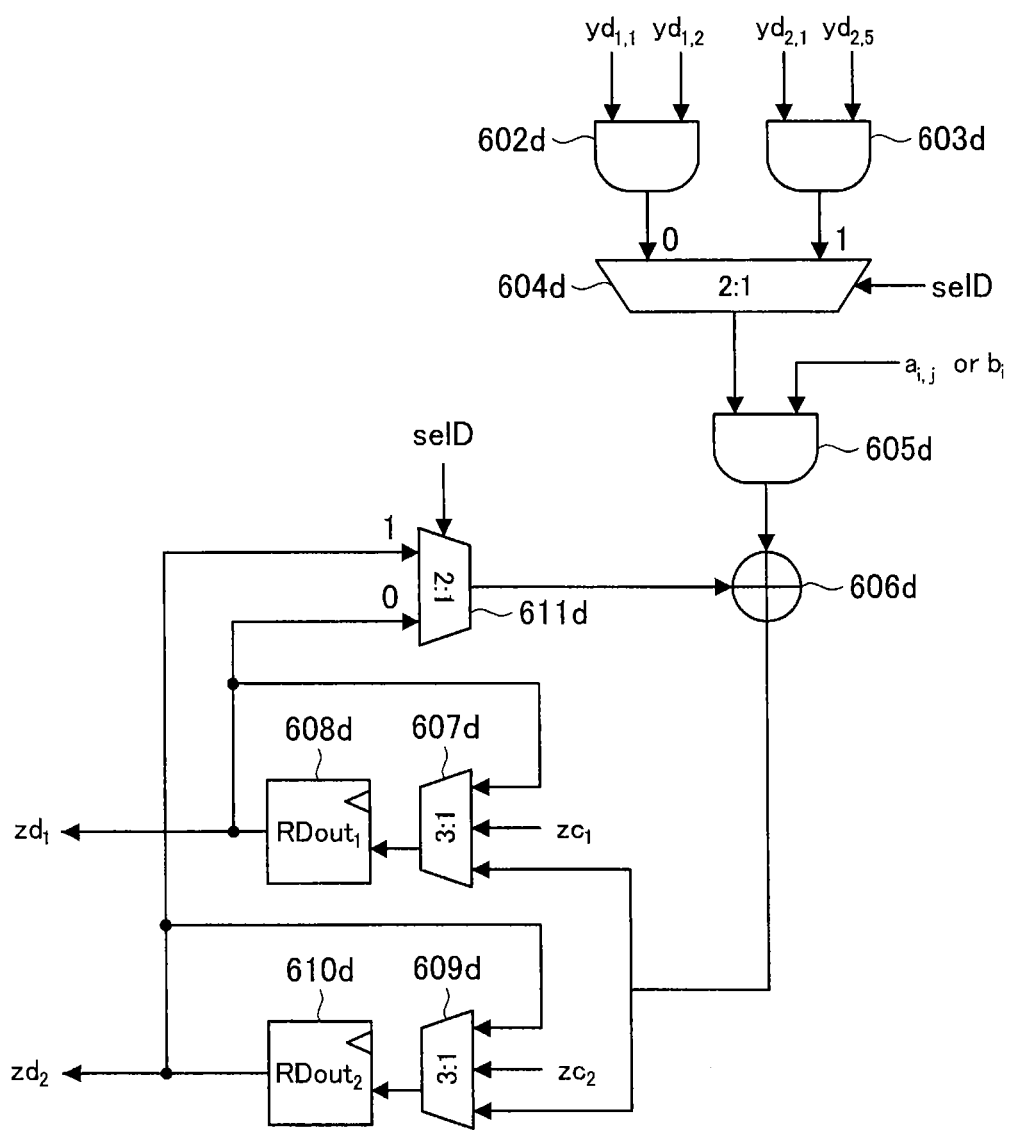
FIG. 61 is an illustrative diagram for describing an operation of the circuit that executes calculation of a multivariate polynomial (Embodiment #3).

FIGS. 60 and 61 are illustrative diagrams showing a circuit configuration of the arithmetic operation circuit 600d. As shown in FIGS. 60 and 62, the arithmetic operation circuit 600d is constituted by a shift register 601d, AND circuits 602d and 603d, a selector 604d, an AND circuit 605d, an XOR circuit 606d, selectors 607d and 609d, registers 608d and 610d, and a selector 611d. In addition, the shift register 601d includes a first shift register 6011d and a second shift register 6012d.

A configuration of the first shift register 6011d has one less register than the configuration of the first shift register 6011c shown in FIG. 58. A configuration of the second shift register 6012d is substantially the same as that of the second shift register 6012a shown in FIG. 54 except that combinations of the registers that output values are different. However, the first shift register 6011d and the second shift register 6012d are operated in association with each other in the same cycles.

As shown in FIG. 60, the first shift register 6011d is constituted by registers RD$_{1,1}$, and RD$_{1,2}$, and selectors SD$_{1,1}$, and SD$_{1,2}$. In addition, the first shift register 6011d is configured to output stored values from the registers RD$_{1,1}$, and RD$_{1,2}$. Likewise, the second shift register 6012d is constituted by registers RD$_{2,1}$, RD$_{2,2}$, RD$_{2,3}$, RD$_{2,4}$, and RD$_{2,5}$, and selectors SD$_{2,1}$, SD$_{2,2}$, SD$_{2,3}$, SD$_{2,4}$, and SD$_{2,5}$.

However, the second shift register 6012d is configured to output stored values from the registers RD$_{2,1}$, and RD$_{2,5}$.

Values yd$_{1,1}$ and yd$_{1,2}$ output from the first shift register 6011d are input to the AND circuit 602d as shown in FIG. 61. In addition, the values yd$_{2,1}$, and yd$_{2,5}$ output from the second shift register 6012d are input to the AND circuit 603d. In addition, the AND circuit 602d computes the logical AND of the input values yd$_{1,1}$ and yd$_{1,2}$ and then inputs the computation result to the selector 604d. In the same manner, the AND circuit 603d computes the logical AND of the input values yd$_{2,1}$, and yd$_{2,5}$ and then inputs the computation result to the selector 604d. The selector 604d selects one value from the two input values and inputs the selection result to the AND circuit 605d.

The coefficients a$_{ij}$ and b$_i$ and the output value of the selector 604d are input to the AND circuit 605d. Then, the AND circuit 605d computes the logical AND of the input output value and the coefficients, and then inputs the computation result to the XOR circuit 606d. The output value of the AND circuit 605d and the output value of the selector 611d that will be described later are input to the XOR circuit 606d. The XOR circuit 606d performs an exclusive-OR operation for the two input values, and then inputs the arithmetic operation result to the selectors 607d and 609d. Note that the arithmetic operation result is stored in the register 608d or the register 610d according to states of the selectors 607d and 609d. In addition, either stored value of the register 608d or 610d is input to the XOR circuit 606d or output from the arithmetic operation circuit as arithmetic operation results zd$_1$ and zd$_2$ according to a state of the selector 611d. The values zd$_1$ and zd$_2$ from the registers 608d and 610d respectively correspond to f(x$_1$) and f(x$_2$).

Note that the selectors 604d and 611d select and output one of the input values according to the value of selD that will be described later. In addition, the selector 607d selects and outputs one of the output of the XOR circuit 606d, the value zc$_1$ supplied from the arithmetic operation circuit 600c, and the output of the register 608d. Likewise, the selector 609d selects and outputs one of the output of the XOR circuit 606d, the value zc$_2$ supplied from the arithmetic operation circuit 600c, and the output of the register 610d.

Hereinabove, the configuration of the arithmetic operation circuit according to Embodiment #3 has been described.

(6-7-2: Operation (FIGS. 62 to 65))

Next, an operation of the arithmetic operation circuit according to Embodiment #3 will be described with reference to FIGS. 62 to 65. FIGS. 62 to 65 respectively summarize the stored values of the registers of the arithmetic operation circuits 600a to 600d, the coefficients read from the ROM 690, and the signals supplied to the selectors and the output values from the arithmetic operation circuits 600a to 600d.

Basic operations of the arithmetic operation circuits 600a to 600d are the same as the arithmetic operation circuit according to Embodiment #1. In other words, each of the selectors included in the arithmetic operation circuits 600a to 600d controls storage and rotation of the values. First, the stored values of the registers of the arithmetic operation circuit 600a, the coefficients read from the ROM 690, and the signals supplied to the selectors and the output values from the arithmetic operation circuit 600a will be described using FIG. 62.

Note that $T_{1,i}$ and $T_{2,i}$ shown in FIGS. 62 to 65 respectively indicate the following expressions.

[Math 13]

$$T_{1,i} = \Sigma_{j=i+1}^{4} a_{i,j} x_{1,j} x_{1,j} + b_i x_{1,i} \qquad (16)$$

$$t_{2,i} = \Sigma_{j=i+1}^{4} a_{i,j} x_{2,j} x_{2,j} + b_i x_{2,i} \qquad (17)$$

Thus, $f(x_1)$ and $f(x_2)$ are expressed in the following expressions.

[Math 14]

$$f(x_1) = T_{1,1} + T_{1,2} + T_{1,3} + T_{1,4} \quad (18)$$

$$f(x_2) = T_{2,1} + T_{2,2} + T_{2,3} + T_{2,4} \quad (19)$$

First, in the first cycle number 1 of the arithmetic operation circuit $600a$, the registers of the arithmetic operation circuit $600a$ respectively store values as shown in FIG. 62. In addition, the coefficient $a_{1,2}$ is read from the region $690a$ of the ROM 690. In addition, signals that cause inputs from "0" in FIG. 55 to be output are supplied to the selectors $604a$ and $611a$. As a result, outputs from the registers $608a$ and $610a$ are all 0.

In the cycle number 2, each selector controls such that the values are stored in the registers of the arithmetic operation circuit $600a$ as shown in FIG. 62. In addition, the coefficient $a_{1,3}$ is read from the region $690a$ of the ROM 690. In addition, the signals that cause inputs from "0" in FIG. 55 to be output are supplied to the selectors $604a$ and $611a$. As a result, the output from the register $608a$ is $a_{1,2}x_{1,1}x_{1,2}$ and the output from the register $610a$ is 0.

In the cycle number 3, each selector controls such that the values are stored in the registers of the arithmetic operation circuit $600a$ as shown in FIG. 62. In addition, the coefficient $a_{1,4}$ is read from the region $690a$ of the ROM 690. In addition, the signals that cause inputs from "0" in FIG. 55 to be output are supplied to the selectors $604a$ and $611a$. As a result, the output from the register $608a$ is $a_{1,2}x_{1,1}x_{1,2} + a_{1,3}x_{1,1}x_{1,3}$ and the output from the register $610a$ is 0.

In the cycle number 4, each selector controls such that the values are stored in the registers of the arithmetic operation circuit $600a$ as shown in FIG. 62. In addition, the coefficient $b_1$ is read from the region $690a$ of the ROM 690. In addition, the signals that cause inputs from "0" in FIG. 55 to be output are supplied to the selectors $604a$ and $611a$. As a result, the output from the register $608a$ is $a_{1,2}x_{1,1}x_{1,2} + a_{1,3}x_{1,1}x_{1,3} + a_{1,4}x_{1,1}x_{1,4}$ and the output from the register $610a$ is 0.

In the cycle number 5, each selector controls such that the values are stored in the registers of the arithmetic operation circuit $600a$ as shown in FIG. 62. In addition, the coefficient $b_4$ is read from the region $690a$ of the ROM 690. In addition, the signals that cause inputs from "1" in FIG. 55 to be output are supplied to the selectors $604a$ and $611a$. As a result, the output from the register $608a$ is $a_{1,2}x_{1,1}x_{1,2} + a_{1,3}x_{1,1}x_{1,3} + a_{1,4}x_{1,1}x_{1,4} + b_1x_{1,1} = T_{1,1}$ and the output from the register $610a$ is 0.

In the cycle number 6, each selector controls such that the values are stored in the registers of the arithmetic operation circuit $600a$ as shown in FIG. 62. As a result, the output from the register $608a$ is $T_{1,1}$ and the output from the register $610a$ is $b_4x_{2,4} = T_{2,4}$.

The arithmetic operation circuit $600a$ outputs the arithmetic operation results to the arithmetic operation circuit $600b$ by repeating the cycles numbers 1 to 6. When the cycle number 6 is completed, the arithmetic operation circuit $600a$ executes the same arithmetic operation process for the next $x_1$ and $x_2$.

Next, the stored values of the registers of the arithmetic operation circuit $600b$, the coefficients read from the ROM 690, and signals supplied to the selectors and the output values from the arithmetic operation circuit $600b$ will be described using FIG. 63. Note that the stored values of the registers of the arithmetic operation circuit $600b$ shown in FIG. 63 have been supplied to the arithmetic operation circuit $600b$ after the arithmetic operation circuit $600a$ executed rotation including the cycles numbers 1 to 6.

First, in the first cycle number 1 of the arithmetic operation circuit $600b$, the registers of the arithmetic operation circuit $600b$ respectively store values as shown in FIG. 63. In addition, the coefficient $a_{2,3}$ is read from the region $690b$ of the ROM 690. In addition, the signals that cause inputs from "0" in FIG. 57 to be output are supplied to the selectors $604b$ and $611b$. As a result, the output from the register $608b$ is $T_{1,1}$ (=the output $za_1$ of the arithmetic operation circuit $600a$) and the output from the register $610b$ is $T_{2,4}$ (=the output $za_2$ of the arithmetic operation circuit $600a$).

In the cycle number 2, each selector controls such that the values are stored in the registers of the arithmetic operation circuit $600b$ as shown in FIG. 63. In addition, the coefficient $a_{2,4}$ is read from the region $690b$ of the ROM 690. In addition, the signals that cause inputs from "0" in FIG. 57 to be output are supplied to the selectors $604b$ and $611b$. As a result, the output from the register $608b$ is $T_{1,1} + a_{2,3}x_{1,2}x_{1,3}$ and the output from the register $610b$ is $T_{2,4}$.

In the cycle number 3, each selector controls such that the values are stored in the registers of the arithmetic operation circuit $600b$ as shown in FIG. 63. In addition, the coefficient $b_2$ is read from the region $690b$ of the ROM 690. In addition, the signals that cause inputs from "0" in FIG. 57 to be output are supplied to the selectors $604b$ and $611b$. As a result, the output from the register $608b$ is $T_{1,1} + a_{2,3}x_{1,2}x_{1,3} + a_{2,4}x_{1,2}x_{1,4}$ and the output from the register $610b$ is $T_{2,4}$.

In the cycle number 4, each selector controls such that the values are stored in the registers of the arithmetic operation circuit $600b$ as shown in FIG. 63. In addition, the coefficient $b_3$ is read from the region $690b$ of the ROM 690. In addition, the signals that cause inputs from "1" in FIG. 57 to be output are supplied to the selectors $604b$ and $611b$. As a result, the output from the register $608b$ is $T_{1,1} + a_{2,3}x_{1,2}x_{1,3} + a_{2,4}x_{1,2}x_{1,4} + b_2x_{1,2} = T_{1,1} + T_{1,2}$ and the output from the register $610b$ is $T_{2,4}$.

In the cycle number 5, each selector controls such that the values are stored in the registers of the arithmetic operation circuit $600b$ as shown in FIG. 63. In addition, the coefficient $a_{3,4}$ is read from the region $690b$ of the ROM 690. In addition, the signals that cause inputs from "1" in FIG. 57 to be output are supplied to the selectors $604b$ and $611b$. As a result, the output from the register $608b$ is $T_{1,1} + T_{1,2}$ and the output from the register $610b$ is $T_{2,4} + b_3x_{2,3}$.

In the cycle number 6, each selector controls such that the values are stored in the registers of the arithmetic operation circuit $600b$ as shown in FIG. 63. As a result, the output from the register $608b$ is $T_{1,1} + T_{1,2}$ and the output from the register $610b$ is $T_{2,4} + b_3x_{2,3} + a_{3,4}x_{2,3}x_{2,4} = T_{2,4} + T_{2,3}$.

The arithmetic operation circuit $600b$ outputs the arithmetic operation results to the arithmetic operation circuit $600c$ by repeating the cycles numbers 1 to 6. When the cycle number 6 is completed, the arithmetic operation circuit $600b$ executes the same arithmetic operation process for the next $x_1$ and $x_2$.

Next, the stored values of the registers of the arithmetic operation circuit $600c$, the coefficients read from the ROM 690, and signals supplied to the selectors and the output values from the arithmetic operation circuit $600c$ will be described using FIG. 64. Note that the stored values of the registers of the arithmetic operation circuit $600c$ shown in FIG. 64 have been supplied to the arithmetic operation circuit $600c$ after the arithmetic operation circuit $600b$ executed rotation including the cycles numbers 1 to 6.

First, in the first cycle number 1 of the arithmetic operation circuit $600c$, the registers of the arithmetic operation circuit 600c respectively store values as shown in FIG. 64. In addition, the coefficient $a_{3,4}$ is read from the region 690b of the ROM 690. In addition, the signals that cause inputs from "0" in FIG. 59 to be output are supplied to the selectors 604c and 611c. As a result, the output from the register 608c is $T_{1,1}+T_{1,2}$ (=the output $zb_1$ of the arithmetic operation circuit 600b) and the output from the register 610c is $T_{2,4}+T_{2,3}$ (=the output $zb_2$ of the arithmetic operation circuit 600b).

In the cycle number 2, each selector controls such that the values are stored in the registers of the arithmetic operation circuit 600c as shown in FIG. 64. In addition, the coefficient $b_3$ is read from the region 690b of the ROM 690. In addition, the signals that cause inputs from "0" in FIG. 59 to be output are supplied to the selectors 604c and 611c. As a result, the output from the register 608c is $T_{1,1}+T_{1,2}+a_{3,4}a_{3,4}x_{1,3}x_{1,4}$ and the output from the register 610c is $T_{2,4}+T_{2,3}$.

In the cycle number 3, each selector controls such that the values are stored in the registers of the arithmetic operation circuit 600c as shown in FIG. 64. In addition, the coefficient $b_2$ is read from the region 690b of the ROM 690. In addition, the signals that cause inputs from "1" in FIG. 59 to be output are supplied to the selectors 604c and 611c. As a result, the output from the register 608c is $T_{1,1}+T_{1,2}+a_{3,4}x_{1,3}x_{1,4}+b_3x_{1,3}=T_{1,1}+T_{1,2}+T_{1,3}$ and the output from the register 610c is $T_{2,4}+T_{2,3}$.

In the cycle number 4, each selector controls such that the values are stored in the registers of the arithmetic operation circuit 600c as shown in FIG. 64. In addition, the coefficient $a_{2,4}$ is read from the region 690b of the ROM 690. In addition, the signals that cause inputs from "1" in FIG. 59 to be output are supplied to the selectors 604c and 611c. As a result, the output from the register 608c is $T_{1,1}+T_{1,2}+T_{1,3}$ and the output from the register 610c is $T_{2,4}+T_{2,3}+b_2x_{2,2}$.

In the cycle number 5, each selector controls such that the values are stored in the registers of the arithmetic operation circuit 600c as shown in FIG. 64. In addition, the coefficient $a_{2,3}$ is read from the region 690b of the ROM 690. In addition, the signals that cause inputs from "1" in FIG. 59 to be output are supplied to the selectors 604c and 611c. As a result, the output from the register 608c is $T_{1,1}+T_{1,2}+T_{1,3}$ and the output from the register 610c is $T_{2,4}+T_{2,3}+b_2x_{2,2}+a_{2,4}x_{2,2}x_{2,4}$.

In the cycle number 6, each selector controls such that the values are stored in the registers of the arithmetic operation circuit 600c as shown in FIG. 64. As a result, the output from the register 608c is $T_{1,1}+T_{1,2}+T_{1,3}$ and the output from the register 610c is $T_{2,4}+T_{2,3}+b_2x_{2,2}+a_{2,4}x_{2,2}x_{2,4}+a_{2,3}x_{2,2}x_{2,3}=T_{2,4}+T_{2,3}+T_{2,2}$.

The arithmetic operation circuit 600c outputs the arithmetic operation results to the arithmetic operation circuit 600d by repeating the cycles numbers 1 to 6. When the cycle number 6 is completed, the arithmetic operation circuit 600c executes the same arithmetic operation process for the next $x_1$ and $x_2$.

Next, the stored values of the registers of the arithmetic operation circuit 600d, the coefficients read from the ROM 690, and signals supplied to the selectors and the output values from the arithmetic operation circuit 600d will be described using FIG. 65. Note that the stored values of the registers of the arithmetic operation circuit 600d shown in FIG. 65 have been supplied to the arithmetic operation circuit 600d after the arithmetic operation circuit 600c executed rotation including the cycles numbers 1 to 6.

First, in the first cycle number 1 of the arithmetic operation circuit 600d, the registers of the arithmetic operation circuit 600d respectively store values as shown in FIG. 65. In addition, the coefficient $b_4$ is read from the region 690a of the ROM 690. In addition, the signals that cause inputs from "0" in FIG. 61 to be output are supplied to the selectors 604d and 611d. As a result, the output from the register 608d is $T_{1,1}+T_{1,2}+T_{1,3}$ (=the output $zc_1$ of the arithmetic operation circuit 600c) and the output from the register 610d is $T_{2,4}+T_{2,3}+T_{2,2}$ (=the output $zc_2$ of the arithmetic operation circuit 600c).

In the cycle number 2, each selector controls such that the values are stored in the registers of the arithmetic operation circuit 600d as shown in FIG. 65. In addition, the coefficient $b_1$ is read from the region 690a of the ROM 690. In addition, the signals that cause inputs from "1" in FIG. 61 to be output are supplied to the selectors 604d and 611d. As a result, the output from the register 608d is $T_{1,1}+T_{1,2}+T_{1,3}+b_4x_{1,4}=T_{1,1}+T_{1,2}+T_{1,3}+T_{1,4}$ and the output from the register 610d is $T_{2,4}+T_{2,3}+T_{2,2}$.

In the cycle number 3, each selector controls such that the values are stored in the registers of the arithmetic operation circuit 600d as shown in FIG. 65. In addition, the coefficient $a_{1,4}$ is read from the region 690a of the ROM 690. In addition, the signals that cause inputs from "1" in FIG. 61 to be output are supplied to the selectors 604d and 611d. As a result, the output from the register 608d is $T_{1,1}+T_{1,2}+T_{1,3}+T_{1,4}$ and the output from the register 610d is $T_{2,4}+T_{2,3}+T_{2,2}+b_1x_{2,1}$.

In the cycle number 4, each selector controls such that the values are stored in the registers of the arithmetic operation circuit 600d as shown in FIG. 65. In addition, the coefficient $a_{1,3}$ is read from the region 690a of the ROM 690. In addition, the signals that cause inputs from "1" in FIG. 61 to be output are supplied to the selectors 604d and 611d. As a result, the output from the register 608d is $T_{1,1}+T_{1,2}+T_{1,3}+T_{1,4}$ and the output from the register 610d is $T_{2,4}+T_{2,3}+T_{2,2}+b_1x_{2,1}+a_{1,4}x_{2,1}x_{2,4}$.

In the cycle number 5, each selector controls such that the values are stored in the registers of the arithmetic operation circuit 600d as shown in FIG. 65. In addition, the coefficient $a_{1,2}$ is read from the region 690a of the ROM 690. In addition, the signals that cause inputs from "1" in FIG. 61 to be output are supplied to the selectors 604d and 611d. As a result, the output from the register 608d is $T_{1,1}+T_{1,2}+T_{1,3}+T_{1,4}$ and the output from the register 610d is $T_{2,4}+T_{2,3}+T_{2,2}+b_1x_{2,1}+a_{1,4}x_{2,1}x_{2,4}+a_{1,3}x_{2,1}x_{2,3}$.

In the cycle number 6, each selector controls such that the values are stored in the registers of the arithmetic operation circuit 600d as shown in FIG. 65. As a result, the output from the register 608d is $T_{1,1}+T_{1,2}+T_{1,3}+T_{1,4}$ and the output from the register 610d is $T_{2,4}+T_{2,3}+T_{2,2}+b_1x_{2,1}+a_{1,4}x_{2,1}x_{2,4}+a_{1,3}x_{2,1}x_{2,3}+a_{1,2}x_{2,1}x_{2,2}=T_{2,4}+T_{2,3}+T_{2,2}+T_{2,1}$.

The arithmetic operation circuit 600d outputs the arithmetic operation results of $f(x_1)$ and $f(x_2)$ by repeating the cycles numbers 1 to 6. When the cycle number 6 is completed, the arithmetic operation circuit 600d executes the same arithmetic operation process for the next $x_1$, and $x_2$.

As described above, the arithmetic operation circuit according to Embodiment #3 divides the ROM 690 in which the coefficients $a_{ij}$ and $b_i$ are stored into a plurality of regions to pipeline the arithmetic operation process of the quadratic polynomials $f(x_1)$ and $f(x_2)$, thereby being able to alleviate the restriction on the disposition of the ROM 690 and preventing a drop of the maximum operation frequency. In addition, the arithmetic operation circuit according to Embodiment #3 can use an output of a certain arithmetic operation circuit as an input of another arithmetic operation circuit provided in the later stage, and thus the number of registers can be reduced in the order of the shift registers 6011a, 6011b, 6011c, and 6011d. Therefore, the arithmetic operation circuit according to Embodiment #3 can reduce the number of registers more than the case in which a plurality of arithmetic operation circuits according to Embodiment #1 are merely provided in parallel.

6-8: Embodiment #4 (Pipelining of Calculation of a Multivariate Polynomial F)

Next, an arithmetic operation circuit according to Embodiment #4 will be described. The arithmetic operation circuit according to Embodiment #3 has been described as being able to reduce the number of registers more than the case in which a plurality of arithmetic operation circuits according to Embodiment #1 are merely provided in parallel, by performing arithmetic operations on the two inputs $x_1$ and $x_2$ in the same order; however, the number of registers can be reduced more by reversing the order of the arithmetic operation of the two inputs $x_1$ and $x_2$.

(6-8-1: Circuit Configuration (FIGS. 66 to 76))

FIG. 66 is an illustrative diagram showing a configuration of the arithmetic operation circuit according to Embodiment #4. The arithmetic operation circuit shown in FIG. 66 performs an arithmetic operation on quadratic polynomials and outputs results when an input x is 4 bits. As shown in FIG. 66, the arithmetic operation circuit according to Embodiment #4 is configured to include arithmetic operation circuits 700a, 700b, 700c, and 700d, and a ROM 790 storing coefficients. In addition, the ROM 790 is divided into two regions 790a and 790b.

The arithmetic operation circuits 700a, 700b, 700c, and 700d are circuits that generate the quadratic multivariate polynomials $f(x_1)$ and $f(x_2)$ from the two inputs $x_1$ and $x_2$ in parallel. The arithmetic operation circuit according to Embodiment #3 is designed to generate the quadratic multivariate polynomials $f(x_1)$ and $f(x_2)$ from the two inputs $x_1$ and $x_2$ in parallel through the pipeline process in the order of the four arithmetic operation circuits 600a, 600b, 600c, and 600d. The arithmetic operation circuit according to Embodiment #4 is designed to respectively generate the quadratic multivariate polynomial $f(x_1)$ from the input $x_1$ through a pipeline process performed in the order of the four arithmetic operation circuits 700a, 700b, 700c, and 700d and the quadratic multivariate polynomial $f(x_2)$ from the input $x_2$ through a pipeline process performed in the reverse order thereof.

In order to efficiently generate the quadratic multivariate polynomials $f(x_1)$ and $f(x_2)$ through the pipeline process performed by the four arithmetic operation circuits 700a, 700b, 700c, and 700d, the ROM 790 storing the coefficients is divided into the two regions 790a and 790b. The coefficients stored in the regions 790a and 790b are the same as those shown in FIG. 53.

Figure 67:
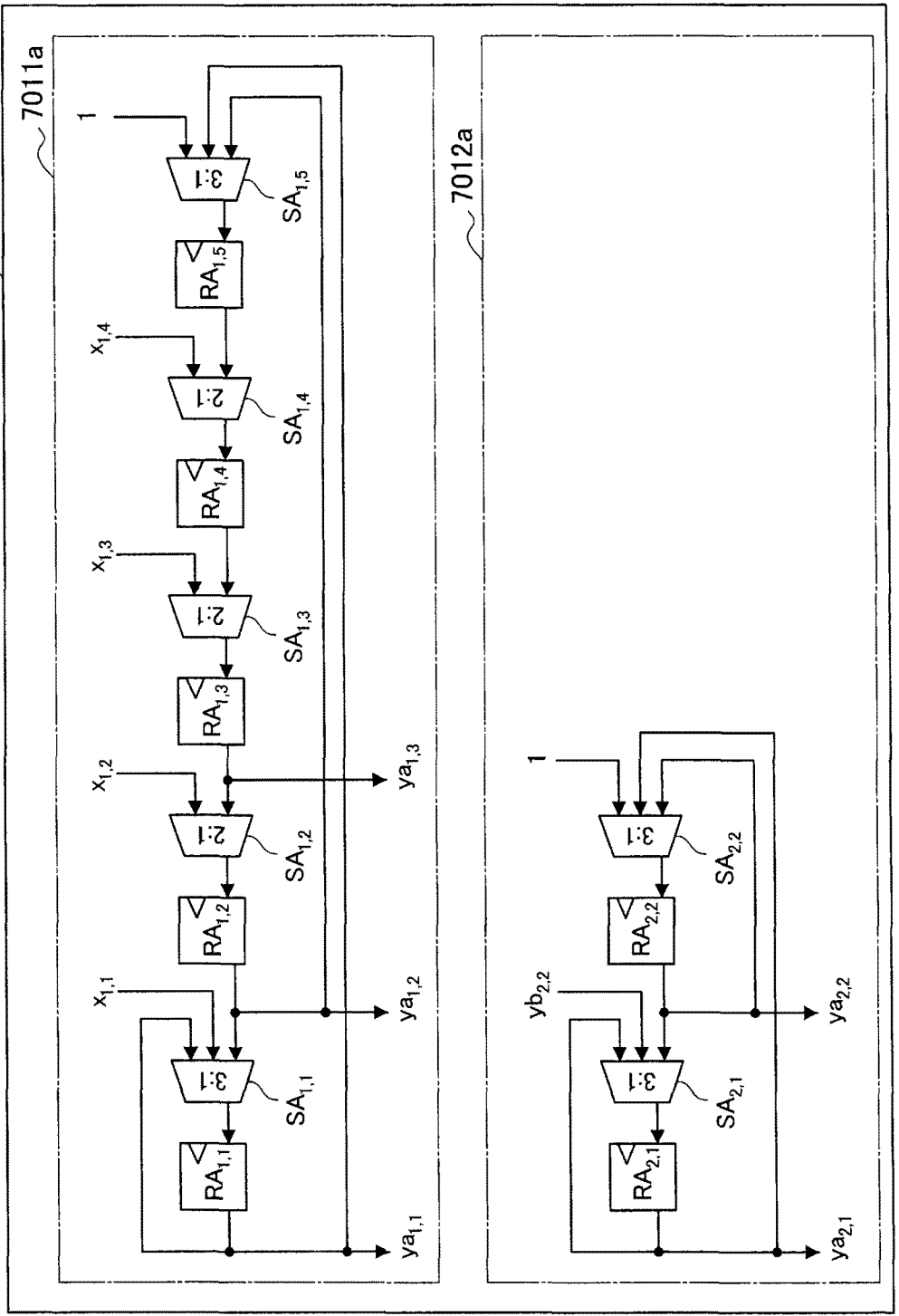
FIG. 67 is an illustrative diagram for describing an operation of the circuit that executes calculation of a multivariate polynomial (Embodiment #4).
Figure 68:
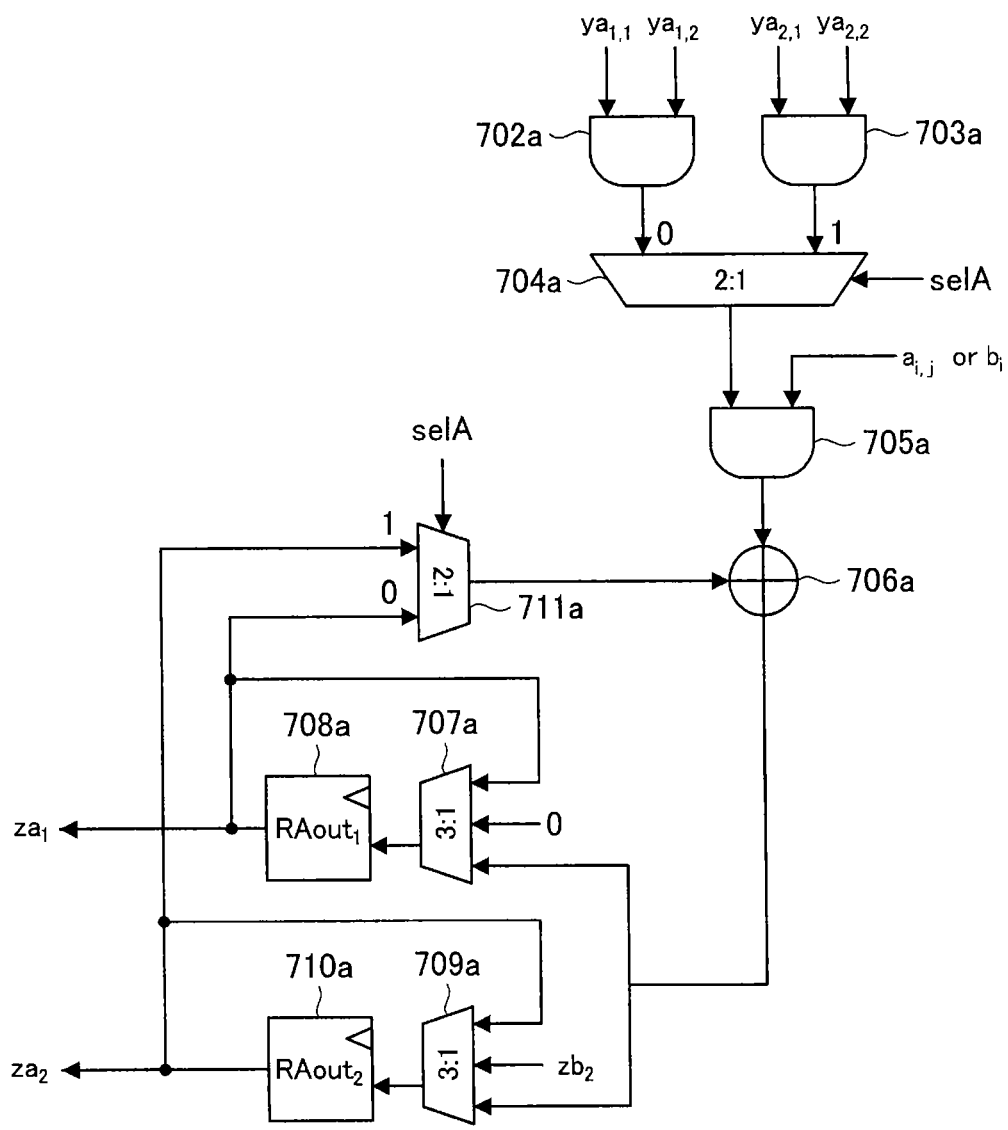
FIG. 68 is an illustrative diagram for describing an operation of the circuit that executes calculation of a multivariate polynomial (Embodiment #4).

FIGS. 67 and 68 are illustrative diagrams showing a circuit configuration of the arithmetic operation circuit 700a. As shown in FIGS. 67 and 68, the arithmetic operation circuit 700a is constituted by a shift register 701a, AND circuits 702a and 703a, a selector 704a, an AND circuit 705a, an XOR circuit 706a, selectors 707a and 709a, registers 708a and 710a, and a selector 711a. In addition, the shift register 701a includes a first shift register 7011a and a second shift register 7012a.

A configuration of the first shift register 7011a is substantially the same as that of the first shift register 4011 shown in FIG. 35 except that combinations of the registers that output values are different. However, the first shift register 7011a and the second shift register 7012a are operated in association with each other in the same cycles.

As shown in FIG. 67, the first shift register 7011a is constituted by registers $RA_{1,1}$, $RA_{1,2}$, $RA_{1,3}$, $RA_{1,4}$, and $RA_{1,5}$, and selectors $SA_{1,1}$, $SA_{1,2}$, $SA_{1,3}$, $SA_{1,4}$, and $SA_{1,5}$. In addition, the first shift register 7011a is configured to output stored values from the registers $RA_{1,1}$, $RA_{1,2}$, and $RA_{1,3}$. The second shift register 7012a is constituted by registers $RA_{2,1}$, and $RA_{2,2}$, and selectors $SA_{2,1}$, and $SA_{2,2}$. The second shift register 7012a is configured to output stored values from the registers $RA_{2,1}$ and $RA_{2,2}$.

Values $ya_{1,1}$, $ya_{1,2}$, and $ya_{1,3}$ output from the first shift register 7011a are input to the arithmetic operation circuit 700b provided in the later stage. In addition, the values $ya_{1,1}$ and $ya_{1,2}$ output from the first shift register 7011a are input to the AND circuit 702a as shown in FIG. 68. In addition, values $ya_{2,1}$ and $ya_{2,2}$ output from the second shift register 7012a are input to the AND circuit 703a. In addition, the AND circuit 702a computes the logical AND of the input values $ya_{1,1}$ and $ya_{1,2}$ and inputs the computation result to the selector 704a. In the same manner, the AND circuit 703a computes the logical AND of the input values $ya_{2,1}$ and $ya_{2,2}$ and inputs the computation result to the selector 704a. The selector 704a selects one value from the two input values and inputs the selection result to the AND circuit 705a.

Coefficients $a_{ij}$ and b, and the output value of the selector 704a are input to the AND circuit 705a. Then, the AND circuit 705a computes the logical AND of the input output value and the coefficients, and then inputs the computation result to the XOR circuit 706a. The output value of the AND circuit 705a and the output value of the selector 711a that will be described later are input to the XOR circuit 706a. The XOR circuit 706a performs an exclusive-OR operation for the two input values, and then inputs the arithmetic operation result to the selectors 707a and 709a. Note that the arithmetic operation result is stored in the register 708a or the register 710a according to states of the selectors 707a and 709a. In addition, either stored value of the register 708a or 710a is input to the XOR circuit 706a or output from the arithmetic operation circuit 700a as arithmetic operation results $za_1$ and $za_2$ according to a state of the selector 711a. The value $za_1$ from the register 708a is input to the arithmetic operation circuit 700b provided in the later stage. On the other hand, the value $za_2$ from the register 710a is output from the arithmetic operation circuit as the quadratic multivariate polynomial $f(x_2)$.

Note that the selectors 704a and 711a select and output one of the input values according to the value of selA that will be described later. In addition, the selector 707a selects and outputs one of the output of the XOR circuit 706a, the value "0," and the output of the register 708a. In the same manner, the selector 709a selects and outputs one of the output of the XOR circuit 706a, a value $zb_2$ supplied from the arithmetic operation circuit 700b, and the output of the register 710a.

Figure 69:
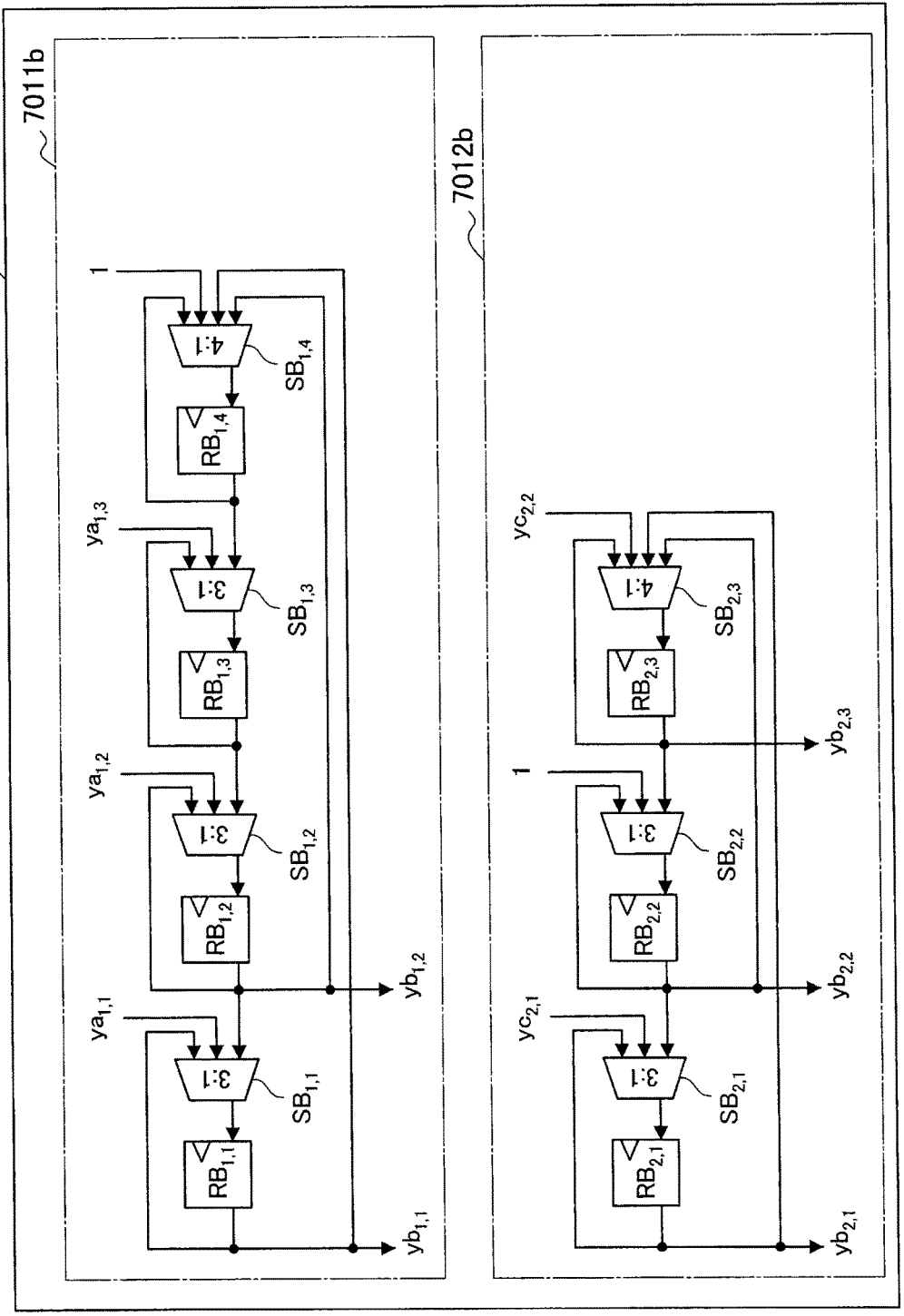
FIG. 69 is an illustrative diagram for describing an operation of the circuit that executes calculation of a multivariate polynomial (Embodiment #4).
Figure 70:
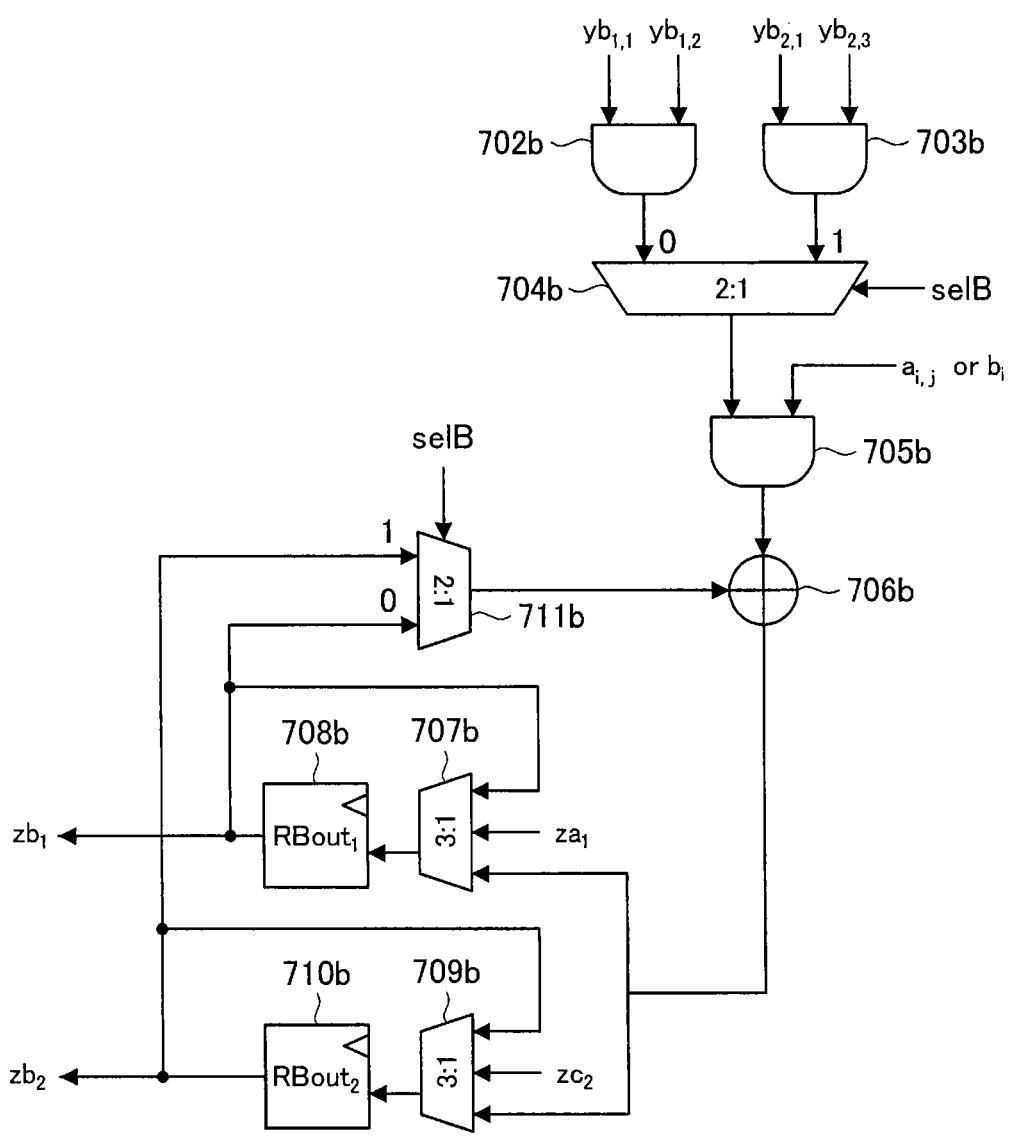
FIG. 70 is an illustrative diagram for describing an operation of the circuit that executes calculation of a multivariate polynomial (Embodiment #4).

FIGS. 69 and 70 are illustrative diagrams showing a circuit configuration of the arithmetic operation circuit 700b. As shown in FIGS. 69 and 70, the arithmetic operation circuit 700b is constituted by a shift register 701b, AND circuits 702b and 703b, a selector 704b, an AND circuit 705b, an XOR circuit 706b, selectors 707b and 709b, registers 708b and 710b, and a selector 711b. In addition, the shift register 701b includes a first shift register 7011b and a second shift register 7012b.

A configuration of the first shift register 7011b has one less register than the configuration of the first shift register 7011a shown in FIG. 67. A configuration of the second shift register 7012b has one more register than that of the first shift register 7012a shown in FIG. 67. The first shift register 7011b and the second shift register 7012b are operated in association with each other in the same cycles.

As shown in FIG. 69, the first shift register 7011b is constituted by registers $RB_{1,1}$, $RB_{1,2}$, $RB_{1,3}$, and $RB_{1,4}$, and selectors $SB_{1,1}$, $SB_{1,2}$, $SB_{1,3}$, and $SB_{1,4}$. In addition, the first shift register 7011b is configured to output stored values from the registers $RB_{1,1}$, and $RB_{1,2}$. Likewise, the second shift register 7012b is constituted by registers $RB_{2,1}$, $RB_{2,2}$, and $RB_{2,3}$, and selectors $SB_{2,1}$, $SB_{2,2}$, and $SB_{2,3}$. However, the second shift register 7012b is configured to output stored values from the registers $RB_{2,1}$, $RB_{2,2}$, and $RB_{2,3}$.

Values $yb_{1,1}$, and $yb_{1,2}$ output from the first shift register 7011b are input to the arithmetic operation circuit 700c provided in the later stage. In addition, the values $yb_{1,1}$, and $yb_{1,2}$ output from the first shift register 7011b are input to the AND circuit 702b as shown in FIG. 70. In the same manner, a value $yb_{2,2}$ output from the second shift register 7012b is input to the arithmetic operation circuit 700a provided in the later stage. In addition, values $yb_{2,1}$ and $yb_{2,2}$ output from the second shift register 7012b are input to the AND circuit 703b. In addition, the AND circuit 702b computes the logical AND of the input values $yb_{1,1}$ and $yb_{1,2}$ and inputs the computation result to the selector 704b. In the same manner, the AND circuit 703b computes the logical AND of the input values $yb_{2,1}$ and $yb_{2,2}$ and inputs the computation result to the selector 704b. The selector 704b selects one value from the two input values and inputs the selection result to the AND circuit 705b.

The coefficients $a_{ij}$ and $b_i$ and the output value of the selector 704b are input to the AND circuit 705b. Then, the AND circuit 705b computes the logical AND of the input output value and the coefficients, and then inputs the computation result to the XOR circuit 706b. The output value of the AND circuit 705b and the output value of the selector 711b that will be described later are input to the XOR circuit 706b. The XOR circuit 706b performs an exclusive-OR operation for the two input values, and then inputs the arithmetic operation result to the selectors 707b and 709a. Note that the arithmetic operation result is stored in the register 708b or the register 710b according to states of the selectors 707b and 709b. In addition, either stored value of the register 708b or 710b is input to the XOR circuit 706b or output from the arithmetic operation circuit 700b as arithmetic operation results $zb_1$ and $zb_2$ according to a state of the selector 711b. The value $zb_1$ from the register 708b is input to the arithmetic operation circuit 700c provided in the later stage. In addition, the value $zb_2$ from the register 710b is input to the arithmetic operation circuit 700a provided in the later stage.

Note that the selectors 704b and 711b select and output one of the input values according to the value of selB that will be described later. In addition, the selector 707b selects and outputs one of the output of the XOR circuit 706b, the value $za_1$ supplied from the arithmetic operation circuit 700a, and the output of the register 708b. Likewise, the selector 709b selects and outputs one of the output of the XOR circuit 706b, the value $zc_2$ supplied from the arithmetic operation circuit 700c, and the output of the register 710b.

Figure 71:
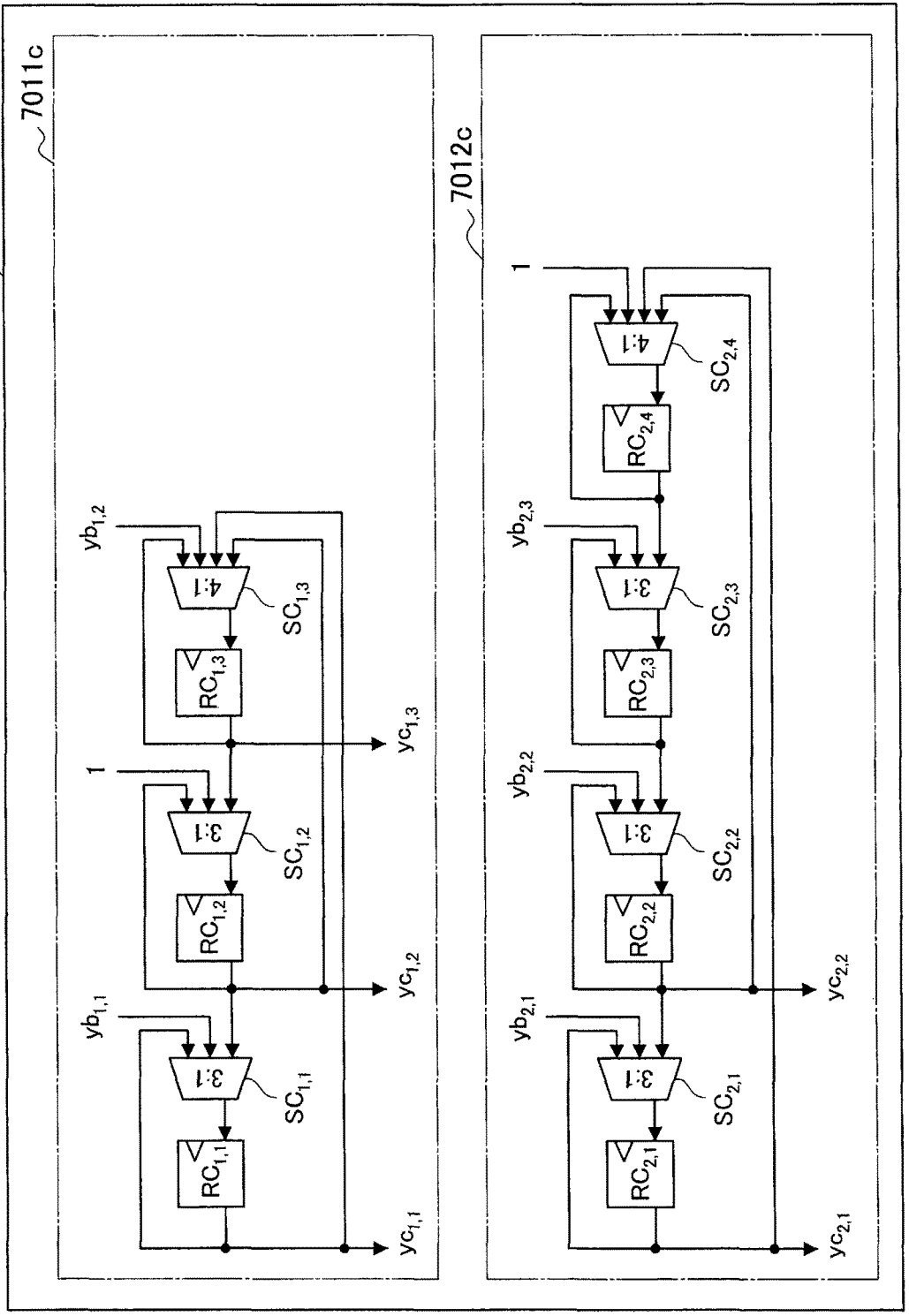
FIG. 71 is an illustrative diagram for describing an operation of the circuit that executes calculation of a multivariate polynomial (Embodiment #4).
Figure 72:
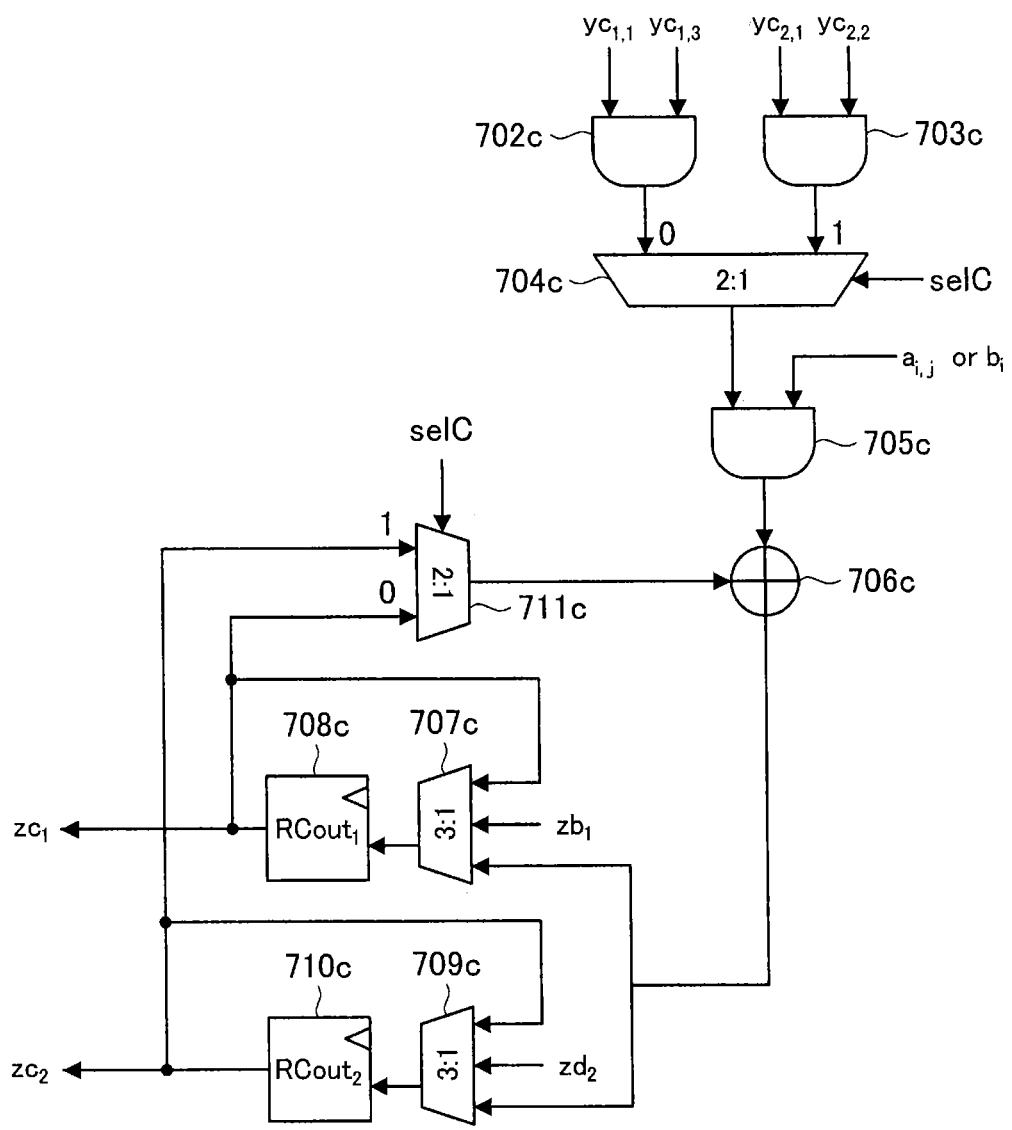
FIG. 72 is an illustrative diagram for describing an operation of the circuit that executes calculation of a multivariate polynomial (Embodiment #4).

FIGS. 71 and 72 are illustrative diagrams showing a circuit configuration of the arithmetic operation circuit 700c. As shown in FIGS. 71 and 72, the arithmetic operation circuit 700c is constituted by a shift register 701c, AND circuits 702c and 703c, a selector 704c, an AND circuit 705c, an XOR circuit 706c, selectors 707c and 709c, registers 708c and 710c, and a selector 711c. In addition, the shift register 701c includes a first shift register 7011c and a second shift register 7012c.

A configuration of the first shift register 7011c has one less register than the configuration of the first shift register 7011b shown in FIG. 69. A configuration of the second shift register 7012c has one more register than the configuration of the first shift register 7012b shown in FIG. 69. The first shift register 7011c and the second shift register 7012c are operated in association with each other in the same cycles.

As shown in FIG. 71, the first shift register 7011c is constituted by registers $RC_{1,1}$, $RC_{1,2}$, and $RC_{1,3}$, and selectors $SC_{1,1}$, $SC_{1,2}$, and $SC_{1,3}$. In addition, the first shift register 7011c is configured to output stored values from the registers $RC_{1,1}$, $RC_{1,2}$, and $RC_{1,3}$. Likewise, the second shift register 7012c is constituted by registers $RC_{2,1}$, $RC_{2,2}$, $R_{2,3}$, and $RC_{2,4}$, and selectors $SC_{2,1}$, $SC_{2,2}$, $SC_{2,3}$, and $SC_{2,4}$. The second shift register 7012c is configured to output stored values from the registers $RC_{2,1}$ and $RC_{2,2}$.

A value $yc_{1,1}$ output from the first shift register 7011c is input to the arithmetic operation circuit 700d provided in the later stage. In addition, the values $yc_{1,1}$, and $yc_{1,2}$ output from the first shift register 7011c are input to the AND circuit 702c as shown in FIG. 72. In the same manner, values $yc_{2,1}$ and $yc_{2,2}$ output from the second shift register 7012c are input to the arithmetic operation circuit 700b provided in the later stage. In addition, the values $yc_{2,1}$ and $yc_{2,2}$ output from the second shift register 7012c are input to the AND circuit 703c. In addition, the AND circuit 702c computes the logical AND of the input values $yc_{1,1}$ and $yc_{1,2}$ and inputs the computation result to the selector 704c. In the same manner, the AND circuit 703c computes the logical AND of the input values $yc_{2,1}$ and $yc_{2,2}$ and inputs the computation result to the selector 704c. The selector 704c selects one value from the two input values and inputs the selection result to the AND circuit 705c.

The coefficients $a_{ij}$ and $b_i$ and the output value of the selector 704c are input to the AND circuit 705c. Then, the AND circuit 705c computes the logical AND of the input output value and the coefficients, and then inputs the computation result to the XOR circuit 706c. The output value of the AND circuit 705c and the output value of the selector 711c that will be described later are input to the XOR circuit 706c. The XOR circuit 706c performs an exclusive-OR operation for the two input values, and then inputs the arithmetic operation result to the selectors 707c and 709c. Note that the arithmetic operation result is stored in the register 708c or the register 710c according to states of the selectors 707c and 709c. In addition, either stored value of the register 708c or 710c is input to the XOR circuit 706c or output from the arithmetic operation circuit as arithmetic operation results $zc_1$ and $zc_2$ according to a state of the selector 711c. The value $zc_1$ from the register 708c is input to the arithmetic operation circuit 700d provided in the later stage. The value $zc_2$ from the register 710c is input to the arithmetic operation circuit 700b provided in the later stage.

Note that the selectors 704c and 711c select and output one of the input values according to the value of selC that will be described later. In addition, the selector 707c selects and outputs one of the output of the XOR circuit 706c, the value $zb_1$ supplied from the arithmetic operation circuit 700b, and the output of the register 708c. Likewise, the selector 709c selects and outputs one of the output of the XOR circuit 706c, a value $zd_2$ supplied from the arithmetic operation circuit 700d, and the output of the register 710c.

Figure 73:
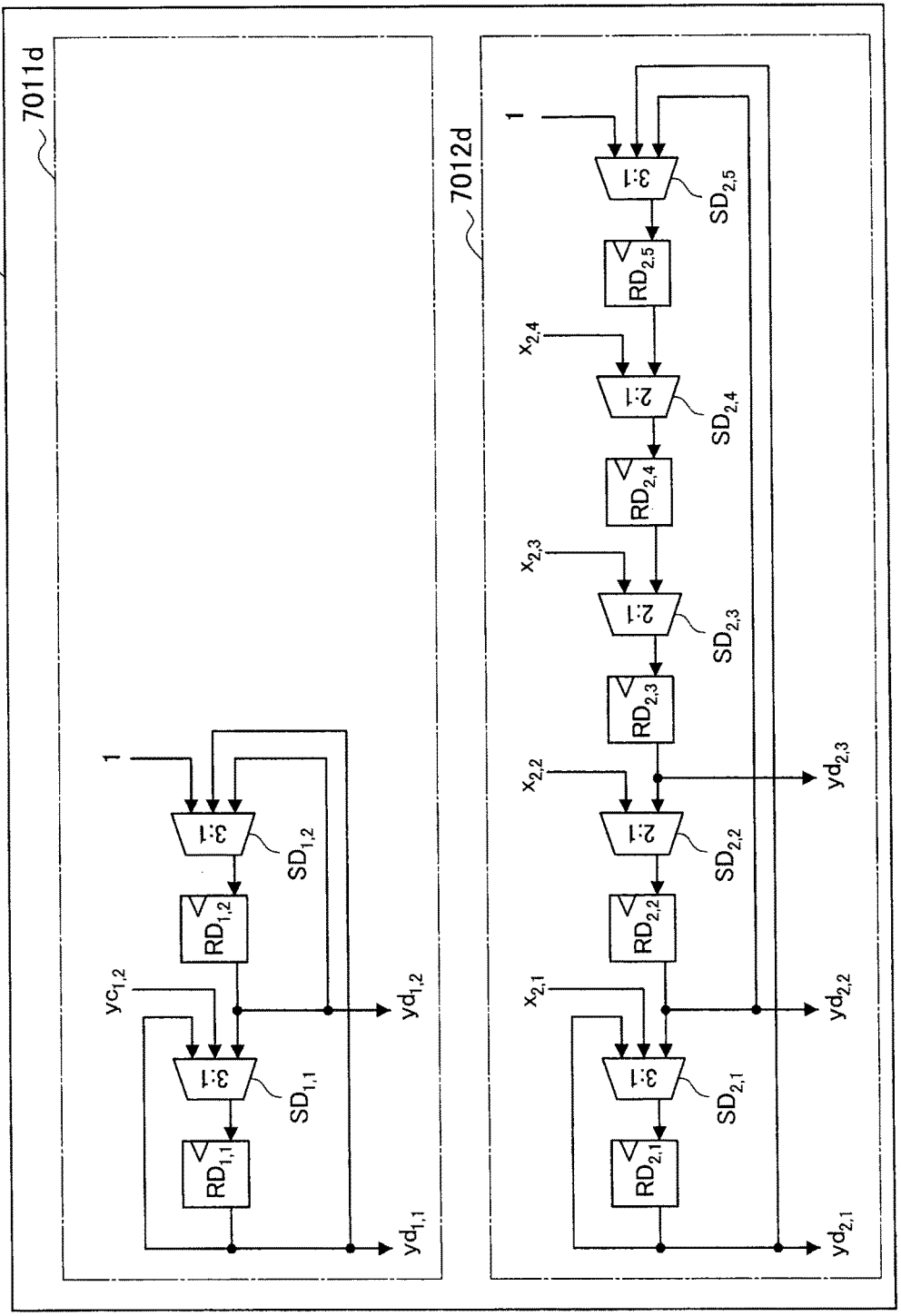
FIG. 73 is an illustrative diagram for describing an operation of the circuit that executes calculation of a multivariate polynomial (Embodiment #4).
Figure 74:
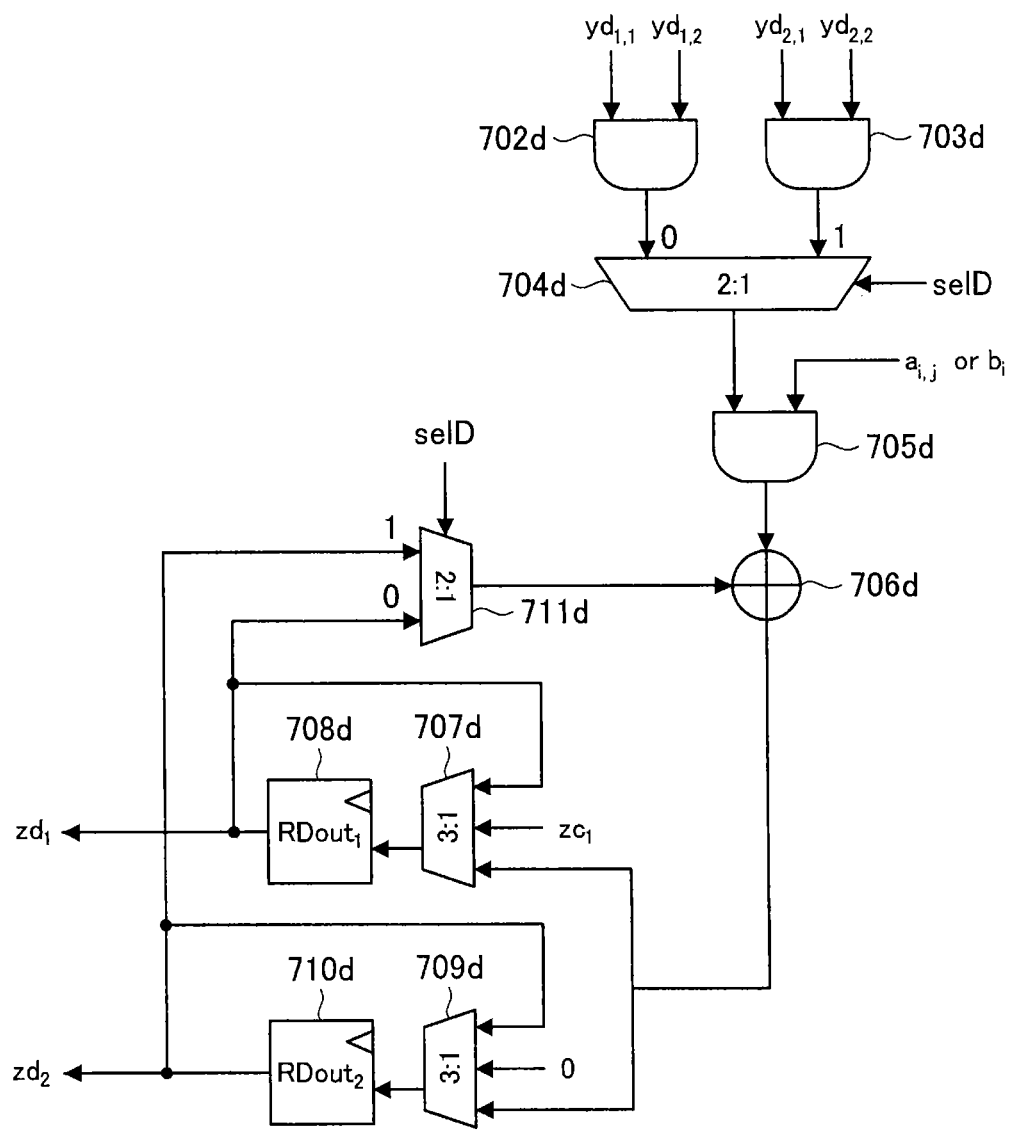
FIG. 74 is an illustrative diagram for describing an operation of the circuit that executes calculation of a multivariate polynomial (Embodiment #4).

FIGS. 73 and 74 are illustrative diagrams showing a circuit configuration of the arithmetic operation circuit 700d.

As shown in FIGS. 73 and 74, the arithmetic operation circuit 700d is constituted by a shift register 701d, AND circuits 702d and 703d, a selector 704d, an AND circuit 705d, an XOR circuit 706d, selectors 707d and 709d, registers 708d and 710d, and a selector 711d. In addition, the shift register 701d includes a first shift register 6011d and a second shift register 7012d.

A configuration of the first shift register 7011d has one less register than the configuration of the first shift register 7011c shown in FIG. 71. A configuration of the second shift register 7012d has one more register than that of the first shift register 7012c shown in FIG. 71. The first shift register 7011d and the second shift register 7012d are operated in association with each other in the same cycles.

As shown in FIG. 73, the first shift register 7011d is constituted by registers $RD_{1,1}$, and $RD_{1,2}$, and selectors $SD_{1,1}$, and $SB_{1,2}$. In addition, the first shift register 7011d is configured to output stored values from the registers $RD_{1,1}$, and $RD_{1,2}$. The second shift register 7012d is constituted by registers $RD_{2,1}$, $RD_{2,2}$, $RD_{2,3}$, $RD_{2,4}$, and $RD_{2,5}$, and selectors $SD_{2,1}$, $SD_{2,2}$, $SD_{2,3}$, $SD_{2,4}$, and $SD_{2,5}$. The second shift register 7012d is configured to output stored values from the registers $RD_{2,1}$, $RD_{2,2}$, and $RD_{2,3}$.

Values $yd_{1,1}$ and $yd_{1,2}$ output from the first shift register 7011d are input to the AND circuit 702d as shown in FIG. 74. In addition, values $yd_{2,1}$, and $yd_{2,2}$ output from the second shift register 7012d are input to the AND circuit 703d. In addition, the AND circuit 702d computes the logical AND of the input values $yd_{1,1}$ and $yd_{1,2}$ and then inputs the computation result to the selector 704d. In the same manner, the AND circuit 703d computes the logical AND of the input values $yd_{2,1}$, and $yd_{2,2}$ and then inputs the computation result to the selector 704d. The selector 704d selects one value from the two input values and inputs the selection result to the AND circuit 705d.

The coefficients $a_{ij}$ and $b_i$ and the output value of the selector 704d are input to the AND circuit 705d. Then, the AND circuit 705d computes the logical AND of the input output value and the coefficients, and then inputs the computation result to the XOR circuit 706d. The output value of the AND circuit 705d and the output value of the selector 711d that will be described later are input to the XOR circuit 706d. The XOR circuit 706d performs an exclusive-OR operation for the two input values, and then inputs the arithmetic operation result to the selectors 707d and 709d. Note that the arithmetic operation result is stored in the register 708d or the register 710d according to states of the selectors 707d and 709d. In addition, either stored value of the register 708d or 710d is input to the XOR circuit 706d or output from the arithmetic operation circuit as arithmetic operation results $zd_1$ and $zd_2$ according to a state of the selector 711d. The value $zd_1$ from the register 708d corresponds to $f(x_1)$. In addition, the value $zd_2$ from the register 710d is input to the arithmetic operation circuit 700c provided in the later stage.

Note that the selectors 704d and 711d select and output one of the input values according to the value of selD that will be described later. In addition, the selector 707d selects and outputs one of the output of the XOR circuit 706d, the value $zc_1$ supplied from the arithmetic operation circuit 700c, and the output of the register 708d. The selector 709d selects and outputs one of the output of the XOR circuit 706d, the value "0," and the output of the register 710d.

Hereinabove, the configuration of the arithmetic operation circuit according to Embodiment #4 has been described.

(6-8-2: Operation (FIGS. 75 to 82))

Next, an operation of the arithmetic operation circuit according to Embodiment #4 will be described using FIGS. 75 to 82. FIGS. 75 to 82 respectively summarize the stored values of the registers of the arithmetic operation circuits 700a to 700d, the coefficients read from the ROM 690, the signals supplied to the selectors and the output values from the arithmetic operation circuits 700a to 700d. FIGS. 75 and 76 summarize the arithmetic operation circuit 700a, FIGS. 77 and 78 summarize the arithmetic operation circuit 700b, FIGS. 79 and 80 summarize the arithmetic operation circuit 700c, and FIGS. 81 and 82 summarize the arithmetic operation circuit 700d.

First, the stored values of the registers of the arithmetic operation circuits 700a and 700d, the coefficients read from the ROM 790, the signals supplied to the selectors and the output values from the arithmetic operation circuits 700a and 700d in the cycles numbers 1 to 6 will be described using FIGS. 75, 76, 81, and 82.

In the first cycle number 1, each selector controls such that the registers of the arithmetic operation circuits 700a and 700d store values as shown in FIGS. 75 and 81. In addition, the coefficient $a_{1,2}$ is read from the region 790a of the ROM 790. In addition, the signals that cause inputs from "0" in FIG. 68 to be output are supplied to the selectors 704a and 711a, and the signals that cause inputs from "1" in FIG. 74 to be output are supplied to the selectors 704d and 711d. As a result, the outputs from the registers 708a and 710d are 0 as shown in FIGS. 76 and 82.

In the cycle number 2, each selector controls such that the registers of the arithmetic operation circuits 700a and 700d store values as shown in FIGS. 75 and 81. In addition, the coefficient $a_{1,3}$ is read from the region 790a of the ROM 790. In addition, the signals that cause inputs from "0" in FIG. 68 to be output are supplied to the selectors 704a and 711a, and the signals that cause inputs from "1" in FIG. 74 to be output are supplied to the selectors 704d and 711d. As a result, the output from the register 708a is $a_{1,2}x_{1,1}x_{1,2}$ and the output from the register 710d is $a_{1,2}x_{2,1}x_{2,2}$.

In the cycle number 3, each selector controls such that the registers of the arithmetic operation circuits 700a and 700d store values as shown in FIGS. 75 and 81. In addition, the coefficient $a_{1,4}$ is read from the region 790a of the ROM 790. In addition, the signals that cause inputs from "0" in FIG. 68 to be output are supplied to the selectors 704a and 711a, and the signals that cause inputs from "1" in FIG. 74 to be output are supplied to the selectors 704d and 711d. As a result, the output from the register 708a is $a_{1,2}x_{1,1}x_{1,2}+a_{1,3}x_{1,1}x_{1,3}$ and the output from the register 710d is $a_{1,2}x_{2,1}x_{2,2}+a_{1,3}x_{2,1}x_{2,3}$.

In the cycle number 4, each selector controls such that the registers of the arithmetic operation circuits 700a and 700d store values as shown in FIGS. 75 and 81. In addition, the coefficient $b_1$ is read from the region 790a of the ROM 790. In addition, the signals that cause inputs from "0" in FIG. 68 to be output are supplied to the selectors 704a and 711a, and the signals that cause inputs from "1" in FIG. 74 to be output are supplied to the selectors 704d and 711d. As a result, the output from the register 708a is $a_{1,2}x_{1,1}x_{1,2}+a_{1,3}x_{1,1}x_{1,3}+a_{1,4}x_{1,1}x_{1,4}$ and the output from the register 710d is $a_{1,2}x_{2,1}x_{2,2}+a_{1,3}x_{2,1}x_{2,3}+a_{1,4}x_{2,1}x_{2,4}$.

In the cycle number 5, each selector controls such that the registers of the arithmetic operation circuits 700a and 700d store values as shown in FIGS. 75 and 81. In addition, the coefficient $b_4$ is read from the region 790a of the ROM 790. As a result, the output from the register 708a is $a_{1,2}x_{1,1}x_{1,2}+a_{1,3}x_{1,1}x_{1,3}+a_{1,4}x_{1,1}x_{1,4}+b_1x_{1,1}=T_{1,1}$ and the output from the register 710d is $a_{1,2}x_{2,1}x_{2,2}+a_{1,3}x_{2,1}x_{2,3}+a_{1,4}x_{2,1}x_{2,4}+b_1x_{2,1}=T_{2,1}$.

In the cycle number 6, each selector controls such that the registers of the arithmetic operation circuits 700a and 700d store values as shown in FIGS. 76 and 81. As a result, the output from the register 708a is $T_{1,1}$ and the output from the register 710d is $T_{2,1}$.

The arithmetic operation circuits 700a and 700d respectively output the arithmetic operation results to the arithmetic operation circuits 700b and 700c repeating the six cycles numbers 1 to 6. When the six cycles are completed, the arithmetic operation circuits 700a and 700d respectively perform the same arithmetic operation process for the next $x_1$ and $x_2$.

Next, the stored values of the registers of the arithmetic operation circuits 700b and 700c, the coefficients read from the ROM 790, the signals supplied to the selectors and the output values from the arithmetic operation circuits 700b and 700c in the cycles numbers 6+1 to 6+6 will be described using FIGS. 77, 78, 79, and 80.

In the first cycle number 6+1, each selector controls such that the registers of the arithmetic operation circuits 700b and 700c store values as shown in FIGS. 77 and 79. In addition, the coefficient $a_{2,3}$ is read from the region 790b of the ROM 790. In addition, the signals that cause inputs from "0" in FIG. 70 to be output are supplied to the selectors 704b and 711b, and the signals that cause inputs from "1" in FIG. 72 to be output are supplied to the selectors 704c and 711c. As a result, the output from the register 708b is $T_{1,1}$ and the output from the register 710c is $T_{2,1}$ as shown in FIGS. 78 and 80.

In the cycle number 6+2, each selector controls such that the registers of the arithmetic operation circuits 700b and 700c store values as shown in FIGS. 77 and 79. In addition, the coefficient $a_{2,4}$ is read from the region 790b of the ROM 790. In addition, the signals that cause inputs from "0" in FIG. 70 to be output are supplied to the selectors 704b and 711b, and the signals that cause inputs from "1" in FIG. 72 to be output are supplied to the selectors 704c and 711c. As a result, the output from the register 708b is $T_{1,1}+a_{2,3}x_{1,2}x_{1,3}$ and the output from the register 710c is $T_{2,1}+a_{2,3}x_{2,2}x_{2,3}$.

In the cycle number 6+3, each selector controls such that the registers of the arithmetic operation circuits 700b and 700c store values as shown in FIGS. 77 and 79. In addition, the coefficient $b_2$ is read from the region 790b of the ROM 790. In addition, the signals that cause inputs from "0" in FIG. 70 to be output are supplied to the selectors 704b and 711b, and the signals that cause inputs from "1" in FIG. 72 to be output are supplied to the selectors 704c and 711c. As a result, the output from the register 708b is $T_{1,1}+a_{2,3}x_{1,2}x_{1,3}+a_{2,4}x_{1,2}x_{1,4}$ and the output from the register 710c is $T_{2,1}+a_{2,3}x_{2,2}x_{2,3}+a_{2,4}x_{2,2}x_{2,4}$.

In the cycles numbers 6+4 to 6+6, each selector controls such that the registers of the arithmetic operation circuits 700b and 700c store values as shown in FIGS. 77 and 79. In addition, the coefficient $b_3$ is read from the region 790b of the ROM 790. As a result, the output from the register 708b is $T_{1,1}+a_{2,3}x_{1,2}x_{1,3}+a_{2,4}x_{1,2}x_{1,4}+b_2x_{1,2}T_{1,1}+T_{1,2}$ and the output from the register 710c is $T_{2,1}+a_{2,3}x_{2,2}x_{2,3}+a_{2,4}x_{2,2}x_{2,4}+b_2x_{2,2}=T_{2,1}+T_{2,2}$.

The arithmetic operation circuits 700b and 700c respectively output the arithmetic operation results to the arithmetic operation circuits 700c and 700b repeating the six cycles. When the six cycles are completed, the arithmetic operation circuits 700a and 700d executes the same arithmetic operation process for the values supplied from the arithmetic operation circuits 700a and 700d.

Next, the stored values of the registers of the arithmetic operation circuits 700b and 700c, the coefficients read from the ROM 790, the signals supplied to the selectors and the output values from the arithmetic operation circuits 700b and 700c in the cycles numbers 2×6+1 to 2×6+6 will be described using FIGS. 77, 78, 79, and 80.

In the first cycle number 2×6+1, each selector controls such that the registers of the arithmetic operation circuits 700b and 700c store values as shown in FIGS. 77 and 79. In the registers $RB_{2,1}$, $RB_{2,2}$, and $RB_{2,3}$ that have not stored values in the cycle number 6+1, the output value from the shift register 7012c of the arithmetic operation circuit 700c or "1" is stored. Likewise, in the registers $RC_{1,1}$, $RC_{1,2}$, and $RC_{1,3}$ that have not stored values in the cycle number 6+1, the output value from the shift register 7012b of the arithmetic operation circuit 700b or "1" is stored. In addition, the coefficient $a_{2,3}$ is read from the region 790b of the ROM 790. In addition, the signals that cause inputs from "0" in FIG. 70 to be output are supplied to the selectors 704b and 711b, and the signals that cause inputs from "1" in FIG. 72 to be output are supplied to the selectors 704c and 711c. As a result, the output from the register 708b is $T_{1,1}$, the output from the register 710b is $T_{2,1}+T_{2,2}$, the output from the register 708c is $T_{1,1}+T_{1,2}$, and the output from the register 710c is $T_{2,1}$ as shown in FIGS. 78 and 80.

In the cycle number 2×6+2, each selector controls such that the registers of the arithmetic operation circuits 700b and 700c store values as shown in FIGS. 77 and 79. In addition, the coefficient $a_{2,4}$ is read from the region 790b of the ROM 790. In addition, the signals that cause inputs from "0" in FIG. 70 to be output are supplied to the selectors 704b and 711b, and the signals that cause inputs from "1" in FIG. 72 to be output are supplied to the selectors 704c and 711c. As a result, the output from the register 708b is $T_{1,1}+a_{2,3}x_{1,2}x_{1,3}$, the output from the register 710b is $T_{2,1}+T_{2,2}$, the output from the register 708c is $T_{1,1}+T_{1,2}$, and the output from the register 710c is $T_{2,1}+a_{2,3}x_{2,2}x_{2,3}$ as shown in FIGS. 78 and 80.

In the cycle number 2×6+3, each selector controls such that the registers of the arithmetic operation circuits 700b and 700c store values as shown in FIGS. 77 and 79. In addition, the coefficient $b_2$ is read from the region 790b of the ROM 790. In addition, the signals that cause inputs from "0" in FIG. 70 to be output are supplied to the selectors 704b and 711b, and the signals that cause inputs from "1" in FIG. 72 to be output are supplied to the selectors 704c and 711c. As a result, the output from the register 708b is $T_{1,1}+a_{2,3}x_{1,2}x_{1,3}+a_{2,4}x_{1,2}x_{1,4}$, the output from the register 710b is $T_{2,1}+T_{2,2}$, the output from the register 708c is $T_{1,1}+T_{1,2}$, and the output from the register 710c is $T_{2,1}+a_{2,3}x_{2,2}x_{2,3}+a_{2,4}x_{2,2}x_{2,4}$ as shown in FIGS. 78 and 80.

In the cycle number 2×6+4, each selector controls such that the registers of the arithmetic operation circuits 700b and 700c store values as shown in FIGS. 77 and 79. In addition, the coefficient $b_3$ is read from the region 790b of the ROM 790. In addition, the signals that cause inputs from "1" in FIG. 70 to be output are supplied to the selectors 704b and 711b, and the signals that cause inputs from "0" in FIG. 72 to be output are supplied to the selectors 704c and 711c. As a result, the output from the register 708b is $T_{1,1}+a_{2,3}x_{1,2}x_{1,3}+a_{2,4}x_{1,2}x_{1,4}+b_2x_{1,2}=T_{1,1}+T_{1,2}$, the output from the register 710b is $T_{2,1}+T_{2,2}$, the output from the register 708c is $T_{1,1}+T_{1,2}$, and the output from the register 710c is $T_{2,1}+a_{2,3}x_{2,2}x_{2,3}+a_{2,4}x_{2,2}x_{2,4}+b_2x_{2,2}=T_{2,1}+T_{2,2}$ as shown in FIGS. 78 and 80.

In the cycle number 2×6+5, each selector controls such that the registers of the arithmetic operation circuits 700b and 700c store values as shown in FIGS. 77 and 79. In addition, the coefficient $a_{3,4}$ is read from the region 790b of the ROM 790. In addition, the signals that cause inputs from "1" in FIG. 70 to be output are supplied to the selectors 704*b* and 711*b*, and the signals that cause inputs from "0" in FIG. 72 to be output are supplied to the selectors 704*c* and 711*c*. As a result, the output from the register 708*b* is $T_{1,1}+T_{1,2}$, the output from the register 710*b* is $T_{2,1}+T_{2,2}+b_3x_{2,3}$, the output from the register 708*c* is $T_{1,1}+T_{1,2}+b_3x_{1,3}$, and the output from the register 710*c* is $T_{2,1}+T_{2,2}$ as shown in FIGS. 78 and 80.

In the cycle number 2×6+6, each selector controls such that the registers of the arithmetic operation circuits 700*b* and 700*c* store values as shown in FIGS. 77 and 79. As a result, the output from the register 708*b* is $T_{1,1}+T_{1,2}$, the output from the register 710*b* is $T_{2,1}+T_{2,2}+b_3x_{2,3}+a_{3,4}x_{2,3}x_{2,4}=T_{2,1}+T_{2,2}+T_{2,3}$, the output from the register 708*c* is $T_{1,1}+T_{1,2}+b_3x_{1,3}+a_{3,4}x_{1,3}x_{1,4}=T_{1,1}+T_{1,2}+T_{1,3}$, and the output from the register 710*c* is $T_{2,1}+x_{2,2}$ as shown in FIGS. 78 and 80.

Next, the stored values of the registers of the arithmetic operation circuits 700*a* and 700*d*, the coefficients read from the ROM 790, the signals supplied to the selectors and the output values from the arithmetic operation circuits 700*a* and 700*d* in the cycles numbers 3×6+1 to 3×6+6 will be described using FIGS. 75, 76, 81, and 82.

In the first cycle number 3×6+1, each selector controls such that the registers of the arithmetic operation circuits 700*a* and 700*d* store values as shown in FIGS. 75 and 81. In the registers $RA_{2,1}$, and $RA_{2,2}$ that have not stored values in the cycles numbers 1 to 2×6+6, the output value from the shift register 7012*b* of the arithmetic operation circuit 700*b* or "1" is stored. Likewise, in the registers $RD_{1,1}$, and $RD_{1,2}$ that have not stored values in the cycles numbers 1 to 2×6+6, the output value from the shift register 7012*c* of the arithmetic operation circuit 700*c* or "1" is stored. In addition, the coefficient $a_{1,2}$ is read from the region 790*a* of the ROM 790. In addition, the signals that cause inputs from "0" in FIG. 68 to be output are supplied to the selectors 704*a* and 711*a*, and the signals that cause inputs from "1" in FIG. 74 to be output are supplied to the selectors 704*d* and 711*d*. As a result, the output from the register 708*a* is 0, the output from the register 710*a* is $T_{2,1}+T_{2,2}+T_{2,3}$, the output from the register 708*d* is $T_{1,1}+T_{1,2}+T_{1,3}$, and the output from the register 710*d* is 0 as shown in FIGS. 76 and 82.

In the cycle number 3×6+2, each selector controls such that the registers of the arithmetic operation circuits 700*a* and 700*d* store values as shown in FIGS. 75 and 81. In addition, the coefficient $a_{1,3}$ is read from the region 790*a* of the ROM 790. In addition, the signals that cause inputs from "0" in FIG. 68 to be output are supplied to the selectors 704*a* and 711*a*, and the signals that cause inputs from "1" in FIG. 74 to be output are supplied to the selectors 704*d* and 711*d*. As a result, the output from the register 708*a* is $a_{1,2}x_{1,1}x_{1,2}$, the output from the register 710*a* is $T_{2,1}+T_{2,2}+T_{2,3}$, the output from the register 708*d* is $T_{1,1}+T_{1,2}+T_{1,3}$, and the output from the register 710*d* is $a_{1,2}x_{2,1}x_{2,2}$ as shown in FIGS. 76 and 82.

In the cycle number 3×6+3, each selector controls such that the registers of the arithmetic operation circuits 700*a* and 700*d* store values as shown in FIGS. 75 and 81. In addition, the coefficient $a_{1,4}$ is read from the region 790*a* of the ROM 790. In addition, the signals that cause inputs from "0" in FIG. 68 to be output are supplied to the selectors 704*a* and 711*a*, and the signals that cause inputs from "1" in FIG. 74 to be output are supplied to the selectors 704*d* and 711*d*. As a result, the output from the register 708*a* is $a_{1,2}x_{1,1}x_{1,2}+a_{1,3}x_{1,1}x_{1,3}$, the output from the register 710*a* is $T_{2,1}+T_{2,2}+T_{2,3}$, the output from the register 708*d* is $T_{1,1}+T_{1,2}+T_{1,3}$, and the output from the register 710*d* is $a_{1,2}x_{2,1}x_{2,2}+a_{1,3}x_{2,1}x_{2,3}$ as shown in FIGS. 76 and 82.

In the cycle number 3×6+4, each selector controls such that the registers of the arithmetic operation circuits 700*a* and 700*d* store values as shown in FIGS. 75 and 81. In addition, the coefficient $b_1$ is read from the region 790*a* of the ROM 790. In addition, the signals that cause inputs from "0" in FIG. 68 to be output are supplied to the selectors 704*a* and 711*a*, and the signals that cause inputs from "1" in FIG. 74 to be output are supplied to the selectors 704*d* and 711*d*. As a result, the output from the register 708*a* is $a_{1,2}x_{1,1}x_{1,2}+a_{1,3}x_{1,1}x_{1,3}+a_{1,4}x_{1,1}x_{1,4}$, the output from the register 710*a* is $T_{2,1}+T_{2,2}+T_{2,3}$, the output from the register 708*d* is $T_{1,1}+T_{1,2}+T_{1,3}$, and the output from the register 710*d* is $a_{1,2}x_{2,1}x_{2,2}+a_{1,3}x_{2,1}x_{2,3}+a_{1,4}x_{2,1}x_{2,4}$ as shown in FIGS. 76 and 82.

In the cycle number 3×6+5, each selector controls such that the registers of the arithmetic operation circuits 700*a* and 700*d* store values as shown in FIGS. 75 and 81. In addition, the coefficient $b_4$ is read from the region 790*a* of the ROM 790. In addition, the signals that cause inputs from "1" in FIG. 68 to be output are supplied to the selectors 704*a* and 711*a*, and the signals that cause inputs from "0" in FIG. 74 to be output are supplied to the selectors 704*d* and 711*d*. As a result, the output from the register 708*a* is $a_{1,2}x_{1,1}x_{1,2}+a_{1,3}x_{1,1}x_{1,3}+a_{1,4}x_{1,1}x_{1,4}+b_1x_{1,1}=T_{1,1}$, the output from the register 710*a* is $T_{2,1}+T_{2,2}+T_{2,3}$, the output from the register 708*d* is $T_{1,1}+T_{1,2}+T_{1,3}$, and the output from the register 710*d* is $a_{1,2}x_{2,1}x_{2,2}+a_{1,3}x_{2,1}x_{2,3}+a_{1,4}x_{2,1}x_{2,4}+b_1x_{2,1}=T_{2,1}$ as shown in FIGS. 76 and 82.

In the cycle number 3×6+6, each selector controls such that the registers of the arithmetic operation circuits 700*a* and 700*d* store values as shown in FIGS. 75 and 81. As a result, the output from the register 708*a* is $T_{1,1}$, the output from the register 710*a* is $T_{2,1}+T_{2,2}+T_{2,3}+b_4x_{2,4}=T_{2,1}+T_{2,2}+T_{2,3}+T_{2,4}$, the output from the register 708*d* is $T_{1,1}+T_{1,2}+T_{1,3}+b_4x_{1,4}=T_{1,1}+T_{1,2}+T_{1,3}+T_{1,4}$ and the output from the register 710*d* is $T_{2,1}$ as shown in FIGS. 77 and 82.

The output value $T_{2,1}+T_{2,2}+T_{2,3}+T_{2,4}$ from the register 710*a* in the cycle number 3×6+6 corresponds to $f(x_2)$ as shown in formula (19), and the output value $T_{1,1}+T_{1,2}+T_{1,3}+T_{1,4}$ from the register 708*d* corresponds to $f(x_1)$ as shown in formula (18).

As described above, the arithmetic operation circuit according to Embodiment #4 can alleviate the restriction on the disposition of the ROM 790 and can prevent a drop of the maximum operation frequency by dividing the ROM 790 storing the coefficients $a_{ij}$ and $b_i$ into a plurality of regions and pipelining the arithmetic operation process of the quadratic polynomials $f(x_1)$ and $f(x_2)$. In addition, the arithmetic operation circuit according to Embodiment #4 and the arithmetic operation circuit according to Embodiment #4 generate the quadratic multivariate polynomial $f(x_1)$ from the input $x_1$ through the pipeline process in the order of the four arithmetic operation circuits 700*a*, 700*b*, 700*c*, and 700*d*, and the quadratic multivariate polynomial $f(x_2)$ from the input $x_2$ through the pipeline process in the reverse order thereof in parallel, and thus can further reduce the number of registers in comparison to the arithmetic operation circuit according to Embodiment #3.

Note that, in the above description, the example of the arithmetic operation circuit when the input x is 4 bits and the coefficients $a_{ij}$ and $b_i$ satisfy $1 \leq i < j \leq 4$ has been described, but the present disclosure is not limited thereto. When the number of bits of the input x or the maximum value of i and j is increased, by increasing, for example, the number of arithmetic operation circuits for performing the pipeline process and the number of divided regions of the ROM, arithmetic operation processes can be similarly performed in parallel while reducing the number of registers in the entire arithmetic operation circuits in comparison to the case in which a plurality of arithmetic operation circuits are simply provided.

For example, when the input x is 140 bits and the coefficients $a_{ij}$ and $b_i$ satisfy $1 \leq i < j \leq 140$, by dividing the ROM into 10 regions and disposing 20 arithmetic operation circuits in parallel to be pipelined, the arithmetic operation processes can be performed in parallel while reducing the number of registers in the entire arithmetic operation circuits in comparison to the case in which there are simply a plurality of arithmetic operation circuits.

In addition, it is needless to say that the arithmetic operation circuit according to Embodiment #3 and the arithmetic operation circuit according to Embodiment #4 can also be expanded when the circuits execute calculation of the multivariate polynomials F and G in parallel as in the arithmetic operation circuit according to Embodiment #2.

7: Conclusion

Finally, technical content relating to an embodiment of the present technology will be briefly summarized. The technical content described herein can be applied to, for example, various information processing apparatuses including PCs, mobile telephones, game devices, information terminals, home information appliances, car navigation systems, and the like. Note that functions of a device to be described below can be realized by one or more circuits, can be realized using one information processing apparatus, or can be realized using a plurality of information processing apparatuses. In addition, a data storage unit or an arithmetic operation processing unit used when the device to be described below executes a process may be provided in the device or provided in another apparatus connected thereto via a network.

A functional configuration of the device described above is expressed as below. For example, in order for a first shift register to array stored values, the device described in (1) below outputs the stored values using another shift register in a cycle in which the stored values have not been output. As a result, the number of cycles in which effective stored values are not output can be reduced, and an amount of arithmetic operation per unit cycle increases. In addition, in order to use a shift register, a selector with multi-bit inputs may not be used, and thus a circuit scale can be suppressed. Resultantly, a small-sized device that performs an arithmetic operation process at a high speed can be realized.

Note that, when predetermined numbers c=1 and c'=1, the device described in (1) below can be used in an arithmetic operation of the multivariate polynomial F described above for two inputs. When predetermined numbers c=1, c'=0, and c"=0, the device described in (5) below can be used in an arithmetic operation of the multivariate polynomials F and G described above. When predetermined numbers c=1 and c'=1, the device described in (13) and (16) below can be used in an arithmetic operation of the multivariate polynomial F described above for the two inputs.

(1)

An arithmetic operation device including:
a plurality of shift registers each constituted by first to $(N+1)^{th}$ registers and capable of moving a stored value from an $(n+1)^{th}$ register (n=1 to N) to an $n^{th}$ register; and
a control unit configured to cause a first shift register in which the first to $(N+1)^{th}$ registers respectively store stored values $x_1, \ldots, x_N$, and c (c is a predetermined number) to move the stored values, and to cause another shift register in which the first to $(N+1)^{th}$ registers respectively store stored values $x_N', \ldots, x_1'$, and c' (c' is a predetermined number) to move the stored values in the same cycle as the first shift register,
wherein the control unit
causes the stored values to be output from a predetermined pair of registers constituting the first shift register while causing the stored values to move so that all combinations of a pair of stored values selectable from the stored values $x_1, \ldots, x_N$, and c are output, and
causes the stored values to be output from a predetermined pair of registers constituting the other shift register while causing the stored values to move so that all combinations of a pair of stored values selectable from the stored values $x_N', \ldots, x_1'$, and c' are output.

(2)

The arithmetic operation device according to (1), further including:
a variable multiplication unit configured to multiply two stored values output from each of the shift registers;
a selection unit configured to select one from a plurality of output results from the variable multiplication unit;
a coefficient multiplication unit configured to multiply the output value of the selection unit by a predetermined coefficient;
a first summing unit configured to add up all output values of the coefficient multiplication unit relating to the stored values output from the first shift register; and
a second summing unit configured to add up all output values of the coefficient multiplication unit relating to the stored values output from the other shift register.

(3)

The arithmetic operation device according to (1) or (2),
wherein the predetermined pair of registers of the first shift register are the first and second registers, and
wherein the predetermined pair of registers of the other shift register are the first and $(N+1)^{th}$ registers.

(4)

The arithmetic operation device according to any one of (1) to (3), wherein, by combining a first control process in which the stored values stored in the second to $(N+1)^{th}$ registers are moved while a stored value stored in the first register is maintained and a second control process in which all stored values stored in the first to $(N+1)^{th}$ registers are moved, the control unit controls the shift registers so that all combinations of the pair of stored values are output.

(5)

An arithmetic operation device including:
a plurality of shift registers each constituted by first to $(N+1)^{th}$ registers and capable of moving a stored value from an $(n+1)^{th}$ register (n=1 to N) to an $n^{th}$ register; and
a control unit configured to cause a first shift register in which the first to $(N+1)^{th}$ registers respectively store stored values $x_1, \ldots, x_N$, and c (c is a predetermined number) to move the stored values, to cause a second shift register in which the first to $(N+1)^{th}$ registers respectively store stored values $x_N', \ldots, x_1'$, and c' (c' is a predetermined number) to move the stored values in the same cycle as the first shift register, and to cause a third shift register in which the first to $(N+1)^{th}$ registers respectively store stored values $x_N'', \ldots, x_1''$, and c" (c" is a predetermined number) to move the stored values in the same cycle as the second shift register,
wherein the control unit
causes the stored values to be output from a predetermined pair of registers constituting the first shift register while causing the stored values to move so that all combinations of a pair of stored values selectable from the stored values $x_1, \ldots, x_N$, and c are output, and causes the stored values to be output from predetermined pairs of registers constituting the second and third shift registers while causing the stored values to move so that all combinations of a pair of stored values selectable from the stored values $x_N', \ldots, x_1'$, and c' and all combinations of a pair of stored values selectable from the stored values $x_N'', \ldots, x_1''$, and c'' are output.

(6)

The arithmetic operation device according to (5), further including:

a variable multiplication unit configured to multiply two stored values output from each of the shift registers;

an addition unit configured to add an output value of the variable multiplication unit based on a first stored value output from the second shift register and a second stored value output from the third shift register to an output value of the variable multiplication unit based on a second stored value output from the second shift register and a first stored value output from the third shift register;

a selection unit configured to select one from a plurality of output results from the variable multiplication unit and the addition unit;

a coefficient multiplication unit configured to multiply the output value of the selection unit by a predetermined coefficient;

a first summing unit configured to add up all output values of the coefficient multiplication unit relating to the stored values output from the first shift register; and a second summing unit configured to add up output values of the coefficient multiplication unit relating to the stored values output from the second and third shift registers.

(7)

The arithmetic operation device according to (5) or (6), wherein the predetermined pair of registers of the first shift register are the first and second registers, and wherein the predetermined pairs of registers of the second and third shift registers are the first and $(N+1)^{th}$ registers.

(8)

The arithmetic operation device according to any one of (5) to (8), wherein, by combining a first control process in which the stored values stored in the second to $(N+1)^{th}$ registers are moved while a stored value stored in the first register is maintained and a second control process in which all stored values stored in the first to $(N+1)^{th}$ registers are moved, the control unit controls the shift registers so that all combinations of the pairs of stored values are output.

(9)

A control method including:

a step of causing, among a plurality of shift registers each constituted by) first to $(N+1)^{th}$ registers and capable of moving a stored value from an $(n+1)^{th}$ register (n=1 to N) to an $n^{th}$ register, a first shift register in which the first to (N+1 registers respectively store stored values $x_1, \ldots, x_N$, and c (c is a predetermined number) to move the stored values and causing another shift register in which the first to $(N+1)^{th}$ registers respectively store stored values $x_N', \ldots, x_1'$, and c' (c' is a predetermined number) to move the stored values in the same cycle as the first shift register, wherein, in the step of causing the movement, a process of outputting the stored values from a predetermined pair of registers constituting the first shift register while the stored values are moved so that all combinations of a pair of stored values selectable from the stored values $x_1, \ldots, x_N$, and c are output, and of outputting the stored values from a predetermined pair of registers constituting the other shift register while the stored values are moved so that all combinations of a pair of stored values selectable from the stored values $x_N', \ldots, x_1'$, and c' are output is performed.

(10)

A control method including:

a step of causing, among a plurality of shift registers each constituted by first to $(N+1)^{th}$ registers and capable of moving a stored value from an $(n+1)^{th}$ register (n=1 to N) to an $n^{th}$ register, a first shift register in which the first to $(N+1)^{th}$ registers respectively store stored values $x_1, \ldots, x_N$, and c (c is a predetermined number) to move the stored values, a second shift register in which the first to $(N+1)^{th}$ registers respectively store stored values $x_N', \ldots, x_1'$, and c' (c' is a predetermined number) to move the stored values in the same cycle as the first shift register, and a third shift register in which the first to $(N+1)^{th}$ registers respectively store stored values $x_N'', \ldots, x_1''$, and c'' (c'' is a predetermined number) to move the stored values in the same cycle as the second shift register, wherein, in the step of causing the movement, a process of outputting the stored values from a predetermined pair of registers constituting the first shift register while the stored values are moved so that all combinations of a pair of stored values selectable from the stored values $x_1, \ldots, x_N$, and c are output, and of outputting the stored values from predetermined pairs of registers constituting the second and third shift registers while the stored values are moved so that all combinations of a pair of stored values selectable from the stored values $x_N', \ldots, x_1'$, and c' and all combinations of a pair of stored values selectable from the stored values $x_N'', \ldots, x_1''$, and c'' are output is performed.

(11)

A program causing a computer to realize a control function of causing, among a plurality of shift registers each constituted by first to $(N+1)^{th}$ registers and capable of moving a stored value from an $(n+1)^{th}$ register (n=1 to N) to an $n^{th}$ register, a first shift register in which the first to $(N+1)^{th}$ registers respectively store stored values $x_1, \ldots, x_N$, and c (c is a predetermined number) to move the stored values and causing another shift register in which the first to $(N+1)^{th}$ registers respectively store stored values $x_N', \ldots, x_1'$, and c' (c' is a predetermined number) to move the stored values in the same cycle as the first shift register, wherein the control function causes the stored values to be output from a predetermined pair of registers constituting the first shift register while causing the stored values to move so that all combinations of a pair of stored values selectable from the stored values $x_1, \ldots, x_N$, and c are output, and causes the stored values to be output from a predetermined pair of registers constituting the other shift register while causing the stored values to move so that all combinations of a pair of stored values selectable from the stored values $x_N', \ldots, x_1'$, and c' are output.

(12)

A program causing a computer to realize a control function of causing, among a plurality of shift registers each constituted by first to $(N+1)^{th}$ registers and capable of moving a stored value from an $(n+1)^{th}$ register (n=1 to N) to an $n^{th}$ register, a first shift register in which the first to $(N+1)^{th}$ registers respectively store stored values $x_1, \ldots, x_N$, and c (c is a predetermined number) to move the stored values, a second shift register in which the first to $(N+1)^{th}$ registers respectively store stored values $x_N', \ldots, x_1'$, and c' (c' is a predetermined number) to move the stored values in the same cycle as the first shift register, and a third shift register in which the first to $(N+1)^{th}$ registers respectively store stored values $x_N{''}, \ldots, x_1{''}$, and c" (c" is a predetermined number) to move the stored values in the same cycle as the second shift register, wherein the control function causes the stored values to be output from a predetermined pair of registers constituting the first shift register while causing the stored values to move so that all combinations of a pair of stored values selectable from the stored values $x_1, \ldots, x_N$, and c are output, and causes the stored values to be output from predetermined pairs of registers constituting the second and third shift registers while causing the stored values to move so that all combinations of a pair of stored values selectable from the stored values $x_N{'}, \ldots, x_1{'}$, and c' and all combinations of a pair of stored values selectable from the stored values $x_N{''}, \ldots, x_1{''}$, and c" are output.

(13)

An arithmetic operation device including:

a plurality of arithmetic operation circuits each including a first shift register constituted by first to $(N+1)^{th}$ registers and capable of moving a stored value from an $(n+1)^{th}$ register (n=1 to N) to an $n^{th}$ register and a second shift register constituted by first to $(M+1)^{th}$ registers and capable of moving a stored value from an $(m+1)^{th}$ register (m=1 to M) to an $m^{th}$ register; and a control unit configured to cause the first shift register of each of the arithmetic operation circuits in which the first to $(N+1)^{th}$ registers respectively store stored values $x_1, \ldots, x_N$, and c (c is a predetermined number) to move the stored values, and to cause the second shift register thereof in which the first to $(M+1)^{th}$ registers respectively store stored values $x_M{'}, \ldots, x_1{'}$, and c' (c' is a predetermined number) to move the stored values in the same cycle as the first shift register, wherein the plurality of arithmetic operation circuits are connected to one another in series and configured to cause the first shift register and the second shift register to execute a pipeline process in the same order, wherein the control unit causes the stored values to be output from a predetermined pair of registers constituting the first shift register while causing the stored values to move so that all combinations of a pair of stored values selectable from the stored values $x_1, \ldots, x_N$, and c are output, and causes the stored values to be output from a predetermined pair of registers constituting the second shift register while causing the stored values to move so that all combinations of a pair of stored values selectable from the stored values $x_M{'}, \ldots, x_1{'}$, and c' are output, and wherein a number of registers N+1 of the first shift register is configured to gradually decrease in later arithmetic operation circuits in the pipeline process.

(14)

The arithmetic operation device according to (13), wherein each of the arithmetic operation circuits further includes:

a variable multiplication unit configured to multiply two stored values output from each of the shift registers;

a selection unit configured to select one from output results from the variable multiplication unit;

a coefficient multiplication unit configured to multiply the output value of the selection unit by a predetermined coefficient;

a first summing unit configured to add up all output values of the coefficient multiplication unit relating to the stored values output from the first shift register; and a second summing unit configured to add up all output values of the coefficient multiplication unit relating to the stored values output from the second shift register, wherein the first summing unit and the second summing unit further add the output value of the coefficient multiplication unit to the value summed by a first summing unit and a second summing unit of the arithmetic operation circuit provided in an earlier stage in the pipeline process.

(15)

The arithmetic operation device according to (13) or (14), wherein the predetermined pair of registers of the first shift register are the first and second registers, and wherein the predetermined pair of registers of the second shift register are the first and $(M+1)^{th}$ registers.

(16)

An arithmetic operation device including:

a plurality of arithmetic operation circuits each including a first shift register constituted by first to $(N+1)^{th}$ registers and capable of moving a stored value from an $(n+1)^{th}$ register (n=1 to N) to an $n^{th}$ register and a second shift register constituted by first to $(M+1)^{th}$ registers and capable of moving a stored value from an $(m+1)^{th}$ register (m=1 to M) to an $m^{th}$ register; and a control unit configured to cause the first shift register of each of the arithmetic operation circuits in which the first to $(N+1)^{th}$ registers respectively store stored values $x_1, \ldots, x_N$, and c (c is a predetermined number) to move the stored values, and to cause the second shift register thereof in which the first to $(m+1)^{th}$ registers respectively store stored values $x_M{'}, \ldots, x_1{'}$, and c' (c' is a predetermined number) to move the stored values in the same cycle as the first shift register, wherein the plurality of arithmetic operation circuits are connected to one another in series and configured to cause the first shift register and the second shift register to execute a pipeline process in reverse orders to each other, wherein the control unit causes the stored values to be output from a predetermined pair of registers constituting the first shift register while causing the stored values to move so that all combinations of a pair of stored values selectable from the stored values $x_1, \ldots, x_N$, and c are output, and causes the stored values to be output from a predetermined pair of registers constituting the second shift register while causing the stored values to move so that all combinations of a pair of stored values selectable from the stored values $x_M{'}, \ldots, x_1{'}$, and c' are output, and wherein a number of the first shift registers N+1 and a number of registers M+1 of the second shift register are configured to gradually decrease in later arithmetic operation circuits in the pipeline process.

(17)

The arithmetic operation device according to (16), wherein each of the arithmetic operation circuits further includes:

a variable multiplication unit configured to multiply two stored values output from each of the shift registers;

a selection unit configured to select one from output results from the variable multiplication unit;

a coefficient multiplication unit configured to multiply the output value of the selection unit by a predetermined coefficient;

a first summing unit configured to add up all output values of the coefficient multiplication unit relating to the stored values output from the first shift register; and a second summing unit configured to add up all output values of the coefficient multiplication unit relating to the stored values output from the second shift register, and wherein the first summing unit and the second summing unit further add the output value of the coefficient multiplication unit to a value summed by a first summing unit and a second summing unit of the arithmetic operation circuit provided in an earlier stage in the pipeline process.

(18)

A control method, with respect to each of a plurality of arithmetic operation circuits each including a first shift register constituted by first to $(N+1)^{th}$ registers and capable of moving a stored value from an $(n+1)^{th}$ register ($n=1$ to N) to an $n^{th}$ register and a second shift register constituted by first to $(M+1)^{th}$ registers and capable of moving a stored value from an $(m+1)^{th}$ register ($m=1$ to M) to an $m^{th}$ register, the method including:

a step of causing the first shift register in which the first to $(N+1)^{th}$ registers respectively store stored values $x_1, \ldots, x_N$, and c (c is a predetermined number) to move the stored values, and causing the second shift register in which the first to $(M+1)^{th}$ registers respectively store stored values $x_M', \ldots, x_1'$, and c' (c' is a predetermined number) to move the stored values in the same cycle as the first shift register, wherein the plurality of arithmetic operation circuits are connected to one another in series and configured to cause the first shift register and the second shift register to execute a pipeline process in the same order, and a number of registers N+1 of the first shift register is configured to gradually decrease in later arithmetic operation circuits in the pipeline process, and wherein, in the step of causing the movement, a process of outputting the stored values from a predetermined pair of registers constituting the first shift register while the stored values are moved so that all combinations of a pair of stored values selectable from the stored values $x_1, \ldots, x_N$, and c are output, and of outputting the stored values from a predetermined pair of registers constituting the second shift register while the stored values are moved so that all combinations of a pair of stored values selectable from the stored values $x_M', \ldots, x_1'$, and c' are output is performed.

(19)

A control method, with respect to each of a plurality of arithmetic operation circuits each including a first shift register constituted by first to $(N+1)^{th}$ registers and capable of moving a stored value from an $(n+1)^{th}$ register ($n=1$ to N) to an $n^{th}$ register and a second shift register constituted by first to $(M+1)^{th}$ registers and capable of moving a stored value from an $(m+1)^{th}$ register ($m=1$ to M) to an $m^{th}$ register, the method including:

a step of causing the first shift register in which the first to $(N+1)^{th}$ registers respectively store stored values $x_1, \ldots, x_N$, and c (c is a predetermined number) to move the stored values, and causing the second shift register in which the first to $(M+1)^{th}$ registers respectively store stored values $x_M', \ldots, x_1'$, and c' (c' is a predetermined number) to move the stored values in the same cycle as the first shift register, wherein the plurality of arithmetic operation circuits are connected to one another in series, and cause the first shift register and the second shift register to execute a pipeline process in reverse orders to each other, and a number of registers N+1 of the first shift register and a number of registers M+1 of the second shift register are configured to gradually decrease in later arithmetic operation circuits in the pipeline process, and wherein, in the step of causing the movement, a process of outputting the stored values from a predetermined pair of registers constituting the first shift register while the stored values are moved so that all combinations of a pair of stored values selectable from the stored values $x_1, \ldots, x_N$, and c are output, and of outputting the stored values from a predetermined pair of registers constituting the second shift register while the stored values are moved so that all combinations of a pair of stored values selectable from the stored values $x_M', \ldots, x_1'$, and c' are output is performed.

(20)

A computer-readable recording medium on which the program is recorded.

Hereinabove, the preferred embodiments according to the present technology have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST 401, 501 shift register
4011, 5011 first shift register
4012, 5012 second shift register
5013 third shift register
402, 403, 405, 502, 503, 504, 507 AND circuit
404, 407, 409, 411, 506, 509, 511, 513 selector
406, 505, 508 XOR circuit
408, 410, 510, 512 register

The invention claimed is:

1. An arithmetic operation device, comprising:
a plurality of shift registers each constituted by first to $(N+1)^{th}$ registers and configured to move a stored value from an $(n+1)^{th}$ register to an $n^{th}$ register, wherein ($n=1$ to N); and
a control unit configured to cause a first shift register, in which the first to $(N+1)^{th}$ registers respectively store stored values $x_1, \ldots, x_N$, and c, to move the stored values, and to cause a second shift register in which the first to $(N+1)^{th}$ registers respectively store stored values $x_N', \ldots, x_1'$, and c', to move the stored values in a same cycle as the first shift register, wherein c is a determined number, and c' is a determined number,
wherein the control unit is further configured to output the stored values from a first determined pair of registers constituting the first shift register while moving the stored values so that all combinations of a pair of stored values selectable from the stored values $x_1, \ldots, x_N$, and c are output, wherein the first determined pair of registers of the first shift register are the first register and the second register, and
output the stored values from second determined pair of registers constituting the second shift register while moving the stored values so that all combinations of a pair of stored values selectable from the stored values $x_N', \ldots, x_1'$, and c' are output, wherein the second determined pair of registers of the second shift register are the corresponding first register and the corresponding $(N+1)^{th}$ register.

2. The arithmetic operation device according to claim 1, further comprising:
- a variable multiplication unit configured to multiply two stored values output from each of the plurality of shift registers;
- a selection unit configured to select one from output results from the variable multiplication unit;
- a coefficient multiplication unit configured to multiply the output value of the selection unit by a determined coefficient;
- a first summing unit configured to add up all output values of the coefficient multiplication unit relating to the stored values output from the first shift register; and
- a second summing unit configured to add up all output values of the coefficient multiplication unit relating to the stored values output from the second shift register.

3. The arithmetic operation device according to claim 1, wherein, based on a combination of a first control process in which the stored values stored in the second to $(N+1)^{th}$ registers are moved while a stored value stored in the first register is maintained in at least one of the plurality of shift registers and a second control process in which all stored values stored in the first to $(N+1)^{th}$ registers are moved in the at least one of the plurality of shift registers, the control unit is further configured to control the plurality of shift registers so that all combinations of the pair of stored values are output.

4. An arithmetic operation device, comprising:
- a plurality of shift registers each constituted by first to $(N+1)^{th}$ registers and configured to move a stored value from an $(n+1)^{th}$ register to an $n^{th}$ register, wherein (n=1 to N); and
- a control unit configured to cause a first shift register, in which the first to $(N+1)^{th}$ registers respectively store stored values $x_1, \ldots, x_N$, and c, to move the stored values, to cause a second shift register in which the first to $(N+1)^{th}$ registers respectively store stored values $x_N', \ldots, x_1'$, and c' to move the stored values in a same cycle as the first shift register, and to cause a third shift register in which the first to $(N+1)^{th}$ registers respectively store stored values $x_N'', \ldots, x_1''$, and c'' to move the stored values in a same cycle as the second shift register, wherein c is a determined number, c' is a determined number and c'' is a determined number,
wherein the control unit
- is further configured to output the stored values from a first determined pair of registers constituting the first shift register while moving the stored values to move so that all combinations of a pair of stored values selectable from the stored values $x_1, \ldots, x_N$, and c are output, wherein the first determined pair of registers of the first shift register are the first register and the second register, and
- output the stored values from a second and a third determined pair of registers constituting the second and third shift registers respectively while moving the stored values so that all combinations of a pair of stored values selectable from the stored values $x_N', \ldots, x_1'$, and c' and all combinations of a pair of stored values selectable from the stored values $x_N'', \ldots, x_1''$, and c'', wherein the second and the third determined pair of registers in the second shift register and the third shift register respectively, are the corresponding first register and the corresponding $(N+1)^{th}$ register.

5. The arithmetic operation device according to claim 4, further comprising:
- a variable multiplication unit configured to multiply two stored values output from each of the plurality of shift registers;
- an addition unit configured to add an output value of the variable multiplication unit based on a first stored value output from the second shift register and a second stored value output from the third shift register to an output value of the variable multiplication unit based on a second stored value output from the second shift register and a first stored value output from the third shift register;
- a selection unit configured to select one from output results from the variable multiplication unit and the addition unit;
- a coefficient multiplication unit configured to multiply the output value of the selection unit by a determined coefficient;
- a first summing unit configured to add up all output values of the coefficient multiplication unit related to the stored values output from the first shift register; and
- a second summing unit configured to add up output values of the coefficient multiplication unit related to the stored values output from the second shift register and the third shift register.

6. The arithmetic operation device according to claim 4, wherein, based on a combination of a first control process in which the stored values stored in the second to $(N+1)^{th}$ registers are moved while a stored value stored in the first register is maintained in at least one of the plurality of shift registers and a second control process in which all stored values stored in the first to $(N+1)^{th}$ registers are moved in at least one of the plurality of shift registers, the control unit is configured to control the plurality of shift registers so that all combinations of the pairs of stored values are output.

7. A control method, comprising:
- moving stored values of, among a plurality of shift registers each constituted by first to $(N+1)^{th}$ registers and capable of moving a stored value from an $(n+1)^{th}$ register to an $n^{th}$ register, a first shift register in which the first to $(N+1)^{th}$ registers respectively store stored values $x_1, \ldots, x_N$, and c and moving stored values of a second shift register in which the first to $(N+1)^{th}$ registers respectively store stored values $x_N', \ldots, x_1'$, and c', in a same cycle as the first shift register, wherein (n=1 to N), wherein c is a determined number, and c' is a determined number;
- outputting the stored values from a first determined pair of registers constituting the first shift register while the stored values are moved so that all combinations of a pair of stored values selectable from the stored values $x_1, \ldots, x_N$, and c are output, wherein the first determined pair of registers of the first shift register are the first register and the second register; and
- outputting the stored values from a second determined pair of registers constituting the other shift register while the stored values are moved so that all combinations of a pair of stored values selectable from the stored values $x_N', \ldots, x_1'$, and c' are output is performed, wherein the second determined pair of registers of the second shift register are the corresponding first register and the corresponding $(N+1)^{th}$ register.

8. A control method, comprising:
- moving stored values of, among a plurality of shift registers each constituted by first to $(N+1)^{th}$ registers and capable of moving a stored value from an $(n+1)^{th}$ register to an $n^{th}$ register, a first shift register in which the first to $(N+1)^{th}$ registers respectively store stored values $x_1, \ldots, x_N$, and c, moving stored values of a second shift register in which the first to $(N+1)^{th}$ registers respectively store stored values $x_N', \ldots, x_1'$, and c', in a same cycle as the first shift register, and moving stored values of a third shift register in which the first to $(N+1)^{th}$ registers respectively store stored values $x_N'', \ldots, x_1''$, and c'', in the same cycle as the second shift register, wherein (n=1 to N), and wherein c is a determined number, c' is a determined number, and c'' is a determined number;

outputting the stored values from a first determined pair of registers constituting the first shift register while the stored values are moved so that all combinations of a pair of stored values selectable from the stored values $x_1, \ldots, x_N$, and c are output, wherein the first determined pair of registers of the first shift register are the first register and the second register; and outputting the stored values from second and third determined pairs of registers constituting the second and third shift registers respectively, while the stored values are moved so that all combinations of a pair of stored values selectable from the stored values $x_N', \ldots, x_1'$, and c' and all combinations of a pair of stored values selectable from the stored values $x_N'', \ldots, x_1''$, and c'' are respectively output is performed, wherein the second and third determined pairs of registers in the respective second and third shift registers are the corresponding first register and the corresponding $(N+1)^{th}$ register.

9. A non-transitory computer-readable storage medium, comprising instructions that when executed by a processor, cause the processor to perform operations, the operations comprising:

moving stored values of, among a plurality of shift registers each constituted by first to $(N+1)^{th}$ registers and capable of moving a stored value from an $(n+1)^{th}$ register to an $n^{th}$ register, a first shift register in which the first to $(N+1)^{th}$ registers respectively store stored values $x^1, \ldots, x^N$, and c to move the stored values and moving stored values of a second shift register in which the first to $(N+1)^{th}$ registers respectively store stored values $x_N', \ldots, x_1'$, and c', in a same cycle as the first shift register, wherein (n=1 to N), and wherein c is a determined number, and c' is a determined number;

outputting the stored values from a first determined pair of registers constituting the first shift register while moving the stored values so that all combinations of a pair of stored values selectable from the stored values $x_1, \ldots, x_N$, and c are output, wherein the first determined pair of registers of the first shift register are the first register and the second register; and outputting the stored values from a second determined pair of registers constituting the second shift register while moving the stored values so that all combinations of a pair of stored values selectable from the stored values $x_N', \ldots, x_1'$, and c' are output, wherein the second determined pair of registers of the second shift register are the corresponding first register and the corresponding $(N+1)^{th}$ register.

10. A non-transitory computer-readable storage medium, comprising instructions that when executed by a processor, cause the processor to perform operations, the operations comprising:

moving stored values of, among a plurality of shift registers each constituted by first to $(N+1)^{th}$ registers and capable of moving a stored value from an $(n+1)^{th}$ register to an $n^{th}$ register, a first shift register in which the first to $(N+1)^{th}$ registers respectively store stored values $x_1, \ldots, x_N$, and c, moving stored values of a second shift register in which the first to $(N+1)^{th}$ registers respectively store stored values $x_N', \ldots, x_1'$, and c', in a same cycle as the first shift register, and moving stored values of a third shift register in which the first to $(N+1)^{th}$ registers respectively store stored values $x_N'', \ldots, x_1''$, and c'', in the same cycle as the second shift register, wherein (n=1 to N), and wherein c is a determined number, c' is a determined number and c'' is a determined number;

outputting the stored values to be output from a first determined pair of registers constituting the first shift register while moving the stored values so that all combinations of a pair of stored values selectable from the stored values $x_1, \ldots, x_N$, and c are output, wherein the first determined pair of registers of the first shift register are the first register and the second register; and outputting the stored values from a second and third determined pairs of registers constituting the second and third shift registers respectively, while moving the stored values so that all combinations of a pair of stored values selectable from the stored values $x_N', \ldots, x_1'$, and c' and all combinations of a pair of stored values selectable from the stored values $x_N'', \ldots, x_1''$, and c'' are respectively output, wherein the second and third determined pairs of registers of the second and third shift registers respectively, are the corresponding first register and the corresponding $(N+1)^{th}$ register.

11. An arithmetic operation device, comprising:

a plurality of arithmetic operation circuits each including a first shift register constituted by first to $(N+1)^{th}$ registers and capable of movement of a stored value from an $(n+1)^{th}$ register to an $n^{th}$ register and a second shift register constituted by first to $(M+1)^{th}$ registers and capable of movement of a stored value from an $(m+1)^{th}$ register to an $m^{th}$ register, wherein (n=1 to N) and (m−1 to M); and a control unit configured to for the first shift register, of each of the arithmetic operation circuits in which the first to $(N+1)^{th}$ registers respectively store stored values $x_1, \ldots, x_N$, and c, move the stored values, and for the second shift register thereof in which the first to $(M+1)^{th}$ registers respectively store stored values $x_M', \ldots, x_1'$, and c', move the stored values in a same cycle as the first shift register, wherein c is a determined number, and c' is a determined number, wherein the plurality of arithmetic operation circuits are configured to cause the first shift register and the second shift register to execute a pipeline process in a determined order, wherein the control unit is configured to output the stored values from a first determined pair of registers constituting the first shift register while moving the stored values so that all combinations of a pair of stored values selectable from the stored values $x_1, \ldots, x_N$, and c are output, wherein the first determined pair of registers of the first shift register are the first register and the second register, and output the stored values from a second determined pair of registers constituting the second shift register while moving the stored values so that all combinations of a pair of stored values selectable from the stored values $x_M', \ldots, x_1'$, and c' are output, wherein the second determined pair of registers of the second shift register are the corresponding first register and the corresponding $(M+1)^{th}$ register, wherein a number of registers N+1 of the first shift register is configured to gradually decrease in later arithmetic operation circuits in the pipeline process.

12. The arithmetic operation device according to claim 11, wherein each of the arithmetic operation circuits further includes:
a variable multiplication unit configured to multiply two stored values output from each of the plurality of shift registers;
a selection unit configured to select one from output results from the variable multiplication unit;
a coefficient multiplication unit configured to multiply the output value of the selection unit by a determined coefficient;
a first summing unit configured to add up all output values of the coefficient multiplication unit relating to the stored values output from the first shift register; and
a second summing unit configured to add up all output values of the coefficient multiplication unit relating to the stored values output from the second shift register,
wherein the first summing unit and the second summing unit are configured to further add the output value of the coefficient multiplication unit to the value summed by a first summing unit and a second summing unit of the arithmetic operation circuit provided in an earlier stage in the pipeline process.

13. An arithmetic operation device, comprising:
a plurality of arithmetic operation circuits each including a first shift register constituted by first to $(N+1)^{th}$ registers and capable of movement of a stored value from an $(n+1)^{th}$ register to an $n^{th}$ register and a second shift register constituted by first to $(M+1)^{th}$ registers and capable of movement of a stored value from an $(m+1)^{th}$ register to an $m^{th}$ register, wherein (n=1 to N) and (m=1 to M); and
a control unit configured to cause the first shift register, of each of the arithmetic operation circuits in which the first to $(N+1)^{th}$ registers respectively store stored values $x_1, \ldots, x_N$, and c, to move the stored values, and to cause the second shift register thereof, in which the first to $(M+1)^{th}$ registers respectively store stored values $x_M', \ldots, x_1'$, and c', to move the stored values in a same cycle as the first shift register, wherein c is a determined number, and c' is a determined number,
wherein the plurality of arithmetic operation circuits are configured to cause the first shift register and the second shift register to execute a pipeline process in reverse orders to each other,
wherein the control unit
is further configured to output the stored values from a first determined pair of registers constituting the first shift register while moving the stored values so that all combinations of a pair of stored values selectable from the stored values $x_1, \ldots, x_N$, and c are output, wherein the first determined pair of registers of the first shift register are the first register and the second register, and
output the stored values from a second determined pair of registers constituting the second shift register while moving the stored values so that all combinations of a pair of stored values selectable from the stored values $x_M', \ldots, x_1'$, and c' are output, wherein the second determined pair of registers of the second shift register are the corresponding first register and the corresponding $(M+1)^{th}$ register,
wherein a number of registers N+1 of the first shift registers and a number of registers M+1 of the second shift register are configured to decrease in later arithmetic operation circuits in the pipeline process.

14. The arithmetic operation device according to claim 13, wherein each of the arithmetic operation circuits further includes:
a variable multiplication unit configured to multiply two stored values output from each of the plurality of shift registers;
a selection unit configured to select one from output results from the variable multiplication unit;
a coefficient multiplication unit configured to multiply the output value of the selection unit by a determined coefficient;
a first summing unit configured to add up all output values of the coefficient multiplication unit relating to the stored values output from the first shift register; and
a second summing unit configured to add up all output values of the coefficient multiplication unit relating to the stored values output from the second shift register, and
wherein the first summing unit and the second summing unit are further configured to add the output value of the coefficient multiplication unit to a value summed by a first summing unit and a second summing unit of the arithmetic operation circuit provided in an earlier stage in the pipeline process.

15. A control method, the control method comprising:
in each of a plurality of arithmetic operation circuits each including a first shift register constituted by first to $(N+1)^{th}$ registers and capable of moving a stored value from an $(n+1)^{th}$ register (n=1 to N) to an $n^{th}$ register and a second shift register constituted by first to $(M+1)^{th}$ registers and capable of moving a stored value from an $(m+1)^{th}$ register to an $m^{th}$ register, wherein (n=1 to N), and (m=1 to M),
moving stored values of the first shift register in which the first to $(N+1)^{th}$ registers respectively store stored values $x_1, \ldots, x_N$, and c, and moving the stored values of the second shift register in which the first to $(M+1)^{th}$ registers respectively store stored values $x_M', \ldots, x_1'$, and c' in a same cycle as the first shift register, wherein c is a determined number, and c' is a determined number,
wherein the plurality of arithmetic operation circuits are configured to cause the first shift register and the second shift register to execute a pipeline process in a determined order, and a number of registers N+1 of the first shift register is configured to decrease in later arithmetic operation circuits in the pipeline process;
outputting the stored values from a first determined pair of registers constituting the first shift register while the stored values are moved so that all combinations of a pair of stored values selectable from the stored values $x_1, \ldots, x_N$, and c are output, wherein the first determined pair of registers of the first shift register are the first register and the second register; and
outputting the stored values from a second determined pair of registers constituting the second shift register while the stored values are moved so that all combinations of a pair of stored values selectable from the stored values $x_M', \ldots, x_1'$, and c' are output, wherein the second determined pair of registers of the second shift register are the corresponding first register and the corresponding $(M+1)^{th}$ register.

16. A control method, the control method comprising:
in each of a plurality of arithmetic operation circuits each including a first shift register constituted by first to (N+1)$^{th}$ registers and capable of moving a stored value from an (n+1)$^{th}$ register to an n$^{th}$ register and a second shift register constituted by first to (M+1)$^{th}$ registers and capable of moving a stored value from an (m+1)$^{th}$ register to an m$^{th}$ register, wherein (n=1 to N) and (m=1 to M), moving stored values of the first shift register in which the first to (N+1)$^{th}$ registers respectively store stored values $x_1, \ldots, x_N$, and c, and moving stored values of the second shift register in which the first to (M+1)$^{th}$ registers respectively store stored values $x_M', \ldots, x_1'$, and c' to move the stored values in a same cycle as the first shift register, wherein c is a determined number, and c' is a determined number wherein the plurality of arithmetic operation circuits are connected to one another in series, and cause the first shift register and the second shift register to execute a pipeline process in reverse orders to each other, and a number of registers N+1 of the first shift register and a number of registers M+1 of the second shift register are configured to decrease in later arithmetic operation circuits in the pipeline process;

outputting the stored values from a first determined pair of registers constituting the first shift register while the stored values are moved so that all combinations of a pair of stored values selectable from the stored values $x_1, \ldots, x_N$, and c are output, wherein the first determined pair of registers of the first shift register are the first register and the second register; and outputting the stored values from a second determined pair of registers constituting the second shift register while the stored values are moved so that all combinations of a pair of stored values selectable from the stored values $x_M', \ldots, x_1'$, and c' are output is performed, wherein the second determined pair of registers of the second shift register are the corresponding first register and the corresponding (M+1)$^{th}$ register.

* * * * *